US009865248B2

(12) United States Patent
Fleizach et al.

(10) Patent No.: US 9,865,248 B2
(45) Date of Patent: *Jan. 9, 2018

(54) INTELLIGENT TEXT-TO-SPEECH CONVERSION

(71) Applicant: Apple Inc., Cupertino, CA (US)

(72) Inventors: Christopher Brian Fleizach, Morgan Hill, CA (US); Reginald Dean Hudson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/451,021

(22) Filed: Mar. 6, 2017

(65) Prior Publication Data

US 2017/0178620 A1  Jun. 22, 2017

Related U.S. Application Data

(63) Continuation of application No. 15/090,544, filed on Apr. 4, 2016, now Pat. No. 9,626,955, which is a (Continued)

(51) Int. Cl.
*G10L 13/00* (2006.01)
*G10L 13/027* (2013.01)
(Continued)

(52) U.S. Cl.
CPC ........ *G10L 13/027* (2013.01); *G06F 17/2705* (2013.01); *G10L 13/00* (2013.01);
(Continued)

(58) Field of Classification Search
CPC ..... G10L 13/043; G10L 15/22; G10L 13/033; G10L 13/08; G10L 13/10;
(Continued)

(56) References Cited

U.S. PATENT DOCUMENTS

| 1,559,320 A | 10/1925 | Hirsh |
| 2,180,522 A | 11/1939 | Henne |

(Continued)

FOREIGN PATENT DOCUMENTS

| CA | 2178696 A1 | 12/1996 |
| CA | 2694314 A1 | 8/2010 |

(Continued)

OTHER PUBLICATIONS

"Alexa, Turn Up the Heat!", Smartthings Samsung [online], Available online at https://web.archive.org/web/20160329142041/https://blog.smartthings.com/news/smartthingsupdates/alexa-turn-up-the-heat/, Mar. 3, 2016, 3 pages.

(Continued)

*Primary Examiner* — Michael Colucci
(74) *Attorney, Agent, or Firm* — Dentons US LLP

(57) ABSTRACT

Techniques for improved text-to-speech processing are disclosed. The improved text-to-speech processing can convert text from an electronic document into an audio output that includes speech associated with the text as well as audio contextual cues. One aspect provides audio contextual cues to the listener when outputting speech (spoken text) pertaining to a document. The audio contextual cues can be based on an analysis of a document prior to a text-to-speech conversion. Another aspect can produce an audio summary for a file. The audio summary for a document can thereafter be presented to a user so that the user can hear a summary of the document without having to process the document to produce its spoken text via text-to-speech conversion.

20 Claims, 12 Drawing Sheets

Related U.S. Application Data continuation of application No. 14/631,526, filed on Feb. 25, 2015, now Pat. No. 9,305,543, which is a continuation of application No. 12/098,417, filed on Apr. 5, 2008, now Pat. No. 8,996,376.

(51) Int. Cl.

| | | |
|---|---|---|
| *G10L 13/04* | (2013.01) | |
| *G06F 17/27* | (2006.01) | |
| *G10L 19/018* | (2013.01) | |
| *G10L 13/08* | (2013.01) | |

(52) U.S. Cl.
   CPC ............ *G10L 13/043* (2013.01); *G10L 13/08* (2013.01); *G10L 19/018* (2013.01)

(58) Field of Classification Search
   CPC ......... G06F 17/30011; G06F 17/30684; G06F 17/241; G06F 17/2705; G06F 17/30672; G06F 17/30905
   USPC .......... 381/56, 320; 715/239, 854, 763, 716, 715/200; 704/260, 9, 270.1, 243, 235, 704/208; 707/999.003; 709/206, 219; 700/94; 379/257; 365/232, 231; 713/219; 705/17; 434/317; 370/311; 345/173
   See application file for complete search history.

(56) References Cited

U.S. PATENT DOCUMENTS

| | | | |
|---|---|---|---|
| 2,495,222 A | 1/1950 | Bierig | |
| 3,704,345 A | 11/1972 | Coker et al. | |
| 3,710,321 A | 1/1973 | Rubenstein | |
| 3,787,542 A | 1/1974 | Gallagher et al. | |
| 3,828,132 A | 8/1974 | Flanagan et al. | |
| 3,979,557 A | 9/1976 | Schulman et al. | |
| 4,013,085 A | 3/1977 | Wright | |
| 4,081,631 A | 3/1978 | Feder | |
| 4,090,216 A | 5/1978 | Constable | |
| 4,107,784 A | 8/1978 | Van Bemmelen | |
| 4,108,211 A | 8/1978 | Tanaka | |
| 4,159,536 A | 6/1979 | Kehoe et al. | |
| 4,181,821 A | 1/1980 | Pirz et al. | |
| 4,204,089 A | 5/1980 | Key et al. | |
| 4,241,286 A | 12/1980 | Gordon | |
| 4,253,477 A | 3/1981 | Eichman | |
| 4,278,838 A | 7/1981 | Antonov | |
| 4,282,405 A | 8/1981 | Taguchi | |
| 4,310,721 A | 1/1982 | Manley et al. | |
| 4,332,464 A | 6/1982 | Bartulis et al. | |
| 4,348,553 A | 9/1982 | Baker et al. | |
| 4,384,169 A | 5/1983 | Mozer et al. | |
| 4,386,345 A | 5/1983 | Narveson et al. | |
| 4,433,377 A | 2/1984 | Eustis et al. | |
| 4,451,849 A | 5/1984 | Fuhrer | |
| 4,485,439 A | 11/1984 | Rothstein | |
| 4,495,644 A | 1/1985 | Parks et al. | |
| 4,513,379 A | 4/1985 | Wilson et al. | |
| 4,513,435 A | 4/1985 | Sakoe et al. | |
| 4,577,343 A | 3/1986 | Oura | |
| 4,586,158 A | 4/1986 | Brandle | |
| 4,587,670 A | 5/1986 | Levinson et al. | |
| 4,589,022 A | 5/1986 | Prince et al. | |
| 4,611,346 A | 9/1986 | Bednar et al. | |
| 4,615,081 A | 10/1986 | Lindahl | |
| 4,618,984 A | 10/1986 | Das et al. | |
| 4,642,790 A | 2/1987 | Minshull et al. | |
| 4,653,021 A | 3/1987 | Takagi | |
| 4,654,875 A | 3/1987 | Srihari et al. | |
| 4,655,233 A | 4/1987 | Laughlin | |
| 4,658,425 A | 4/1987 | Julstrom | |
| 4,670,848 A | 6/1987 | Schramm | |
| 4,677,570 A | 6/1987 | Taki | |
| 4,680,429 A | 7/1987 | Murdock et al. | |
| 4,680,805 A | 7/1987 | Scott | |
| 4,686,522 A | 8/1987 | Hernandez et al. | |
| 4,688,195 A | 8/1987 | Thompson et al. | |
| 4,692,941 A | 9/1987 | Jacks et al. | |
| 4,698,625 A | 10/1987 | McCaskill et al. | |
| 4,709,390 A | 11/1987 | Atal et al. | |
| 4,713,775 A | 12/1987 | Scott et al. | |
| 4,718,094 A | 1/1988 | Bahl et al. | |
| 4,724,542 A | 2/1988 | Williford | |
| 4,726,065 A | 2/1988 | Froessl | |
| 4,727,354 A | 2/1988 | Lindsay | |
| RE32,632 E | 3/1988 | Atkinson | |
| 4,736,296 A | 4/1988 | Katayama et al. | |
| 4,750,122 A | 6/1988 | Kaji et al. | |
| 4,754,489 A | 6/1988 | Bokser | |
| 4,755,811 A | 7/1988 | Slavin et al. | |
| 4,759,070 A | 7/1988 | Voroba et al. | |
| 4,776,016 A | 10/1988 | Hansen | |
| 4,783,804 A | 11/1988 | Juang et al. | |
| 4,783,807 A | 11/1988 | Marley | |
| 4,785,413 A | 11/1988 | Atsumi | |
| 4,790,028 A | 12/1988 | Ramage | |
| 4,797,930 A | 1/1989 | Goudie | |
| 4,802,223 A | 1/1989 | Lin et al. | |
| 4,803,729 A | 2/1989 | Baker | |
| 4,807,752 A | 2/1989 | Chodorow | |
| 4,811,243 A | 3/1989 | Racine | |
| 4,813,074 A | 3/1989 | Marcus | |
| 4,819,271 A | 4/1989 | Bahl et al. | |
| 4,827,518 A | 5/1989 | Feustel et al. | |
| 4,827,520 A | 5/1989 | Zeinstra | |
| 4,829,576 A | 5/1989 | Porter | |
| 4,829,583 A | 5/1989 | Monroe et al. | |
| 4,831,551 A | 5/1989 | Schalk et al. | |
| 4,833,712 A | 5/1989 | Bahl et al. | |
| 4,833,718 A | 5/1989 | Sprague | |
| 4,837,798 A | 6/1989 | Cohen et al. | |
| 4,837,831 A | 6/1989 | Gillick et al. | |
| 4,839,853 A | 6/1989 | Deerwester et al. | |
| 4,852,168 A | 7/1989 | Sprague | |
| 4,862,504 A | 8/1989 | Nomura | |
| 4,875,187 A | 10/1989 | Smith | |
| 4,878,230 A | 10/1989 | Murakami et al. | |
| 4,887,212 A | 12/1989 | Zamora et al. | |
| 4,896,359 A | 1/1990 | Yamamoto et al. | |
| 4,903,305 A | 2/1990 | Gillick et al. | |
| 4,905,163 A | 2/1990 | Garber et al. | |
| 4,908,867 A | 3/1990 | Silverman | |
| 4,914,704 A | 4/1990 | Cole et al. | |
| 4,955,047 A | 9/1990 | Morganstein et al. | |
| 4,965,763 A | 10/1990 | Zamora | |
| 4,972,462 A | 11/1990 | Shibata | |
| 4,974,191 A | 11/1990 | Amirghodsi et al. | |
| 4,975,975 A | 12/1990 | Filipski | |
| 4,977,598 A | 12/1990 | Doddington et al. | |
| 4,980,916 A | 12/1990 | Zinser | |
| 4,985,924 A | 1/1991 | Matsuura | |
| 4,992,972 A | 2/1991 | Brooks et al. | |
| 4,994,966 A | 2/1991 | Hutchins | |
| 4,994,983 A | 2/1991 | Landell et al. | |
| 5,001,774 A | 3/1991 | Lee | |
| 5,003,577 A | 3/1991 | Ertz et al. | |
| 5,007,095 A | 4/1991 | Nara et al. | |
| 5,007,098 A | 4/1991 | Kumagai | |
| 5,010,574 A | 4/1991 | Wang | |
| 5,016,002 A | 5/1991 | Levanto | |
| 5,020,112 A | 5/1991 | Chou | |
| 5,021,971 A | 6/1991 | Lindsay | |
| 5,022,081 A | 6/1991 | Hirose et al. | |
| 5,027,110 A | 6/1991 | Chang et al. | |
| 5,027,406 A | 6/1991 | Roberts et al. | |
| 5,027,408 A | 6/1991 | Kroeker et al. | |
| 5,029,211 A | 7/1991 | Ozawa | |
| 5,031,217 A | 7/1991 | Nishimura | |
| 5,032,989 A | 7/1991 | Tornetta | |
| 5,033,087 A | 7/1991 | Bahl et al. | |
| 5,040,218 A | 8/1991 | Vitale et al. | |
| 5,046,099 A | 9/1991 | Nishimura | |

(56) References Cited

U.S. PATENT DOCUMENTS

| | | |
|---|---|---|
| 5,047,614 A | 9/1991 | Bianco |
| 5,047,617 A | 9/1991 | Shepard et al. |
| 5,050,215 A | 9/1991 | Nishimura |
| 5,053,758 A | 10/1991 | Cornett et al. |
| 5,054,084 A | 10/1991 | Tanaka et al. |
| 5,057,915 A | 10/1991 | Von Kohorn |
| 5,062,143 A | 10/1991 | Schmitt |
| 5,067,158 A | 11/1991 | Arjmand |
| 5,067,503 A | 11/1991 | Stile |
| 5,072,452 A | 12/1991 | Brown et al. |
| 5,075,896 A | 12/1991 | Wilcox et al. |
| 5,079,723 A | 1/1992 | Herceg et al. |
| 5,083,119 A | 1/1992 | Trevett et al. |
| 5,083,268 A | 1/1992 | Hemphill et al. |
| 5,086,792 A | 2/1992 | Chodorow |
| 5,090,012 A | 2/1992 | Kajiyama et al. |
| 5,091,790 A | 2/1992 | Silverberg |
| 5,091,945 A | 2/1992 | Kleijn |
| 5,103,498 A | 4/1992 | Lanier et al. |
| 5,109,509 A | 4/1992 | Katayama et al. |
| 5,111,423 A | 5/1992 | Kopec, Jr. et al. |
| 5,119,079 A | 6/1992 | Hube et al. |
| 5,122,951 A | 6/1992 | Kamiya |
| 5,123,103 A | 6/1992 | Ohtaki et al. |
| 5,125,022 A | 6/1992 | Hunt et al. |
| 5,125,030 A | 6/1992 | Nomura et al. |
| 5,127,043 A | 6/1992 | Hunt et al. |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,133,023 A | 7/1992 | Bokser |
| 5,142,584 A | 8/1992 | Ozawa |
| 5,144,875 A | 9/1992 | Nakada |
| 5,148,541 A | 9/1992 | Lee et al. |
| 5,153,913 A | 10/1992 | Kandefer et al. |
| 5,157,610 A | 10/1992 | Asano et al. |
| 5,157,779 A | 10/1992 | Washburn et al. |
| 5,161,102 A | 11/1992 | Griffin et al. |
| 5,163,809 A | 11/1992 | Akgun et al. |
| 5,164,900 A | 11/1992 | Bernath |
| 5,164,982 A | 11/1992 | Davis |
| 5,165,007 A | 11/1992 | Bahl et al. |
| 5,167,004 A | 11/1992 | Netsch et al. |
| 5,175,536 A | 12/1992 | Aschliman et al. |
| 5,175,803 A | 12/1992 | Yeh |
| 5,175,814 A | 12/1992 | Anick et al. |
| 5,179,627 A | 1/1993 | Sweet et al. |
| 5,179,652 A | 1/1993 | Rozmanith et al. |
| 5,194,950 A | 3/1993 | Murakami et al. |
| 5,195,034 A | 3/1993 | Garneau et al. |
| 5,195,167 A | 3/1993 | Bahl et al. |
| 5,197,005 A | 3/1993 | Shwartz et al. |
| 5,199,077 A | 3/1993 | Wilcox et al. |
| 5,201,034 A | 4/1993 | Matsuura et al. |
| 5,202,952 A | 4/1993 | Gillick et al. |
| 5,208,862 A | 5/1993 | Ozawa |
| 5,210,689 A | 5/1993 | Baker et al. |
| 5,212,638 A | 5/1993 | Bernath et al. |
| 5,212,821 A | 5/1993 | Gorin et al. |
| 5,216,747 A | 6/1993 | Hardwick et al. |
| 5,218,700 A | 6/1993 | Beechick |
| 5,220,629 A | 6/1993 | Kosaka et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,231,670 A | 7/1993 | Goldhor et al. |
| 5,235,680 A | 8/1993 | Bijnagte |
| 5,237,502 A | 8/1993 | White et al. |
| 5,241,619 A | 8/1993 | Schwartz et al. |
| 5,252,951 A | 10/1993 | Tannenbaum et al. |
| 5,253,325 A | 10/1993 | Clark |
| 5,255,386 A | 10/1993 | Prager |
| 5,257,387 A | 10/1993 | Richek et al. |
| 5,260,697 A | 11/1993 | Barrett et al. |
| 5,266,931 A | 11/1993 | Tanaka |
| 5,266,949 A | 11/1993 | Rossi |
| 5,267,345 A | 11/1993 | Brown et al. |
| 5,268,990 A | 12/1993 | Cohen et al. |
| 5,274,771 A | 12/1993 | Hamilton et al. |
| 5,274,818 A | 12/1993 | Vasilevsky et al. |
| 5,276,616 A | 1/1994 | Kuga et al. |
| 5,276,794 A | 1/1994 | Lamb, Jr. |
| 5,278,980 A | 1/1994 | Pedersen et al. |
| 5,282,265 A | 1/1994 | Rohra Suda et al. |
| 5,283,818 A | 2/1994 | Klausner et al. |
| 5,287,448 A | 2/1994 | Nicol et al. |
| 5,289,562 A | 2/1994 | Mizuta et al. |
| RE34,562 E | 3/1994 | Murakami et al. |
| 5,291,286 A | 3/1994 | Murakami et al. |
| 5,293,254 A | 3/1994 | Eschbach |
| 5,293,448 A | 3/1994 | Honda |
| 5,293,452 A | 3/1994 | Picone et al. |
| 5,296,642 A | 3/1994 | Konishi |
| 5,297,170 A | 3/1994 | Eyuboglu et al. |
| 5,297,194 A | 3/1994 | Hunt et al. |
| 5,299,125 A | 3/1994 | Baker et al. |
| 5,299,284 A | 3/1994 | Roy |
| 5,301,109 A | 4/1994 | Landauer et al. |
| 5,303,406 A | 4/1994 | Hansen et al. |
| 5,305,205 A | 4/1994 | Weber et al. |
| 5,305,421 A | 4/1994 | Li |
| 5,305,768 A | 4/1994 | Gross et al. |
| 5,309,359 A | 5/1994 | Katz et al. |
| 5,315,689 A | 5/1994 | Kanazawa et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,325,462 A | 6/1994 | Farrett |
| 5,326,270 A | 7/1994 | Ostby et al. |
| 5,327,342 A | 7/1994 | Roy |
| 5,327,498 A | 7/1994 | Hamon |
| 5,329,608 A | 7/1994 | Bocchieri et al. |
| 5,333,236 A | 7/1994 | Bahl et al. |
| 5,333,266 A | 7/1994 | Boaz et al. |
| 5,333,275 A | 7/1994 | Wheatley et al. |
| 5,335,011 A | 8/1994 | Addeo et al. |
| 5,335,276 A | 8/1994 | Thompson et al. |
| 5,341,293 A | 8/1994 | Vertelney et al. |
| 5,341,466 A | 8/1994 | Perlin et al. |
| 5,345,536 A | 9/1994 | Hoshimi et al. |
| 5,349,645 A | 9/1994 | Zhao |
| 5,353,374 A | 10/1994 | Wilson et al. |
| 5,353,376 A | 10/1994 | Oh et al. |
| 5,353,377 A | 10/1994 | Kuroda et al. |
| 5,353,408 A | 10/1994 | Kato et al. |
| 5,353,432 A | 10/1994 | Richek et al. |
| 5,357,431 A | 10/1994 | Nakada et al. |
| 5,367,640 A | 11/1994 | Hamilton et al. |
| 5,369,575 A | 11/1994 | Lamberti et al. |
| 5,369,577 A | 11/1994 | Kadashevich et al. |
| 5,371,853 A | 12/1994 | Kao et al. |
| 5,371,901 A | 12/1994 | Reed et al. |
| 5,373,566 A | 12/1994 | Murdock |
| 5,377,103 A | 12/1994 | Lamberti et al. |
| 5,377,301 A | 12/1994 | Rosenberg et al. |
| 5,377,303 A | 12/1994 | Firman |
| 5,384,671 A | 1/1995 | Fisher |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,236 A | 2/1995 | Klausner et al. |
| 5,390,279 A | 2/1995 | Strong |
| 5,390,281 A | 2/1995 | Luciw et al. |
| 5,392,419 A | 2/1995 | Walton |
| 5,396,625 A | 3/1995 | Parkes |
| 5,400,434 A | 3/1995 | Pearson |
| 5,404,295 A | 4/1995 | Katz et al. |
| 5,406,305 A | 4/1995 | Shimomura et al. |
| 5,408,060 A | 4/1995 | Muurinen |
| 5,412,756 A | 5/1995 | Bauman et al. |

(56) References Cited

U.S. PATENT DOCUMENTS

| | | |
|---|---|---|
| 5,412,804 A | 5/1995 | Krishna |
| 5,412,806 A | 5/1995 | Du et al. |
| 5,418,951 A | 5/1995 | Damashek |
| 5,422,656 A | 6/1995 | Allard et al. |
| 5,424,947 A | 6/1995 | Nagao et al. |
| 5,425,108 A | 6/1995 | Hwang et al. |
| 5,428,731 A | 6/1995 | Powers, III |
| 5,434,777 A | 7/1995 | Luciw |
| 5,440,615 A | 8/1995 | Caccuro et al. |
| 5,442,598 A | 8/1995 | Haikawa et al. |
| 5,442,780 A | 8/1995 | Takanashi et al. |
| 5,444,823 A | 8/1995 | Nguyen |
| 5,449,368 A | 9/1995 | Kuzmak |
| 5,450,523 A | 9/1995 | Zhao |
| 5,455,888 A | 10/1995 | Iyengar et al. |
| 5,457,768 A | 10/1995 | Tsuboi et al. |
| 5,459,488 A | 10/1995 | Geiser |
| 5,463,696 A | 10/1995 | Beernink et al. |
| 5,463,725 A | 10/1995 | Henckel et al. |
| 5,465,401 A | 11/1995 | Thompson |
| 5,469,529 A | 11/1995 | Bimbot et al. |
| 5,471,611 A | 11/1995 | McGregor |
| 4,555,775 B1 | 12/1995 | Pike |
| 5,473,728 A | 12/1995 | Luginbuhl et al. |
| 5,475,587 A | 12/1995 | Anick et al. |
| 5,475,796 A | 12/1995 | Iwata |
| 5,477,447 A | 12/1995 | Luciw et al. |
| 5,477,448 A | 12/1995 | Golding et al. |
| 5,477,451 A | 12/1995 | Brown et al. |
| 5,479,488 A | 12/1995 | Lennig et al. |
| 5,481,739 A | 1/1996 | Staats |
| 5,483,261 A | 1/1996 | Yasutake |
| 5,485,372 A | 1/1996 | Golding et al. |
| 5,485,543 A | 1/1996 | Aso |
| 5,488,204 A | 1/1996 | Mead et al. |
| 5,488,727 A | 1/1996 | Agrawal et al. |
| 5,490,234 A | 2/1996 | Narayan |
| 5,491,758 A | 2/1996 | Bellegarda et al. |
| 5,491,772 A | 2/1996 | Hardwick et al. |
| 5,493,677 A | 2/1996 | Balogh et al. |
| 5,495,604 A | 2/1996 | Harding et al. |
| 5,497,319 A | 3/1996 | Chong et al. |
| 5,500,903 A | 3/1996 | Gulli |
| 5,500,905 A | 3/1996 | Martin et al. |
| 5,500,937 A | 3/1996 | Thompson-Rohrlich |
| 5,502,774 A | 3/1996 | Bellegarda et al. |
| 5,502,790 A | 3/1996 | Yi |
| 5,502,791 A | 3/1996 | Nishimura et al. |
| 5,515,475 A | 5/1996 | Gupta et al. |
| 5,521,816 A | 5/1996 | Roche et al. |
| 5,524,140 A | 6/1996 | Klausner et al. |
| 5,530,861 A | 6/1996 | Diamant et al. |
| 5,530,950 A | 6/1996 | Medan et al. |
| 5,533,182 A | 7/1996 | Bates et al. |
| 5,535,121 A | 7/1996 | Roche et al. |
| 5,536,902 A | 7/1996 | Serra et al. |
| 5,537,317 A | 7/1996 | Schabes et al. |
| 5,537,618 A | 7/1996 | Boulton et al. |
| 5,537,647 A | 7/1996 | Hermansky et al. |
| 5,543,588 A | 8/1996 | Bisset et al. |
| 5,543,897 A | 8/1996 | Altrieth, III |
| 5,544,264 A | 8/1996 | Bellegarda et al. |
| 5,548,507 A | 8/1996 | Martino et al. |
| 5,551,049 A | 8/1996 | Kaplan et al. |
| 5,555,343 A * | 9/1996 | Luther .................. G10L 13/08 704/258 |
| 5,555,344 A | 9/1996 | Zunkler |
| 5,559,301 A | 9/1996 | Bryan, Jr. et al. |
| 5,559,945 A | 9/1996 | Beaudet et al. |
| 5,564,446 A | 10/1996 | Wiltshire |
| 5,565,888 A | 10/1996 | Selker |
| 5,568,536 A | 10/1996 | Tiller et al. |
| 5,568,540 A | 10/1996 | Greco et al. |
| 5,570,324 A | 10/1996 | Geil |
| 5,572,576 A | 11/1996 | Klausner et al. |
| 5,574,823 A | 11/1996 | Hassanein et al. |
| 5,574,824 A | 11/1996 | Slyh et al. |
| 5,577,135 A | 11/1996 | Grajski et al. |
| 5,577,164 A | 11/1996 | Kaneko et al. |
| 5,577,241 A | 11/1996 | Spencer |
| 5,578,808 A | 11/1996 | Taylor |
| 5,579,037 A | 11/1996 | Tahara et al. |
| 5,579,436 A | 11/1996 | Chou et al. |
| 5,581,484 A | 12/1996 | Prince |
| 5,581,652 A | 12/1996 | Abe et al. |
| 5,581,655 A | 12/1996 | Cohen et al. |
| 5,583,993 A | 12/1996 | Foster et al. |
| 5,584,024 A | 12/1996 | Shwartz |
| 5,586,540 A | 12/1996 | Marzec et al. |
| 5,594,641 A | 1/1997 | Kaplan et al. |
| 5,596,260 A | 1/1997 | Moravec et al. |
| 5,596,676 A | 1/1997 | Swaminathan et al. |
| 5,596,994 A | 1/1997 | Bro |
| 5,608,624 A | 3/1997 | Luciw |
| 5,608,698 A | 3/1997 | Yamanoi et al. |
| 5,608,841 A | 3/1997 | Tsuboka |
| 5,610,812 A | 3/1997 | Schabes et al. |
| 5,613,036 A | 3/1997 | Strong |
| 5,613,122 A | 3/1997 | Burnard et al. |
| 5,615,378 A | 3/1997 | Nishino et al. |
| 5,615,384 A | 3/1997 | Allard et al. |
| 5,616,876 A | 4/1997 | Cluts |
| 5,617,386 A | 4/1997 | Choi |
| 5,617,507 A | 4/1997 | Lee et al. |
| 5,617,539 A | 4/1997 | Ludwig et al. |
| 5,619,583 A | 4/1997 | Page et al. |
| 5,619,694 A | 4/1997 | Shimazu |
| 5,621,859 A | 4/1997 | Schwartz et al. |
| 5,621,903 A | 4/1997 | Luciw et al. |
| 5,627,939 A | 5/1997 | Huang et al. |
| 5,634,084 A | 5/1997 | Malsheen et al. |
| 5,636,325 A | 6/1997 | Farrett |
| 5,638,425 A | 6/1997 | Meador, III et al. |
| 5,638,489 A | 6/1997 | Tsuboka |
| 5,638,523 A | 6/1997 | Mullet et al. |
| 5,640,487 A | 6/1997 | Lau et al. |
| 5,642,464 A | 6/1997 | Yue et al. |
| 5,642,466 A | 6/1997 | Narayan |
| 5,642,519 A | 6/1997 | Martin |
| 5,644,656 A | 7/1997 | Akra et al. |
| 5,644,727 A | 7/1997 | Atkins |
| 5,644,735 A | 7/1997 | Luciw et al. |
| 5,649,060 A | 7/1997 | Ellozy et al. |
| 5,652,828 A | 7/1997 | Silverman |
| 5,652,884 A | 7/1997 | Palevich |
| 5,652,897 A | 7/1997 | Linebarger et al. |
| 5,661,787 A | 8/1997 | Pocock |
| 5,664,055 A | 9/1997 | Kroon |
| 5,664,206 A | 9/1997 | Murow et al. |
| 5,670,985 A | 9/1997 | Cappels, Sr. et al. |
| 5,675,704 A | 10/1997 | Juang et al. |
| 5,675,819 A | 10/1997 | Schuetze |
| 5,678,039 A | 10/1997 | Hinks et al. |
| 5,678,053 A | 10/1997 | Anderson |
| 5,680,511 A | 10/1997 | Baker et al. |
| 5,682,475 A | 10/1997 | Johnson et al. |
| 5,682,539 A | 10/1997 | Conrad et al. |
| 5,684,513 A | 11/1997 | Decker |
| 5,687,077 A | 11/1997 | Gough, Jr. |
| 5,689,287 A | 11/1997 | Mackinlay et al. |
| 5,689,616 A | 11/1997 | Li |
| 5,689,618 A | 11/1997 | Gasper et al. |
| 5,692,205 A | 11/1997 | Berry et al. |
| 5,696,962 A | 12/1997 | Kupiec |
| 5,697,793 A | 12/1997 | Huffman et al. |
| 5,699,082 A | 12/1997 | Marks et al. |
| 5,701,400 A | 12/1997 | Amado |
| 5,706,442 A | 1/1998 | Anderson et al. |
| 5,708,659 A | 1/1998 | Rostoker et al. |
| 5,708,822 A | 1/1998 | Wical |
| 5,710,886 A | 1/1998 | Christensen et al. |
| 5,710,922 A | 1/1998 | Alley et al. |
| 5,712,949 A | 1/1998 | Kato et al. |
| 5,712,957 A | 1/1998 | Waibel et al. |

(56) References Cited

U.S. PATENT DOCUMENTS

| | | |
|---|---|---|
| 5,715,468 A | 2/1998 | Budzinski |
| 5,717,877 A | 2/1998 | Orton et al. |
| 5,721,827 A | 2/1998 | Logan et al. |
| 5,721,949 A | 2/1998 | Smith et al. |
| 5,724,406 A | 3/1998 | Juster |
| 5,724,985 A | 3/1998 | Snell et al. |
| 5,726,672 A | 3/1998 | Hernandez et al. |
| 5,727,950 A | 3/1998 | Cook et al. |
| 5,729,694 A | 3/1998 | Holzrichter et al. |
| 5,729,704 A | 3/1998 | Stone et al. |
| 5,732,216 A | 3/1998 | Logan et al. |
| 5,732,390 A | 3/1998 | Katayanagi et al. |
| 5,732,395 A | 3/1998 | Silverman |
| 5,734,750 A | 3/1998 | Arai et al. |
| 5,734,791 A | 3/1998 | Acero et al. |
| 5,736,974 A | 4/1998 | Selker |
| 5,737,487 A | 4/1998 | Bellegarda et al. |
| 5,737,609 A | 4/1998 | Reed et al. |
| 5,737,734 A | 4/1998 | Schultz |
| 5,739,451 A | 4/1998 | Winksy et al. |
| 5,740,143 A | 4/1998 | Suetomi |
| 5,742,705 A | 4/1998 | Parthasarathy |
| 5,742,736 A | 4/1998 | Haddock |
| 5,745,116 A | 4/1998 | Pisutha-Arnond |
| 5,745,843 A | 4/1998 | Wetters et al. |
| 5,745,873 A | 4/1998 | Braida et al. |
| 5,748,512 A | 5/1998 | Vargas |
| 5,748,974 A | 5/1998 | Johnson |
| 5,749,071 A | 5/1998 | Silverman |
| 5,749,081 A | 5/1998 | Whiteis |
| 5,751,906 A | 5/1998 | Silverman |
| 5,757,358 A | 5/1998 | Osga |
| 5,757,979 A | 5/1998 | Hongo et al. |
| 5,758,024 A | 5/1998 | Alleva |
| 5,758,079 A | 5/1998 | Ludwig et al. |
| 5,758,083 A | 5/1998 | Singh et al. |
| 5,758,314 A | 5/1998 | McKenna |
| 5,758,318 A | 5/1998 | Kojima et al. |
| 5,759,101 A | 6/1998 | Von Kohorn |
| 5,761,640 A | 6/1998 | Kalyanswamy et al. |
| 5,761,687 A | 6/1998 | Hon et al. |
| 5,764,852 A | 6/1998 | Williams |
| 5,765,131 A | 6/1998 | Stentiford et al. |
| 5,765,168 A | 6/1998 | Burrows |
| 5,771,276 A | 6/1998 | Wolf |
| 5,774,834 A | 6/1998 | Visser |
| 5,774,855 A | 6/1998 | Foti et al. |
| 5,774,859 A | 6/1998 | Houser et al. |
| 5,777,614 A | 7/1998 | Ando et al. |
| 5,778,405 A | 7/1998 | Ogawa |
| 5,790,978 A | 8/1998 | Olive et al. |
| 5,794,050 A | 8/1998 | Dahlgren et al. |
| 5,794,182 A | 8/1998 | Manduchi et al. |
| 5,794,189 A | 8/1998 | Gould |
| 5,794,207 A | 8/1998 | Walker et al. |
| 5,794,237 A | 8/1998 | Gore, Jr. |
| 5,797,008 A | 8/1998 | Burrows |
| 5,799,268 A | 8/1998 | Boguraev |
| 5,799,269 A | 8/1998 | Schabes et al. |
| 5,799,276 A | 8/1998 | Komissarchik et al. |
| 5,799,279 A | 8/1998 | Gould et al. |
| 5,801,692 A | 9/1998 | Muzio et al. |
| 5,802,466 A | 9/1998 | Gallant et al. |
| 5,802,526 A | 9/1998 | Fawcett et al. |
| 5,806,021 A | 9/1998 | Chen et al. |
| 5,812,697 A | 9/1998 | Sakai et al. |
| 5,812,698 A | 9/1998 | Platt et al. |
| 5,815,142 A | 9/1998 | Allard et al. |
| 5,815,225 A | 9/1998 | Nelson |
| 5,818,142 A | 10/1998 | Edleblute et al. |
| 5,818,451 A | 10/1998 | Bertram et al. |
| 5,818,924 A | 10/1998 | King et al. |
| 5,822,288 A | 10/1998 | Shinada |
| 5,822,720 A | 10/1998 | Bookman et al. |
| 5,822,730 A | 10/1998 | Roth et al. |
| 5,822,743 A | 10/1998 | Gupta et al. |
| 5,825,349 A | 10/1998 | Meier et al. |
| 5,825,352 A | 10/1998 | Bisset et al. |
| 5,825,881 A | 10/1998 | Colvin, Sr. |
| 5,826,261 A | 10/1998 | Spencer |
| 5,828,768 A | 10/1998 | Eatwell et al. |
| 5,828,999 A | 10/1998 | Bellegarda et al. |
| 5,832,428 A | 11/1998 | Chow et al. |
| 5,832,433 A | 11/1998 | Yashchin et al. |
| 5,832,435 A | 11/1998 | Silverman |
| 5,833,134 A | 11/1998 | Ho et al. |
| 5,835,077 A | 11/1998 | Dao et al. |
| 5,835,079 A | 11/1998 | Shieh |
| 5,835,721 A | 11/1998 | Donahue et al. |
| 5,835,732 A | 11/1998 | Kikinis et al. |
| 5,835,893 A | 11/1998 | Ushioda |
| 5,839,106 A | 11/1998 | Bellegarda |
| 5,841,902 A | 11/1998 | Tu |
| 5,842,165 A | 11/1998 | Raman et al. |
| 5,845,255 A | 12/1998 | Mayaud |
| 5,848,410 A | 12/1998 | Walls et al. |
| 5,850,480 A | 12/1998 | Scanlon |
| 5,850,629 A | 12/1998 | Holm et al. |
| 5,852,801 A | 12/1998 | Hon et al. |
| 5,854,893 A | 12/1998 | Ludwig et al. |
| 5,855,000 A | 12/1998 | Waibel et al. |
| 5,857,184 A | 1/1999 | Lynch |
| 5,859,636 A | 1/1999 | Pandit |
| 5,860,063 A | 1/1999 | Gorin et al. |
| 5,860,064 A | 1/1999 | Henton |
| 5,860,075 A | 1/1999 | Hashizume et al. |
| 5,862,223 A | 1/1999 | Walker et al. |
| 5,862,233 A | 1/1999 | Poletti |
| 5,864,806 A | 1/1999 | Mokbel et al. |
| 5,864,815 A | 1/1999 | Rozak et al. |
| 5,864,844 A | 1/1999 | James et al. |
| 5,864,855 A | 1/1999 | Ruocco et al. |
| 5,864,868 A | 1/1999 | Contois |
| 5,867,799 A | 2/1999 | Lang et al. |
| 5,870,710 A | 2/1999 | Ozawa et al. |
| 5,873,056 A | 2/1999 | Liddy et al. |
| 5,873,064 A | 2/1999 | De Armas et al. |
| 5,875,427 A | 2/1999 | Yamazaki |
| 5,875,429 A | 2/1999 | Douglas |
| 5,875,437 A | 2/1999 | Atkins |
| 5,875,448 A | 2/1999 | Boys et al. |
| 5,876,396 A | 3/1999 | Lo et al. |
| 5,877,751 A | 3/1999 | Kanemitsu et al. |
| 5,877,757 A | 3/1999 | Baldwin et al. |
| 5,878,393 A | 3/1999 | Hata et al. |
| 5,878,394 A | 3/1999 | Muhling |
| 5,878,396 A | 3/1999 | Henton |
| 5,880,411 A | 3/1999 | Gillespie et al. |
| 5,880,731 A | 3/1999 | Liles et al. |
| 5,884,039 A | 3/1999 | Ludwig et al. |
| 5,884,262 A | 3/1999 | Wise et al. |
| 5,884,323 A | 3/1999 | Hawkins et al. |
| 5,890,117 A | 3/1999 | Silverman |
| 5,890,122 A | 3/1999 | Van et al. |
| 5,891,180 A | 4/1999 | Greeninger et al. |
| 5,893,126 A | 4/1999 | Drews et al. |
| 5,893,132 A | 4/1999 | Huffman et al. |
| 5,895,448 A | 4/1999 | Vysotsky et al. |
| 5,895,464 A | 4/1999 | Bhandari et al. |
| 5,895,466 A | 4/1999 | Goldberg et al. |
| 5,896,321 A | 4/1999 | Miller et al. |
| 5,896,500 A | 4/1999 | Ludwig et al. |
| 5,899,972 A | 5/1999 | Miyazawa et al. |
| 5,905,498 A | 5/1999 | Diament et al. |
| 5,907,597 A | 5/1999 | Mark |
| 5,909,666 A | 6/1999 | Gould et al. |
| 5,909,667 A | 6/1999 | Leontiades et al. |
| 5,912,951 A | 6/1999 | Checchio et al. |
| 5,912,952 A | 6/1999 | Brendzel |
| 5,913,185 A | 6/1999 | Martino et al. |
| 5,913,193 A | 6/1999 | Huang et al. |
| 5,915,001 A | 6/1999 | Uppaluru et al. |
| 5,915,236 A | 6/1999 | Gould et al. |
| 5,915,238 A | 6/1999 | Tjaden |

(56) References Cited

U.S. PATENT DOCUMENTS

| | | |
|---|---|---|
| 5,915,249 A | 6/1999 | Spencer |
| 5,917,487 A | 6/1999 | Ulrich |
| 5,918,303 A | 6/1999 | Yamaura et al. |
| 5,920,327 A | 7/1999 | Seidensticker, Jr. |
| 5,920,836 A | 7/1999 | Gould et al. |
| 5,920,837 A | 7/1999 | Gould et al. |
| 5,923,757 A | 7/1999 | Hocker et al. |
| 5,924,068 A | 7/1999 | Richard et al. |
| 5,926,769 A | 7/1999 | Valimaa et al. |
| 5,926,789 A | 7/1999 | Barbara et al. |
| 5,930,408 A | 7/1999 | Seto |
| 5,930,751 A | 7/1999 | Cohrs et al. |
| 5,930,754 A | 7/1999 | Karaali et al. |
| 5,930,769 A | 7/1999 | Rose |
| 5,930,783 A | 7/1999 | Li et al. |
| 5,933,477 A | 8/1999 | Wu |
| 5,933,806 A | 8/1999 | Beyerlein et al. |
| 5,933,822 A | 8/1999 | Braden-Harder et al. |
| 5,936,926 A | 8/1999 | Yokouchi et al. |
| 5,937,163 A | 8/1999 | Lee et al. |
| 5,940,811 A | 8/1999 | Norris |
| 5,940,841 A | 8/1999 | Schmuck et al. |
| 5,941,944 A | 8/1999 | Messerly |
| 5,943,043 A | 8/1999 | Furuhata et al. |
| 5,943,049 A | 8/1999 | Matsubara et al. |
| 5,943,052 A | 8/1999 | Allen et al. |
| 5,943,429 A | 8/1999 | Haendel et al. |
| 5,943,443 A | 8/1999 | Itonori et al. |
| 5,943,670 A | 8/1999 | Prager |
| 5,946,647 A | 8/1999 | Miller et al. |
| 5,946,648 A | 8/1999 | Halstead et al. |
| 5,948,040 A | 9/1999 | DeLorme et al. |
| 5,949,961 A | 9/1999 | Sharman |
| 5,950,123 A | 9/1999 | Schwelb et al. |
| 5,952,992 A | 9/1999 | Helms |
| 5,953,541 A | 9/1999 | King et al. |
| 5,956,021 A | 9/1999 | Kubota et al. |
| 5,956,699 A | 9/1999 | Wong et al. |
| 5,960,385 A | 9/1999 | Skiena et al. |
| 5,960,394 A | 9/1999 | Gould et al. |
| 5,960,422 A | 9/1999 | Prasad |
| 5,963,208 A | 10/1999 | Dolan et al. |
| 5,963,924 A | 10/1999 | Williams et al. |
| 5,963,964 A | 10/1999 | Nielsen |
| 5,966,126 A | 10/1999 | Szabo |
| 5,970,446 A | 10/1999 | Goldberg et al. |
| 5,970,451 A | 10/1999 | Lewis et al. |
| 5,970,460 A | 10/1999 | Bunce et al. |
| 5,970,474 A | 10/1999 | LeRoy et al. |
| 5,973,612 A | 10/1999 | Deo et al. |
| 5,973,676 A | 10/1999 | Kawakura |
| 5,974,146 A | 10/1999 | Randle et al. |
| 5,977,950 A | 11/1999 | Rhyne |
| 5,982,352 A | 11/1999 | Pryor |
| 5,982,370 A | 11/1999 | Kamper |
| 5,982,891 A | 11/1999 | Ginter et al. |
| 5,982,902 A | 11/1999 | Terano |
| 5,983,179 A | 11/1999 | Gould |
| 5,983,184 A | 11/1999 | Noguchi |
| 5,983,216 A | 11/1999 | Kirsch et al. |
| 5,987,132 A | 11/1999 | Rowney |
| 5,987,140 A | 11/1999 | Rowney et al. |
| 5,987,401 A | 11/1999 | Trudeau |
| 5,987,404 A | 11/1999 | Della Pietra et al. |
| 5,987,440 A | 11/1999 | O'Neil et al. |
| 5,990,887 A | 11/1999 | Redpath et al. |
| 5,991,441 A | 11/1999 | Jourjine |
| 5,995,460 A | 11/1999 | Takagi et al. |
| 5,995,590 A | 11/1999 | Brunet et al. |
| 5,995,918 A | 11/1999 | Kendall et al. |
| 5,998,972 A | 12/1999 | Gong |
| 5,999,169 A | 12/1999 | Lee |
| 5,999,895 A | 12/1999 | Forest |
| 5,999,908 A | 12/1999 | Abelow |
| 5,999,927 A | 12/1999 | Tukey et al. |
| 6,005,495 A | 12/1999 | Connolly et al. |
| 6,006,274 A | 12/1999 | Hawkins et al. |
| 6,009,237 A | 12/1999 | Hirabayashi et al. |
| 6,011,585 A | 1/2000 | Anderson |
| 6,014,428 A | 1/2000 | Wolf |
| 6,016,471 A | 1/2000 | Kuhn et al. |
| 6,017,219 A | 1/2000 | Adams, Jr. et al. |
| 6,018,705 A | 1/2000 | Gaudet |
| 6,018,711 A | 1/2000 | French-St. George et al. |
| 6,020,881 A | 2/2000 | Naughton et al. |
| 6,023,536 A | 2/2000 | Visser |
| 6,023,676 A | 2/2000 | Erell |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,029,135 A | 2/2000 | Krasle |
| 6,035,267 A | 3/2000 | Watanabe et al. |
| 6,035,303 A | 3/2000 | Baer et al. |
| 6,035,336 A | 3/2000 | Lu et al. |
| 6,038,533 A | 3/2000 | Buchsbaum et al. |
| 6,040,824 A | 3/2000 | Maekawa et al. |
| 6,041,023 A | 3/2000 | Lakhansingh |
| 6,047,255 A | 4/2000 | Williamson |
| 6,047,300 A | 4/2000 | Walfish et al. |
| 6,052,654 A | 4/2000 | Gaudet et al. |
| 6,052,656 A | 4/2000 | Suda et al. |
| 6,054,990 A | 4/2000 | Tran |
| 6,055,514 A | 4/2000 | Wren |
| 6,055,531 A | 4/2000 | Bennett et al. |
| 6,061,646 A | 5/2000 | Martino et al. |
| 6,064,767 A | 5/2000 | Muir et al. |
| 6,064,951 A | 5/2000 | Park et al. |
| 6,064,959 A | 5/2000 | Young et al. |
| 6,064,960 A | 5/2000 | Bellegarda et al. |
| 6,064,963 A | 5/2000 | Gainsboro |
| 6,067,519 A | 5/2000 | Lowry |
| 6,069,648 A | 5/2000 | Suso et al. |
| 6,070,138 A * | 5/2000 | Iwata ............... G10L 13/00 704/260 |
| 6,070,139 A | 5/2000 | Miyazawa et al. |
| 6,070,140 A | 5/2000 | Tran |
| 6,070,147 A | 5/2000 | Harms et al. |
| 6,073,033 A | 6/2000 | Campo |
| 6,073,036 A | 6/2000 | Heikkinen et al. |
| 6,073,091 A | 6/2000 | Kanevsky et al. |
| 6,073,097 A | 6/2000 | Gould et al. |
| 6,076,051 A | 6/2000 | Messerly et al. |
| 6,076,060 A | 6/2000 | Lin et al. |
| 6,076,088 A | 6/2000 | Paik et al. |
| 6,078,885 A | 6/2000 | Beutnagel |
| 6,078,914 A | 6/2000 | Redfern |
| 6,081,750 A | 6/2000 | Hoffberg et al. |
| 6,081,774 A | 6/2000 | de Hita et al. |
| 6,081,780 A | 6/2000 | Lumelsky |
| 6,085,204 A | 7/2000 | Chijiwa et al. |
| 6,088,671 A | 7/2000 | Gould et al. |
| 6,088,731 A | 7/2000 | Kiraly et al. |
| 6,092,036 A | 7/2000 | Hamann |
| 6,092,038 A | 7/2000 | Kanevsky et al. |
| 6,092,043 A | 7/2000 | Squires et al. |
| 6,094,649 A | 7/2000 | Bowen et al. |
| 6,097,391 A | 8/2000 | Wilcox |
| 6,101,468 A | 8/2000 | Gould et al. |
| 6,101,470 A | 8/2000 | Eide et al. |
| 6,105,865 A | 8/2000 | Hardesty |
| 6,108,627 A | 8/2000 | Sabourin |
| 6,108,640 A | 8/2000 | Slotznick |
| 6,111,562 A | 8/2000 | Downs et al. |
| 6,111,572 A | 8/2000 | Blair et al. |
| 6,115,686 A | 9/2000 | Chung et al. |
| 6,116,907 A | 9/2000 | Baker et al. |
| 6,119,101 A | 9/2000 | Peckover |
| 6,121,960 A | 9/2000 | Carroll et al. |
| 6,122,340 A | 9/2000 | Darley et al. |
| 6,122,614 A | 9/2000 | Kahn et al. |

(56) References Cited

U.S. PATENT DOCUMENTS

| | | |
|---|---|---|
| 6,122,616 A | 9/2000 | Henton |
| 6,122,647 A | 9/2000 | Horowitz et al. |
| 6,125,284 A | 9/2000 | Moore et al. |
| 6,125,346 A | 9/2000 | Nishimura et al. |
| 6,125,356 A | 9/2000 | Brockman et al. |
| 6,129,582 A | 10/2000 | Wilhite et al. |
| 6,138,098 A | 10/2000 | Shieber et al. |
| 6,138,158 A | 10/2000 | Boyle et al. |
| 6,141,642 A | 10/2000 | Oh |
| 6,141,644 A | 10/2000 | Kuhn et al. |
| 6,144,377 A | 11/2000 | Oppermann et al. |
| 6,144,380 A | 11/2000 | Shwarts et al. |
| 6,144,938 A | 11/2000 | Surace et al. |
| 6,144,939 A | 11/2000 | Pearson et al. |
| 6,151,401 A | 11/2000 | Annaratone |
| 6,151,574 A | 11/2000 | Lee et al. |
| 6,154,551 A | 11/2000 | Frenkel |
| 6,154,720 A | 11/2000 | Onishi et al. |
| 6,157,935 A | 12/2000 | Tran et al. |
| 6,161,084 A | 12/2000 | Messerly et al. |
| 6,161,087 A | 12/2000 | Wightman et al. |
| 6,161,944 A | 12/2000 | Leman |
| 6,163,769 A | 12/2000 | Acero et al. |
| 6,163,809 A | 12/2000 | Buckley |
| 6,167,369 A | 12/2000 | Schulze |
| 6,169,538 B1 | 1/2001 | Nowlan et al. |
| 6,172,948 B1 | 1/2001 | Keller et al. |
| 6,173,194 B1 | 1/2001 | Vanttila |
| 6,173,251 B1 | 1/2001 | Ito et al. |
| 6,173,261 B1 | 1/2001 | Arai et al. |
| 6,173,263 B1 | 1/2001 | Conkie |
| 6,173,279 B1 | 1/2001 | Levin et al. |
| 6,177,905 B1 | 1/2001 | Welch |
| 6,177,931 B1 | 1/2001 | Alexander et al. |
| 6,179,432 B1 | 1/2001 | Zhang et al. |
| 6,182,028 B1 | 1/2001 | Karaali et al. |
| 6,182,099 B1 | 1/2001 | Nakasato |
| 6,185,533 B1 | 2/2001 | Holm et al. |
| 6,188,391 B1 | 2/2001 | Seely et al. |
| 6,188,967 B1 | 2/2001 | Kurtzberg et al. |
| 6,188,999 B1 | 2/2001 | Moody |
| 6,191,939 B1 | 2/2001 | Burnett |
| 6,192,253 B1 | 2/2001 | Charlier et al. |
| 6,192,340 B1 | 2/2001 | Abecassis |
| 6,195,641 B1 | 2/2001 | Loring et al. |
| 6,199,076 B1 | 3/2001 | Logan et al. |
| 6,205,456 B1 | 3/2001 | Nakao |
| 6,208,044 B1 | 3/2001 | Viswanadham et al. |
| 6,208,932 B1 | 3/2001 | Ohmura et al. |
| 6,208,956 B1 | 3/2001 | Motoyama |
| 6,208,964 B1 | 3/2001 | Sabourin |
| 6,208,967 B1 | 3/2001 | Pauws et al. |
| 6,208,971 B1 | 3/2001 | Bellegarda et al. |
| 6,212,564 B1 | 4/2001 | Harter et al. |
| 6,216,102 B1 | 4/2001 | Martino et al. |
| 6,216,131 B1 | 4/2001 | Liu et al. |
| 6,217,183 B1 | 4/2001 | Shipman |
| 6,219,641 B1 | 4/2001 | Socaciu |
| 6,222,347 B1 | 4/2001 | Gong |
| 6,226,403 B1 | 5/2001 | Parthasarathy |
| 6,226,533 B1 | 5/2001 | Akahane |
| 6,226,614 B1 | 5/2001 | Mizuno et al. |
| 6,226,655 B1 | 5/2001 | Borman et al. |
| 6,230,322 B1 | 5/2001 | Saib et al. |
| 6,232,539 B1 | 5/2001 | Looney et al. |
| 6,232,966 B1 | 5/2001 | Kurlander |
| 6,233,545 B1 | 5/2001 | Datig |
| 6,233,547 B1 | 5/2001 | Denber |
| 6,233,559 B1 | 5/2001 | Balakrishnan |
| 6,233,578 B1 | 5/2001 | Machihara et al. |
| 6,237,025 B1 | 5/2001 | Ludwig et al. |
| 6,240,303 B1 | 5/2001 | Katzur |
| 6,243,681 B1 | 6/2001 | Guji et al. |
| 6,246,981 B1 | 6/2001 | Papineni et al. |
| 6,248,946 B1 | 6/2001 | Dwek |
| 6,249,606 B1 | 6/2001 | Kiraly et al. |
| 6,259,436 B1 | 7/2001 | Moon et al. |
| 6,259,826 B1 | 7/2001 | Pollard et al. |
| 6,260,011 B1 | 7/2001 | Heckerman et al. |
| 6,260,013 B1 | 7/2001 | Sejnoha |
| 6,260,016 B1 | 7/2001 | Holm et al. |
| 6,260,024 B1 | 7/2001 | Shkedy |
| 6,266,098 B1 | 7/2001 | Cove et al. |
| 6,266,637 B1 | 7/2001 | Donovan et al. |
| 6,268,859 B1 | 7/2001 | Andresen et al. |
| 6,269,712 B1 | 8/2001 | Zentmyer |
| 6,271,835 B1 | 8/2001 | Hoeksma |
| 6,272,456 B1 | 8/2001 | De Campos |
| 6,272,464 B1 | 8/2001 | Kiraz et al. |
| 6,275,795 B1 | 8/2001 | Tzirkel-Hancock |
| 6,275,824 B1 | 8/2001 | O'Flaherty et al. |
| 6,278,443 B1 | 8/2001 | Amro et al. |
| 6,278,970 B1 | 8/2001 | Milner |
| 6,282,507 B1 | 8/2001 | Horiguchi et al. |
| 6,282,511 B1 | 8/2001 | Mayer |
| 6,285,785 B1 | 9/2001 | Bellegarda et al. |
| 6,285,786 B1 | 9/2001 | Seni et al. |
| 6,289,085 B1 | 9/2001 | Miyashita et al. |
| 6,289,124 B1 | 9/2001 | Okamoto |
| 6,289,301 B1 | 9/2001 | Higginbotham et al. |
| 6,289,353 B1 | 9/2001 | Hazlehurst et al. |
| 6,292,772 B1 | 9/2001 | Kantrowitz |
| 6,292,778 B1 | 9/2001 | Sukkar |
| 6,295,390 B1 | 9/2001 | Kobayashi et al. |
| 6,295,391 B1 | 9/2001 | Rudd et al. |
| 6,295,541 B1 | 9/2001 | Bodnar et al. |
| 6,297,818 B1 | 10/2001 | Ulrich et al. |
| 6,298,314 B1 | 10/2001 | Blackadar et al. |
| 6,298,321 B1 | 10/2001 | Karlov et al. |
| 6,300,947 B1 | 10/2001 | Kanevsky |
| 6,304,844 B1 | 10/2001 | Pan et al. |
| 6,304,846 B1 | 10/2001 | George et al. |
| 6,307,548 B1 | 10/2001 | Flinchem et al. |
| 6,308,149 B1 | 10/2001 | Gaussier et al. |
| 6,310,610 B1 | 10/2001 | Beaton et al. |
| 6,311,152 B1 | 10/2001 | Bai et al. |
| 6,311,157 B1 | 10/2001 | Strong |
| 6,311,189 B1 | 10/2001 | deVries et al. |
| 6,314,397 B1 | 11/2001 | Lewis et al. |
| 6,317,237 B1 | 11/2001 | Nakao et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,321,179 B1 | 11/2001 | Glance et al. |
| 6,323,846 B1 | 11/2001 | Westerman et al. |
| 6,324,499 B1 | 11/2001 | Lewis et al. |
| 6,324,502 B1 | 11/2001 | Handel et al. |
| 6,324,512 B1 | 11/2001 | Junqua et al. |
| 6,324,514 B2 | 11/2001 | Matulich et al. |
| 6,330,538 B1 | 12/2001 | Breen |
| 6,331,867 B1 | 12/2001 | Eberhard et al. |
| 6,332,175 B1 | 12/2001 | Birrell et al. |
| 6,334,103 B1 | 12/2001 | Surace et al. |
| 6,335,722 B1 | 1/2002 | Tani et al. |
| 6,336,365 B1 | 1/2002 | Blackadar et al. |
| 6,336,727 B1 | 1/2002 | Kim |
| 6,340,937 B1 | 1/2002 | Stepita-Klauco |
| 6,341,316 B1 | 1/2002 | Kloba et al. |
| 6,343,267 B1 | 1/2002 | Kuhn et al. |
| 6,345,240 B1 | 2/2002 | Havens |
| 6,345,250 B1 | 2/2002 | Martin |
| 6,347,296 B1 | 2/2002 | Friedland |
| 6,351,522 B1 | 2/2002 | Vitikainen |
| 6,351,762 B1 | 2/2002 | Ludwig et al. |
| 6,353,442 B1 | 3/2002 | Masui |
| 6,353,794 B1 | 3/2002 | Davis et al. |
| 6,356,287 B1 | 3/2002 | Ruberry et al. |
| 6,356,854 B1 | 3/2002 | Schubert et al. |
| 6,356,864 B1 | 3/2002 | Foltz et al. |
| 6,356,905 B1 | 3/2002 | Gershman et al. |
| 6,357,147 B1 | 3/2002 | Darley et al. |
| 6,359,572 B1 | 3/2002 | Vale |
| 6,359,970 B1 | 3/2002 | Burgess |

(56) References Cited

U.S. PATENT DOCUMENTS

| | | |
|---|---|---|
| 6,360,227 B1 | 3/2002 | Aggarwal et al. |
| 6,360,237 B1 | 3/2002 | Schulz et al. |
| 6,363,347 B1 | 3/2002 | Rozak |
| 6,363,348 B1 | 3/2002 | Besling et al. |
| 6,366,883 B1 | 4/2002 | Campbell et al. |
| 6,366,884 B1 | 4/2002 | Bellegarda et al. |
| 6,374,217 B1 | 4/2002 | Bellegarda |
| 6,374,226 B1 | 4/2002 | Hunt et al. |
| 6,377,530 B1 | 4/2002 | Burrows |
| 6,377,925 B1 | 4/2002 | Greene, Jr. et al. |
| 6,377,928 B1 | 4/2002 | Saxena et al. |
| 6,381,593 B1 | 4/2002 | Yano et al. |
| 6,385,586 B1 | 5/2002 | Dietz |
| 6,385,662 B1 | 5/2002 | Moon et al. |
| 6,389,114 B1 | 5/2002 | Dowens et al. |
| 6,397,183 B1 | 5/2002 | Baba et al. |
| 6,397,186 B1 | 5/2002 | Bush et al. |
| 6,400,806 B1 | 6/2002 | Uppaluru |
| 6,400,996 B1 | 6/2002 | Hoffberg et al. |
| 6,401,065 B1 | 6/2002 | Kanevsky et al. |
| 6,401,085 B1 | 6/2002 | Gershman et al. |
| 6,405,169 B1 | 6/2002 | Kondo et al. |
| 6,405,238 B1 | 6/2002 | Votipka |
| 6,408,272 B1 | 6/2002 | White et al. |
| 6,411,924 B1 | 6/2002 | De Hita et al. |
| 6,411,932 B1 | 6/2002 | Molnar et al. |
| 6,415,250 B1 | 7/2002 | Van Den Akker |
| 6,417,873 B1 | 7/2002 | Fletcher et al. |
| 6,418,431 B1 | 7/2002 | Mahajan et al. |
| 6,421,305 B1 | 7/2002 | Gioscia et al. |
| 6,421,672 B1 | 7/2002 | McAllister et al. |
| 6,421,707 B1 | 7/2002 | Miller et al. |
| 6,424,944 B1 | 7/2002 | Hikawa |
| 6,430,531 B1 | 8/2002 | Polish |
| 6,430,551 B1 | 8/2002 | Thelen et al. |
| 6,434,522 B1 | 8/2002 | Tsuboka |
| 6,434,524 B1 | 8/2002 | Weber |
| 6,434,529 B1 | 8/2002 | Walker et al. |
| 6,434,604 B1 | 8/2002 | Harada et al. |
| 6,437,818 B1 | 8/2002 | Ludwig et al. |
| 6,438,523 B1 | 8/2002 | Oberteuffer et al. |
| 6,442,518 B1 | 8/2002 | Van Thong et al. |
| 6,442,523 B1 | 8/2002 | Siegel |
| 6,446,076 B1 | 9/2002 | Burkey et al. |
| 6,448,485 B1 | 9/2002 | Barile |
| 6,448,986 B1 | 9/2002 | Smith |
| 6,449,620 B1 | 9/2002 | Draper et al. |
| 6,453,281 B1 | 9/2002 | Walters et al. |
| 6,453,292 B2 | 9/2002 | Ramaswamy et al. |
| 6,453,312 B1 | 9/2002 | Goiffon et al. |
| 6,453,315 B1 | 9/2002 | Weissman et al. |
| 6,456,616 B1 | 9/2002 | Rantanen |
| 6,456,972 B1 | 9/2002 | Gladstein et al. |
| 6,460,015 B1 | 10/2002 | Hetherington et al. |
| 6,460,029 B1 | 10/2002 | Fries et al. |
| 6,462,778 B1 | 10/2002 | Abram et al. |
| 6,463,128 B1 | 10/2002 | Elwin |
| 6,463,413 B1 | 10/2002 | Applebaum et al. |
| 6,466,654 B1 | 10/2002 | Cooper et al. |
| 6,467,924 B2 | 10/2002 | Shipman |
| 6,469,712 B1 | 10/2002 | Hilpert, Jr. et al. |
| 6,469,722 B1 | 10/2002 | Kinoe et al. |
| 6,469,732 B1 | 10/2002 | Chang et al. |
| 6,470,347 B1 | 10/2002 | Gillam |
| 6,473,630 B1 | 10/2002 | Baranowski et al. |
| 6,473,754 B1 | 10/2002 | Matsubayashi et al. |
| 6,477,488 B1 | 11/2002 | Bellegarda |
| 6,477,494 B2 | 11/2002 | Hyde-Thomson et al. |
| 6,487,533 B2 | 11/2002 | Hyde-Thomson et al. |
| 6,487,534 B1 | 11/2002 | Thelen et al. |
| 6,487,663 B1 | 11/2002 | Jaisimha et al. |
| 6,489,951 B1 | 12/2002 | Wong et al. |
| 6,490,547 B1 | 12/2002 | Atkin et al. |
| 6,490,560 B1 | 12/2002 | Ramaswamy et al. |
| 6,493,006 B1 | 12/2002 | Gourdol et al. |
| 6,493,428 B1 | 12/2002 | Hillier |
| 6,493,652 B1 | 12/2002 | Ohlenbusch et al. |
| 6,493,667 B1 | 12/2002 | De Souza et al. |
| 6,499,013 B1 | 12/2002 | Weber |
| 6,499,014 B1 | 12/2002 | Chihara |
| 6,499,016 B1 | 12/2002 | Anderson |
| 6,501,937 B1 | 12/2002 | Ho et al. |
| 6,502,022 B1 | 12/2002 | Chastain et al. |
| 6,502,194 B1 | 12/2002 | Berman et al. |
| 6,504,990 B1 | 1/2003 | Abecassis |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,507,829 B1 | 1/2003 | Richards et al. |
| 6,510,406 B1 | 1/2003 | Marchisio |
| 6,510,412 B1 | 1/2003 | Sasai et al. |
| 6,510,417 B1 | 1/2003 | Woods et al. |
| 6,513,006 B2 | 1/2003 | Howard et al. |
| 6,513,008 B2 | 1/2003 | Pearson et al. |
| 6,513,063 B1 | 1/2003 | Julia et al. |
| 6,519,565 B1 | 2/2003 | Clements et al. |
| 6,519,566 B1 | 2/2003 | Boyer et al. |
| 6,523,026 B1 | 2/2003 | Gillis |
| 6,523,061 B1 | 2/2003 | Halverson et al. |
| 6,523,172 B1 | 2/2003 | Martinez-Guerra et al. |
| 6,526,351 B2 | 2/2003 | Whitham |
| 6,526,382 B1 | 2/2003 | Yuschik |
| 6,526,395 B1 | 2/2003 | Morris |
| 6,529,592 B1 | 3/2003 | Khan |
| 6,529,608 B2 | 3/2003 | Gersabeck et al. |
| 6,532,444 B1 | 3/2003 | Weber |
| 6,532,446 B1 | 3/2003 | King |
| 6,535,610 B1 | 3/2003 | Stewart |
| 6,535,852 B2 | 3/2003 | Eide |
| 6,535,983 B1 | 3/2003 | McCormack et al. |
| 6,536,139 B2 | 3/2003 | Darley et al. |
| 6,538,665 B2 | 3/2003 | Crow et al. |
| 6,542,171 B1 | 4/2003 | Satou et al. |
| 6,542,584 B1 | 4/2003 | Sherwood et al. |
| 6,542,868 B1 | 4/2003 | Badt et al. |
| 6,546,262 B1 | 4/2003 | Freadman |
| 6,546,367 B2 | 4/2003 | Otsuka |
| 6,546,388 B1 | 4/2003 | Edlund et al. |
| 6,549,497 B2 | 4/2003 | Miyamoto et al. |
| 6,553,343 B1 | 4/2003 | Kagoshima et al. |
| 6,553,344 B2 | 4/2003 | Bellegarda et al. |
| 6,556,971 B1 | 4/2003 | Rigsby et al. |
| 6,556,983 B1 | 4/2003 | Altschuler et al. |
| 6,560,903 B1 | 5/2003 | Darley |
| 6,563,769 B1 | 5/2003 | Van Der Meulen |
| 6,564,186 B1 | 5/2003 | Kiraly et al. |
| 6,567,549 B1 | 5/2003 | Marianetti et al. |
| 6,570,557 B1 | 5/2003 | Westerman et al. |
| 6,570,596 B2 | 5/2003 | Frederiksen |
| 6,582,342 B2 | 6/2003 | Kaufman |
| 6,583,806 B2 | 6/2003 | Ludwig et al. |
| 6,584,464 B1 | 6/2003 | Warthen |
| 6,587,403 B1 | 7/2003 | Keller et al. |
| 6,587,404 B1 | 7/2003 | Keller et al. |
| 6,590,303 B1 | 7/2003 | Austin et al. |
| 6,591,379 B1 | 7/2003 | LeVine et al. |
| 6,594,673 B1 | 7/2003 | Smith et al. |
| 6,594,688 B2 | 7/2003 | Ludwig et al. |
| 6,597,345 B2 | 7/2003 | Hirshberg |
| 6,598,021 B1 | 7/2003 | Shambaugh et al. |
| 6,598,022 B2 | 7/2003 | Yuschik |
| 6,598,039 B1 | 7/2003 | Livowsky |
| 6,598,054 B2 | 7/2003 | Schuetze et al. |
| 6,601,026 B2 | 7/2003 | Appelt et al. |
| 6,601,234 B1 | 7/2003 | Bowman-Amuah |
| 6,603,837 B1 | 8/2003 | Kesanupalli et al. |
| 6,604,059 B2 | 8/2003 | Strubbe et al. |
| 6,606,101 B1 | 8/2003 | Malamud et al. |
| 6,606,388 B1 | 8/2003 | Townsend et al. |
| 6,606,632 B1 | 8/2003 | Saulpaugh et al. |
| 6,611,789 B1 | 8/2003 | Darley |
| 6,615,172 B1 | 9/2003 | Bennett et al. |
| 6,615,175 B1 | 9/2003 | Gazdzinski |
| 6,615,176 B2 | 9/2003 | Lewis et al. |

(56) References Cited

U.S. PATENT DOCUMENTS

| | | |
|---|---|---|
| 6,615,220 B1 | 9/2003 | Austin et al. |
| 6,621,768 B1 | 9/2003 | Keller et al. |
| 6,621,892 B1 | 9/2003 | Banister et al. |
| 6,622,121 B1 * | 9/2003 | Crepy .................. G10L 15/01 704/243 |
| 6,622,136 B2 | 9/2003 | Russell |
| 6,622,148 B1 | 9/2003 | Noble et al. |
| 6,623,529 B1 | 9/2003 | Lakritz |
| 6,625,583 B1 | 9/2003 | Silverman et al. |
| 6,628,808 B1 | 9/2003 | Bach et al. |
| 6,631,186 B1 | 10/2003 | Gibson et al. |
| 6,631,346 B1 | 10/2003 | Karaorman et al. |
| 6,633,741 B1 | 10/2003 | Posa et al. |
| 6,633,846 B1 | 10/2003 | Bennett et al. |
| 6,633,932 B1 | 10/2003 | Bork et al. |
| 6,642,940 B1 | 11/2003 | Dakss et al. |
| 6,643,401 B1 | 11/2003 | Kashioka et al. |
| 6,643,824 B1 | 11/2003 | Bates et al. |
| 6,647,260 B2 | 11/2003 | Dusse et al. |
| 6,650,735 B2 | 11/2003 | Burton et al. |
| 6,651,042 B1 | 11/2003 | Field et al. |
| 6,651,218 B1 | 11/2003 | Adler et al. |
| 6,654,740 B2 | 11/2003 | Tokuda et al. |
| 6,658,389 B1 | 12/2003 | Alpdemir |
| 6,658,408 B2 | 12/2003 | Yano et al. |
| 6,658,577 B2 | 12/2003 | Huppi et al. |
| 6,661,438 B1 | 12/2003 | Shiraishi et al. |
| 6,662,023 B1 | 12/2003 | Helle |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,671,672 B1 | 12/2003 | Heck |
| 6,671,683 B2 | 12/2003 | Kanno |
| 6,671,856 B1 | 12/2003 | Gillam |
| 6,675,169 B1 | 1/2004 | Bennett et al. |
| 6,675,233 B1 | 1/2004 | Du et al. |
| 6,677,932 B1 | 1/2004 | Westerman |
| 6,680,675 B1 | 1/2004 | Suzuki |
| 6,684,187 B1 | 1/2004 | Conkie |
| 6,684,376 B1 | 1/2004 | Kerzman et al. |
| 6,690,387 B2 | 2/2004 | Zimmerman et al. |
| 6,690,800 B2 | 2/2004 | Resnick |
| 6,690,828 B2 | 2/2004 | Meyers |
| 6,690,956 B2 | 2/2004 | Chua et al. |
| 6,691,064 B2 | 2/2004 | Vroman |
| 6,691,090 B1 | 2/2004 | Laurila et al. |
| 6,691,111 B2 | 2/2004 | Lazaridis et al. |
| 6,691,151 B1 | 2/2004 | Cheyer et al. |
| 6,694,295 B2 | 2/2004 | Lindholm et al. |
| 6,694,297 B2 | 2/2004 | Sato |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,701,305 B1 | 3/2004 | Holt et al. |
| 6,701,318 B2 | 3/2004 | Fox et al. |
| 6,704,015 B1 | 3/2004 | Bovarnick et al. |
| 6,704,034 B1 | 3/2004 | Rodriguez et al. |
| 6,704,698 B1 | 3/2004 | Paulsen, Jr. et al. |
| 6,704,710 B2 | 3/2004 | Strong |
| 6,708,153 B2 | 3/2004 | Brittan et al. |
| 6,711,585 B1 | 3/2004 | Copperman et al. |
| 6,714,221 B1 | 3/2004 | Christie et al. |
| 6,716,139 B1 | 4/2004 | Hosseinzadeh-Dolkhani et al. |
| 6,718,324 B2 | 4/2004 | Edlund et al. |
| 6,718,331 B2 | 4/2004 | Davis et al. |
| 6,720,980 B1 | 4/2004 | Lui et al. |
| 6,721,728 B2 | 4/2004 | McGreevy |
| 6,721,734 B1 | 4/2004 | Subasic et al. |
| 6,724,370 B2 | 4/2004 | Dutta et al. |
| 6,725,197 B1 | 4/2004 | Wuppermann et al. |
| 6,728,675 B1 | 4/2004 | Maddalozzo, Jr. et al. |
| 6,728,681 B2 | 4/2004 | Whitham |
| 6,728,729 B1 | 4/2004 | Jawa et al. |
| 6,731,312 B2 | 5/2004 | Robbin |
| 6,732,142 B1 | 5/2004 | Bates et al. |
| 6,735,562 B1 | 5/2004 | Zhang et al. |
| 6,735,632 B1 | 5/2004 | Kiraly et al. |
| 6,738,738 B2 | 5/2004 | Henton |
| 6,738,742 B2 | 5/2004 | Badt et al. |
| 6,741,264 B1 | 5/2004 | Lesser |
| 6,742,021 B1 | 5/2004 | Halverson et al. |
| 6,751,592 B1 | 6/2004 | Shiga |
| 6,751,595 B2 | 6/2004 | Busayapongchai et al. |
| 6,751,621 B1 | 6/2004 | Calistri-Yeh et al. |
| 6,754,504 B1 | 6/2004 | Reed |
| 6,757,362 B1 | 6/2004 | Cooper et al. |
| 6,757,365 B1 | 6/2004 | Bogard |
| 6,757,646 B2 | 6/2004 | Marchisio |
| 6,757,653 B2 | 6/2004 | Buth et al. |
| 6,757,718 B1 | 6/2004 | Halverson et al. |
| 6,760,412 B1 | 7/2004 | Loucks |
| 6,760,700 B2 | 7/2004 | Lewis et al. |
| 6,760,754 B1 | 7/2004 | Isaacs et al. |
| 6,762,741 B2 | 7/2004 | Weindorf |
| 6,762,777 B2 | 7/2004 | Carroll |
| 6,763,089 B2 | 7/2004 | Feigenbaum |
| 6,766,294 B2 | 7/2004 | MacGinite et al. |
| 6,766,295 B1 | 7/2004 | Murveit et al. |
| 6,766,320 B1 | 7/2004 | Wang et al. |
| 6,766,324 B2 | 7/2004 | Carlson et al. |
| 6,768,979 B1 | 7/2004 | Menendez-Pidal et al. |
| 6,771,982 B1 | 8/2004 | Toupin |
| 6,772,123 B2 | 8/2004 | Cooklev et al. |
| 6,772,195 B1 | 8/2004 | Hatlelid et al. |
| 6,772,394 B1 | 8/2004 | Kamada |
| 6,775,358 B1 | 8/2004 | Breitenbach et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,778,979 B2 | 8/2004 | Grefenstette et al. |
| 6,782,510 B1 | 8/2004 | Gross et al. |
| 6,784,901 B1 | 8/2004 | Harvey et al. |
| 6,789,094 B2 | 9/2004 | Rudoff et al. |
| 6,789,231 B1 | 9/2004 | Reynar et al. |
| 6,790,704 B2 | 9/2004 | Doyle et al. |
| 6,792,082 B1 | 9/2004 | Levine |
| 6,792,083 B2 | 9/2004 | Dams et al. |
| 6,792,086 B1 | 9/2004 | Saylor et al. |
| 6,792,407 B2 | 9/2004 | Kibre et al. |
| 6,794,566 B2 | 9/2004 | Pachet |
| 6,795,059 B2 | 9/2004 | Endo |
| 6,799,162 B1 | 9/2004 | Goronzy et al. |
| 6,799,226 B1 | 9/2004 | Robbin et al. |
| 6,801,604 B2 | 10/2004 | Maes et al. |
| 6,801,964 B1 | 10/2004 | Mahdavi |
| 6,803,905 B1 | 10/2004 | Capps et al. |
| 6,804,649 B2 | 10/2004 | Miranda |
| 6,804,677 B2 | 10/2004 | Shadmon et al. |
| 6,807,536 B2 | 10/2004 | Achlioptas et al. |
| 6,807,574 B1 | 10/2004 | Partovi et al. |
| 6,809,724 B1 | 10/2004 | Shiraishi et al. |
| 6,810,379 B1 | 10/2004 | Vermeulen et al. |
| 6,813,218 B1 | 11/2004 | Antonelli et al. |
| 6,813,491 B1 | 11/2004 | McKinney |
| 6,813,607 B1 | 11/2004 | Faruquie et al. |
| 6,816,578 B1 | 11/2004 | Kredo et al. |
| 6,820,055 B2 | 11/2004 | Saindon et al. |
| 6,829,018 B2 | 12/2004 | Lin et al. |
| 6,829,603 B1 | 12/2004 | Wolf et al. |
| 6,832,194 B1 | 12/2004 | Mozer et al. |
| 6,832,381 B1 | 12/2004 | Mathur et al. |
| 6,836,537 B1 | 12/2004 | Zirngibl et al. |
| 6,836,651 B2 | 12/2004 | Segal et al. |
| 6,836,760 B1 | 12/2004 | Bellegarda et al. |
| 6,839,464 B2 | 1/2005 | Hawkins et al. |
| 6,839,667 B2 | 1/2005 | Reich |
| 6,839,669 B1 | 1/2005 | Gould et al. |
| 6,839,670 B1 | 1/2005 | Stammler et al. |
| 6,839,742 B1 | 1/2005 | Dyer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,850,775 B1 | 2/2005 | Berg |

(56) References Cited

U.S. PATENT DOCUMENTS

| | | | |
|---|---|---|---|
| 6,850,887 B2 | 2/2005 | Epstein et al. |
| 6,851,115 B1 | 2/2005 | Cheyer et al. |
| 6,856,259 B1 | 2/2005 | Sharp |
| 6,857,800 B2 | 2/2005 | Zhang et al. |
| 6,859,931 B1 | 2/2005 | Cheyer et al. |
| 6,862,568 B2 | 3/2005 | Case |
| 6,862,710 B1 | 3/2005 | Marchisio |
| 6,862,713 B1 | 3/2005 | Kraft et al. |
| 6,865,533 B2 | 3/2005 | Addison et al. |
| 6,868,045 B1 | 3/2005 | Schroder |
| 6,868,385 B1 | 3/2005 | Gerson |
| 6,870,529 B1 | 3/2005 | Davis |
| 6,871,346 B1 | 3/2005 | Kumbalimutt et al. |
| 6,873,953 B1 | 3/2005 | Lennig |
| 6,873,986 B2 | 3/2005 | McConnell et al. |
| 6,876,947 B1 | 4/2005 | Darley et al. |
| 6,877,003 B2 | 4/2005 | Ho et al. |
| 6,879,957 B1 | 4/2005 | Pechter et al. |
| 6,882,335 B2 | 4/2005 | Saarinen |
| 6,882,337 B2 | 4/2005 | Shetter |
| 6,882,747 B2 | 4/2005 | Thawonmas et al. |
| 6,882,955 B1 | 4/2005 | Ohlenbusch et al. |
| 6,882,971 B2 | 4/2005 | Craner |
| 6,885,734 B1 | 4/2005 | Eberle et al. |
| 6,889,361 B1 | 5/2005 | Bates et al. |
| 6,895,084 B1 | 5/2005 | Saylor et al. |
| 6,895,257 B2 | 5/2005 | Boman et al. |
| 6,895,380 B2 | 5/2005 | Sepe, Jr. |
| 6,895,558 B1 | 5/2005 | Loveland |
| 6,898,550 B1 | 5/2005 | Blackadar et al. |
| 6,901,364 B2 | 5/2005 | Nguyen et al. |
| 6,901,399 B1 | 5/2005 | Corston et al. |
| 6,904,405 B2 | 6/2005 | Suominen |
| 6,907,112 B1 | 6/2005 | Guedalia et al. |
| 6,907,140 B2 | 6/2005 | Matsugu et al. |
| 6,910,004 B2 | 6/2005 | Tarbouriech et al. |
| 6,910,007 B2 | 6/2005 | Stylianou et al. |
| 6,910,012 B2 | 6/2005 | Hartley et al. |
| 6,910,186 B2 | 6/2005 | Kim |
| 6,911,971 B2 | 6/2005 | Suzuki et al. |
| 6,912,407 B1 | 6/2005 | Clarke et al. |
| 6,912,498 B2 | 6/2005 | Stevens et al. |
| 6,912,499 B1 | 6/2005 | Sabourin et al. |
| 6,915,138 B2 | 7/2005 | Kraft |
| 6,915,246 B2 | 7/2005 | Gusler et al. |
| 6,915,294 B1 | 7/2005 | Singh et al. |
| 6,917,373 B2 | 7/2005 | Vong et al. |
| 6,918,677 B2 | 7/2005 | Shipman |
| 6,924,828 B1 | 8/2005 | Hirsch |
| 6,925,438 B2 | 8/2005 | Mohamed et al. |
| 6,928,149 B1 | 8/2005 | Panjwani et al. |
| 6,928,614 B1 | 8/2005 | Everhart |
| 6,931,255 B2 | 8/2005 | Mekuria |
| 6,931,384 B1 | 8/2005 | Horvitz et al. |
| 6,932,708 B2 | 8/2005 | Yamashita et al. |
| 6,933,928 B1 * | 8/2005 | Lilienthal ........... G06F 15/0283 345/156 |
| 6,934,394 B1 | 8/2005 | Anderson |
| 6,934,684 B2 | 8/2005 | Alpdemir et al. |
| 6,934,756 B2 | 8/2005 | Maes |
| 6,934,812 B1 | 8/2005 | Robbin et al. |
| 6,937,975 B1 | 8/2005 | Elworthy |
| 6,937,986 B2 | 8/2005 | Denenberg et al. |
| 6,944,593 B2 | 9/2005 | Kuzunuki et al. |
| 6,944,846 B2 | 9/2005 | Ryzhov |
| 6,948,094 B2 | 9/2005 | Schultz et al. |
| 6,950,087 B2 | 9/2005 | Knox et al. |
| 6,950,502 B1 | 9/2005 | Jenkins |
| 6,952,799 B2 | 10/2005 | Edwards et al. |
| 6,954,755 B2 | 10/2005 | Reisman |
| 6,954,899 B1 | 10/2005 | Anderson |
| 6,956,845 B2 | 10/2005 | Baker et al. |
| 6,957,076 B2 | 10/2005 | Hunzinger |
| 6,957,183 B2 | 10/2005 | Malayath et al. |
| 6,960,734 B1 | 11/2005 | Park |
| 6,961,699 B1 | 11/2005 | Kahn et al. |
| 6,961,912 B2 | 11/2005 | Aoki et al. |
| 6,963,759 B1 | 11/2005 | Gerson |
| 6,963,841 B2 | 11/2005 | Handal et al. |
| 6,964,023 B2 | 11/2005 | Maes et al. |
| 6,965,376 B2 | 11/2005 | Tani et al. |
| 6,965,863 B1 | 11/2005 | Zuberec et al. |
| 6,968,311 B2 | 11/2005 | Knockeart et al. |
| 6,970,820 B2 | 11/2005 | Junqua et al. |
| 6,970,881 B1 | 11/2005 | Mohan et al. |
| 6,970,915 B1 | 11/2005 | Partovi et al. |
| 6,970,935 B1 | 11/2005 | Maes |
| 6,976,090 B2 | 12/2005 | Ben-Shaul et al. |
| 6,978,127 B1 | 12/2005 | Bulthuis et al. |
| 6,978,239 B2 | 12/2005 | Chu et al. |
| 6,980,949 B2 | 12/2005 | Ford |
| 6,980,953 B1 | 12/2005 | Kanevsky et al. |
| 6,980,955 B2 | 12/2005 | Okutani et al. |
| 6,983,251 B1 | 1/2006 | Umemoto et al. |
| 6,985,858 B2 | 1/2006 | Frey et al. |
| 6,985,865 B1 | 1/2006 | Packingham et al. |
| 6,985,958 B2 | 1/2006 | Lucovsky et al. |
| 6,988,063 B2 | 1/2006 | Tokuda et al. |
| 6,988,071 B1 | 1/2006 | Gazdzinski |
| 6,990,450 B2 | 1/2006 | Case et al. |
| 6,996,520 B2 | 2/2006 | Levin |
| 6,996,531 B2 | 2/2006 | Korall et al. |
| 6,996,575 B2 | 2/2006 | Cox et al. |
| 6,999,066 B2 | 2/2006 | Litwiller |
| 6,999,914 B1 | 2/2006 | Boerner et al. |
| 6,999,925 B2 | 2/2006 | Fischer et al. |
| 6,999,927 B2 | 2/2006 | Mozer et al. |
| 7,000,189 B2 | 2/2006 | Dutta et al. |
| 7,002,556 B2 | 2/2006 | Tsukada et al. |
| 7,003,099 B1 | 2/2006 | Zhang et al. |
| 7,003,463 B1 | 2/2006 | Maes et al. |
| 7,003,522 B1 | 2/2006 | Reynar et al. |
| 7,006,969 B2 | 2/2006 | Atal |
| 7,006,973 B1 | 2/2006 | Genly et al. |
| 7,007,026 B2 | 2/2006 | Wilkinson et al. |
| 7,007,239 B1 | 2/2006 | Hawkins et al. |
| 7,010,581 B2 | 3/2006 | Brown et al. |
| 7,013,289 B2 | 3/2006 | Horn et al. |
| 7,013,308 B1 | 3/2006 | Tunstall-Pedoe |
| 7,013,429 B2 | 3/2006 | Fujimoto et al. |
| 7,015,894 B2 | 3/2006 | Morohoshi |
| 7,020,685 B1 | 3/2006 | Chen et al. |
| 7,023,979 B1 | 4/2006 | Wu et al. |
| 7,024,363 B1 | 4/2006 | Comerford et al. |
| 7,024,364 B2 | 4/2006 | Guerra et al. |
| 7,024,366 B1 | 4/2006 | Deyoe et al. |
| 7,024,460 B2 | 4/2006 | Koopmas et al. |
| 7,027,568 B1 | 4/2006 | Simpson et al. |
| 7,027,974 B1 | 4/2006 | Busch et al. |
| 7,027,990 B2 | 4/2006 | Sussman |
| 7,028,252 B1 | 4/2006 | Baru et al. |
| 7,030,861 B1 | 4/2006 | Westerman et al. |
| 7,031,530 B2 | 4/2006 | Driggs et al. |
| 7,031,909 B2 | 4/2006 | Mao et al. |
| 7,035,794 B2 | 4/2006 | Sirivara |
| 7,035,801 B2 | 4/2006 | Jimenez-Feltstrom |
| 7,035,807 B1 | 4/2006 | Brittain et al. |
| 7,036,128 B1 | 4/2006 | Julia et al. |
| 7,036,681 B2 | 5/2006 | Suda et al. |
| 7,038,659 B2 | 5/2006 | Rajkowski |
| 7,039,588 B2 | 5/2006 | Okutani et al. |
| 7,043,420 B2 | 5/2006 | Ratnaparkhi |
| 7,043,422 B2 | 5/2006 | Gao et al. |
| 7,046,230 B2 | 5/2006 | Zadesky et al. |
| 7,046,850 B2 | 5/2006 | Braspenning et al. |
| 7,047,193 B1 | 5/2006 | Bellegarda |
| 7,050,550 B2 | 5/2006 | Steinbiss et al. |
| 7,050,976 B1 | 5/2006 | Packingham |
| 7,050,977 B1 | 5/2006 | Bennett |
| 7,051,096 B1 | 5/2006 | Krawiec et al. |
| 7,054,419 B2 | 5/2006 | Culliss |
| 7,054,888 B2 | 5/2006 | LaChapelle et al. |
| 7,057,607 B2 | 6/2006 | Mayoraz et al. |
| 7,058,569 B2 | 6/2006 | Coorman et al. |

(56) References Cited

U.S. PATENT DOCUMENTS

| | | |
|---|---|---|
| 7,058,888 B1 | 6/2006 | Gjerstad et al. |
| 7,058,889 B2 | 6/2006 | Trovato et al. |
| 7,062,223 B2 | 6/2006 | Gerber et al. |
| 7,062,225 B2 | 6/2006 | White |
| 7,062,428 B2 | 6/2006 | Hogenhout et al. |
| 7,062,438 B2 | 6/2006 | Kobayashi et al. |
| 7,065,185 B1 | 6/2006 | Koch |
| 7,065,485 B1 | 6/2006 | Chong-White et al. |
| 7,069,213 B2 | 6/2006 | Thompson |
| 7,069,220 B2 | 6/2006 | Coffman et al. |
| 7,069,560 B1 | 6/2006 | Cheyer et al. |
| 7,072,686 B1 | 7/2006 | Schrager |
| 7,072,941 B2 | 7/2006 | Griffin et al. |
| 7,076,527 B2 | 7/2006 | Bellegarda et al. |
| 7,079,713 B2 | 7/2006 | Simmons |
| 7,082,322 B2 | 7/2006 | Harano |
| 7,084,758 B1 | 8/2006 | Cole |
| 7,084,856 B2 | 8/2006 | Huppi |
| 7,085,716 B1 | 8/2006 | Even et al. |
| 7,085,723 B2 | 8/2006 | Ross et al. |
| 7,085,960 B2 | 8/2006 | Bouat et al. |
| 7,088,345 B2 | 8/2006 | Robinson et al. |
| 7,089,292 B1 | 8/2006 | Roderick et al. |
| 7,092,370 B2 | 8/2006 | Jiang et al. |
| 7,092,887 B2 | 8/2006 | Mozer et al. |
| 7,092,928 B1 | 8/2006 | Elad et al. |
| 7,092,950 B2 | 8/2006 | Wong et al. |
| 7,093,693 B1 | 8/2006 | Gazdzinski |
| 7,095,733 B1 | 8/2006 | Yarlagadda et al. |
| 7,096,183 B2 | 8/2006 | Junqua |
| 7,100,117 B1 * | 8/2006 | Chwa ................ H04N 21/235 375/E7.024 |
| 7,103,548 B2 | 9/2006 | Squibbs et al. |
| 7,107,204 B1 | 9/2006 | Liu et al. |
| 7,110,998 B1 | 9/2006 | Bhandari et al. |
| 7,111,248 B2 | 9/2006 | Mulvey et al. |
| 7,111,774 B2 | 9/2006 | Song |
| 7,112,827 B2 | 9/2006 | Hayakawa et al. |
| 7,113,803 B2 | 9/2006 | Dehlin |
| 7,113,943 B2 | 9/2006 | Bradford et al. |
| 7,115,035 B2 | 10/2006 | Tanaka |
| 7,117,231 B2 | 10/2006 | Fischer et al. |
| 7,120,586 B2 | 10/2006 | Loui et al. |
| 7,120,865 B1 | 10/2006 | Horvitz et al. |
| 7,123,696 B2 | 10/2006 | Lowe |
| 7,124,081 B1 | 10/2006 | Bellegarda |
| 7,124,082 B2 | 10/2006 | Freedman |
| 7,124,164 B1 | 10/2006 | Chemtob |
| 7,127,046 B1 | 10/2006 | Smith et al. |
| 7,127,394 B2 | 10/2006 | Strong |
| 7,127,396 B2 | 10/2006 | Chu et al. |
| 7,127,403 B1 | 10/2006 | Saylor et al. |
| 7,129,932 B1 | 10/2006 | Klarlund et al. |
| 7,133,900 B1 | 11/2006 | Szeto |
| 7,136,710 B1 | 11/2006 | Hoffberg et al. |
| 7,136,818 B1 | 11/2006 | Cosatto et al. |
| 7,137,126 B1 | 11/2006 | Coffman et al. |
| 7,139,697 B2 | 11/2006 | Häkkinen et al. |
| 7,139,714 B2 | 11/2006 | Bennett et al. |
| 7,139,722 B2 | 11/2006 | Perrella et al. |
| 7,143,028 B2 | 11/2006 | Hillis et al. |
| 7,143,038 B2 | 11/2006 | Katae |
| 7,143,040 B2 | 11/2006 | Durston et al. |
| 7,146,319 B2 | 12/2006 | Hunt |
| 7,146,437 B2 | 12/2006 | Robbin et al. |
| 7,149,319 B2 | 12/2006 | Roeck |
| 7,149,695 B1 | 12/2006 | Bellegarda |
| 7,149,964 B1 | 12/2006 | Cottrille et al. |
| 7,152,070 B1 | 12/2006 | Musick et al. |
| 7,152,093 B2 | 12/2006 | Ludwig et al. |
| 7,154,526 B2 | 12/2006 | Foote et al. |
| 7,155,668 B2 | 12/2006 | Holland et al. |
| 7,158,647 B2 | 1/2007 | Azima et al. |
| 7,159,174 B2 | 1/2007 | Johnson et al. |
| 7,162,412 B2 | 1/2007 | Yamada et al. |
| 7,162,482 B1 | 1/2007 | Dunning |
| 7,165,073 B2 | 1/2007 | Vandersluis |
| 7,166,791 B2 | 1/2007 | Robbin et al. |
| 7,171,350 B2 | 1/2007 | Lin et al. |
| 7,171,360 B2 | 1/2007 | Huang et al. |
| 7,174,042 B1 | 2/2007 | Simmons et al. |
| 7,174,295 B1 | 2/2007 | Kivimaki |
| 7,174,297 B2 | 2/2007 | Guerra et al. |
| 7,174,298 B2 | 2/2007 | Sharma |
| 7,177,794 B2 | 2/2007 | Mani et al. |
| 7,177,798 B2 | 2/2007 | Hsu et al. |
| 7,177,817 B1 | 2/2007 | Khosla et al. |
| 7,181,386 B2 | 2/2007 | Mohri et al. |
| 7,181,388 B2 | 2/2007 | Tian |
| 7,184,064 B2 | 2/2007 | Zimmerman et al. |
| 7,185,276 B2 * | 2/2007 | Keswa ................ H04L 63/08 707/999.001 |
| 7,188,085 B2 | 3/2007 | Pelletier |
| 7,190,351 B1 | 3/2007 | Goren |
| 7,190,794 B2 | 3/2007 | Hinde |
| 7,191,118 B2 | 3/2007 | Bellegarda |
| 7,191,131 B1 | 3/2007 | Nagao |
| 7,194,186 B1 | 3/2007 | Kim et al. |
| 7,194,413 B2 | 3/2007 | Mahoney et al. |
| 7,194,471 B1 | 3/2007 | Nagatsuka et al. |
| 7,194,611 B2 | 3/2007 | Bear et al. |
| 7,194,699 B2 | 3/2007 | Thomson et al. |
| 7,197,120 B2 | 3/2007 | Luehrig et al. |
| 7,197,460 B1 | 3/2007 | Gupta et al. |
| 7,200,550 B2 | 4/2007 | Menezes et al. |
| 7,200,558 B2 | 4/2007 | Kato et al. |
| 7,200,559 B2 | 4/2007 | Wang |
| 7,203,297 B2 | 4/2007 | Vitikainen et al. |
| 7,203,646 B2 | 4/2007 | Bennett |
| 7,206,809 B2 | 4/2007 | Ludwig et al. |
| 7,212,827 B1 | 5/2007 | Veschi |
| 7,216,008 B2 | 5/2007 | Sakata |
| 7,216,066 B2 | 5/2007 | Di et al. |
| 7,216,073 B2 | 5/2007 | Lavi et al. |
| 7,216,079 B1 | 5/2007 | Barnard et al. |
| 7,216,080 B2 | 5/2007 | Tsiao et al. |
| 7,218,920 B2 | 5/2007 | Hyon |
| 7,218,943 B2 | 5/2007 | Klassen et al. |
| 7,219,063 B2 | 5/2007 | Schalk et al. |
| 7,219,123 B1 | 5/2007 | Fiechter et al. |
| 7,225,125 B2 | 5/2007 | Bennett et al. |
| 7,228,278 B2 | 6/2007 | Nguyen et al. |
| 7,231,343 B1 | 6/2007 | Treadgold et al. |
| 7,231,597 B1 | 6/2007 | Braun et al. |
| 7,233,790 B2 | 6/2007 | Kjellberg et al. |
| 7,233,904 B2 | 6/2007 | Luisi |
| 7,236,932 B1 | 6/2007 | Grajski |
| 7,264,026 B2 | 6/2007 | Robbin et al. |
| 7,240,002 B2 | 7/2007 | Minamino et al. |
| 7,243,130 B2 | 7/2007 | Horvitz et al. |
| 7,243,305 B2 | 7/2007 | Schabes et al. |
| 7,246,118 B2 | 7/2007 | Chastain et al. |
| 7,246,151 B2 | 7/2007 | Isaacs et al. |
| 7,248,900 B2 | 7/2007 | Deeds et al. |
| 7,251,313 B1 | 7/2007 | Miller et al. |
| 7,251,454 B2 | 7/2007 | White |
| 7,254,773 B2 | 8/2007 | Bates et al. |
| 7,257,537 B2 | 8/2007 | Ross et al. |
| 7,259,752 B1 | 8/2007 | Simmons |
| 7,260,529 B1 | 8/2007 | Lengen |
| 7,260,567 B2 | 8/2007 | Parikh et al. |
| 7,263,373 B2 | 8/2007 | Mattisson |
| 7,266,189 B1 | 9/2007 | Day |
| 7,266,495 B1 | 9/2007 | Beaufays et al. |
| 7,266,496 B2 | 9/2007 | Wang et al. |
| 7,266,499 B2 | 9/2007 | Surace et al. |
| 7,269,544 B2 | 9/2007 | Simske |
| 7,269,556 B2 | 9/2007 | Kiss et al. |
| 7,272,224 B1 | 9/2007 | Normile et al. |
| 7,275,063 B2 | 9/2007 | Horn |
| 7,277,088 B2 | 10/2007 | Robinson et al. |
| 7,277,854 B2 | 10/2007 | Bennett et al. |
| 7,277,855 B1 | 10/2007 | Acker et al. |
| 7,280,958 B2 | 10/2007 | Pavlov et al. |

(56) References Cited

U.S. PATENT DOCUMENTS

| | | |
|---|---|---|
| 7,283,072 B1 | 10/2007 | Plachta et al. |
| 7,289,102 B2 | 10/2007 | Hinckley et al. |
| 7,290,039 B1 | 10/2007 | Lisitsa et al. |
| 7,292,579 B2 | 11/2007 | Morris |
| 7,292,979 B2 | 11/2007 | Karas et al. |
| 7,292,980 B1 | 11/2007 | August et al. |
| 7,296,019 B1 | 11/2007 | Chandrasekar et al. |
| 7,296,230 B2 | 11/2007 | Fukatsu et al. |
| 7,299,033 B2 | 11/2007 | Kjellberg et al. |
| 7,302,392 B1 | 11/2007 | Thenthiruperai et al. |
| 7,302,394 B1 | 11/2007 | Baray et al. |
| 7,302,686 B2 | 11/2007 | Togawa |
| 7,308,404 B2 | 12/2007 | Venkataraman et al. |
| 7,308,408 B1 | 12/2007 | Stifelman et al. |
| 7,310,329 B2 | 12/2007 | Vieri et al. |
| 7,310,600 B1 | 12/2007 | Garner et al. |
| 7,310,605 B2 | 12/2007 | Janakiraman et al. |
| 7,313,523 B1 | 12/2007 | Bellegarda et al. |
| 7,315,809 B2 | 1/2008 | Xun |
| 7,315,818 B2 | 1/2008 | Stevens et al. |
| 7,318,020 B1 | 1/2008 | Kim |
| 7,319,957 B2 | 1/2008 | Robinson et al. |
| 7,321,783 B2 | 1/2008 | Kim |
| 7,322,023 B2 | 1/2008 | Shulman et al. |
| 7,324,833 B2 | 1/2008 | White et al. |
| 7,324,947 B2 | 1/2008 | Jordan et al. |
| 7,328,155 B2 | 2/2008 | Endo et al. |
| 7,328,250 B2 | 2/2008 | Wang et al. |
| 7,333,998 B2 | 2/2008 | Heckerman et al. |
| 7,345,670 B2 | 3/2008 | Armstrong |
| 7,345,671 B2 | 3/2008 | Robbin et al. |
| 7,349,953 B2 | 3/2008 | Lisitsa et al. |
| 7,353,139 B1 | 4/2008 | Burrell et al. |
| 7,359,493 B1 | 4/2008 | Wang et al. |
| 7,359,671 B2 | 4/2008 | Richenstein et al. |
| 7,359,851 B2 | 4/2008 | Tong et al. |
| 7,360,158 B1 | 4/2008 | Beeman |
| 7,362,738 B2 | 4/2008 | Taube et al. |
| 7,363,227 B2 | 4/2008 | Mapes-Riordan et al. |
| 7,363,586 B1 | 4/2008 | Briggs et al. |
| 7,365,260 B2 | 4/2008 | Kawashima |
| 7,366,461 B1 | 4/2008 | Brown |
| 7,373,291 B2 | 5/2008 | Garst |
| 7,373,612 B2 | 5/2008 | Risch et al. |
| 7,376,556 B2 | 5/2008 | Bennett |
| 7,376,632 B1 | 5/2008 | Sadek et al. |
| 7,376,645 B2 | 5/2008 | Bernard |
| 7,378,963 B1 | 5/2008 | Begault et al. |
| 7,379,874 B2 | 5/2008 | Schmid et al. |
| 7,380,203 B2 | 5/2008 | Keely et al. |
| 7,383,170 B2 | 6/2008 | Mills et al. |
| 7,386,438 B1 | 6/2008 | Franz et al. |
| 7,386,449 B2 | 6/2008 | Sun et al. |
| 7,386,799 B1 | 6/2008 | Clanton et al. |
| 7,389,224 B1 | 6/2008 | Elworthy |
| 7,389,225 B1 | 6/2008 | Jensen et al. |
| 7,392,185 B2 | 6/2008 | Bennett |
| 7,394,947 B2 | 7/2008 | Li et al. |
| 7,398,209 B2 | 7/2008 | Kennewick et al. |
| 7,401,300 B2 | 7/2008 | Nurmi |
| 7,403,938 B2 | 7/2008 | Harrison et al. |
| 7,403,941 B2 | 7/2008 | Bedworth et al. |
| 7,404,143 B2 | 7/2008 | Freelander et al. |
| 7,409,337 B1 | 8/2008 | Potter et al. |
| 7,409,347 B1 | 8/2008 | Bellegarda |
| 7,412,389 B2 | 8/2008 | Yang |
| 7,412,470 B2 | 8/2008 | Masuno et al. |
| 7,415,100 B2 | 8/2008 | Cooper et al. |
| 7,415,469 B2 | 8/2008 | Singh et al. |
| 7,418,382 B1 | 8/2008 | Maes |
| 7,418,389 B2 | 8/2008 | Chu et al. |
| 7,418,392 B1 | 8/2008 | Mozer et al. |
| 7,426,467 B2 | 9/2008 | Nashida et al. |
| 7,426,468 B2 | 9/2008 | Coifman et al. |
| 7,427,024 B1 | 9/2008 | Gazdzinski et al. |
| 7,428,541 B2 | 9/2008 | Houle |
| 7,433,869 B2 | 10/2008 | Gollapudi |
| 7,433,921 B2 | 10/2008 | Ludwig et al. |
| 7,436,947 B2 | 10/2008 | Wadler et al. |
| 7,441,184 B2 | 10/2008 | Frerebeau et al. |
| 7,443,316 B2 | 10/2008 | Lim |
| 7,444,589 B2 | 10/2008 | Zellner |
| 7,447,360 B2 | 11/2008 | Li et al. |
| 7,447,624 B2 | 11/2008 | Fuhrmann |
| 7,447,635 B1 | 11/2008 | Konopka et al. |
| 7,447,637 B1 | 11/2008 | Grant et al. |
| 7,451,081 B1 | 11/2008 | Gajic et al. |
| 7,454,351 B2 | 11/2008 | Jeschke et al. |
| 7,460,652 B2 | 12/2008 | Chang |
| 7,461,043 B2 | 12/2008 | Hess |
| 7,467,087 B1 | 12/2008 | Gillick et al. |
| 7,467,164 B2 | 12/2008 | Marsh |
| 7,472,061 B1 | 12/2008 | Alewine et al. |
| 7,472,065 B2 | 12/2008 | Aaron et al. |
| 7,475,010 B2 | 1/2009 | Chao |
| 7,475,015 B2 | 1/2009 | Epstein et al. |
| 7,475,063 B2 | 1/2009 | Datta et al. |
| 7,477,238 B2 | 1/2009 | Fux et al. |
| 7,477,240 B2 | 1/2009 | Yanagisawa |
| 7,478,037 B2 | 1/2009 | Strong |
| 7,478,091 B2 | 1/2009 | Mojsilovic et al. |
| 7,478,129 B1 | 1/2009 | Chemtob |
| 7,479,948 B2 | 1/2009 | Kim et al. |
| 7,479,949 B2 | 1/2009 | Jobs et al. |
| 7,483,832 B2 | 1/2009 | Tischer |
| 7,483,894 B2 | 1/2009 | Cao |
| 7,487,089 B2 | 2/2009 | Mozer |
| 7,487,093 B2 | 2/2009 | Mutsuno et al. |
| 7,490,034 B2 | 2/2009 | Finnigan et al. |
| 7,490,039 B1 | 2/2009 | Shaffer et al. |
| 7,493,560 B1 | 2/2009 | Kipnes et al. |
| 7,496,498 B2 | 2/2009 | Chu et al. |
| 7,496,512 B2 | 2/2009 | Zhao et al. |
| 7,499,923 B2 | 3/2009 | Kawatani |
| 7,502,738 B2 | 3/2009 | Kennewick et al. |
| 7,505,795 B1 | 3/2009 | Lim et al. |
| 7,508,324 B2 | 3/2009 | Suraqui |
| 7,508,373 B2 | 3/2009 | Lin et al. |
| 7,516,123 B2 | 4/2009 | Betz et al. |
| 7,519,327 B2 | 4/2009 | White |
| 7,519,398 B2 | 4/2009 | Hirose |
| 7,522,927 B2 | 4/2009 | Fitch et al. |
| 7,523,036 B2 | 4/2009 | Akabane et al. |
| 7,523,108 B2 | 4/2009 | Cao |
| 7,526,466 B2 | 4/2009 | Au |
| 7,526,738 B2 | 4/2009 | Ording et al. |
| 7,528,713 B2 | 5/2009 | Singh et al. |
| 7,529,671 B2 | 5/2009 | Rockenbeck et al. |
| 7,529,676 B2 | 5/2009 | Koyama |
| 7,535,997 B1 | 5/2009 | McQuaide, Jr. et al. |
| 7,536,029 B2 | 5/2009 | Choi et al. |
| 7,536,565 B2 | 5/2009 | Girish et al. |
| 7,538,685 B1 | 5/2009 | Cooper et al. |
| 7,539,619 B1 | 5/2009 | Seligman et al. |
| 7,539,656 B2 | 5/2009 | Fratkina et al. |
| 7,541,940 B2 | 6/2009 | Upton |
| 7,542,967 B2 | 6/2009 | Hurst-Hiller et al. |
| 7,542,971 B2 | 6/2009 | Thione et al. |
| 7,543,232 B2 | 6/2009 | Easton, Jr. et al. |
| 7,546,382 B2 | 6/2009 | Healey et al. |
| 7,546,529 B2 | 6/2009 | Reynar et al. |
| 7,548,895 B2 | 6/2009 | Pulsipher |
| 7,552,045 B2 | 6/2009 | Barliga et al. |
| 7,552,055 B2 | 6/2009 | Lecoeuche |
| 7,555,431 B2 | 6/2009 | Bennett |
| 7,555,496 B1 | 6/2009 | Lantrip et al. |
| 7,558,381 B1 | 7/2009 | Ali et al. |
| 7,558,730 B2 | 7/2009 | Davis et al. |
| 7,559,026 B2 | 7/2009 | Girish et al. |
| 7,561,069 B2 | 7/2009 | Horstemeyer |
| 7,562,007 B2 | 7/2009 | Hwang |
| 7,562,032 B2 | 7/2009 | Abbosh et al. |
| 7,565,104 B1 | 7/2009 | Brown et al. |
| 7,565,380 B1 | 7/2009 | Venkatachary |

(56) References Cited

U.S. PATENT DOCUMENTS

| | | |
|---|---|---|
| 7,571,092 B1 | 8/2009 | Nieh |
| 7,571,106 B2 | 8/2009 | Cao et al. |
| 7,577,522 B2 | 8/2009 | Rosenberg |
| 7,580,551 B1 | 8/2009 | Srihari et al. |
| 7,580,576 B2 | 8/2009 | Wang et al. |
| 7,580,839 B2 | 8/2009 | Tamura et al. |
| 7,584,093 B2 | 9/2009 | Potter et al. |
| 7,584,278 B2 | 9/2009 | Rajarajan et al. |
| 7,584,429 B2 | 9/2009 | Fabritius |
| 7,593,868 B2 | 9/2009 | Margiloff et al. |
| 7,596,269 B2 | 9/2009 | King et al. |
| 7,596,499 B2 | 9/2009 | Anguera et al. |
| 7,596,606 B2 * | 9/2009 | Codignotto .......... G06Q 10/107 379/67.1 |
| 7,596,765 B2 | 9/2009 | Almas |
| 7,599,918 B2 | 10/2009 | Shen et al. |
| 7,603,349 B1 | 10/2009 | Kraft et al. |
| 7,603,381 B2 | 10/2009 | Burke et al. |
| 7,606,444 B1 | 10/2009 | Erol et al. |
| 7,609,179 B2 | 10/2009 | Diaz-Gutierrez et al. |
| 7,610,258 B2 | 10/2009 | Yuknewicz et al. |
| 7,613,264 B2 | 11/2009 | Wells et al. |
| 7,614,008 B2 | 11/2009 | Ording |
| 7,617,094 B2 | 11/2009 | Aoki et al. |
| 7,620,407 B1 | 11/2009 | Donald et al. |
| 7,620,549 B2 | 11/2009 | Di Cristo et al. |
| 7,620,894 B1 | 11/2009 | Kahn |
| 7,623,119 B2 | 11/2009 | Autio et al. |
| 7,624,007 B2 | 11/2009 | Bennett |
| 7,627,481 B1 | 12/2009 | Kuo et al. |
| 7,630,901 B2 | 12/2009 | Omi |
| 7,633,076 B2 | 12/2009 | Huppi et al. |
| 7,634,409 B2 | 12/2009 | Kennewick et al. |
| 7,634,413 B1 | 12/2009 | Kuo et al. |
| 7,634,718 B2 | 12/2009 | Nakajima |
| 7,634,732 B1 | 12/2009 | Blagsvedt et al. |
| 7,636,657 B2 | 12/2009 | Ju et al. |
| 7,640,158 B2 * | 12/2009 | Detlef .................... G10L 15/26 704/235 |
| 7,640,160 B2 | 12/2009 | Di Cristo et al. |
| 7,643,990 B1 | 1/2010 | Bellegarda |
| 7,647,225 B2 | 1/2010 | Bennett et al. |
| 7,649,454 B2 | 1/2010 | Singh et al. |
| 7,649,877 B2 | 1/2010 | Vieri et al. |
| 7,653,883 B2 | 1/2010 | Hotelling et al. |
| 7,656,393 B2 | 2/2010 | King et al. |
| 7,657,424 B2 | 2/2010 | Bennett |
| 7,657,828 B2 | 2/2010 | Lucas et al. |
| 7,657,844 B2 | 2/2010 | Gibson et al. |
| 7,657,849 B2 | 2/2010 | Chaudhri et al. |
| 7,663,607 B2 | 2/2010 | Hotelling et al. |
| 7,664,558 B2 | 2/2010 | Lindahl et al. |
| 7,664,638 B2 | 2/2010 | Cooper et al. |
| 7,669,134 B1 | 2/2010 | Christie et al. |
| 7,672,841 B2 | 3/2010 | Bennett |
| 7,672,952 B2 | 3/2010 | Isaacson et al. |
| 7,673,238 B2 | 3/2010 | Girish et al. |
| 7,673,340 B1 | 3/2010 | Cohen et al. |
| 7,676,026 B1 | 3/2010 | Baxter, Jr. |
| 7,676,365 B2 | 3/2010 | Hwang et al. |
| 7,676,463 B2 | 3/2010 | Thompson et al. |
| 7,679,534 B2 | 3/2010 | Kay et al. |
| 7,680,649 B2 | 3/2010 | Park |
| 7,681,126 B2 | 3/2010 | Roose |
| 7,683,886 B2 | 3/2010 | Willey |
| 7,683,893 B2 | 3/2010 | Kim |
| 7,684,985 B2 | 3/2010 | Dominach et al. |
| 7,684,990 B2 | 3/2010 | Caskey et al. |
| 7,684,991 B2 | 3/2010 | Stohr et al. |
| 7,689,245 B2 | 3/2010 | Cox et al. |
| 7,689,408 B2 | 3/2010 | Chen et al. |
| 7,689,409 B2 | 3/2010 | Heinecke |
| 7,689,421 B2 | 3/2010 | Li et al. |
| 7,693,715 B2 | 4/2010 | Hwang et al. |
| 7,693,717 B2 * | 4/2010 | Kahn ....................... G10L 15/22 704/260 |
| 7,693,719 B2 | 4/2010 | Chu et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,703,091 B1 | 4/2010 | Martin et al. |
| 7,706,510 B2 | 4/2010 | Ng |
| 7,707,026 B2 | 4/2010 | Liu |
| 7,707,027 B2 | 4/2010 | Balchandran et al. |
| 7,707,032 B2 | 4/2010 | Wang et al. |
| 7,707,221 B1 | 4/2010 | Dunning et al. |
| 7,707,226 B1 | 4/2010 | Tonse |
| 7,707,267 B2 | 4/2010 | Lisitsa et al. |
| 7,710,262 B2 | 5/2010 | Ruha |
| 7,711,129 B2 | 5/2010 | Lindahl et al. |
| 7,711,550 B1 | 5/2010 | Feinberg et al. |
| 7,711,565 B1 | 5/2010 | Gazdzinski |
| 7,711,672 B2 | 5/2010 | Au |
| 7,712,053 B2 | 5/2010 | Bradford et al. |
| 7,716,056 B2 | 5/2010 | Weng et al. |
| 7,716,216 B1 | 5/2010 | Harik et al. |
| 7,720,674 B2 | 5/2010 | Kaiser et al. |
| 7,720,683 B1 | 5/2010 | Vermeulen et al. |
| 7,721,226 B2 | 5/2010 | Barabe et al. |
| 7,721,301 B2 | 5/2010 | Wong et al. |
| 7,724,242 B2 | 5/2010 | Hillis et al. |
| 7,724,696 B1 * | 5/2010 | Parekh .................. G06F 1/3203 345/104 |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,725,838 B2 | 5/2010 | Williams |
| 7,729,904 B2 | 6/2010 | Bennett |
| 7,729,916 B2 | 6/2010 | Coffman et al. |
| 7,734,461 B2 | 6/2010 | Kwak et al. |
| 7,735,012 B2 | 6/2010 | Naik |
| 7,739,588 B2 | 6/2010 | Reynar et al. |
| 7,742,953 B2 | 6/2010 | King et al. |
| 7,743,188 B2 | 6/2010 | Haitani et al. |
| 7,747,616 B2 | 6/2010 | Yamada et al. |
| 7,752,152 B2 | 7/2010 | Paek et al. |
| 7,756,708 B2 | 7/2010 | Cohen et al. |
| 7,756,868 B2 | 7/2010 | Lee |
| 7,756,871 B2 | 7/2010 | Yacoub et al. |
| 7,757,173 B2 | 7/2010 | Beaman |
| 7,757,182 B2 | 7/2010 | Elliott et al. |
| 7,761,296 B1 | 7/2010 | Bakis et al. |
| 7,763,842 B2 | 7/2010 | Hsu et al. |
| 7,774,204 B2 | 8/2010 | Mozer et al. |
| 7,774,388 B1 | 8/2010 | Runchey |
| 7,777,717 B2 | 8/2010 | Fux et al. |
| 7,778,432 B2 | 8/2010 | Larsen |
| 7,778,595 B2 | 8/2010 | White et al. |
| 7,778,632 B2 | 8/2010 | Kurlander et al. |
| 7,778,830 B2 | 8/2010 | Davis et al. |
| 7,779,353 B2 | 8/2010 | Grigoriu et al. |
| 7,779,356 B2 | 8/2010 | Griesmer |
| 7,779,357 B2 | 8/2010 | Naik |
| 7,783,283 B2 | 8/2010 | Kuusinen et al. |
| 7,783,486 B2 | 8/2010 | Rosser et al. |
| 7,788,590 B2 | 8/2010 | Taboada et al. |
| 7,788,663 B2 | 8/2010 | Illowsky et al. |
| 7,796,980 B1 | 9/2010 | McKinney et al. |
| 7,797,265 B2 | 9/2010 | Brinker et al. |
| 7,797,269 B2 | 9/2010 | Rieman et al. |
| 7,797,331 B2 | 9/2010 | Theimer et al. |
| 7,797,629 B2 | 9/2010 | Fux et al. |
| 7,801,721 B2 | 9/2010 | Rosart et al. |
| 7,801,728 B2 | 9/2010 | Ben-David et al. |
| 7,801,729 B2 | 9/2010 | Mozer |
| 7,805,299 B2 | 9/2010 | Coifman |
| 7,809,550 B1 | 10/2010 | Barrows |
| 7,809,565 B2 | 10/2010 | Coifman |
| 7,809,569 B2 | 10/2010 | Attwater et al. |
| 7,809,570 B2 | 10/2010 | Kennewick et al. |
| 7,809,610 B2 | 10/2010 | Cao |

(56) References Cited

U.S. PATENT DOCUMENTS

| | | |
|---|---|---|
| 7,809,744 B2 | 10/2010 | Nevidomski et al. |
| 7,818,165 B2 | 10/2010 | Carlgren et al. |
| 7,818,176 B2 | 10/2010 | Freeman et al. |
| 7,818,215 B2 | 10/2010 | King et al. |
| 7,818,291 B2 | 10/2010 | Ferguson et al. |
| 7,818,672 B2 | 10/2010 | Mccormack et al. |
| 7,822,608 B2 | 10/2010 | Cross, Jr. et al. |
| 7,823,123 B2 | 10/2010 | Sabbouh |
| 7,826,945 B2 | 11/2010 | Zhang et al. |
| 7,827,047 B2 | 11/2010 | Anderson et al. |
| 7,831,423 B2 | 11/2010 | Schubert |
| 7,831,426 B2 | 11/2010 | Bennett |
| 7,831,432 B2 | 11/2010 | Bodin et al. |
| 7,835,504 B1 | 11/2010 | Donald et al. |
| 7,836,437 B2 | 11/2010 | Kacmarcik |
| 7,840,348 B2 | 11/2010 | Kim et al. |
| 7,840,400 B2 | 11/2010 | Lavi et al. |
| 7,840,447 B2 | 11/2010 | Kleinrock et al. |
| 7,840,581 B2 | 11/2010 | Ross et al. |
| 7,840,912 B2 | 11/2010 | Elias et al. |
| 7,844,394 B2 | 11/2010 | Kim |
| 7,848,924 B2 | 12/2010 | Nurminen et al. |
| 7,848,926 B2 | 12/2010 | Goto et al. |
| 7,853,444 B2 | 12/2010 | Wang et al. |
| 7,853,445 B2 | 12/2010 | Bachenko et al. |
| 7,853,574 B2 | 12/2010 | Kraenzel et al. |
| 7,853,577 B2 | 12/2010 | Sundaresan et al. |
| 7,853,664 B1 | 12/2010 | Wang et al. |
| 7,853,900 B2 | 12/2010 | Nguyen et al. |
| 7,865,817 B2 | 1/2011 | Ryan et al. |
| 7,869,999 B2 | 1/2011 | Amato et al. |
| 7,870,118 B2 | 1/2011 | Jiang et al. |
| 7,870,133 B2 | 1/2011 | Krishnamoorthy et al. |
| 7,873,149 B2 | 1/2011 | Schultz et al. |
| 7,873,519 B2 | 1/2011 | Bennett |
| 7,873,654 B2 | 1/2011 | Bernard |
| 7,877,705 B2 | 1/2011 | Chambers et al. |
| 7,880,730 B2 | 2/2011 | Robinson et al. |
| 7,881,283 B2 | 2/2011 | Cormier et al. |
| 7,881,936 B2 | 2/2011 | Longe et al. |
| 7,885,390 B2 | 2/2011 | Chaudhuri et al. |
| 7,885,844 B1 | 2/2011 | Cohen et al. |
| 7,886,233 B2 | 2/2011 | Rainisto et al. |
| 7,889,184 B2 | 2/2011 | Blumenberg et al. |
| 7,889,185 B2 | 2/2011 | Blumenberg et al. |
| 7,890,330 B2 | 2/2011 | Ozkaragoz et al. |
| 7,890,652 B2 | 2/2011 | Bull et al. |
| 7,895,531 B2 | 2/2011 | Radtke et al. |
| 7,899,666 B2 | 3/2011 | Varone |
| 7,908,287 B1 | 3/2011 | Katragadda |
| 7,912,289 B2 | 3/2011 | Kansal et al. |
| 7,912,699 B1 | 3/2011 | Saraclar et al. |
| 7,912,702 B2 | 3/2011 | Bennett |
| 7,912,720 B1 | 3/2011 | Hakkani-Tur et al. |
| 7,912,828 B2 | 3/2011 | Bonnet et al. |
| 7,913,185 B1 | 3/2011 | Benson et al. |
| 7,916,979 B2 | 3/2011 | Simmons |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,920,682 B2 | 4/2011 | Byrne et al. |
| 7,920,857 B2 | 4/2011 | Lau et al. |
| 7,925,525 B2 | 4/2011 | Chin |
| 7,925,610 B2 | 4/2011 | Elbaz et al. |
| 7,929,805 B2 | 4/2011 | Wang et al. |
| 7,930,168 B2 | 4/2011 | Weng et al. |
| 7,930,183 B2 | 4/2011 | Odell et al. |
| 7,930,197 B2 | 4/2011 | Ozzie et al. |
| 7,936,339 B2 | 5/2011 | Marggraff et al. |
| 7,936,861 B2 | 5/2011 | Martin et al. |
| 7,936,863 B2 | 5/2011 | John et al. |
| 7,937,075 B2 | 5/2011 | Zellner |
| 7,941,009 B2 | 5/2011 | Li et al. |
| 7,945,294 B2 | 5/2011 | Zhang et al. |
| 7,945,470 B1 | 5/2011 | Cohen et al. |
| 7,949,529 B2 | 5/2011 | Weider et al. |
| 7,949,534 B2 | 5/2011 | Davis et al. |
| 7,949,752 B2 | 5/2011 | Lange et al. |
| 7,953,679 B2 | 5/2011 | Chidlovskii et al. |
| 7,957,975 B2 | 6/2011 | Burns et al. |
| 7,958,136 B1 | 6/2011 | Curtis et al. |
| 7,962,179 B2 | 6/2011 | Huang |
| 7,974,835 B2 | 7/2011 | Balchandran et al. |
| 7,974,844 B2 | 7/2011 | Sumita |
| 7,974,972 B2 | 7/2011 | Cao |
| 7,975,216 B2 | 7/2011 | Woolf et al. |
| 7,983,478 B2 | 7/2011 | Liu et al. |
| 7,983,915 B2 | 7/2011 | Knight et al. |
| 7,983,917 B2 | 7/2011 | Kennewick et al. |
| 7,983,919 B2 | 7/2011 | Conkie |
| 7,983,997 B2 | 7/2011 | Allen et al. |
| 7,984,062 B2 | 7/2011 | Dunning et al. |
| 7,986,431 B2 | 7/2011 | Emori et al. |
| 7,987,151 B2 | 7/2011 | Schott et al. |
| 7,987,244 B1 | 7/2011 | Lewis et al. |
| 7,991,614 B2 | 8/2011 | Washio et al. |
| 7,992,085 B2 | 8/2011 | Wang-Aryattanwanich et al. |
| 7,996,228 B2 | 8/2011 | Miller et al. |
| 7,996,589 B2 | 8/2011 | Schultz et al. |
| 7,996,769 B2 | 8/2011 | Fux et al. |
| 7,996,792 B2 | 8/2011 | Anzures et al. |
| 7,999,669 B2 | 8/2011 | Singh et al. |
| 8,000,453 B2 | 8/2011 | Cooper et al. |
| 8,005,664 B2 | 8/2011 | Hanumanthappa |
| 8,005,679 B2 | 8/2011 | Jordan et al. |
| 8,006,180 B2 | 8/2011 | Tunning et al. |
| 8,014,308 B2 | 9/2011 | Gates et al. |
| 8,015,006 B2 | 9/2011 | Kennewick et al. |
| 8,015,011 B2 | 9/2011 | Nagano et al. |
| 8,015,144 B2 | 9/2011 | Zheng et al. |
| 8,018,431 B1 | 9/2011 | Zehr et al. |
| 8,019,271 B1 | 9/2011 | Izdepski |
| 8,024,195 B2 | 9/2011 | Mozer et al. |
| 8,024,415 B2 | 9/2011 | Horvitz et al. |
| 8,027,836 B2 | 9/2011 | Baker et al. |
| 8,031,943 B2 | 10/2011 | Chen et al. |
| 8,032,383 B1 | 10/2011 | Bhardwaj et al. |
| 8,036,901 B2 | 10/2011 | Mozer |
| 8,037,034 B2 | 10/2011 | Plachta et al. |
| 8,041,557 B2 | 10/2011 | Liu |
| 8,041,570 B2 | 10/2011 | Mirkovic et al. |
| 8,041,611 B2 | 10/2011 | Kleinrock et al. |
| 8,042,053 B2 | 10/2011 | Darwish et al. |
| 8,046,363 B2 | 10/2011 | Cha et al. |
| 8,046,374 B1 | 10/2011 | Bromwich et al. |
| 8,050,500 B1 | 11/2011 | Batty et al. |
| 8,055,502 B2 | 11/2011 | Clark et al. |
| 8,055,708 B2 | 11/2011 | Chitsaz et al. |
| 8,056,070 B2 | 11/2011 | Goller et al. |
| 8,060,824 B2 | 11/2011 | Brownrigg, Jr. et al. |
| 8,064,753 B2 | 11/2011 | Freeman |
| 8,065,143 B2 | 11/2011 | Yanagihara |
| 8,065,155 B1 | 11/2011 | Gazdzinski |
| 8,065,156 B2 | 11/2011 | Gazdzinski |
| 8,068,604 B2 | 11/2011 | Leeds et al. |
| 8,069,046 B2 | 11/2011 | Kennewick et al. |
| 8,069,422 B2 | 11/2011 | Sheshagiri et al. |
| 8,073,681 B2 | 12/2011 | Baldwin et al. |
| 8,073,695 B1 | 12/2011 | Hendricks et al. |
| 8,077,153 B2 | 12/2011 | Benko et al. |
| 8,078,473 B1 | 12/2011 | Gazdzinski |
| 8,082,153 B2 | 12/2011 | Coffman et al. |
| 8,082,498 B2 | 12/2011 | Salamon et al. |
| 8,090,571 B2 | 1/2012 | Elshishiny et al. |
| 8,095,364 B2 | 1/2012 | Longe et al. |
| 8,099,289 B2 | 1/2012 | Mozer et al. |
| 8,099,395 B2 | 1/2012 | Pabla et al. |
| 8,099,418 B2 | 1/2012 | Inoue et al. |
| 8,103,510 B2 | 1/2012 | Sato |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,117,542 B2 | 2/2012 | Radtke et al. |

(56) References Cited

U.S. PATENT DOCUMENTS

| | | | |
|---|---|---|---|
| 8,121,413 B2 | 2/2012 | Hwang et al. |
| 8,121,837 B2 | 2/2012 | Agapi et al. |
| 8,122,094 B1 | 2/2012 | Kotab |
| 8,122,353 B2 | 2/2012 | Bouta |
| 8,131,557 B2 | 3/2012 | Davis et al. |
| 8,135,115 B1 | 3/2012 | Hogg, Jr. et al. |
| 8,138,912 B2 | 3/2012 | Singh et al. |
| 8,140,335 B2 | 3/2012 | Kennewick et al. |
| 8,140,567 B2 | 3/2012 | Padovitz et al. |
| 8,150,694 B2 | 4/2012 | Kennewick et al. |
| 8,150,700 B2 | 4/2012 | Shin et al. |
| 8,155,956 B2 | 4/2012 | Cho et al. |
| 8,156,005 B2 | 4/2012 | Vieri |
| 8,160,877 B1 | 4/2012 | Nucci et al. |
| 8,160,883 B2 | 4/2012 | Lecoeuche |
| 8,165,321 B2 | 4/2012 | Paquier et al. |
| 8,165,886 B1 | 4/2012 | Gagnon et al. |
| 8,166,019 B1 | 4/2012 | Lee et al. |
| 8,166,032 B2 | 4/2012 | Sommer et al. |
| 8,170,790 B2 | 5/2012 | Lee et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,195,467 B2 | 6/2012 | Mozer et al. |
| 8,195,468 B2 | 6/2012 | Kennewick et al. |
| 8,200,495 B2 | 6/2012 | Braho et al. |
| 8,201,109 B2 | 6/2012 | Van Os et al. |
| 8,204,238 B2 | 6/2012 | Mozer |
| 8,205,788 B1 | 6/2012 | Gazdzinski et al. |
| 8,209,183 B1 | 6/2012 | Patel et al. |
| 8,213,911 B2 | 7/2012 | Williams et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,608 B2 | 7/2012 | alSafadi et al. |
| 8,224,649 B2 | 7/2012 | Chaudhari et al. |
| 8,228,299 B1 | 7/2012 | Maloney et al. |
| 8,233,919 B2 | 7/2012 | Haag et al. |
| 8,234,111 B2 | 7/2012 | Lloyd et al. |
| 8,239,207 B2 | 8/2012 | Seligman et al. |
| 8,244,712 B2 | 8/2012 | Serlet et al. |
| 8,250,071 B1 | 8/2012 | Killalea et al. |
| 8,255,217 B2 | 8/2012 | Stent et al. |
| 8,260,247 B2 | 9/2012 | Lazaridis et al. |
| 8,260,617 B2 | 9/2012 | Dhanakshirur et al. |
| 8,270,933 B2 | 9/2012 | Riemer et al. |
| 8,275,621 B2 | 9/2012 | Alewine et al. |
| 8,279,171 B2 | 10/2012 | Hirai et al. |
| 8,280,438 B2 | 10/2012 | Barbera |
| 8,285,546 B2 | 10/2012 | Reich |
| 8,285,551 B2 | 10/2012 | Gazdzinski |
| 8,285,553 B2 | 10/2012 | Gazdzinski |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,124 B1 | 10/2012 | Holsztynska et al. |
| 8,296,145 B2 | 10/2012 | Clark et al. |
| 8,296,146 B2 | 10/2012 | Gazdzinski |
| 8,296,153 B2 | 10/2012 | Gazdzinski |
| 8,296,380 B1 | 10/2012 | Kelly et al. |
| 8,296,383 B2 | 10/2012 | Lindahl |
| 8,300,801 B2 | 10/2012 | Sweeney et al. |
| 8,301,456 B2 | 10/2012 | Gazdzinski |
| 8,311,834 B1 | 11/2012 | Gazdzinski |
| 8,311,835 B2 | 11/2012 | Lecoeuche |
| 8,311,838 B2 | 11/2012 | Lindahl et al. |
| 8,312,017 B2 | 11/2012 | Martin et al. |
| 8,321,786 B2 | 11/2012 | Lunati et al. |
| 8,332,218 B2 | 12/2012 | Cross et al. |
| 8,332,224 B2 | 12/2012 | Di Cristo et al. |
| 8,332,748 B1 | 12/2012 | Karam |
| 8,340,975 B1 | 12/2012 | Rosenberger |
| 8,345,665 B2 | 1/2013 | Vieri et al. |
| 8,352,183 B2 | 1/2013 | Thota et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,145 B2 | 2/2013 | Endo et al. |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,380,504 B1 | 2/2013 | Peden et al. |
| 8,380,507 B2 | 2/2013 | Herman et al. |
| 8,381,107 B2 | 2/2013 | Rottler et al. |
| 8,381,135 B2 | 2/2013 | Hotelling et al. |
| 8,386,485 B2 | 2/2013 | Kerschberg et al. |
| 8,386,926 B1 | 2/2013 | Matsuoka |
| 8,391,844 B2 | 3/2013 | Lamiraux et al. |
| 8,396,714 B2 | 3/2013 | Rogers et al. |
| 8,406,745 B1 | 3/2013 | Upadhyay et al. |
| 8,423,288 B2 | 4/2013 | Stahl et al. |
| 8,428,758 B2 | 4/2013 | Naik et al. |
| 8,447,612 B2 | 5/2013 | Gazdzinski |
| 8,452,597 B2 | 5/2013 | Bringert et al. |
| 8,458,115 B2 | 6/2013 | Cai et al. |
| 8,458,278 B2 | 6/2013 | Christie et al. |
| 8,464,150 B2 | 6/2013 | Davidson et al. |
| 8,479,122 B2 | 7/2013 | Hotelling et al. |
| 8,484,027 B1 | 7/2013 | Murphy |
| 8,489,599 B2 | 7/2013 | Bellotti |
| 8,498,857 B2 | 7/2013 | Kopparapu et al. |
| 8,514,197 B2 | 8/2013 | Shahraray et al. |
| 8,515,750 B1 | 8/2013 | Lei et al. |
| 8,521,513 B2 | 8/2013 | Millett et al. |
| 8,527,276 B1 | 9/2013 | Senior et al. |
| 8,560,229 B1 | 10/2013 | Park et al. |
| 8,571,851 B1 | 10/2013 | Tickner et al. |
| 8,583,416 B2 | 11/2013 | Huang et al. |
| 8,583,511 B2 | 11/2013 | Hendrickson |
| 8,589,869 B2 | 11/2013 | Wolfram |
| 8,589,911 B1 | 11/2013 | Sharkey et al. |
| 8,595,004 B2 | 11/2013 | Koshinaka |
| 8,606,568 B1 | 12/2013 | Tickner et al. |
| 8,620,659 B2 | 12/2013 | Di Cristo et al. |
| 8,620,662 B2 | 12/2013 | Bellegarda |
| 8,626,681 B1 | 1/2014 | Jurca et al. |
| 8,639,516 B2 | 1/2014 | Lindahl et al. |
| 8,645,137 B2 | 2/2014 | Bellegarda et al. |
| 8,654,936 B1 | 2/2014 | Tofighbakhsh et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,970 B1 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,904 B2 | 3/2014 | Lindahl |
| 8,677,377 B2 | 3/2014 | Cheyer et al. |
| 8,681,950 B2 | 3/2014 | Vlack et al. |
| 8,682,667 B2 | 3/2014 | Haughay et al. |
| 8,688,446 B2 | 4/2014 | Yanagihara et al. |
| 8,688,453 B1 | 4/2014 | Joshi et al. |
| 8,695,074 B2 | 4/2014 | Saraf et al. |
| 8,696,364 B2 | 4/2014 | Cohen |
| 8,706,472 B2 | 4/2014 | Ramerth et al. |
| 8,706,503 B2 | 4/2014 | Cheyer et al. |
| 8,713,119 B2 | 4/2014 | Lindahl et al. |
| 8,713,418 B2 * | 4/2014 | King ............... G06F 17/3089 715/200 |
| 8,719,006 B2 | 5/2014 | Bellegarda et al. |
| 8,719,014 B2 | 5/2014 | Wagner et al. |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Rodriguez et al. |
| 8,744,852 B1 | 6/2014 | Seymour et al. |
| 8,760,537 B2 | 6/2014 | Johnson et al. |
| 8,762,145 B2 | 6/2014 | Ouchi et al. |
| 8,762,156 B2 | 6/2014 | Chen et al. |
| 8,762,469 B2 | 6/2014 | Lindahl |

(56) References Cited

U.S. PATENT DOCUMENTS

| | | |
|---|---|---|
| 8,768,693 B2 | 7/2014 | Lempel et al. |
| 8,768,702 B2 | 7/2014 | Boettcher et al. |
| 8,775,931 B2 | 7/2014 | Fux et al. |
| 8,781,841 B1 | 7/2014 | Wang |
| 8,798,995 B1 | 8/2014 | Edara et al. |
| 8,799,000 B2 | 8/2014 | Guzzoni et al. |
| 8,805,690 B1 | 8/2014 | LeBeau et al. |
| 8,838,457 B2 | 9/2014 | Cerra et al. |
| 8,855,915 B2 | 10/2014 | Furuhata et al. |
| 8,861,925 B1 | 10/2014 | Ohme |
| 8,862,252 B2 | 10/2014 | Rottler et al. |
| 8,868,409 B1 | 10/2014 | Mengibar et al. |
| 8,880,405 B2 | 11/2014 | Cerra et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,930,191 B2 | 1/2015 | Gruber et al. |
| 8,942,986 B2 | 1/2015 | Cheyer et al. |
| 8,943,423 B2 | 1/2015 | Merrill et al. |
| 8,972,878 B2 | 3/2015 | David et al. |
| 8,983,383 B1 | 3/2015 | Haskin |
| 8,989,713 B2 | 3/2015 | Doulton |
| 8,990,235 B2 | 3/2015 | King et al. |
| 8,994,660 B2 | 3/2015 | Neels et al. |
| 8,996,376 B2 | 3/2015 | Fleizach et al. |
| 8,996,381 B2 | 3/2015 | Mozer et al. |
| 9,009,046 B1 | 4/2015 | Stewart |
| 9,037,967 B1 | 5/2015 | Al-Jefri et al. |
| 9,049,255 B2 | 6/2015 | MacFarlane et al. |
| 9,063,979 B2 | 6/2015 | Chiu et al. |
| 9,070,366 B1 | 6/2015 | Mathias et al. |
| 9,071,701 B2 | 6/2015 | Donaldson et al. |
| 9,081,411 B2 | 7/2015 | Kalns et al. |
| 9,081,482 B1 | 7/2015 | Zhai et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,447 B2 | 8/2015 | Gruber et al. |
| 9,123,338 B1 | 9/2015 | Sanders et al. |
| 9,190,062 B2 | 11/2015 | Haughay |
| 9,208,153 B1 | 12/2015 | Zaveri et al. |
| 9,218,809 B2 | 12/2015 | Bellegarda et al. |
| 9,223,537 B2 | 12/2015 | Brown et al. |
| 9,255,812 B2 | 2/2016 | Maeoka et al. |
| 9,258,604 B1 | 2/2016 | Bilobrov et al. |
| 9,262,612 B2 | 2/2016 | Cheyer |
| 9,292,487 B1 | 3/2016 | Weber |
| 9,299,344 B2 | 3/2016 | Braho et al. |
| 9,305,543 B2 | 4/2016 | Fleizach et al. |
| 9,305,548 B2 | 4/2016 | Kennewick et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,338,493 B2 | 5/2016 | Van Os et al. |
| 9,349,368 B1 | 5/2016 | LeBeau et al. |
| 9,361,084 B1 | 6/2016 | Costa |
| 9,377,871 B2 | 6/2016 | Waddell et al. |
| 9,423,266 B2 | 8/2016 | Clark et al. |
| 9,437,186 B1 | 9/2016 | Liu et al. |
| 9,495,129 B2 | 11/2016 | Fleizach et al. |
| 9,547,647 B2 | 1/2017 | Badaskar |
| 9,548,050 B2 | 1/2017 | Gruber et al. |
| 2001/0000534 A1 | 4/2001 | Matulich et al. |
| 2001/0005859 A1 | 6/2001 | Okuyama et al. |
| 2001/0020259 A1 | 9/2001 | Sekiguchi et al. |
| 2001/0027394 A1 | 10/2001 | Theimer |
| 2001/0027396 A1 | 10/2001 | Sato |
| 2001/0029455 A1 | 10/2001 | Chin et al. |
| 2001/0030660 A1 | 10/2001 | Zainoulline |
| 2001/0032080 A1 | 10/2001 | Fukada |
| 2001/0041021 A1 | 11/2001 | Boyle et al. |
| 2001/0042107 A1 | 11/2001 | Palm |
| 2001/0044724 A1 | 11/2001 | Hon et al. |
| 2001/0047264 A1 | 11/2001 | Roundtree |
| 2001/0055963 A1 | 12/2001 | Cloutier |
| 2001/0056342 A1 | 12/2001 | Piehn et al. |
| 2001/0056347 A1 | 12/2001 | Chazan et al. |
| 2002/0001395 A1 | 1/2002 | Davis et al. |
| 2002/0002039 A1 | 1/2002 | Qureshey et al. |
| 2002/0002413 A1 | 1/2002 | Tokue |
| 2002/0002461 A1* | 1/2002 | Tetsumoto ............ G10L 13/08 704/270.1 |
| 2002/0002465 A1 | 1/2002 | Maes |
| 2002/0004703 A1 | 1/2002 | Gaspard, II |
| 2002/0010581 A1 | 1/2002 | Euler et al. |
| 2002/0010584 A1 | 1/2002 | Schultz et al. |
| 2002/0010589 A1 | 1/2002 | Nashida et al. |
| 2002/0010726 A1 | 1/2002 | Rogson |
| 2002/0010798 A1 | 1/2002 | Ben-Shaul et al. |
| 2002/0013707 A1 | 1/2002 | Shaw et al. |
| 2002/0013784 A1 | 1/2002 | Swanson |
| 2002/0013852 A1 | 1/2002 | Janik |
| 2002/0015024 A1 | 2/2002 | Westerman et al. |
| 2002/0015064 A1 | 2/2002 | Robotham et al. |
| 2002/0021278 A1 | 2/2002 | Hinckley et al. |
| 2002/0026315 A1 | 2/2002 | Miranda |
| 2002/0026456 A1 | 2/2002 | Bradford |
| 2002/0031254 A1 | 3/2002 | Lantrip et al. |
| 2002/0031262 A1 | 3/2002 | Imagawa et al. |
| 2002/0032048 A1 | 3/2002 | Kitao et al. |
| 2002/0032564 A1 | 3/2002 | Ehsani et al. |
| 2002/0032591 A1 | 3/2002 | Mahaffy et al. |
| 2002/0032751 A1 | 3/2002 | Bharadwaj |
| 2002/0035467 A1 | 3/2002 | Morimoto et al. |
| 2002/0035469 A1 | 3/2002 | Holzapfel |
| 2002/0035474 A1 | 3/2002 | Alpdemir |
| 2002/0040297 A1 | 4/2002 | Tsiao et al. |
| 2002/0040359 A1 | 4/2002 | Green et al. |
| 2002/0042707 A1 | 4/2002 | Zhao et al. |
| 2002/0045438 A1 | 4/2002 | Tagawa et al. |
| 2002/0045961 A1 | 4/2002 | Gibbs et al. |
| 2002/0046025 A1 | 4/2002 | Hain |
| 2002/0046032 A1 | 4/2002 | Wutte |
| 2002/0046315 A1 | 4/2002 | Miller et al. |
| 2002/0049587 A1 | 4/2002 | Miyazawa |
| 2002/0052730 A1 | 5/2002 | Nakao |
| 2002/0052740 A1 | 5/2002 | Charlesworth et al. |
| 2002/0052746 A1 | 5/2002 | Handelman |
| 2002/0052747 A1 | 5/2002 | Sarukkai |
| 2002/0052913 A1 | 5/2002 | Yamada et al. |
| 2002/0054094 A1 | 5/2002 | Matsuda |
| 2002/0055844 A1 | 5/2002 | L'Esperance et al. |
| 2002/0055934 A1 | 5/2002 | Lipscomb et al. |
| 2002/0057293 A1 | 5/2002 | Liao |
| 2002/0059066 A1 | 5/2002 | O'hagan |
| 2002/0059068 A1 | 5/2002 | Rose et al. |
| 2002/0065659 A1 | 5/2002 | Isono et al. |
| 2002/0065797 A1 | 5/2002 | Meidan et al. |
| 2002/0067308 A1 | 6/2002 | Robertson |
| 2002/0069063 A1 | 6/2002 | Buchner et al. |
| 2002/0069071 A1 | 6/2002 | Knockeart et al. |
| 2002/0069220 A1 | 6/2002 | Tran |
| 2002/0072816 A1 | 6/2002 | Shdema et al. |
| 2002/0072908 A1 | 6/2002 | Case et al. |
| 2002/0072914 A1 | 6/2002 | Alshawi et al. |
| 2002/0072915 A1 | 6/2002 | Bower |
| 2002/0073177 A1* | 6/2002 | Clark ....................... G06F 21/10 709/219 |
| 2002/0077082 A1 | 6/2002 | Cruickshank |
| 2002/0077817 A1 | 6/2002 | Atal |
| 2002/0078041 A1 | 6/2002 | Wu |
| 2002/0080163 A1 | 6/2002 | Morey |
| 2002/0082831 A1 | 6/2002 | Hwang et al. |
| 2002/0083068 A1 | 6/2002 | Quass et al. |
| 2002/0085037 A1 | 7/2002 | Leavitt et al. |
| 2002/0086680 A1 | 7/2002 | Hunzinger |
| 2002/0087306 A1 | 7/2002 | Lee et al. |
| 2002/0087508 A1 | 7/2002 | Hull et al. |
| 2002/0087974 A1 | 7/2002 | Sprague |
| 2002/0091511 A1 | 7/2002 | Hellwig et al. |
| 2002/0091529 A1 | 7/2002 | Whitham |

(56) References Cited

U.S. PATENT DOCUMENTS

| | | |
|---|---|---|
| 2002/0095286 A1 | 7/2002 | Ross et al. |
| 2002/0095290 A1 | 7/2002 | Kahn et al. |
| 2002/0099547 A1 | 7/2002 | Chu et al. |
| 2002/0099552 A1 | 7/2002 | Rubin et al. |
| 2002/0101447 A1 | 8/2002 | Carro |
| 2002/0103641 A1 | 8/2002 | Kuo et al. |
| 2002/0103644 A1 | 8/2002 | Brocious et al. |
| 2002/0103646 A1 | 8/2002 | Kochanski et al. |
| 2002/0107684 A1 | 8/2002 | Gao |
| 2002/0109709 A1 | 8/2002 | Sagar |
| 2002/0110248 A1* | 8/2002 | Kovales ............... G10L 13/00 381/56 |
| 2002/0111198 A1 | 8/2002 | Heie et al. |
| 2002/0111810 A1 | 8/2002 | Khan et al. |
| 2002/0116082 A1 | 8/2002 | Gudorf |
| 2002/0116171 A1 | 8/2002 | Russell |
| 2002/0116185 A1 | 8/2002 | Cooper et al. |
| 2002/0116189 A1 | 8/2002 | Yeh et al. |
| 2002/0116420 A1 | 8/2002 | Allam et al. |
| 2002/0117384 A1 | 8/2002 | Marchant |
| 2002/0120697 A1 | 8/2002 | Generous et al. |
| 2002/0120925 A1 | 8/2002 | Logan |
| 2002/0122053 A1 | 9/2002 | Dutta et al. |
| 2002/0123804 A1 | 9/2002 | Gwon et al. |
| 2002/0123891 A1 | 9/2002 | Epstein et al. |
| 2002/0123892 A1 | 9/2002 | Woodward |
| 2002/0123894 A1 | 9/2002 | Woodward |
| 2002/0126097 A1 | 9/2002 | Savolainen |
| 2002/0128821 A1 | 9/2002 | Ehsani et al. |
| 2002/0128827 A1 | 9/2002 | Bu et al. |
| 2002/0128840 A1 | 9/2002 | Hinde et al. |
| 2002/0129057 A1 | 9/2002 | Spielberg |
| 2002/0133341 A1 | 9/2002 | Gillick et al. |
| 2002/0133347 A1 | 9/2002 | Schoneburg et al. |
| 2002/0133348 A1 | 9/2002 | Pearson et al. |
| 2002/0135565 A1 | 9/2002 | Gordon et al. |
| 2002/0135618 A1 | 9/2002 | Maes et al. |
| 2002/0137505 A1 | 9/2002 | Eiche et al. |
| 2002/0138254 A1 | 9/2002 | Isaka et al. |
| 2002/0138265 A1 | 9/2002 | Stevens et al. |
| 2002/0138270 A1 | 9/2002 | Bellegarda et al. |
| 2002/0138616 A1 | 9/2002 | Basson et al. |
| 2002/0140679 A1 | 10/2002 | Wen |
| 2002/0143533 A1 | 10/2002 | Lucas et al. |
| 2002/0143542 A1 | 10/2002 | Eide |
| 2002/0143551 A1 | 10/2002 | Sharma et al. |
| 2002/0143826 A1 | 10/2002 | Day et al. |
| 2002/0151297 A1 | 10/2002 | Remboski et al. |
| 2002/0152045 A1 | 10/2002 | Dowling et al. |
| 2002/0152255 A1 | 10/2002 | Smith et al. |
| 2002/0154160 A1 | 10/2002 | Hosokawa |
| 2002/0156771 A1 | 10/2002 | Frieder et al. |
| 2002/0161865 A1 | 10/2002 | Nguyen |
| 2002/0163544 A1 | 11/2002 | Baker et al. |
| 2002/0164000 A1 | 11/2002 | Cohen et al. |
| 2002/0165918 A1 | 11/2002 | Bettis |
| 2002/0166123 A1 | 11/2002 | Schrader et al. |
| 2002/0167534 A1 | 11/2002 | Burke |
| 2002/0169592 A1 | 11/2002 | Aityan |
| 2002/0169605 A1 | 11/2002 | Damiba et al. |
| 2002/0173273 A1 | 11/2002 | Spurgat et al. |
| 2002/0173889 A1 | 11/2002 | Odinak et al. |
| 2002/0173955 A1 | 11/2002 | Reich |
| 2002/0173961 A1 | 11/2002 | Guerra |
| 2002/0173962 A1 | 11/2002 | Tang et al. |
| 2002/0173966 A1 | 11/2002 | Henton |
| 2002/0177993 A1 | 11/2002 | Veditz et al. |
| 2002/0184003 A1 | 12/2002 | Hakkinen et al. |
| 2002/0184015 A1 | 12/2002 | Li et al. |
| 2002/0184027 A1 | 12/2002 | Brittan et al. |
| 2002/0184189 A1 | 12/2002 | Hay et al. |
| 2002/0188454 A1 | 12/2002 | Sauber |
| 2002/0189426 A1 | 12/2002 | Hirade et al. |
| 2002/0191029 A1 | 12/2002 | Gillespie et al. |
| 2002/0193996 A1 | 12/2002 | Squibbs et al. |
| 2002/0196911 A1 | 12/2002 | Gao et al. |
| 2002/0198714 A1 | 12/2002 | Zhou |
| 2002/0198715 A1 | 12/2002 | Belrose |
| 2003/0001881 A1 | 1/2003 | Mannheimer et al. |
| 2003/0002632 A1 | 1/2003 | Bhogal et al. |
| 2003/0003609 A1 | 1/2003 | Sauer et al. |
| 2003/0003897 A1 | 1/2003 | Hyon |
| 2003/0004968 A1 | 1/2003 | Romer et al. |
| 2003/0005174 A1 | 1/2003 | Coffman et al. |
| 2003/0009459 A1* | 1/2003 | Chastain ............... G06F 17/241 |
| 2003/0013483 A1 | 1/2003 | Ausems et al. |
| 2003/0016770 A1 | 1/2003 | Trans et al. |
| 2003/0018475 A1 | 1/2003 | Basu et al. |
| 2003/0020760 A1 | 1/2003 | Takatsu et al. |
| 2003/0023420 A1 | 1/2003 | Goodman et al. |
| 2003/0023426 A1 | 1/2003 | Pun et al. |
| 2003/0025676 A1 | 2/2003 | Cappendijk |
| 2003/0026392 A1 | 2/2003 | Brown et al. |
| 2003/0026402 A1 | 2/2003 | Clapper |
| 2003/0028380 A1 | 2/2003 | Freeland et al. |
| 2003/0030645 A1 | 2/2003 | Ribak et al. |
| 2003/0033148 A1 | 2/2003 | Silverman et al. |
| 2003/0033152 A1 | 2/2003 | Cameron |
| 2003/0033153 A1 | 2/2003 | Olson et al. |
| 2003/0033214 A1 | 2/2003 | Mikkelsen et al. |
| 2003/0036909 A1 | 2/2003 | Kato |
| 2003/0037073 A1 | 2/2003 | Tokuda et al. |
| 2003/0037077 A1 | 2/2003 | Brill et al. |
| 2003/0037254 A1 | 2/2003 | Fischer et al. |
| 2003/0038786 A1 | 2/2003 | Nguyen et al. |
| 2003/0040908 A1 | 2/2003 | Yang et al. |
| 2003/0046075 A1 | 3/2003 | Stone |
| 2003/0046401 A1 | 3/2003 | Abbott et al. |
| 2003/0046434 A1 | 3/2003 | Flanagin et al. |
| 2003/0048881 A1 | 3/2003 | Trajkovic et al. |
| 2003/0050781 A1 | 3/2003 | Tamura et al. |
| 2003/0051136 A1 | 3/2003 | Curtis et al. |
| 2003/0055537 A1 | 3/2003 | Odinak et al. |
| 2003/0055623 A1 | 3/2003 | Epstein et al. |
| 2003/0061317 A1 | 3/2003 | Brown et al. |
| 2003/0061570 A1 | 3/2003 | Hatori et al. |
| 2003/0063073 A1 | 4/2003 | Geaghan et al. |
| 2003/0069893 A1 | 4/2003 | Kanai et al. |
| 2003/0074195 A1 | 4/2003 | Bartosik et al. |
| 2003/0074198 A1 | 4/2003 | Sussman |
| 2003/0074457 A1 | 4/2003 | Kluth |
| 2003/0076301 A1 | 4/2003 | Tsuk et al. |
| 2003/0078766 A1* | 4/2003 | Appelt ............... G06F 17/30616 704/9 |
| 2003/0078778 A1 | 4/2003 | Emam et al. |
| 2003/0078779 A1 | 4/2003 | Desai et al. |
| 2003/0078780 A1 | 4/2003 | Kochanski et al. |
| 2003/0078969 A1 | 4/2003 | Sprague et al. |
| 2003/0079024 A1 | 4/2003 | Hough et al. |
| 2003/0079038 A1 | 4/2003 | Robbin et al. |
| 2003/0080991 A1 | 5/2003 | Crow et al. |
| 2003/0083113 A1 | 5/2003 | Chua et al. |
| 2003/0083878 A1 | 5/2003 | Lee et al. |
| 2003/0083884 A1 | 5/2003 | Odinak et al. |
| 2003/0084350 A1 | 5/2003 | Eibach et al. |
| 2003/0085870 A1 | 5/2003 | Hinckley |
| 2003/0086699 A1 | 5/2003 | Benyamin et al. |
| 2003/0088414 A1 | 5/2003 | Huang et al. |
| 2003/0088421 A1 | 5/2003 | Maes et al. |
| 2003/0090467 A1 | 5/2003 | Hohl et al. |
| 2003/0090474 A1 | 5/2003 | Schaefer |
| 2003/0095096 A1 | 5/2003 | Robbin et al. |
| 2003/0097210 A1 | 5/2003 | Horst et al. |
| 2003/0097379 A1 | 5/2003 | Ireton |
| 2003/0097407 A1 | 5/2003 | Litwin et al. |
| 2003/0097408 A1 | 5/2003 | Kageyama et al. |
| 2003/0098892 A1 | 5/2003 | Hiipakka |
| 2003/0099335 A1 | 5/2003 | Tanaka et al. |
| 2003/0101045 A1 | 5/2003 | Moffatt et al. |
| 2003/0101054 A1 | 5/2003 | Davis et al. |
| 2003/0115060 A1 | 6/2003 | Junqua et al. |
| 2003/0115064 A1 | 6/2003 | Gusler et al. |
| 2003/0115186 A1 | 6/2003 | Wilkinson et al. |
| 2003/0115289 A1 | 6/2003 | Chinn et al. |

(56) References Cited

U.S. PATENT DOCUMENTS

| | | |
|---|---|---|
| 2003/0115552 A1 | 6/2003 | Jahnke et al. |
| 2003/0117365 A1 | 6/2003 | Shteyn |
| 2003/0120494 A1 | 6/2003 | Jost et al. |
| 2003/0122652 A1 | 7/2003 | Himmelstein et al. |
| 2003/0122787 A1 | 7/2003 | Zimmerman et al. |
| 2003/0125927 A1 | 7/2003 | Seme |
| 2003/0125945 A1 | 7/2003 | Doyle |
| 2003/0125955 A1 | 7/2003 | Arnold et al. |
| 2003/0126559 A1 | 7/2003 | Fuhrmann |
| 2003/0128819 A1 | 7/2003 | Lee et al. |
| 2003/0130847 A1 | 7/2003 | Case et al. |
| 2003/0131320 A1 | 7/2003 | Kumhyr et al. |
| 2003/0133694 A1 | 7/2003 | Yeo |
| 2003/0134678 A1 | 7/2003 | Tanaka |
| 2003/0135501 A1 | 7/2003 | Frerebeau et al. |
| 2003/0135740 A1 | 7/2003 | Talmor et al. |
| 2003/0140088 A1 | 7/2003 | Robinson et al. |
| 2003/0144846 A1 | 7/2003 | Denenberge et al. |
| 2003/0145285 A1 | 7/2003 | Miyahira et al. |
| 2003/0147512 A1 | 8/2003 | Abburi |
| 2003/0149557 A1 | 8/2003 | Cox et al. |
| 2003/0149567 A1 | 8/2003 | Schmitz et al. |
| 2003/0149978 A1 | 8/2003 | Plotnick |
| 2003/0152203 A1 | 8/2003 | Berger et al. |
| 2003/0152894 A1 | 8/2003 | Townshend |
| 2003/0154079 A1 | 8/2003 | Ota et al. |
| 2003/0154081 A1 | 8/2003 | Chu et al. |
| 2003/0154116 A1 | 8/2003 | Lofton |
| 2003/0157968 A1 | 8/2003 | Boman et al. |
| 2003/0158732 A1 | 8/2003 | Pi et al. |
| 2003/0158735 A1 | 8/2003 | Yamada et al. |
| 2003/0158737 A1 | 8/2003 | Csicsatka |
| 2003/0160702 A1 | 8/2003 | Tanaka |
| 2003/0160830 A1 | 8/2003 | Degross |
| 2003/0163316 A1 | 8/2003 | Addison et al. |
| 2003/0164848 A1 | 9/2003 | Dutta et al. |
| 2003/0167167 A1 | 9/2003 | Gong |
| 2003/0167318 A1 | 9/2003 | Robbin et al. |
| 2003/0167335 A1 | 9/2003 | Alexander |
| 2003/0171928 A1 | 9/2003 | Falcon et al. |
| 2003/0171936 A1 | 9/2003 | Sall et al. |
| 2003/0174830 A1 | 9/2003 | Boyer et al. |
| 2003/0177046 A1 | 9/2003 | Socha-Leialoha et al. |
| 2003/0179222 A1 | 9/2003 | Noma et al. |
| 2003/0182115 A1 | 9/2003 | Malayath et al. |
| 2003/0182131 A1 | 9/2003 | Arnold et al. |
| 2003/0182394 A1 | 9/2003 | Ryngle et al. |
| 2003/0187655 A1 | 10/2003 | Dunsmuir |
| 2003/0187659 A1 | 10/2003 | Cho et al. |
| 2003/0187775 A1 | 10/2003 | Du et al. |
| 2003/0187844 A1 | 10/2003 | Li et al. |
| 2003/0187925 A1 | 10/2003 | Inala et al. |
| 2003/0188005 A1 | 10/2003 | Yoneda et al. |
| 2003/0188192 A1 | 10/2003 | Tang et al. |
| 2003/0190074 A1 | 10/2003 | Loudon et al. |
| 2003/0191625 A1 | 10/2003 | Gorin et al. |
| 2003/0191645 A1 | 10/2003 | Zhou |
| 2003/0193481 A1 | 10/2003 | Sokolsky |
| 2003/0194080 A1* | 10/2003 | Michaelis ......... H04M 3/42153 379/257 |
| 2003/0195741 A1 | 10/2003 | Mani et al. |
| 2003/0197736 A1 | 10/2003 | Murphy |
| 2003/0197744 A1 | 10/2003 | Irvine |
| 2003/0200085 A1 | 10/2003 | Nguyen et al. |
| 2003/0200452 A1* | 10/2003 | Tagawa ................. G06F 3/16 713/193 |
| 2003/0200858 A1 | 10/2003 | Xie |
| 2003/0202697 A1 | 10/2003 | Simard et al. |
| 2003/0204392 A1 | 10/2003 | Finnigan et al. |
| 2003/0204492 A1 | 10/2003 | Wolf et al. |
| 2003/0206199 A1 | 11/2003 | Pusa et al. |
| 2003/0208756 A1 | 11/2003 | Macrae et al. |
| 2003/0210266 A1 | 11/2003 | Cragun et al. |
| 2003/0212543 A1 | 11/2003 | Epstein et al. |
| 2003/0212961 A1 | 11/2003 | Soin et al. |
| 2003/0214519 A1 | 11/2003 | Smith et al. |
| 2003/0216919 A1 | 11/2003 | Roushar |
| 2003/0221198 A1 | 11/2003 | Sloo et al. |
| 2003/0224760 A1 | 12/2003 | Day |
| 2003/0228863 A1 | 12/2003 | Vander Veen et al. |
| 2003/0228909 A1 | 12/2003 | Tanaka et al. |
| 2003/0229490 A1 | 12/2003 | Etter |
| 2003/0229616 A1 | 12/2003 | Wong |
| 2003/0233230 A1 | 12/2003 | Ammicht et al. |
| 2003/0233237 A1 | 12/2003 | Garside et al. |
| 2003/0233240 A1 | 12/2003 | Kaatrasalo |
| 2003/0234824 A1 | 12/2003 | Litwiller |
| 2003/0236663 A1 | 12/2003 | Dimitrova et al. |
| 2004/0001396 A1 | 1/2004 | Keller et al. |
| 2004/0006467 A1 | 1/2004 | Anisimovich et al. |
| 2004/0008277 A1 | 1/2004 | Nagaishi et al. |
| 2004/0010484 A1 | 1/2004 | Foulger et al. |
| 2004/0012556 A1 | 1/2004 | Yong et al. |
| 2004/0013252 A1 | 1/2004 | Craner |
| 2004/0015342 A1 | 1/2004 | Garst et al. |
| 2004/0021676 A1 | 2/2004 | Chen et al. |
| 2004/0022369 A1 | 2/2004 | Vitikainen et al. |
| 2004/0022373 A1 | 2/2004 | Suder et al. |
| 2004/0023643 A1 | 2/2004 | Vander Veen et al. |
| 2004/0024834 A1 | 2/2004 | Alegria et al. |
| 2004/0030551 A1 | 2/2004 | Marcu et al. |
| 2004/0030554 A1 | 2/2004 | Boxberger-Oberoi et al. |
| 2004/0030556 A1 | 2/2004 | Bennett |
| 2004/0030559 A1 | 2/2004 | Payne et al. |
| 2004/0030996 A1 | 2/2004 | Van Liempd et al. |
| 2004/0036715 A1 | 2/2004 | Warren |
| 2004/0044516 A1 | 3/2004 | Kennewick et al. |
| 2004/0048627 A1 | 3/2004 | Olvera-Hernandez |
| 2004/0049388 A1 | 3/2004 | Roth et al. |
| 2004/0049391 A1 | 3/2004 | Polanyi et al. |
| 2004/0051729 A1 | 3/2004 | Borden, IV |
| 2004/0052338 A1 | 3/2004 | Celi, Jr. et al. |
| 2004/0054530 A1 | 3/2004 | Davis et al. |
| 2004/0054533 A1 | 3/2004 | Bellegarda |
| 2004/0054534 A1 | 3/2004 | Junqua |
| 2004/0054535 A1 | 3/2004 | Mackie et al. |
| 2004/0054541 A1 | 3/2004 | Kryze et al. |
| 2004/0054690 A1 | 3/2004 | Hillerbrand et al. |
| 2004/0055446 A1 | 3/2004 | Robbin et al. |
| 2004/0056899 A1 | 3/2004 | Sinclair, II et al. |
| 2004/0059577 A1 | 3/2004 | Pickering |
| 2004/0059790 A1 | 3/2004 | Austin-Lane et al. |
| 2004/0061717 A1 | 4/2004 | Menon et al. |
| 2004/0062367 A1 | 4/2004 | Fellenstein et al. |
| 2004/0064593 A1 | 4/2004 | Sinclair et al. |
| 2004/0069122 A1 | 4/2004 | Wilson |
| 2004/0070567 A1 | 4/2004 | Longe et al. |
| 2004/0070612 A1 | 4/2004 | Sinclair et al. |
| 2004/0073427 A1 | 4/2004 | Moore |
| 2004/0073428 A1 | 4/2004 | Zlokarnik et al. |
| 2004/0076086 A1 | 4/2004 | Keller et al. |
| 2004/0078382 A1 | 4/2004 | Mercer et al. |
| 2004/0085162 A1 | 5/2004 | Agarwal et al. |
| 2004/0085368 A1 | 5/2004 | Johnson, Jr. et al. |
| 2004/0086120 A1 | 5/2004 | Akins, III et al. |
| 2004/0093213 A1 | 5/2004 | Conkie |
| 2004/0093215 A1 | 5/2004 | Gupta et al. |
| 2004/0093328 A1 | 5/2004 | Damle |
| 2004/0094018 A1 | 5/2004 | Ueshima et al. |
| 2004/0096105 A1 | 5/2004 | Holtsberg |
| 2004/0098250 A1 | 5/2004 | Kimchi et al. |
| 2004/0100479 A1 | 5/2004 | Nakano et al. |
| 2004/0106432 A1 | 6/2004 | Kanamori et al. |
| 2004/0107169 A1 | 6/2004 | Lowe |
| 2004/0111266 A1 | 6/2004 | Coorman et al. |
| 2004/0111332 A1 | 6/2004 | Baar et al. |
| 2004/0114731 A1 | 6/2004 | Gillett et al. |
| 2004/0120476 A1 | 6/2004 | Harrison et al. |
| 2004/0122656 A1 | 6/2004 | Abir |
| 2004/0122664 A1 | 6/2004 | Lorenzo et al. |
| 2004/0122673 A1 | 6/2004 | Park et al. |
| 2004/0124583 A1 | 7/2004 | Landis |
| 2004/0125088 A1 | 7/2004 | Zimmerman et al. |
| 2004/0125922 A1 | 7/2004 | Specht |

(56) References Cited

U.S. PATENT DOCUMENTS

| | | |
|---|---|---|
| 2004/0127198 A1 | 7/2004 | Roskind et al. |
| 2004/0127241 A1 | 7/2004 | Shostak |
| 2004/0128137 A1 | 7/2004 | Bush et al. |
| 2004/0128614 A1 | 7/2004 | Andrews et al. |
| 2004/0133817 A1 | 7/2004 | Choi |
| 2004/0135701 A1 | 7/2004 | Yasuda et al. |
| 2004/0135774 A1 | 7/2004 | La Monica |
| 2004/0136510 A1 | 7/2004 | Vander Veen |
| 2004/0138869 A1 | 7/2004 | Heinecke |
| 2004/0138881 A1 | 7/2004 | Divay et al. |
| 2004/0145607 A1 | 7/2004 | Alderson |
| 2004/0148154 A1 | 7/2004 | Acero et al. |
| 2004/0152054 A1 | 8/2004 | Gleissner et al. |
| 2004/0153306 A1 | 8/2004 | Tanner et al. |
| 2004/0155869 A1 | 8/2004 | Robinson et al. |
| 2004/0160419 A1 | 8/2004 | Padgitt |
| 2004/0162741 A1 | 8/2004 | Flaxer et al. |
| 2004/0170379 A1 | 9/2004 | Yao et al. |
| 2004/0174399 A1 | 9/2004 | Wu et al. |
| 2004/0174434 A1 | 9/2004 | Walker et al. |
| 2004/0176958 A1 | 9/2004 | Salmenkaita et al. |
| 2004/0177319 A1 | 9/2004 | Horn |
| 2004/0178994 A1 | 9/2004 | Kairls, Jr. |
| 2004/0181392 A1 | 9/2004 | Parikh et al. |
| 2004/0183833 A1 | 9/2004 | Chua |
| 2004/0186713 A1 | 9/2004 | Gomas et al. |
| 2004/0186714 A1 | 9/2004 | Baker |
| 2004/0186777 A1 | 9/2004 | Margiloff et al. |
| 2004/0186857 A1 | 9/2004 | Serlet et al. |
| 2004/0193398 A1 | 9/2004 | Chu et al. |
| 2004/0193420 A1 | 9/2004 | Kennewick et al. |
| 2004/0193421 A1 | 9/2004 | Blass |
| 2004/0193426 A1 | 9/2004 | Maddux et al. |
| 2004/0196256 A1 | 10/2004 | Wobbrock et al. |
| 2004/0198436 A1 | 10/2004 | Alden |
| 2004/0199375 A1 | 10/2004 | Ehsani et al. |
| 2004/0199387 A1 | 10/2004 | Wang et al. |
| 2004/0199663 A1 | 10/2004 | Horvitz et al. |
| 2004/0203520 A1 | 10/2004 | Schirtzinger et al. |
| 2004/0205151 A1 | 10/2004 | Sprigg et al. |
| 2004/0205671 A1 | 10/2004 | Sukehiro et al. |
| 2004/0208302 A1 | 10/2004 | Urban et al. |
| 2004/0210442 A1 | 10/2004 | Glynn et al. |
| 2004/0210634 A1 | 10/2004 | Ferrer et al. |
| 2004/0213419 A1 | 10/2004 | Varma et al. |
| 2004/0215731 A1 | 10/2004 | Tzann-en Szeto |
| 2004/0216049 A1 | 10/2004 | Lewis et al. |
| 2004/0218451 A1 | 11/2004 | Said et al. |
| 2004/0220798 A1 | 11/2004 | Chi et al. |
| 2004/0220809 A1 | 11/2004 | Wang et al. |
| 2004/0221235 A1 | 11/2004 | Marchisio et al. |
| 2004/0223485 A1 | 11/2004 | Arellano et al. |
| 2004/0223599 A1 | 11/2004 | Bear et al. |
| 2004/0224638 A1 | 11/2004 | Fadell et al. |
| 2004/0225501 A1 | 11/2004 | Cutaia et al. |
| 2004/0225504 A1 | 11/2004 | Junqua et al. |
| 2004/0225650 A1 | 11/2004 | Cooper et al. |
| 2004/0225746 A1 | 11/2004 | Niell et al. |
| 2004/0230420 A1 | 11/2004 | Kadambe et al. |
| 2004/0230637 A1 | 11/2004 | Lecoueche et al. |
| 2004/0236778 A1 | 11/2004 | Junqua et al. |
| 2004/0242286 A1 | 12/2004 | Benco et al. |
| 2004/0243412 A1 | 12/2004 | Gupta et al. |
| 2004/0243415 A1 | 12/2004 | Commarford et al. |
| 2004/0243419 A1 | 12/2004 | Wang |
| 2004/0249629 A1 | 12/2004 | Webster |
| 2004/0249637 A1 | 12/2004 | Baker |
| 2004/0249667 A1 | 12/2004 | Oon |
| 2004/0252119 A1 | 12/2004 | Hunleth et al. |
| 2004/0252604 A1 | 12/2004 | Johnson et al. |
| 2004/0252966 A1 | 12/2004 | Holloway et al. |
| 2004/0254791 A1 | 12/2004 | Coifman et al. |
| 2004/0254792 A1 | 12/2004 | Busayapongchai et al. |
| 2004/0257432 A1 | 12/2004 | Girish et al. |
| 2004/0259536 A1 | 12/2004 | Keskar et al. |
| 2004/0260438 A1 | 12/2004 | Chernetsky et al. |
| 2004/0260547 A1 | 12/2004 | Cohen et al. |
| 2004/0260718 A1 | 12/2004 | Fedorov et al. |
| 2004/0261023 A1 | 12/2004 | Bier |
| 2004/0262051 A1 | 12/2004 | Carro |
| 2004/0263636 A1 | 12/2004 | Cutler et al. |
| 2004/0267825 A1 | 12/2004 | Novak et al. |
| 2004/0268253 A1 | 12/2004 | Demello et al. |
| 2004/0268262 A1 | 12/2004 | Gupta et al. |
| 2005/0002507 A1 | 1/2005 | Timmins et al. |
| 2005/0010409 A1 | 1/2005 | Hull et al. |
| 2005/0012723 A1 | 1/2005 | Pallakoff |
| 2005/0015254 A1 | 1/2005 | Beaman |
| 2005/0015751 A1 | 1/2005 | Grassens |
| 2005/0015772 A1 | 1/2005 | Saare et al. |
| 2005/0021330 A1 | 1/2005 | Mano et al. |
| 2005/0021424 A1 | 1/2005 | Lewis et al. |
| 2005/0022114 A1 | 1/2005 | Shanahan et al. |
| 2005/0024341 A1 | 2/2005 | Gillespie et al. |
| 2005/0024345 A1 | 2/2005 | Eastty et al. |
| 2005/0027385 A1 | 2/2005 | Yueh |
| 2005/0030175 A1 | 2/2005 | Wolfe |
| 2005/0031106 A1 | 2/2005 | Henderson |
| 2005/0033582 A1 | 2/2005 | Gadd et al. |
| 2005/0033771 A1 | 2/2005 | Schmitter et al. |
| 2005/0034164 A1 | 2/2005 | Sano et al. |
| 2005/0038657 A1 | 2/2005 | Roth et al. |
| 2005/0039141 A1 | 2/2005 | Burke et al. |
| 2005/0042591 A1 | 2/2005 | Bloom et al. |
| 2005/0043946 A1 | 2/2005 | Ueyama et al. |
| 2005/0043949 A1 | 2/2005 | Roth et al. |
| 2005/0043974 A1 | 2/2005 | Vassilev et al. |
| 2005/0044569 A1 | 2/2005 | Marcus |
| 2005/0045373 A1 | 3/2005 | Born |
| 2005/0049862 A1 | 3/2005 | Choi et al. |
| 2005/0049870 A1 | 3/2005 | Zhang et al. |
| 2005/0049880 A1 | 3/2005 | Roth et al. |
| 2005/0055212 A1* | 3/2005 | Nagao ................ G10L 13/00 704/270.1 |
| 2005/0055403 A1 | 3/2005 | Brittan |
| 2005/0058438 A1 | 3/2005 | Hayashi |
| 2005/0060155 A1 | 3/2005 | Chu et al. |
| 2005/0071165 A1 | 3/2005 | Hofstader et al. |
| 2005/0071332 A1 | 3/2005 | Ortega et al. |
| 2005/0071437 A1 | 3/2005 | Bear et al. |
| 2005/0074113 A1 | 4/2005 | Mathew et al. |
| 2005/0075875 A1 | 4/2005 | Shozakai et al. |
| 2005/0075881 A1 | 4/2005 | Rigazio et al. |
| 2005/0080613 A1 | 4/2005 | Colledge et al. |
| 2005/0080620 A1 | 4/2005 | Rao et al. |
| 2005/0080625 A1 | 4/2005 | Bennett et al. |
| 2005/0080632 A1 | 4/2005 | Endo et al. |
| 2005/0080780 A1 | 4/2005 | Colledge et al. |
| 2005/0086059 A1 | 4/2005 | Bennett |
| 2005/0086255 A1 | 4/2005 | Schran et al. |
| 2005/0086605 A1 | 4/2005 | Ferrer et al. |
| 2005/0091118 A1 | 4/2005 | Fano |
| 2005/0094475 A1* | 5/2005 | Naoi .................. G10L 13/00 365/232 |
| 2005/0099398 A1 | 5/2005 | Garside et al. |
| 2005/0100214 A1 | 5/2005 | Zhang et al. |
| 2005/0102144 A1 | 5/2005 | Rapoport |
| 2005/0102614 A1 | 5/2005 | Brockett et al. |
| 2005/0102625 A1 | 5/2005 | Lee et al. |
| 2005/0105712 A1 | 5/2005 | Williams et al. |
| 2005/0108001 A1 | 5/2005 | Aarskog |
| 2005/0108017 A1 | 5/2005 | Esser et al. |
| 2005/0108074 A1 | 5/2005 | Bloechl et al. |
| 2005/0108338 A1 | 5/2005 | Simske et al. |
| 2005/0108344 A1 | 5/2005 | Tafoya et al. |
| 2005/0108642 A1 | 5/2005 | Sinclair et al. |
| 2005/0114124 A1 | 5/2005 | Liu et al. |
| 2005/0114140 A1 | 5/2005 | Brackett et al. |
| 2005/0114306 A1 | 5/2005 | Shu et al. |
| 2005/0114791 A1 | 5/2005 | Bollenbacher et al. |
| 2005/0119890 A1 | 6/2005 | Hirose |
| 2005/0119897 A1 | 6/2005 | Bennett et al. |
| 2005/0125216 A1 | 6/2005 | Chitrapura et al. |
| 2005/0125226 A1 | 6/2005 | Magee |

(56) References Cited

U.S. PATENT DOCUMENTS

| | | |
|---|---|---|
| 2005/0125235 A1 | 6/2005 | Lazay et al. |
| 2005/0131951 A1 | 6/2005 | Zhang et al. |
| 2005/0132301 A1 | 6/2005 | Ikeda |
| 2005/0136949 A1 | 6/2005 | Barnes |
| 2005/0138305 A1 | 6/2005 | Zellner |
| 2005/0140504 A1 | 6/2005 | Marshall et al. |
| 2005/0143972 A1 | 6/2005 | Gopalakrishnan et al. |
| 2005/0144003 A1 | 6/2005 | Iso-Sipila |
| 2005/0144070 A1 | 6/2005 | Cheshire |
| 2005/0144568 A1 | 6/2005 | Gruen et al. |
| 2005/0148356 A1 | 7/2005 | Ferguson et al. |
| 2005/0149214 A1 | 7/2005 | Yoo et al. |
| 2005/0149326 A1 | 7/2005 | Hogengout et al. |
| 2005/0149330 A1 | 7/2005 | Katae |
| 2005/0149332 A1 | 7/2005 | Kuzunuki et al. |
| 2005/0149510 A1 | 7/2005 | Shafrir |
| 2005/0152558 A1 | 7/2005 | Van Tassel |
| 2005/0152602 A1 | 7/2005 | Chen et al. |
| 2005/0154578 A1 | 7/2005 | Tong et al. |
| 2005/0154580 A1 | 7/2005 | Horowitz et al. |
| 2005/0154591 A1 | 7/2005 | Lecoeuche |
| 2005/0159939 A1 | 7/2005 | Mohler et al. |
| 2005/0159957 A1 | 7/2005 | Roth et al. |
| 2005/0162395 A1 | 7/2005 | Unruh |
| 2005/0165015 A1 | 7/2005 | Ncube et al. |
| 2005/0165607 A1 | 7/2005 | Di Fabbrizio et al. |
| 2005/0166153 A1 | 7/2005 | Eytchison et al. |
| 2005/0171779 A1 | 8/2005 | Joublin |
| 2005/0177445 A1 | 8/2005 | Church |
| 2005/0181770 A1 | 8/2005 | Helferich |
| 2005/0182616 A1 | 8/2005 | Kotipalli |
| 2005/0182627 A1 | 8/2005 | Tanaka et al. |
| 2005/0182628 A1 | 8/2005 | Choi |
| 2005/0182629 A1 | 8/2005 | Coorman et al. |
| 2005/0182630 A1 | 8/2005 | Miro et al. |
| 2005/0182765 A1 | 8/2005 | Liddy |
| 2005/0184958 A1 | 8/2005 | Gnanamgari et al. |
| 2005/0187770 A1 | 8/2005 | Kompe et al. |
| 2005/0187773 A1 | 8/2005 | Filoche et al. |
| 2005/0190970 A1 | 9/2005 | Griffin |
| 2005/0192801 A1 | 9/2005 | Lewis et al. |
| 2005/0192807 A1 | 9/2005 | Emam et al. |
| 2005/0192812 A1 | 9/2005 | Buchholz et al. |
| 2005/0195077 A1 | 9/2005 | Mcculloch et al. |
| 2005/0195429 A1 | 9/2005 | Archbold |
| 2005/0196733 A1 | 9/2005 | Budra et al. |
| 2005/0201572 A1 | 9/2005 | Lindahl et al. |
| 2005/0202854 A1 | 9/2005 | Kortum et al. |
| 2005/0203738 A1 | 9/2005 | Hwang |
| 2005/0203747 A1 | 9/2005 | Lecoeuche |
| 2005/0203782 A1 | 9/2005 | Smith |
| 2005/0203991 A1 | 9/2005 | Kawamura et al. |
| 2005/0209848 A1 | 9/2005 | Ishii |
| 2005/0210394 A1 | 9/2005 | Crandall et al. |
| 2005/0216331 A1 | 9/2005 | Ahrens et al. |
| 2005/0222843 A1 | 10/2005 | Kahn et al. |
| 2005/0222973 A1* | 10/2005 | Kaiser ................ G06F 17/30011 |
| 2005/0228665 A1 | 10/2005 | Kobayashi et al. |
| 2005/0245243 A1 | 11/2005 | Zuniga |
| 2005/0246350 A1 | 11/2005 | Canaran |
| 2005/0246365 A1 | 11/2005 | Lowles et al. |
| 2005/0246686 A1 | 11/2005 | Seshadri et al. |
| 2005/0246726 A1 | 11/2005 | Labrou et al. |
| 2005/0251572 A1 | 11/2005 | McMahan et al. |
| 2005/0254481 A1 | 11/2005 | Vishik et al. |
| 2005/0255874 A1 | 11/2005 | Stewart-Baxter et al. |
| 2005/0261901 A1 | 11/2005 | Davis et al. |
| 2005/0262440 A1 | 11/2005 | Stanciu et al. |
| 2005/0267738 A1 | 12/2005 | Wilkinson et al. |
| 2005/0267757 A1 | 12/2005 | Iso-Sipila et al. |
| 2005/0268247 A1 | 12/2005 | Baneth |
| 2005/0271216 A1 | 12/2005 | Lashkari |
| 2005/0273332 A1 | 12/2005 | Scott et al. |
| 2005/0273337 A1 | 12/2005 | Erell et al. |
| 2005/0273626 A1 | 12/2005 | Pearson et al. |
| 2005/0278297 A1 | 12/2005 | Nelson |
| 2005/0278643 A1 | 12/2005 | Ukai et al. |
| 2005/0278647 A1 | 12/2005 | Leavitt et al. |
| 2005/0283363 A1 | 12/2005 | Weng et al. |
| 2005/0283364 A1 | 12/2005 | Longe et al. |
| 2005/0283726 A1 | 12/2005 | Lunati |
| 2005/0283729 A1 | 12/2005 | Morris et al. |
| 2005/0288934 A1 | 12/2005 | Omi |
| 2005/0288936 A1 | 12/2005 | Busayapongchai et al. |
| 2005/0289458 A1 | 12/2005 | Kylmanen |
| 2005/0289463 A1 | 12/2005 | Wu et al. |
| 2006/0001652 A1 | 1/2006 | Chiu et al. |
| 2006/0004570 A1 | 1/2006 | Ju et al. |
| 2006/0004640 A1 | 1/2006 | Swierczek |
| 2006/0004744 A1 | 1/2006 | Nevidomski et al. |
| 2006/0007174 A1 | 1/2006 | Shen |
| 2006/0009973 A1 | 1/2006 | Nguyen et al. |
| 2006/0013414 A1 | 1/2006 | Shih |
| 2006/0013446 A1 | 1/2006 | Stephens |
| 2006/0015317 A1 | 1/2006 | Nakagawa |
| 2006/0015326 A1 | 1/2006 | Mori et al. |
| 2006/0015341 A1 | 1/2006 | Baker |
| 2006/0015484 A1 | 1/2006 | Weng et al. |
| 2006/0015819 A1 | 1/2006 | Hawkins et al. |
| 2006/0018446 A1 | 1/2006 | Schmandt et al. |
| 2006/0018492 A1 | 1/2006 | Chiu et al. |
| 2006/0020890 A1 | 1/2006 | Kroll et al. |
| 2006/0025999 A1 | 2/2006 | Feng et al. |
| 2006/0026233 A1 | 2/2006 | Tenembaum et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0033724 A1 | 2/2006 | Chaudhri et al. |
| 2006/0035632 A1 | 2/2006 | Sorvari et al. |
| 2006/0036946 A1 | 2/2006 | Radtke et al. |
| 2006/0041424 A1 | 2/2006 | Todhunter et al. |
| 2006/0041431 A1 | 2/2006 | Maes |
| 2006/0041590 A1* | 2/2006 | King ................ G06F 17/30011 |
| 2006/0041926 A1 | 2/2006 | Istvan et al. |
| 2006/0047632 A1 | 3/2006 | Zhang |
| 2006/0050865 A1 | 3/2006 | Kortum et al. |
| 2006/0052141 A1 | 3/2006 | Suzuki |
| 2006/0053007 A1 | 3/2006 | Niemisto |
| 2006/0053014 A1 | 3/2006 | Yoshizawa |
| 2006/0053365 A1 | 3/2006 | Hollander et al. |
| 2006/0053379 A1 | 3/2006 | Henderson et al. |
| 2006/0053387 A1 | 3/2006 | Ording |
| 2006/0058999 A1 | 3/2006 | Barker et al. |
| 2006/0059190 A1 | 3/2006 | Fukuoka et al. |
| 2006/0059424 A1 | 3/2006 | Petri et al. |
| 2006/0059437 A1 | 3/2006 | Conklin |
| 2006/0060762 A1 | 3/2006 | Chan et al. |
| 2006/0061488 A1 | 3/2006 | Dunton |
| 2006/0064693 A1 | 3/2006 | Messer et al. |
| 2006/0067535 A1 | 3/2006 | Culbert et al. |
| 2006/0067536 A1 | 3/2006 | Culbert et al. |
| 2006/0069567 A1 | 3/2006 | Tischer et al. |
| 2006/0069664 A1 | 3/2006 | Ling et al. |
| 2006/0072248 A1 | 4/2006 | Watanabe et al. |
| 2006/0072716 A1 | 4/2006 | Pham |
| 2006/0074628 A1 | 4/2006 | Elbaz et al. |
| 2006/0074651 A1 | 4/2006 | Arun et al. |
| 2006/0074660 A1 | 4/2006 | Waters et al. |
| 2006/0074674 A1 | 4/2006 | Zhang et al. |
| 2006/0074750 A1 | 4/2006 | Clark et al. |
| 2006/0074898 A1 | 4/2006 | Gavalda et al. |
| 2006/0075429 A1 | 4/2006 | Istvan et al. |
| 2006/0077055 A1 | 4/2006 | Basir |
| 2006/0080098 A1 | 4/2006 | Campbell |
| 2006/0085187 A1 | 4/2006 | Barquilla |
| 2006/0085465 A1 | 4/2006 | Nori et al. |
| 2006/0085757 A1 | 4/2006 | Andre et al. |
| 2006/0093998 A1 | 5/2006 | Vertegaal |
| 2006/0095265 A1 | 5/2006 | Chu et al. |
| 2006/0095790 A1 | 5/2006 | Nguyen et al. |
| 2006/0095846 A1 | 5/2006 | Nurmi |
| 2006/0095848 A1* | 5/2006 | Naik .................... G06F 9/4443 715/716 |
| 2006/0097991 A1 | 5/2006 | Hotelling et al. |

(56) References Cited

U.S. PATENT DOCUMENTS

| | | |
|---|---|---|
| 2006/0100848 A1 | 5/2006 | Cozzi et al. |
| 2006/0100849 A1 | 5/2006 | Chan |
| 2006/0101354 A1 | 5/2006 | Hashimoto et al. |
| 2006/0103633 A1 | 5/2006 | Gioeli |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0111906 A1 | 5/2006 | Cross et al. |
| 2006/0111909 A1 | 5/2006 | Maes et al. |
| 2006/0116874 A1 | 6/2006 | Samuelsson et al. |
| 2006/0116877 A1 | 6/2006 | Pickering et al. |
| 2006/0117002 A1 | 6/2006 | Swen |
| 2006/0119582 A1 | 6/2006 | Ng et al. |
| 2006/0122834 A1 | 6/2006 | Bennett |
| 2006/0122836 A1 | 6/2006 | Cross et al. |
| 2006/0129379 A1 | 6/2006 | Ramsey et al. |
| 2006/0129929 A1 | 6/2006 | Weber et al. |
| 2006/0130006 A1 | 6/2006 | Chitale |
| 2006/0132812 A1 | 6/2006 | Barnes et al. |
| 2006/0135214 A1 | 6/2006 | Zhang et al. |
| 2006/0136213 A1 | 6/2006 | Hirose et al. |
| 2006/0136280 A1 | 6/2006 | Cho et al. |
| 2006/0136352 A1 | 6/2006 | Brun et al. |
| 2006/0141990 A1 | 6/2006 | Zak et al. |
| 2006/0142576 A1 | 6/2006 | Meng et al. |
| 2006/0142993 A1 | 6/2006 | Menendez-Pidal et al. |
| 2006/0143007 A1 | 6/2006 | Koh et al. |
| 2006/0143559 A1 | 6/2006 | Spielberg et al. |
| 2006/0143576 A1 | 6/2006 | Gupta et al. |
| 2006/0148520 A1 | 7/2006 | Baker et al. |
| 2006/0149557 A1 | 7/2006 | Kaneko et al. |
| 2006/0149558 A1 | 7/2006 | Kahn et al. |
| 2006/0150087 A1 | 7/2006 | Cronenberger et al. |
| 2006/0152496 A1 | 7/2006 | Knaven |
| 2006/0153040 A1 | 7/2006 | Girish et al. |
| 2006/0156252 A1 | 7/2006 | Sheshagiri et al. |
| 2006/0156307 A1 | 7/2006 | Kunjithapatham et al. |
| 2006/0161870 A1 | 7/2006 | Hotelling et al. |
| 2006/0161871 A1 | 7/2006 | Hotelling et al. |
| 2006/0161872 A1 | 7/2006 | Rytivaara et al. |
| 2006/0165105 A1 | 7/2006 | Shenfield et al. |
| 2006/0167676 A1 | 7/2006 | Plumb |
| 2006/0168150 A1 | 7/2006 | Naik et al. |
| 2006/0168507 A1 | 7/2006 | Hansen |
| 2006/0168539 A1 | 7/2006 | Hawkins et al. |
| 2006/0172720 A1 | 8/2006 | Islam et al. |
| 2006/0173683 A1 | 8/2006 | Roth et al. |
| 2006/0173684 A1 | 8/2006 | Fischer et al. |
| 2006/0174207 A1 | 8/2006 | Deshpande |
| 2006/0178868 A1 | 8/2006 | Billerey-Mosier |
| 2006/0181519 A1 | 8/2006 | Vernier et al. |
| 2006/0183466 A1 | 8/2006 | Lee et al. |
| 2006/0184886 A1 | 8/2006 | Chung et al. |
| 2006/0187073 A1 | 8/2006 | Lin et al. |
| 2006/0190169 A1 | 8/2006 | Kawai |
| 2006/0190269 A1 | 8/2006 | Tessel et al. |
| 2006/0190436 A1 | 8/2006 | Richardson et al. |
| 2006/0190577 A1 | 8/2006 | Yamada |
| 2006/0193518 A1 | 8/2006 | Dong |
| 2006/0194181 A1 | 8/2006 | Rosenberg |
| 2006/0195206 A1 | 8/2006 | Moon et al. |
| 2006/0195323 A1 | 8/2006 | Monne et al. |
| 2006/0195516 A1 | 8/2006 | Beaupre |
| 2006/0197753 A1 | 9/2006 | Hotelling |
| 2006/0197755 A1 | 9/2006 | Bawany |
| 2006/0200253 A1 | 9/2006 | Hoffberg et al. |
| 2006/0200342 A1 | 9/2006 | Corston-Oliver et al. |
| 2006/0200347 A1 | 9/2006 | Kim et al. |
| 2006/0205432 A1 | 9/2006 | Hawkins et al. |
| 2006/0206313 A1 | 9/2006 | Xu et al. |
| 2006/0206454 A1 | 9/2006 | Forstall et al. |
| 2006/0206724 A1 | 9/2006 | Schaufele et al. |
| 2006/0212415 A1 | 9/2006 | Backer et al. |
| 2006/0217967 A1 | 9/2006 | Goertzen et al. |
| 2006/0218244 A1 | 9/2006 | Rasmussen et al. |
| 2006/0221738 A1 | 10/2006 | Park et al. |
| 2006/0221788 A1 | 10/2006 | Lindahl et al. |
| 2006/0224570 A1 | 10/2006 | Quiroga et al. |
| 2006/0229802 A1 | 10/2006 | Vertelney et al. |
| 2006/0229870 A1 | 10/2006 | Kobal |
| 2006/0229876 A1 | 10/2006 | Aaron et al. |
| 2006/0230350 A1 | 10/2006 | Baluja |
| 2006/0230410 A1 | 10/2006 | Kurganov et al. |
| 2006/0234680 A1 | 10/2006 | Doulton |
| 2006/0235550 A1 | 10/2006 | Csicsatka et al. |
| 2006/0235690 A1 | 10/2006 | Tomasic et al. |
| 2006/0235700 A1 | 10/2006 | Wong et al. |
| 2006/0235841 A1 | 10/2006 | Betz et al. |
| 2006/0236262 A1 | 10/2006 | Bathiche et al. |
| 2006/0239419 A1 | 10/2006 | Joseph et al. |
| 2006/0239471 A1 | 10/2006 | Mao et al. |
| 2006/0240866 A1 | 10/2006 | Eilts et al. |
| 2006/0241948 A1 | 10/2006 | Abrash et al. |
| 2006/0242190 A1 | 10/2006 | Wnek |
| 2006/0246955 A1 | 11/2006 | Nirhamo et al. |
| 2006/0247931 A1 | 11/2006 | Caskey et al. |
| 2006/0252457 A1 | 11/2006 | Schrager |
| 2006/0253210 A1 | 11/2006 | Rosenberg |
| 2006/0253787 A1 | 11/2006 | Fogg |
| 2006/0256934 A1 | 11/2006 | Mazor |
| 2006/0258376 A1 | 11/2006 | Ewell et al. |
| 2006/0262876 A1 | 11/2006 | LaDue |
| 2006/0265208 A1 | 11/2006 | Assadollahi |
| 2006/0265503 A1 | 11/2006 | Jones et al. |
| 2006/0265648 A1 | 11/2006 | Rainisto et al. |
| 2006/0271627 A1 | 11/2006 | Szczepanek |
| 2006/0274051 A1 | 12/2006 | Longe et al. |
| 2006/0274905 A1 | 12/2006 | Lindahl et al. |
| 2006/0277031 A1 | 12/2006 | Ramsey et al. |
| 2006/0277058 A1 | 12/2006 | J''maev et al. |
| 2006/0282264 A1 | 12/2006 | Denny et al. |
| 2006/0282415 A1 | 12/2006 | Shibata et al. |
| 2006/0282455 A1 | 12/2006 | Lee et al. |
| 2006/0286527 A1 | 12/2006 | Morel |
| 2006/0287864 A1 | 12/2006 | Pusa et al. |
| 2006/0288024 A1 | 12/2006 | Braica |
| 2006/0291666 A1 | 12/2006 | Ball et al. |
| 2006/0293876 A1 | 12/2006 | Kamatani et al. |
| 2006/0293880 A1 | 12/2006 | Elshishiny et al. |
| 2006/0293886 A1 | 12/2006 | Odell et al. |
| 2006/0293889 A1 | 12/2006 | Kiss et al. |
| 2007/0003026 A1 | 1/2007 | Hodge et al. |
| 2007/0004451 A1 | 1/2007 | C. Anderson |
| 2007/0005849 A1 | 1/2007 | Oliver |
| 2007/0006098 A1 | 1/2007 | Krumm et al. |
| 2007/0011154 A1 | 1/2007 | Musgrove et al. |
| 2007/0014280 A1 | 1/2007 | Cormier et al. |
| 2007/0016563 A1 | 1/2007 | Omoigui |
| 2007/0016865 A1 | 1/2007 | Johnson et al. |
| 2007/0021956 A1 | 1/2007 | Qu et al. |
| 2007/0022380 A1 | 1/2007 | Swartz et al. |
| 2007/0025704 A1 | 2/2007 | Tsukazaki et al. |
| 2007/0026852 A1 | 2/2007 | Logan et al. |
| 2007/0027732 A1 | 2/2007 | Hudgens |
| 2007/0028009 A1 | 2/2007 | Robbin et al. |
| 2007/0030824 A1 | 2/2007 | Ribaudo et al. |
| 2007/0032247 A1 | 2/2007 | Shaffer et al. |
| 2007/0033003 A1 | 2/2007 | Morris |
| 2007/0033005 A1 | 2/2007 | Cristo et al. |
| 2007/0033026 A1 | 2/2007 | Bartosik et al. |
| 2007/0033054 A1 | 2/2007 | Snitkovskiy et al. |
| 2007/0036117 A1 | 2/2007 | Taube et al. |
| 2007/0036286 A1 | 2/2007 | Champlin et al. |
| 2007/0036294 A1 | 2/2007 | Chaudhuri et al. |
| 2007/0038436 A1 | 2/2007 | Cristoe et al. |
| 2007/0038609 A1 | 2/2007 | Wu |
| 2007/0040813 A1 | 2/2007 | Kushler et al. |
| 2007/0041361 A1 | 2/2007 | Iso-Sipila |
| 2007/0042812 A1 | 2/2007 | Basir |
| 2007/0043568 A1 | 2/2007 | Dhanakshirur et al. |
| 2007/0043574 A1 | 2/2007 | Coffman et al. |
| 2007/0043687 A1 | 2/2007 | Bodart et al. |
| 2007/0043820 A1 | 2/2007 | George et al. |
| 2007/0044038 A1 | 2/2007 | Horentrup et al. |

(56) References Cited

U.S. PATENT DOCUMENTS

| | | |
|---|---|---|
| 2007/0046641 A1 | 3/2007 | Lim |
| 2007/0047719 A1 | 3/2007 | Dhawan et al. |
| 2007/0050184 A1 | 3/2007 | Drucker et al. |
| 2007/0050191 A1 | 3/2007 | Weider et al. |
| 2007/0050393 A1 | 3/2007 | Vogel et al. |
| 2007/0050712 A1 | 3/2007 | Hull et al. |
| 2007/0052586 A1 | 3/2007 | Horstemeyer |
| 2007/0055493 A1 | 3/2007 | Lee |
| 2007/0055508 A1 | 3/2007 | Zhao et al. |
| 2007/0055514 A1 | 3/2007 | Beattie et al. |
| 2007/0055525 A1 | 3/2007 | Kennewick et al. |
| 2007/0055529 A1 | 3/2007 | Kanevsky et al. |
| 2007/0058832 A1 | 3/2007 | Hug et al. |
| 2007/0060107 A1 | 3/2007 | Day |
| 2007/0060118 A1 | 3/2007 | Guyette |
| 2007/0061152 A1 | 3/2007 | Doi |
| 2007/0061487 A1 | 3/2007 | Moore et al. |
| 2007/0061712 A1 | 3/2007 | Bodin et al. |
| 2007/0061754 A1 | 3/2007 | Ardhanari et al. |
| 2007/0067173 A1 | 3/2007 | Bellegarda |
| 2007/0067272 A1 | 3/2007 | Flynt et al. |
| 2007/0072553 A1 | 3/2007 | Barbera |
| 2007/0073540 A1 | 3/2007 | Hirakawa et al. |
| 2007/0073541 A1 | 3/2007 | Tian |
| 2007/0073745 A1 | 3/2007 | Scott et al. |
| 2007/0074131 A1 | 3/2007 | Assadollahi et al. |
| 2007/0075965 A1 | 4/2007 | Huppi et al. |
| 2007/0079027 A1 | 4/2007 | Marriott et al. |
| 2007/0080936 A1 | 4/2007 | Tsuk et al. |
| 2007/0083366 A1 | 4/2007 | Peters |
| 2007/0083467 A1 | 4/2007 | Lindahl et al. |
| 2007/0083623 A1 | 4/2007 | Nishimura et al. |
| 2007/0088556 A1 | 4/2007 | Andrew |
| 2007/0089132 A1 | 4/2007 | Qureshey et al. |
| 2007/0089135 A1 | 4/2007 | Qureshey et al. |
| 2007/0093277 A1 | 4/2007 | Cavacuiti et al. |
| 2007/0094026 A1 | 4/2007 | Ativanichayaphong et al. |
| 2007/0098195 A1 | 5/2007 | Holmes |
| 2007/0100206 A1 | 5/2007 | Lin et al. |
| 2007/0100602 A1 | 5/2007 | Kim |
| 2007/0100619 A1 | 5/2007 | Purho |
| 2007/0100624 A1 | 5/2007 | Weng et al. |
| 2007/0100635 A1 | 5/2007 | Mahajan et al. |
| 2007/0100709 A1 | 5/2007 | Lee et al. |
| 2007/0100790 A1 | 5/2007 | Cheyer et al. |
| 2007/0100814 A1 | 5/2007 | Lee et al. |
| 2007/0100883 A1 | 5/2007 | Rose et al. |
| 2007/0106491 A1 | 5/2007 | Carter et al. |
| 2007/0106497 A1 | 5/2007 | Ramsey et al. |
| 2007/0106512 A1 | 5/2007 | Acero et al. |
| 2007/0106513 A1 | 5/2007 | Boillot et al. |
| 2007/0106657 A1 | 5/2007 | Brzeski et al. |
| 2007/0106674 A1 | 5/2007 | Agrawal et al. |
| 2007/0106685 A1 | 5/2007 | Houh et al. |
| 2007/0112562 A1* | 5/2007 | Vainio ............... G11B 27/105 704/208 |
| 2007/0116195 A1 | 5/2007 | Thompson et al. |
| 2007/0118351 A1 | 5/2007 | Sumita |
| 2007/0118377 A1 | 5/2007 | Badino et al. |
| 2007/0118378 A1* | 5/2007 | Skuratovsky ......... G10L 13/033 704/260 |
| 2007/0121846 A1 | 5/2007 | Altberg et al. |
| 2007/0124131 A1 | 5/2007 | Chino et al. |
| 2007/0124132 A1 | 5/2007 | Takeuchi |
| 2007/0124149 A1 | 5/2007 | Shen et al. |
| 2007/0124289 A1 | 5/2007 | Imielinski |
| 2007/0124291 A1 | 5/2007 | Hassan et al. |
| 2007/0124676 A1 | 5/2007 | Amundsen et al. |
| 2007/0127888 A1 | 6/2007 | Hayashi et al. |
| 2007/0128777 A1 | 6/2007 | Yin et al. |
| 2007/0129059 A1 | 6/2007 | Nadarajah et al. |
| 2007/0130014 A1 | 6/2007 | Altberg et al. |
| 2007/0130128 A1 | 6/2007 | Garg et al. |
| 2007/0132738 A1 | 6/2007 | Lowles et al. |
| 2007/0133771 A1 | 6/2007 | Stifelman et al. |
| 2007/0135187 A1 | 6/2007 | Kreiner et al. |
| 2007/0135949 A1 | 6/2007 | Snover et al. |
| 2007/0136064 A1 | 6/2007 | Carroll |
| 2007/0136778 A1 | 6/2007 | Birger et al. |
| 2007/0143163 A1 | 6/2007 | Weiss et al. |
| 2007/0143376 A1 | 6/2007 | McIntosh |
| 2007/0149252 A1 | 6/2007 | Jobs et al. |
| 2007/0150403 A1 | 6/2007 | Mock et al. |
| 2007/0150444 A1 | 6/2007 | Chesnais et al. |
| 2007/0150842 A1 | 6/2007 | Chaudhri et al. |
| 2007/0152978 A1 | 7/2007 | Kocienda et al. |
| 2007/0152980 A1 | 7/2007 | Kocienda et al. |
| 2007/0155346 A1 | 7/2007 | Mijatovic et al. |
| 2007/0156410 A1 | 7/2007 | Stohr et al. |
| 2007/0156627 A1 | 7/2007 | D'Alicandro |
| 2007/0157089 A1 | 7/2007 | Van Os et al. |
| 2007/0157268 A1 | 7/2007 | Girish et al. |
| 2007/0162274 A1 | 7/2007 | Ruiz et al. |
| 2007/0162296 A1 | 7/2007 | Altberg et al. |
| 2007/0162414 A1 | 7/2007 | Horowitz et al. |
| 2007/0165003 A1 | 7/2007 | Fux et al. |
| 2007/0167136 A1 | 7/2007 | Groth |
| 2007/0168922 A1 | 7/2007 | Kaiser |
| 2007/0173233 A1 | 7/2007 | Vander Veen et al. |
| 2007/0173267 A1 | 7/2007 | Klassen et al. |
| 2007/0174057 A1 | 7/2007 | Genly |
| 2007/0174188 A1 | 7/2007 | Fish |
| 2007/0174350 A1 | 7/2007 | Pell et al. |
| 2007/0174396 A1 | 7/2007 | Kumar et al. |
| 2007/0179776 A1 | 8/2007 | Segond et al. |
| 2007/0179778 A1 | 8/2007 | Gong et al. |
| 2007/0180383 A1 | 8/2007 | Naik |
| 2007/0182595 A1 | 8/2007 | Ghasabian |
| 2007/0185551 A1 | 8/2007 | Meadows et al. |
| 2007/0185754 A1 | 8/2007 | Schmidt |
| 2007/0185831 A1 | 8/2007 | Churcher |
| 2007/0185917 A1 | 8/2007 | Prahlad et al. |
| 2007/0188901 A1 | 8/2007 | Heckerman et al. |
| 2007/0192026 A1 | 8/2007 | Lee et al. |
| 2007/0192027 A1 | 8/2007 | Lee et al. |
| 2007/0192105 A1 | 8/2007 | Neeracher et al. |
| 2007/0192179 A1 | 8/2007 | Van et al. |
| 2007/0192293 A1 | 8/2007 | Swen |
| 2007/0192403 A1 | 8/2007 | Heine et al. |
| 2007/0192744 A1 | 8/2007 | Reponen |
| 2007/0198267 A1 | 8/2007 | Jones et al. |
| 2007/0198269 A1 | 8/2007 | Braho et al. |
| 2007/0198273 A1 | 8/2007 | Hennecke |
| 2007/0198566 A1 | 8/2007 | Sustik |
| 2007/0203955 A1 | 8/2007 | Pomerantz |
| 2007/0207785 A1 | 9/2007 | Chatterjee et al. |
| 2007/0208555 A1 | 9/2007 | Blass et al. |
| 2007/0208569 A1 | 9/2007 | Subramanian et al. |
| 2007/0208579 A1 | 9/2007 | Peterson |
| 2007/0208726 A1 | 9/2007 | Krishnaprasad et al. |
| 2007/0211071 A1 | 9/2007 | Slotznick et al. |
| 2007/0213099 A1 | 9/2007 | Bast |
| 2007/0213857 A1 | 9/2007 | Bodin et al. |
| 2007/0213984 A1 | 9/2007 | Ativanichayaphong et al. |
| 2007/0213986 A1 | 9/2007 | Bodin et al. |
| 2007/0217693 A1 | 9/2007 | Kretzschmar, Jr |
| 2007/0219645 A1 | 9/2007 | Thomas et al. |
| 2007/0219777 A1 | 9/2007 | Chu et al. |
| 2007/0219801 A1 | 9/2007 | Sundaram et al. |
| 2007/0219803 A1 | 9/2007 | Chiu et al. |
| 2007/0219983 A1 | 9/2007 | Fish |
| 2007/0225980 A1 | 9/2007 | Sumita |
| 2007/0225984 A1 | 9/2007 | Milstein et al. |
| 2007/0226652 A1 | 9/2007 | Kikuchi et al. |
| 2007/0229323 A1 | 10/2007 | Plachta et al. |
| 2007/0230729 A1* | 10/2007 | Naylor ................. H04R 25/407 381/320 |
| 2007/0233484 A1 | 10/2007 | Coelho et al. |
| 2007/0233487 A1 | 10/2007 | Cohen et al. |
| 2007/0233490 A1 | 10/2007 | Yao |
| 2007/0233497 A1 | 10/2007 | Paek et al. |
| 2007/0233692 A1 | 10/2007 | Lisa et al. |
| 2007/0233725 A1 | 10/2007 | Michmerhuizen et al. |
| 2007/0238488 A1 | 10/2007 | Scott |

(56) References Cited

U.S. PATENT DOCUMENTS

| | | |
|---|---|---|
| 2007/0238489 A1 | 10/2007 | Scott |
| 2007/0238520 A1 | 10/2007 | Kacmarcik |
| 2007/0239429 A1 | 10/2007 | Johnson et al. |
| 2007/0239453 A1 | 10/2007 | Paek et al. |
| 2007/0240043 A1 | 10/2007 | Fux et al. |
| 2007/0240044 A1 | 10/2007 | Fux et al. |
| 2007/0240045 A1 | 10/2007 | Fux et al. |
| 2007/0241885 A1 | 10/2007 | Clipsham et al. |
| 2007/0244702 A1* | 10/2007 | Kahn ............... G10L 15/22 704/260 |
| 2007/0244976 A1 | 10/2007 | Carroll et al. |
| 2007/0247441 A1 | 10/2007 | Kim et al. |
| 2007/0255435 A1 | 11/2007 | Cohen et al. |
| 2007/0255979 A1 | 11/2007 | Deily et al. |
| 2007/0257890 A1 | 11/2007 | Hotelling et al. |
| 2007/0258642 A1 | 11/2007 | Thota |
| 2007/0260460 A1 | 11/2007 | Hyatt |
| 2007/0260595 A1 | 11/2007 | Beatty et al. |
| 2007/0260822 A1 | 11/2007 | Adams |
| 2007/0261080 A1 | 11/2007 | Saetti |
| 2007/0265831 A1 | 11/2007 | Dinur et al. |
| 2007/0265850 A1 | 11/2007 | Kennewick et al. |
| 2007/0271104 A1 | 11/2007 | McKay |
| 2007/0271510 A1 | 11/2007 | Grigoriu et al. |
| 2007/0274468 A1 | 11/2007 | Cai |
| 2007/0276651 A1 | 11/2007 | Bliss et al. |
| 2007/0276714 A1 | 11/2007 | Beringer |
| 2007/0276810 A1 | 11/2007 | Rosen |
| 2007/0277088 A1 | 11/2007 | Bodin et al. |
| 2007/0281603 A1 | 12/2007 | Nath et al. |
| 2007/0282595 A1 | 12/2007 | Tunning et al. |
| 2007/0285958 A1 | 12/2007 | Platchta et al. |
| 2007/0286363 A1 | 12/2007 | Burg et al. |
| 2007/0286399 A1 | 12/2007 | Ramamoorthy et al. |
| 2007/0288238 A1 | 12/2007 | Hetherington et al. |
| 2007/0288241 A1 | 12/2007 | Cross et al. |
| 2007/0288449 A1 | 12/2007 | Datta et al. |
| 2007/0291108 A1 | 12/2007 | Huber et al. |
| 2007/0294077 A1 | 12/2007 | Narayanan et al. |
| 2007/0294083 A1 | 12/2007 | Bellegarda et al. |
| 2007/0294199 A1 | 12/2007 | Nelken et al. |
| 2007/0294263 A1 | 12/2007 | Punj et al. |
| 2007/0299664 A1 | 12/2007 | Peters et al. |
| 2007/0299831 A1 | 12/2007 | Williams et al. |
| 2007/0300140 A1 | 12/2007 | Makela et al. |
| 2007/0300185 A1 | 12/2007 | Macbeth et al. |
| 2008/0001785 A1 | 1/2008 | Elizarov et al. |
| 2008/0010355 A1 | 1/2008 | Vieri et al. |
| 2008/0010605 A1 | 1/2008 | Frank et al. |
| 2008/0012950 A1 | 1/2008 | Lee et al. |
| 2008/0013751 A1 | 1/2008 | Hiselius |
| 2008/0015863 A1 | 1/2008 | Agapi et al. |
| 2008/0015864 A1 | 1/2008 | Ross et al. |
| 2008/0016575 A1 | 1/2008 | Vincent et al. |
| 2008/0021708 A1 | 1/2008 | Bennett et al. |
| 2008/0021886 A1 | 1/2008 | Wang-Aryattanwanich et al. |
| 2008/0022208 A1 | 1/2008 | Morse |
| 2008/0027726 A1 | 1/2008 | Hansen et al. |
| 2008/0031475 A1 | 2/2008 | Goldstein |
| 2008/0033719 A1 | 2/2008 | Hall et al. |
| 2008/0034032 A1 | 2/2008 | Healey et al. |
| 2008/0034044 A1 | 2/2008 | Bhakta et al. |
| 2008/0036743 A1 | 2/2008 | Westerman et al. |
| 2008/0040339 A1 | 2/2008 | Zhou et al. |
| 2008/0042970 A1 | 2/2008 | Liang et al. |
| 2008/0043936 A1 | 2/2008 | Liebermann |
| 2008/0043943 A1 | 2/2008 | Sipher et al. |
| 2008/0046239 A1 | 2/2008 | Boo |
| 2008/0046250 A1 | 2/2008 | Agapi et al. |
| 2008/0046422 A1 | 2/2008 | Lee et al. |
| 2008/0046820 A1 | 2/2008 | Lee et al. |
| 2008/0046948 A1 | 2/2008 | Verosub |
| 2008/0048908 A1 | 2/2008 | Sato |
| 2008/0050027 A1 | 2/2008 | Bashyam et al. |
| 2008/0052063 A1 | 2/2008 | Bennett et al. |
| 2008/0052073 A1 | 2/2008 | Goto et al. |
| 2008/0052077 A1 | 2/2008 | Bennett et al. |
| 2008/0052080 A1 | 2/2008 | Narayanan et al. |
| 2008/0052262 A1 | 2/2008 | Kosinov et al. |
| 2008/0055194 A1 | 3/2008 | Baudino et al. |
| 2008/0056459 A1 | 3/2008 | Vallier et al. |
| 2008/0056579 A1 | 3/2008 | Guha |
| 2008/0057922 A1 | 3/2008 | Kokes et al. |
| 2008/0059200 A1 | 3/2008 | Puli |
| 2008/0059876 A1 | 3/2008 | Hantler et al. |
| 2008/0062141 A1 | 3/2008 | Chandhri |
| 2008/0065382 A1 | 3/2008 | Gerl et al. |
| 2008/0065387 A1 | 3/2008 | Cross et al. |
| 2008/0071529 A1 | 3/2008 | Silverman et al. |
| 2008/0071544 A1 | 3/2008 | Beaufays et al. |
| 2008/0071742 A1 | 3/2008 | Yang et al. |
| 2008/0072143 A1 | 3/2008 | Assadollahi |
| 2008/0075296 A1 | 3/2008 | Lindahl et al. |
| 2008/0076972 A1 | 3/2008 | Dorogusker et al. |
| 2008/0077310 A1 | 3/2008 | Murlidar et al. |
| 2008/0077384 A1 | 3/2008 | Agapi et al. |
| 2008/0077386 A1 | 3/2008 | Gao et al. |
| 2008/0077391 A1 | 3/2008 | Chino et al. |
| 2008/0077393 A1 | 3/2008 | Gao et al. |
| 2008/0077406 A1 | 3/2008 | Ganong, III |
| 2008/0077859 A1 | 3/2008 | Schabes et al. |
| 2008/0079566 A1 | 4/2008 | Singh et al. |
| 2008/0080411 A1 | 4/2008 | Cole |
| 2008/0082332 A1 | 4/2008 | Mallett et al. |
| 2008/0082338 A1 | 4/2008 | O''Neil et al. |
| 2008/0082390 A1 | 4/2008 | Hawkins et al. |
| 2008/0082576 A1 | 4/2008 | Bodin et al. |
| 2008/0082651 A1 | 4/2008 | Singh et al. |
| 2008/0084974 A1 | 4/2008 | Dhanakshirur |
| 2008/0085689 A1 | 4/2008 | Zellner |
| 2008/0091406 A1 | 4/2008 | Baldwin et al. |
| 2008/0091426 A1 | 4/2008 | Rempel et al. |
| 2008/0091428 A1 | 4/2008 | Bellegarda |
| 2008/0091443 A1 | 4/2008 | Strope et al. |
| 2008/0096531 A1 | 4/2008 | Mcquaide et al. |
| 2008/0096533 A1 | 4/2008 | Manfredi et al. |
| 2008/0096726 A1 | 4/2008 | Riley et al. |
| 2008/0097937 A1 | 4/2008 | Hadjarian |
| 2008/0098302 A1 | 4/2008 | Roose |
| 2008/0098480 A1 | 4/2008 | Henry et al. |
| 2008/0100579 A1 | 5/2008 | Robinson et al. |
| 2008/0101584 A1 | 5/2008 | Gray et al. |
| 2008/0103774 A1 | 5/2008 | White |
| 2008/0109222 A1 | 5/2008 | Liu |
| 2008/0109402 A1 | 5/2008 | Wang et al. |
| 2008/0114480 A1 | 5/2008 | Harb |
| 2008/0114598 A1 | 5/2008 | Prieto et al. |
| 2008/0114604 A1 | 5/2008 | Wei et al. |
| 2008/0114841 A1 | 5/2008 | Lambert |
| 2008/0115084 A1 | 5/2008 | Scott et al. |
| 2008/0118143 A1 | 5/2008 | Gordon et al. |
| 2008/0119953 A1* | 5/2008 | Reed ............... G06F 17/30017 700/94 |
| 2008/0120102 A1 | 5/2008 | Rao |
| 2008/0120112 A1 | 5/2008 | Jordan et al. |
| 2008/0120196 A1* | 5/2008 | Reed ............... G06F 17/30017 705/17 |
| 2008/0120311 A1* | 5/2008 | Reed ............... G06F 17/30017 |
| 2008/0120312 A1* | 5/2008 | Reed ............... G06F 17/30017 |
| 2008/0120330 A1* | 5/2008 | Reed ............... G06F 17/30017 |
| 2008/0120342 A1* | 5/2008 | Reed ............... G06F 17/30017 |
| 2008/0122796 A1 | 5/2008 | Jobs et al. |
| 2008/0124695 A1* | 5/2008 | Myers ............... G09B 5/062 434/317 |
| 2008/0126075 A1 | 5/2008 | Thorn et al. |
| 2008/0126077 A1 | 5/2008 | Thorn |
| 2008/0126091 A1 | 5/2008 | Clark et al. |
| 2008/0126093 A1 | 5/2008 | Sivadas |
| 2008/0126100 A1 | 5/2008 | Grost et al. |
| 2008/0126491 A1 | 5/2008 | Portele et al. |
| 2008/0129520 A1 | 6/2008 | Lee |
| 2008/0130867 A1 | 6/2008 | Bowen |
| 2008/0131006 A1 | 6/2008 | Oliver |
| 2008/0132221 A1 | 6/2008 | Willey et al. |

(56) References Cited

U.S. PATENT DOCUMENTS

| | | |
|---|---|---|
| 2008/0132295 A1 | 6/2008 | Horowitz |
| 2008/0133215 A1 | 6/2008 | Sarukkai |
| 2008/0133228 A1 | 6/2008 | Rao |
| 2008/0133230 A1 | 6/2008 | Herforth et al. |
| 2008/0133241 A1 | 6/2008 | Baker et al. |
| 2008/0133956 A1 | 6/2008 | Fadell |
| 2008/0140413 A1 | 6/2008 | Millman et al. |
| 2008/0140416 A1 | 6/2008 | Shostak |
| 2008/0140652 A1 | 6/2008 | Millman et al. |
| 2008/0140657 A1 | 6/2008 | Azvine et al. |
| 2008/0140702 A1* | 6/2008 | Reed ................ G06F 17/30017 |
| 2008/0141125 A1 | 6/2008 | Ghassabian et al. |
| 2008/0141180 A1* | 6/2008 | Reed ................ G06F 17/30017 715/854 |
| 2008/0141182 A1 | 6/2008 | Barsness et al. |
| 2008/0146245 A1 | 6/2008 | Appaji |
| 2008/0146290 A1 | 6/2008 | Sreeram et al. |
| 2008/0147408 A1 | 6/2008 | Da Palma et al. |
| 2008/0147411 A1 | 6/2008 | Dames et al. |
| 2008/0147874 A1 | 6/2008 | Yoneda et al. |
| 2008/0150900 A1 | 6/2008 | Han |
| 2008/0154577 A1 | 6/2008 | Kim et al. |
| 2008/0154600 A1 | 6/2008 | Tian et al. |
| 2008/0154612 A1 | 6/2008 | Evermann et al. |
| 2008/0154828 A1 | 6/2008 | Antebi et al. |
| 2008/0157867 A1 | 7/2008 | Krah |
| 2008/0161113 A1 | 7/2008 | Hansen et al. |
| 2008/0162120 A1 | 7/2008 | Mactavish et al. |
| 2008/0162471 A1 | 7/2008 | Bernard |
| 2008/0163119 A1 | 7/2008 | Kim et al. |
| 2008/0163131 A1 | 7/2008 | Hirai et al. |
| 2008/0165144 A1 | 7/2008 | Forstall et al. |
| 2008/0165980 A1 | 7/2008 | Pavlovic et al. |
| 2008/0165994 A1 | 7/2008 | Caren et al. |
| 2008/0167013 A1 | 7/2008 | Novick et al. |
| 2008/0167858 A1 | 7/2008 | Christie et al. |
| 2008/0167876 A1 | 7/2008 | Bakis et al. |
| 2008/0168052 A1 | 7/2008 | Ott et al. |
| 2008/0168366 A1 | 7/2008 | Kocienda et al. |
| 2008/0183473 A1 | 7/2008 | Nagano et al. |
| 2008/0186960 A1 | 8/2008 | Kocheisen et al. |
| 2008/0189099 A1 | 8/2008 | Friedman et al. |
| 2008/0189106 A1 | 8/2008 | Low et al. |
| 2008/0189110 A1 | 8/2008 | Freeman et al. |
| 2008/0189114 A1 | 8/2008 | Fail et al. |
| 2008/0189606 A1 | 8/2008 | Rybak |
| 2008/0195312 A1 | 8/2008 | Aaron et al. |
| 2008/0195388 A1 | 8/2008 | Bower et al. |
| 2008/0195391 A1 | 8/2008 | Marple et al. |
| 2008/0195601 A1 | 8/2008 | Ntoulas et al. |
| 2008/0195630 A1 | 8/2008 | Exartier et al. |
| 2008/0195940 A1 | 8/2008 | Gail et al. |
| 2008/0200142 A1 | 8/2008 | Abdel-Kader et al. |
| 2008/0201306 A1 | 8/2008 | Cooper et al. |
| 2008/0201375 A1 | 8/2008 | Khedouri et al. |
| 2008/0201434 A1 | 8/2008 | Holmes et al. |
| 2008/0204379 A1 | 8/2008 | Perez-Noguera |
| 2008/0207176 A1 | 8/2008 | Brackbill et al. |
| 2008/0208585 A1 | 8/2008 | Ativanichayaphong et al. |
| 2008/0208587 A1 | 8/2008 | Ben-David et al. |
| 2008/0208864 A1 | 8/2008 | Cucerzan et al. |
| 2008/0212796 A1 | 9/2008 | Denda |
| 2008/0219641 A1 | 9/2008 | Sandrew et al. |
| 2008/0221866 A1 | 9/2008 | Katragadda et al. |
| 2008/0221879 A1 | 9/2008 | Cerra et al. |
| 2008/0221880 A1 | 9/2008 | Cerra et al. |
| 2008/0221887 A1 | 9/2008 | Rose et al. |
| 2008/0221889 A1 | 9/2008 | Cerra et al. |
| 2008/0221903 A1 | 9/2008 | Kanevsky et al. |
| 2008/0222118 A1 | 9/2008 | Scian et al. |
| 2008/0226130 A1 | 9/2008 | Kansal et al. |
| 2008/0228463 A1 | 9/2008 | Mori et al. |
| 2008/0228485 A1 | 9/2008 | Owen |
| 2008/0228490 A1 | 9/2008 | Fischer et al. |
| 2008/0228495 A1 | 9/2008 | Cross et al. |
| 2008/0228496 A1 | 9/2008 | Yu et al. |
| 2008/0228928 A1 | 9/2008 | Donelli et al. |
| 2008/0229185 A1 | 9/2008 | Lynch |
| 2008/0229218 A1 | 9/2008 | Maeng |
| 2008/0235017 A1 | 9/2008 | Satomura |
| 2008/0235024 A1 | 9/2008 | Goldberg et al. |
| 2008/0235027 A1 | 9/2008 | Cross |
| 2008/0240569 A1 | 10/2008 | Tonouchi |
| 2008/0242280 A1 | 10/2008 | Shapiro et al. |
| 2008/0242322 A1 | 10/2008 | Scott et al. |
| 2008/0243834 A1 | 10/2008 | Rieman et al. |
| 2008/0244390 A1 | 10/2008 | Fux et al. |
| 2008/0244446 A1 | 10/2008 | Lefevre et al. |
| 2008/0247519 A1 | 10/2008 | Abella et al. |
| 2008/0247529 A1 | 10/2008 | Barton et al. |
| 2008/0248797 A1 | 10/2008 | Freeman et al. |
| 2008/0249770 A1 | 10/2008 | Kim et al. |
| 2008/0249778 A1 | 10/2008 | Barton et al. |
| 2008/0253577 A1 | 10/2008 | Eppolito |
| 2008/0254425 A1 | 10/2008 | Cohen et al. |
| 2008/0255837 A1 | 10/2008 | Kahn et al. |
| 2008/0255842 A1 | 10/2008 | Simhi et al. |
| 2008/0255845 A1 | 10/2008 | Bennett |
| 2008/0256613 A1 | 10/2008 | Grover |
| 2008/0259022 A1 | 10/2008 | Mansfield et al. |
| 2008/0262828 A1 | 10/2008 | Och et al. |
| 2008/0262838 A1 | 10/2008 | Nurminen et al. |
| 2008/0262846 A1 | 10/2008 | Burns et al. |
| 2008/0263139 A1 | 10/2008 | Martin |
| 2008/0267416 A1 | 10/2008 | Goldstein et al. |
| 2008/0270118 A1 | 10/2008 | Kuo et al. |
| 2008/0270138 A1 | 10/2008 | Knight et al. |
| 2008/0270139 A1 | 10/2008 | Shi et al. |
| 2008/0270140 A1 | 10/2008 | Hertz et al. |
| 2008/0270151 A1 | 10/2008 | Mahoney et al. |
| 2008/0273672 A1 | 11/2008 | Didcock et al. |
| 2008/0277473 A1 | 11/2008 | Kotlarsky et al. |
| 2008/0281510 A1 | 11/2008 | Shahine |
| 2008/0281582 A1 | 11/2008 | Hsu et al. |
| 2008/0288259 A1 | 11/2008 | Chambers et al. |
| 2008/0288460 A1 | 11/2008 | Poniatowski et al. |
| 2008/0292112 A1 | 11/2008 | Valenzuela et al. |
| 2008/0294418 A1 | 11/2008 | Cleary et al. |
| 2008/0294517 A1 | 11/2008 | Hill |
| 2008/0294651 A1 | 11/2008 | Masuyama et al. |
| 2008/0294981 A1 | 11/2008 | Balzano et al. |
| 2008/0298563 A1 | 12/2008 | Rondeau et al. |
| 2008/0298766 A1 | 12/2008 | Wen et al. |
| 2008/0299523 A1 | 12/2008 | Chai et al. |
| 2008/0300871 A1 | 12/2008 | Gilbert |
| 2008/0300878 A1 | 12/2008 | Bennett |
| 2008/0303645 A1 | 12/2008 | Seymour et al. |
| 2008/0306727 A1 | 12/2008 | Thurmair et al. |
| 2008/0312909 A1 | 12/2008 | Hermansen et al. |
| 2008/0312928 A1 | 12/2008 | Goebel et al. |
| 2008/0313335 A1 | 12/2008 | Jung et al. |
| 2008/0316183 A1 | 12/2008 | Westerman et al. |
| 2008/0319738 A1 | 12/2008 | Liu et al. |
| 2008/0319753 A1 | 12/2008 | Hancock |
| 2008/0319763 A1 | 12/2008 | Di Fabbrizio et al. |
| 2008/0319783 A1 | 12/2008 | Yao et al. |
| 2009/0003115 A1 | 1/2009 | Lindahl et al. |
| 2009/0005012 A1 | 1/2009 | Van Heugten |
| 2009/0005891 A1 | 1/2009 | Batson et al. |
| 2009/0006097 A1 | 1/2009 | Etezadi et al. |
| 2009/0006099 A1 | 1/2009 | Sharpe et al. |
| 2009/0006100 A1 | 1/2009 | Badger et al. |
| 2009/0006343 A1 | 1/2009 | Platt et al. |
| 2009/0006345 A1 | 1/2009 | Platt et al. |
| 2009/0006488 A1 | 1/2009 | Lindahl et al. |
| 2009/0006671 A1 | 1/2009 | Batson et al. |
| 2009/0007001 A1 | 1/2009 | Morin et al. |
| 2009/0011709 A1 | 1/2009 | Akasaka et al. |
| 2009/0012748 A1 | 1/2009 | Beish et al. |
| 2009/0012775 A1 | 1/2009 | El Hady et al. |
| 2009/0018828 A1 | 1/2009 | Nakadai et al. |
| 2009/0018829 A1 | 1/2009 | Kuperstein |
| 2009/0018834 A1 | 1/2009 | Cooper et al. |
| 2009/0018835 A1 | 1/2009 | Cooper et al. |

(56) References Cited

U.S. PATENT DOCUMENTS

| | | |
|---|---|---|
| 2009/0018839 A1 | 1/2009 | Cooper et al. |
| 2009/0018840 A1 | 1/2009 | Lutz et al. |
| 2009/0022329 A1 | 1/2009 | Mahowald |
| 2009/0024595 A1 | 1/2009 | Chen |
| 2009/0028435 A1 | 1/2009 | Wu et al. |
| 2009/0030800 A1 | 1/2009 | Grois |
| 2009/0030978 A1 | 1/2009 | Johnson et al. |
| 2009/0043580 A1 | 2/2009 | Mozer et al. |
| 2009/0043583 A1 | 2/2009 | Agapi et al. |
| 2009/0043763 A1 | 2/2009 | Peng |
| 2009/0044094 A1 | 2/2009 | Rapp et al. |
| 2009/0048821 A1 | 2/2009 | Yam et al. |
| 2009/0048845 A1 | 2/2009 | Burckart et al. |
| 2009/0049067 A1 | 2/2009 | Murray |
| 2009/0055168 A1 | 2/2009 | Wu et al. |
| 2009/0055175 A1 | 2/2009 | Terrell et al. |
| 2009/0055179 A1 | 2/2009 | Cho et al. |
| 2009/0055186 A1 | 2/2009 | Lance et al. |
| 2009/0055381 A1 | 2/2009 | Wu et al. |
| 2009/0055648 A1 | 2/2009 | Kim et al. |
| 2009/0058823 A1 | 3/2009 | Kocienda |
| 2009/0058860 A1 | 3/2009 | Fong et al. |
| 2009/0060351 A1 | 3/2009 | Li et al. |
| 2009/0060472 A1 | 3/2009 | Bull et al. |
| 2009/0063974 A1 | 3/2009 | Bull et al. |
| 2009/0064031 A1 | 3/2009 | Bull et al. |
| 2009/0070097 A1 | 3/2009 | Wu et al. |
| 2009/0070102 A1 | 3/2009 | Maegawa |
| 2009/0070109 A1 | 3/2009 | Didcock et al. |
| 2009/0070114 A1 | 3/2009 | Staszak |
| 2009/0074214 A1 | 3/2009 | Bradford et al. |
| 2009/0076792 A1 | 3/2009 | Lawson-Tancred |
| 2009/0076796 A1 | 3/2009 | Daraselia |
| 2009/0076819 A1 | 3/2009 | Wouters et al. |
| 2009/0076821 A1 | 3/2009 | Brenner et al. |
| 2009/0076825 A1 | 3/2009 | Bradford et al. |
| 2009/0077165 A1 | 3/2009 | Rhodes et al. |
| 2009/0079622 A1 | 3/2009 | Seshadri et al. |
| 2009/0083034 A1 | 3/2009 | Hernandez et al. |
| 2009/0083035 A1 | 3/2009 | Huang et al. |
| 2009/0083036 A1 | 3/2009 | Zhao et al. |
| 2009/0083037 A1 | 3/2009 | Gleason et al. |
| 2009/0083047 A1 | 3/2009 | Lindahl et al. |
| 2009/0089058 A1 | 4/2009 | Bellegarda |
| 2009/0092239 A1 | 4/2009 | Macwan et al. |
| 2009/0092260 A1 | 4/2009 | Powers |
| 2009/0092261 A1 | 4/2009 | Bard |
| 2009/0092262 A1 | 4/2009 | Costa et al. |
| 2009/0094029 A1 | 4/2009 | Koch et al. |
| 2009/0094033 A1 | 4/2009 | Mozer et al. |
| 2009/0097634 A1 | 4/2009 | Nambiar et al. |
| 2009/0097637 A1 | 4/2009 | Boscher et al. |
| 2009/0098903 A1 | 4/2009 | Donaldson et al. |
| 2009/0100049 A1 | 4/2009 | Cao |
| 2009/0100454 A1 | 4/2009 | Weber |
| 2009/0104898 A1 | 4/2009 | Harris |
| 2009/0106026 A1 | 4/2009 | Ferrieux |
| 2009/0106376 A1 | 4/2009 | Tom et al. |
| 2009/0106397 A1 | 4/2009 | O'Keefe |
| 2009/0112572 A1 | 4/2009 | Thorn |
| 2009/0112576 A1 | 4/2009 | Jackson et al. |
| 2009/0112592 A1 | 4/2009 | Candelore et al. |
| 2009/0112677 A1 | 4/2009 | Rhett |
| 2009/0112892 A1 | 4/2009 | Cardie et al. |
| 2009/0119587 A1 | 5/2009 | Allen et al. |
| 2009/0123021 A1 | 5/2009 | Jung et al. |
| 2009/0123071 A1 | 5/2009 | Iwasaki |
| 2009/0125477 A1 | 5/2009 | Lu et al. |
| 2009/0128505 A1 | 5/2009 | Partridge et al. |
| 2009/0132253 A1 | 5/2009 | Bellegarda |
| 2009/0132255 A1 | 5/2009 | Lu |
| 2009/0137286 A1 | 5/2009 | Luke et al. |
| 2009/0138263 A1 | 5/2009 | Shozakai et al. |
| 2009/0138736 A1 | 5/2009 | Chin |
| 2009/0138828 A1 | 5/2009 | Schultz et al. |
| 2009/0144049 A1 | 6/2009 | Haddad et al. |
| 2009/0144428 A1 | 6/2009 | Bowater et al. |
| 2009/0144609 A1 | 6/2009 | Liang et al. |
| 2009/0146848 A1 | 6/2009 | Ghassabian |
| 2009/0150147 A1 | 6/2009 | Jacoby et al. |
| 2009/0150156 A1 | 6/2009 | Kennewick et al. |
| 2009/0152349 A1 | 6/2009 | Bonev et al. |
| 2009/0153288 A1 | 6/2009 | Hope et al. |
| 2009/0154669 A1 | 6/2009 | Wood et al. |
| 2009/0157382 A1 | 6/2009 | Bar |
| 2009/0157384 A1 | 6/2009 | Toutanova et al. |
| 2009/0157401 A1 | 6/2009 | Bennett |
| 2009/0158200 A1 | 6/2009 | Palahnuk et al. |
| 2009/0158323 A1 | 6/2009 | Bober et al. |
| 2009/0158423 A1 | 6/2009 | Orlassino et al. |
| 2009/0160803 A1 | 6/2009 | Hashimoto |
| 2009/0163243 A1 | 6/2009 | Barbera |
| 2009/0164301 A1 | 6/2009 | O'Sullivan et al. |
| 2009/0164441 A1 | 6/2009 | Cheyer |
| 2009/0164655 A1 | 6/2009 | Pettersson et al. |
| 2009/0164937 A1 | 6/2009 | Alviar et al. |
| 2009/0167508 A1 | 7/2009 | Fadell et al. |
| 2009/0167509 A1 | 7/2009 | Fadell et al. |
| 2009/0171578 A1 | 7/2009 | Kim et al. |
| 2009/0171662 A1 | 7/2009 | Huang et al. |
| 2009/0171664 A1 | 7/2009 | Kennewick et al. |
| 2009/0172108 A1 | 7/2009 | Singh |
| 2009/0172542 A1 | 7/2009 | Girish et al. |
| 2009/0174667 A1 | 7/2009 | Kocienda et al. |
| 2009/0174677 A1 | 7/2009 | Gehani et al. |
| 2009/0177300 A1 | 7/2009 | Lee |
| 2009/0177461 A1 | 7/2009 | Ehsani et al. |
| 2009/0177966 A1 | 7/2009 | Chaudhri |
| 2009/0182445 A1 | 7/2009 | Girish et al. |
| 2009/0182702 A1 | 7/2009 | Miller |
| 2009/0183070 A1 | 7/2009 | Robbins |
| 2009/0187402 A1 | 7/2009 | Scholl |
| 2009/0187577 A1* | 7/2009 | Reznik ............... G06F 17/3089 |
| 2009/0187950 A1 | 7/2009 | Nicas et al. |
| 2009/0191895 A1 | 7/2009 | Singh et al. |
| 2009/0192782 A1 | 7/2009 | Drewes |
| 2009/0192787 A1 | 7/2009 | Roon |
| 2009/0198497 A1 | 8/2009 | Kwon |
| 2009/0204409 A1 | 8/2009 | Mozer et al. |
| 2009/0204478 A1 | 8/2009 | Kaib et al. |
| 2009/0204596 A1 | 8/2009 | Brun et al. |
| 2009/0204601 A1 | 8/2009 | Grasset |
| 2009/0204620 A1 | 8/2009 | Thione et al. |
| 2009/0210230 A1 | 8/2009 | Schwarz et al. |
| 2009/0210232 A1 | 8/2009 | Sanchez et al. |
| 2009/0213134 A1 | 8/2009 | Stephanick et al. |
| 2009/0215466 A1 | 8/2009 | Ahl et al. |
| 2009/0215503 A1 | 8/2009 | Zhang et al. |
| 2009/0216396 A1 | 8/2009 | Yamagata |
| 2009/0216540 A1 | 8/2009 | Tessel et al. |
| 2009/0216704 A1 | 8/2009 | Zheng et al. |
| 2009/0219166 A1 | 9/2009 | MacFarlane et al. |
| 2009/0221274 A1 | 9/2009 | Venkatakrishnan et al. |
| 2009/0222257 A1 | 9/2009 | Sumita et al. |
| 2009/0222270 A2 | 9/2009 | Likens et al. |
| 2009/0222488 A1 | 9/2009 | Boerries et al. |
| 2009/0228126 A1 | 9/2009 | Spielberg et al. |
| 2009/0228273 A1 | 9/2009 | Wang et al. |
| 2009/0228277 A1 | 9/2009 | Bonforte et al. |
| 2009/0228281 A1 | 9/2009 | Singleton et al. |
| 2009/0228439 A1 | 9/2009 | Manolescu et al. |
| 2009/0228792 A1 | 9/2009 | Van Os et al. |
| 2009/0228842 A1 | 9/2009 | Westerman et al. |
| 2009/0234638 A1 | 9/2009 | Ranjan et al. |
| 2009/0234655 A1 | 9/2009 | Kwon |
| 2009/0235280 A1 | 9/2009 | Tannier et al. |
| 2009/0239202 A1 | 9/2009 | Stone |
| 2009/0239552 A1 | 9/2009 | Churchill et al. |
| 2009/0240485 A1 | 9/2009 | Dalal et al. |
| 2009/0241054 A1 | 9/2009 | Hendricks |
| 2009/0241760 A1 | 10/2009 | Georges |
| 2009/0247237 A1 | 10/2009 | Mittleman et al. |
| 2009/0248182 A1* | 10/2009 | Logan ............... G06F 17/30053 700/94 |

(56) References Cited

U.S. PATENT DOCUMENTS

| | | |
|---|---|---|
| 2009/0248395 A1 | 10/2009 | Alewine et al. |
| 2009/0248402 A1 | 10/2009 | Ito et al. |
| 2009/0248420 A1 | 10/2009 | Basir et al. |
| 2009/0248422 A1 | 10/2009 | Li et al. |
| 2009/0248456 A1 | 10/2009 | Fahmy et al. |
| 2009/0249198 A1 | 10/2009 | Davis et al. |
| 2009/0249247 A1 | 10/2009 | Tseng et al. |
| 2009/0252350 A1 | 10/2009 | Seguin |
| 2009/0253457 A1 | 10/2009 | Seguin |
| 2009/0253463 A1 | 10/2009 | Shin et al. |
| 2009/0254339 A1 | 10/2009 | Seguin |
| 2009/0254345 A1* | 10/2009 | Fleizach ............... G10L 13/043 704/260 |
| 2009/0254819 A1 | 10/2009 | Song et al. |
| 2009/0254823 A1 | 10/2009 | Barrett |
| 2009/0259969 A1 | 10/2009 | Pallakoff |
| 2009/0265368 A1 | 10/2009 | Crider et al. |
| 2009/0271109 A1 | 10/2009 | Lee et al. |
| 2009/0271175 A1 | 10/2009 | Bodin et al. |
| 2009/0271176 A1 | 10/2009 | Bodin et al. |
| 2009/0271178 A1 | 10/2009 | Bodin et al. |
| 2009/0271188 A1 | 10/2009 | Agapi et al. |
| 2009/0271189 A1 | 10/2009 | Agapi et al. |
| 2009/0274315 A1 | 11/2009 | Carnes et al. |
| 2009/0281789 A1 | 11/2009 | Waibel et al. |
| 2009/0284482 A1 | 11/2009 | Chin |
| 2009/0286514 A1 | 11/2009 | Lichorowic et al. |
| 2009/0287583 A1 | 11/2009 | Holmes |
| 2009/0290718 A1 | 11/2009 | Kahn et al. |
| 2009/0292987 A1 | 11/2009 | Sorenson |
| 2009/0296552 A1 | 12/2009 | Hicks et al. |
| 2009/0298474 A1 | 12/2009 | George |
| 2009/0298529 A1 | 12/2009 | Mahajan |
| 2009/0299745 A1 | 12/2009 | Kennewick et al. |
| 2009/0299849 A1 | 12/2009 | Cao et al. |
| 2009/0300391 A1 | 12/2009 | Jessup et al. |
| 2009/0300488 A1 | 12/2009 | Salamon et al. |
| 2009/0304198 A1 | 12/2009 | Herre et al. |
| 2009/0306967 A1 | 12/2009 | Nicolov et al. |
| 2009/0306969 A1 | 12/2009 | Goud et al. |
| 2009/0306979 A1 | 12/2009 | Jaiswal et al. |
| 2009/0306980 A1 | 12/2009 | Shin |
| 2009/0306981 A1 | 12/2009 | Cromack et al. |
| 2009/0306985 A1 | 12/2009 | Roberts et al. |
| 2009/0306988 A1 | 12/2009 | Chen et al. |
| 2009/0306989 A1 | 12/2009 | Kaji |
| 2009/0307162 A1 | 12/2009 | Bui et al. |
| 2009/0307201 A1 | 12/2009 | Dunning et al. |
| 2009/0307584 A1 | 12/2009 | Davidson et al. |
| 2009/0313014 A1 | 12/2009 | Shin et al. |
| 2009/0313023 A1 | 12/2009 | Jones |
| 2009/0313026 A1 | 12/2009 | Coffman et al. |
| 2009/0313544 A1 | 12/2009 | Wood et al. |
| 2009/0313564 A1 | 12/2009 | Rottler et al. |
| 2009/0316943 A1 | 12/2009 | Frigola Munoz et al. |
| 2009/0318119 A1 | 12/2009 | Basir et al. |
| 2009/0318198 A1 | 12/2009 | Carroll |
| 2009/0319266 A1 | 12/2009 | Brown et al. |
| 2009/0326923 A1 | 12/2009 | Yan et al. |
| 2009/0326936 A1 | 12/2009 | Nagashima |
| 2009/0326938 A1 | 12/2009 | Marila et al. |
| 2009/0326949 A1 | 12/2009 | Douthitt et al. |
| 2009/0327977 A1 | 12/2009 | Bachfischer et al. |
| 2010/0004918 A1 | 1/2010 | Lee et al. |
| 2010/0004931 A1 | 1/2010 | Ma et al. |
| 2010/0005081 A1 | 1/2010 | Bennett |
| 2010/0010803 A1 | 1/2010 | Ishikawa et al. |
| 2010/0010814 A1 | 1/2010 | Patel |
| 2010/0013760 A1 | 1/2010 | Hirai et al. |
| 2010/0013796 A1 | 1/2010 | Abileah et al. |
| 2010/0017212 A1 | 1/2010 | Attwater et al. |
| 2010/0017382 A1 | 1/2010 | Katragadda et al. |
| 2010/0019834 A1 | 1/2010 | Zerbe et al. |
| 2010/0023318 A1 | 1/2010 | Lemoine |
| 2010/0023320 A1 | 1/2010 | Di Cristo et al. |
| 2010/0026526 A1 | 2/2010 | Yokota |
| 2010/0030549 A1 | 2/2010 | Lee et al. |
| 2010/0030928 A1 | 2/2010 | Conroy et al. |
| 2010/0031143 A1 | 2/2010 | Rao et al. |
| 2010/0036653 A1 | 2/2010 | Kim et al. |
| 2010/0036655 A1 | 2/2010 | Cecil et al. |
| 2010/0036660 A1 | 2/2010 | Bennett |
| 2010/0037183 A1 | 2/2010 | Miyashita et al. |
| 2010/0042400 A1 | 2/2010 | Block et al. |
| 2010/0042576 A1 | 2/2010 | Roettger et al. |
| 2010/0046842 A1 | 2/2010 | Conwell et al. |
| 2010/0049498 A1 | 2/2010 | Cao et al. |
| 2010/0049514 A1 | 2/2010 | Kennewick et al. |
| 2010/0050064 A1 | 2/2010 | Liu et al. |
| 2010/0054512 A1 | 3/2010 | Solum |
| 2010/0057443 A1 | 3/2010 | Di Cristo et al. |
| 2010/0057457 A1 | 3/2010 | Ogata et al. |
| 2010/0057461 A1 | 3/2010 | Neubacher et al. |
| 2010/0057643 A1 | 3/2010 | Yang |
| 2010/0060646 A1 | 3/2010 | Unsal et al. |
| 2010/0063804 A1 | 3/2010 | Sato et al. |
| 2010/0063825 A1 | 3/2010 | Williams et al. |
| 2010/0063961 A1 | 3/2010 | Guiheneuf et al. |
| 2010/0064113 A1 | 3/2010 | Lindahl et al. |
| 2010/0064218 A1 | 3/2010 | Bull et al. |
| 2010/0064226 A1 | 3/2010 | Stefaniak et al. |
| 2010/0067723 A1 | 3/2010 | Bergmann et al. |
| 2010/0067867 A1 | 3/2010 | Lin et al. |
| 2010/0070281 A1 | 3/2010 | Conkie et al. |
| 2010/0070899 A1 | 3/2010 | Hunt et al. |
| 2010/0071003 A1 | 3/2010 | Bychkov et al. |
| 2010/0076760 A1 | 3/2010 | Kraenzel et al. |
| 2010/0076993 A1 | 3/2010 | Klawitter et al. |
| 2010/0077350 A1 | 3/2010 | Lim et al. |
| 2010/0079501 A1 | 4/2010 | Ikeda et al. |
| 2010/0080398 A1 | 4/2010 | Waldmann |
| 2010/0080470 A1 | 4/2010 | Deluca et al. |
| 2010/0081456 A1 | 4/2010 | Singh et al. |
| 2010/0081487 A1 | 4/2010 | Chen et al. |
| 2010/0082286 A1 | 4/2010 | Leung |
| 2010/0082327 A1 | 4/2010 | Rogers et al. |
| 2010/0082328 A1 | 4/2010 | Rogers et al. |
| 2010/0082329 A1 | 4/2010 | Silverman et al. |
| 2010/0082333 A1 | 4/2010 | Al-Shammari |
| 2010/0082346 A1 | 4/2010 | Rogers et al. |
| 2010/0082347 A1 | 4/2010 | Rogers et al. |
| 2010/0082348 A1 | 4/2010 | Silverman et al. |
| 2010/0082349 A1 | 4/2010 | Bellegarda et al. |
| 2010/0082567 A1 | 4/2010 | Rosenblatt et al. |
| 2010/0082970 A1 | 4/2010 | Lindahl et al. |
| 2010/0086152 A1 | 4/2010 | Rank et al. |
| 2010/0086153 A1 | 4/2010 | Hagen et al. |
| 2010/0086156 A1 | 4/2010 | Rank et al. |
| 2010/0088020 A1 | 4/2010 | Sano et al. |
| 2010/0088093 A1 | 4/2010 | Lee et al. |
| 2010/0088100 A1 | 4/2010 | Lindahl |
| 2010/0098231 A1 | 4/2010 | Wohlert et al. |
| 2010/0100212 A1 | 4/2010 | Lindahl et al. |
| 2010/0100384 A1 | 4/2010 | Ju et al. |
| 2010/0100816 A1 | 4/2010 | Mccloskey et al. |
| 2010/0103776 A1 | 4/2010 | Chan |
| 2010/0106486 A1 | 4/2010 | Hua et al. |
| 2010/0106498 A1 | 4/2010 | Morrison et al. |
| 2010/0106500 A1 | 4/2010 | McKee et al. |
| 2010/0106503 A1 | 4/2010 | Farrell et al. |
| 2010/0114856 A1 | 5/2010 | Kuboyama |
| 2010/0121637 A1 | 5/2010 | Roy et al. |
| 2010/0125456 A1 | 5/2010 | Weng et al. |
| 2010/0125458 A1 | 5/2010 | Franco et al. |
| 2010/0125460 A1 | 5/2010 | Mellott et al. |
| 2010/0125811 A1 | 5/2010 | Moore et al. |
| 2010/0125269 A1 | 5/2010 | Park et al. |
| 2010/0131273 A1 | 5/2010 | Aley-Raz et al. |
| 2010/0131498 A1 | 5/2010 | Linthicum et al. |
| 2010/0131899 A1 | 5/2010 | Hubert |
| 2010/0138215 A1 | 6/2010 | Williams |
| 2010/0138224 A1 | 6/2010 | Bedingfield, Sr. |
| 2010/0138416 A1 | 6/2010 | Bellotti |
| 2010/0138680 A1 | 6/2010 | Brisebois et al. |

(56) References Cited

U.S. PATENT DOCUMENTS

| | | |
|---|---|---|
| 2010/0138759 A1 | 6/2010 | Roy |
| 2010/0138798 A1 | 6/2010 | Wilson et al. |
| 2010/0142740 A1 | 6/2010 | Roerup |
| 2010/0145694 A1 | 6/2010 | Ju et al. |
| 2010/0145700 A1 | 6/2010 | Kennewick et al. |
| 2010/0145707 A1 | 6/2010 | Ljolje et al. |
| 2010/0146442 A1 | 6/2010 | Nagasaka et al. |
| 2010/0150321 A1 | 6/2010 | Harris et al. |
| 2010/0153115 A1 | 6/2010 | Klee et al. |
| 2010/0153448 A1 | 6/2010 | Harpur et al. |
| 2010/0161313 A1 | 6/2010 | Karttunen |
| 2010/0161337 A1 | 6/2010 | Pulz et al. |
| 2010/0161554 A1 | 6/2010 | Datuashvili et al. |
| 2010/0164897 A1 | 7/2010 | Morin et al. |
| 2010/0169075 A1 | 7/2010 | Raffa et al. |
| 2010/0169093 A1 | 7/2010 | Washio |
| 2010/0169097 A1 | 7/2010 | Nachman et al. |
| 2010/0169098 A1 | 7/2010 | Patch |
| 2010/0171713 A1 | 7/2010 | Kwok et al. |
| 2010/0174544 A1 | 7/2010 | Heifets |
| 2010/0175066 A1 | 7/2010 | Paik |
| 2010/0179932 A1 | 7/2010 | Yoon et al. |
| 2010/0179991 A1 | 7/2010 | Lorch et al. |
| 2010/0180218 A1 | 7/2010 | Boston et al. |
| 2010/0185448 A1 | 7/2010 | Meisel |
| 2010/0185949 A1 | 7/2010 | Jaeger |
| 2010/0191520 A1 | 7/2010 | Gruhn et al. |
| 2010/0197359 A1 | 8/2010 | Harris |
| 2010/0199180 A1 | 8/2010 | Brichter et al. |
| 2010/0199215 A1 | 8/2010 | Seymour et al. |
| 2010/0204986 A1 | 8/2010 | Kennewick et al. |
| 2010/0211199 A1 | 8/2010 | Naik et al. |
| 2010/0216509 A1 | 8/2010 | Riemer et al. |
| 2010/0217604 A1 | 8/2010 | Baldwin et al. |
| 2010/0222033 A1 | 9/2010 | Scott et al. |
| 2010/0222098 A1 | 9/2010 | Garg |
| 2010/0223055 A1 | 9/2010 | Mclean |
| 2010/0223056 A1 | 9/2010 | Kadirkamanathan et al. |
| 2010/0223131 A1 | 9/2010 | Scott et al. |
| 2010/0225599 A1 | 9/2010 | Danielsson et al. |
| 2010/0225809 A1 | 9/2010 | Connors et al. |
| 2010/0227642 A1 | 9/2010 | Kim et al. |
| 2010/0228540 A1 | 9/2010 | Bennett |
| 2010/0228549 A1 | 9/2010 | Herman et al. |
| 2010/0228691 A1 | 9/2010 | Yang et al. |
| 2010/0229082 A1 | 9/2010 | Karmarkar et al. |
| 2010/0229100 A1 | 9/2010 | Miller et al. |
| 2010/0231474 A1 | 9/2010 | Yamagajo et al. |
| 2010/0235167 A1 | 9/2010 | Bourdon |
| 2010/0235341 A1 | 9/2010 | Bennett |
| 2010/0235729 A1 | 9/2010 | Kocienda et al. |
| 2010/0235732 A1 | 9/2010 | Bergman |
| 2010/0235770 A1 | 9/2010 | Ording et al. |
| 2010/0241418 A1 | 9/2010 | Maeda et al. |
| 2010/0250542 A1 | 9/2010 | Fujimaki |
| 2010/0250599 A1 | 9/2010 | Schmidt et al. |
| 2010/0255858 A1 | 10/2010 | Juhasz |
| 2010/0257160 A1 | 10/2010 | Cao |
| 2010/0257478 A1 | 10/2010 | Longe et al. |
| 2010/0262599 A1 | 10/2010 | Nitz |
| 2010/0268539 A1 | 10/2010 | Xu et al. |
| 2010/0269040 A1 | 10/2010 | Lee |
| 2010/0274753 A1 | 10/2010 | Liberty et al. |
| 2010/0277579 A1 | 11/2010 | Cho et al. |
| 2010/0278320 A1 | 11/2010 | Arsenault et al. |
| 2010/0278453 A1 | 11/2010 | King |
| 2010/0280983 A1 | 11/2010 | Cho et al. |
| 2010/0281034 A1 | 11/2010 | Petrou et al. |
| 2010/0286985 A1 | 11/2010 | Kennewick et al. |
| 2010/0287514 A1 | 11/2010 | Cragun et al. |
| 2010/0290632 A1 | 11/2010 | Lin |
| 2010/0293460 A1 | 11/2010 | Budelli |
| 2010/0295645 A1 | 11/2010 | Falldin et al. |
| 2010/0299133 A1 | 11/2010 | Kopparapu et al. |
| 2010/0299138 A1 | 11/2010 | Kim |
| 2010/0299142 A1 | 11/2010 | Freeman et al. |
| 2010/0302056 A1 | 12/2010 | Dutton et al. |
| 2010/0304342 A1 | 12/2010 | Zilber |
| 2010/0304705 A1 | 12/2010 | Hursey et al. |
| 2010/0305807 A1 | 12/2010 | Basir et al. |
| 2010/0305947 A1 | 12/2010 | Schwarz et al. |
| 2010/0312547 A1 | 12/2010 | Van Os et al. |
| 2010/0312566 A1 | 12/2010 | Odinak et al. |
| 2010/0318366 A1 | 12/2010 | Sullivan et al. |
| 2010/0318576 A1 | 12/2010 | Kim |
| 2010/0322438 A1 | 12/2010 | Siotis |
| 2010/0324709 A1 | 12/2010 | Starmen |
| 2010/0324895 A1 | 12/2010 | Kurzweil et al. |
| 2010/0324896 A1 | 12/2010 | Attwater et al. |
| 2010/0324905 A1 | 12/2010 | Kurzweil et al. |
| 2010/0325131 A1 | 12/2010 | Dumais et al. |
| 2010/0325158 A1 | 12/2010 | Oral et al. |
| 2010/0325573 A1 | 12/2010 | Estrada et al. |
| 2010/0325588 A1 | 12/2010 | Reddy et al. |
| 2010/0330908 A1 | 12/2010 | Maddern et al. |
| 2010/0332220 A1 | 12/2010 | Hursey et al. |
| 2010/0332224 A1 | 12/2010 | Mäkelä et al. |
| 2010/0332235 A1 | 12/2010 | David |
| 2010/0332236 A1 | 12/2010 | Tan |
| 2010/0332280 A1 | 12/2010 | Bradley et al. |
| 2010/0332348 A1 | 12/2010 | Cao |
| 2010/0332428 A1 | 12/2010 | Mchenry et al. |
| 2010/0332976 A1 | 12/2010 | Fux et al. |
| 2010/0333030 A1 | 12/2010 | Johns |
| 2010/0333163 A1 | 12/2010 | Daly |
| 2011/0002487 A1 | 1/2011 | Panther et al. |
| 2011/0004475 A1 | 1/2011 | Bellegarda |
| 2011/0009107 A1 | 1/2011 | Guba et al. |
| 2011/0010178 A1 | 1/2011 | Lee et al. |
| 2011/0010644 A1 | 1/2011 | Merrill et al. |
| 2011/0016150 A1 | 1/2011 | Engstrom et al. |
| 2011/0018695 A1 | 1/2011 | Bells et al. |
| 2011/0021213 A1 | 1/2011 | Carr |
| 2011/0022292 A1 | 1/2011 | Shen et al. |
| 2011/0022388 A1 | 1/2011 | Wu et al. |
| 2011/0022393 A1 | 1/2011 | Waller et al. |
| 2011/0022394 A1 | 1/2011 | Wide et al. |
| 2011/0022472 A1 | 1/2011 | Zon et al. |
| 2011/0022952 A1 | 1/2011 | Wu et al. |
| 2011/0029616 A1 | 2/2011 | Wang et al. |
| 2011/0030067 A1 | 2/2011 | Wilson |
| 2011/0033064 A1 | 2/2011 | Johnson et al. |
| 2011/0034183 A1 | 2/2011 | Haag et al. |
| 2011/0035144 A1 | 2/2011 | Okamoto et al. |
| 2011/0035434 A1 | 2/2011 | Lockwood |
| 2011/0038489 A1 | 2/2011 | Visser et al. |
| 2011/0040707 A1 | 2/2011 | Theisen et al. |
| 2011/0045841 A1 | 2/2011 | Kuhlke et al. |
| 2011/0047072 A1 | 2/2011 | Ciurea |
| 2011/0047149 A1 | 2/2011 | Vaananen |
| 2011/0047161 A1 | 2/2011 | Myaeng et al. |
| 2011/0050591 A1 | 3/2011 | Kim et al. |
| 2011/0050592 A1 | 3/2011 | Kim et al. |
| 2011/0054647 A1 | 3/2011 | Chipchase |
| 2011/0054894 A1 | 3/2011 | Phillips et al. |
| 2011/0054901 A1 | 3/2011 | Qin et al. |
| 2011/0055256 A1 | 3/2011 | Phillips et al. |
| 2011/0060584 A1 | 3/2011 | Ferrucci et al. |
| 2011/0060587 A1 | 3/2011 | Phillips et al. |
| 2011/0060589 A1 | 3/2011 | Weinberg et al. |
| 2011/0060807 A1 | 3/2011 | Martin et al. |
| 2011/0064387 A1 | 3/2011 | Mendeloff et al. |
| 2011/0065456 A1 | 3/2011 | Brennan et al. |
| 2011/0066366 A1 | 3/2011 | Ellanti et al. |
| 2011/0066468 A1 | 3/2011 | Huang et al. |
| 2011/0066634 A1 | 3/2011 | Phillips et al. |
| 2011/0072492 A1 | 3/2011 | Mohler et al. |
| 2011/0076994 A1 | 3/2011 | Kim et al. |
| 2011/0077943 A1 | 3/2011 | Miki et al. |
| 2011/0081889 A1 | 4/2011 | Gao et al. |
| 2011/0082688 A1 | 4/2011 | Kim et al. |
| 2011/0083079 A1 | 4/2011 | Farrell et al. |
| 2011/0087491 A1 | 4/2011 | Wittenstein et al. |
| 2011/0090078 A1 | 4/2011 | Kim et al. |

(56) References Cited

U.S. PATENT DOCUMENTS

| | | |
|---|---|---|
| 2011/0093261 A1 | 4/2011 | Angott |
| 2011/0093265 A1 | 4/2011 | Stent et al. |
| 2011/0093271 A1 | 4/2011 | Bernard et al. |
| 2011/0099000 A1 | 4/2011 | Rai et al. |
| 2011/0103682 A1 | 5/2011 | Chidlovskii et al. |
| 2011/0106736 A1 | 5/2011 | Aharonson et al. |
| 2011/0106892 A1 | 5/2011 | Nelson et al. |
| 2011/0110502 A1 | 5/2011 | Daye et al. |
| 2011/0112827 A1 | 5/2011 | Kennewick et al. |
| 2011/0112837 A1 | 5/2011 | Kurki-Suonio et al. |
| 2011/0112921 A1 | 5/2011 | Kennewick et al. |
| 2011/0116610 A1 | 5/2011 | Shaw et al. |
| 2011/0119049 A1 | 5/2011 | Ylonen |
| 2011/0119051 A1 | 5/2011 | Li et al. |
| 2011/0119623 A1 | 5/2011 | Kim |
| 2011/0119715 A1 | 5/2011 | Chang et al. |
| 2011/0123004 A1 | 5/2011 | Chang et al. |
| 2011/0125498 A1 | 5/2011 | Pickering et al. |
| 2011/0125540 A1 | 5/2011 | Jang et al. |
| 2011/0130958 A1 | 6/2011 | Stahl et al. |
| 2011/0131036 A1 | 6/2011 | DiCristo et al. |
| 2011/0131038 A1 | 6/2011 | Oyaizu et al. |
| 2011/0131045 A1 | 6/2011 | Cristo et al. |
| 2011/0137636 A1 | 6/2011 | Srihari et al. |
| 2011/0141141 A1 | 6/2011 | Kankainen |
| 2011/0143726 A1 | 6/2011 | de Silva |
| 2011/0143811 A1 | 6/2011 | Rodriguez |
| 2011/0144857 A1 | 6/2011 | Wingrove et al. |
| 2011/0144901 A1 | 6/2011 | Wang |
| 2011/0144973 A1 | 6/2011 | Bocchieri et al. |
| 2011/0144999 A1 | 6/2011 | Jang et al. |
| 2011/0145718 A1 | 6/2011 | Ketola et al. |
| 2011/0151830 A1 | 6/2011 | Blanda et al. |
| 2011/0153209 A1 | 6/2011 | Geelen |
| 2011/0153322 A1 | 6/2011 | Kwak et al. |
| 2011/0153324 A1 | 6/2011 | Ballinger et al. |
| 2011/0153330 A1 | 6/2011 | Yazdani et al. |
| 2011/0153373 A1 | 6/2011 | Dantzig et al. |
| 2011/0154193 A1 | 6/2011 | Creutz et al. |
| 2011/0157029 A1 | 6/2011 | Tseng |
| 2011/0161072 A1 | 6/2011 | Terao et al. |
| 2011/0161076 A1 | 6/2011 | Davis et al. |
| 2011/0161079 A1 | 6/2011 | Gruhn et al. |
| 2011/0161309 A1 | 6/2011 | Lung et al. |
| 2011/0161852 A1 | 6/2011 | Vainio et al. |
| 2011/0166851 A1 | 7/2011 | LeBeau et al. |
| 2011/0167350 A1 | 7/2011 | Hoellwarth |
| 2011/0175810 A1 | 7/2011 | Markovic et al. |
| 2011/0179002 A1 | 7/2011 | Dumitru et al. |
| 2011/0179372 A1 | 7/2011 | Moore et al. |
| 2011/0183650 A1 | 7/2011 | Mckee et al. |
| 2011/0184721 A1 | 7/2011 | Subramanian et al. |
| 2011/0184730 A1 | 7/2011 | LeBeau et al. |
| 2011/0184768 A1 | 7/2011 | Norton et al. |
| 2011/0185288 A1 | 7/2011 | Gupta et al. |
| 2011/0191271 A1 | 8/2011 | Baker et al. |
| 2011/0191344 A1 | 8/2011 | Jin et al. |
| 2011/0195758 A1 | 8/2011 | Damale et al. |
| 2011/0196670 A1 | 8/2011 | Dang et al. |
| 2011/0197128 A1 | 8/2011 | Assadollahi et al. |
| 2011/0201385 A1 | 8/2011 | Higginbotham et al. |
| 2011/0201387 A1 | 8/2011 | Paek et al. |
| 2011/0202526 A1 | 8/2011 | Lee et al. |
| 2011/0205149 A1 | 8/2011 | Tom et al. |
| 2011/0208511 A1 | 8/2011 | Sikstrom et al. |
| 2011/0208524 A1 | 8/2011 | Haughay |
| 2011/0209088 A1 | 8/2011 | Hinckley et al. |
| 2011/0212717 A1 | 9/2011 | Rhoads et al. |
| 2011/0218806 A1 | 9/2011 | Alewine et al. |
| 2011/0218855 A1 | 9/2011 | Cao et al. |
| 2011/0219018 A1 | 9/2011 | Bailey et al. |
| 2011/0223893 A1 | 9/2011 | Lau et al. |
| 2011/0224972 A1 | 9/2011 | Millett et al. |
| 2011/0228913 A1 | 9/2011 | Cochinwala et al. |
| 2011/0231182 A1 | 9/2011 | Weider et al. |
| 2011/0231184 A1 | 9/2011 | Kerr |
| 2011/0231188 A1 | 9/2011 | Kennewick et al. |
| 2011/0231432 A1 | 9/2011 | Sata et al. |
| 2011/0231474 A1 | 9/2011 | Locker et al. |
| 2011/0238407 A1 | 9/2011 | Kent |
| 2011/0238408 A1 | 9/2011 | Larcheveque et al. |
| 2011/0238676 A1 | 9/2011 | Liu et al. |
| 2011/0239111 A1 | 9/2011 | Grover |
| 2011/0242007 A1 | 10/2011 | Gray et al. |
| 2011/0246471 A1 | 10/2011 | Rakib et al. |
| 2011/0249144 A1 | 10/2011 | Chang |
| 2011/0250570 A1 | 10/2011 | Mack et al. |
| 2011/0258188 A1 | 10/2011 | Abdalmageed et al. |
| 2011/0260861 A1 | 10/2011 | Singh et al. |
| 2011/0264643 A1 | 10/2011 | Cao |
| 2011/0264999 A1 | 10/2011 | Bells et al. |
| 2011/0274303 A1 | 11/2011 | Filson et al. |
| 2011/0276595 A1 | 11/2011 | Kirkland et al. |
| 2011/0276598 A1 | 11/2011 | Kozempel |
| 2011/0276944 A1 | 11/2011 | Bergman et al. |
| 2011/0279368 A1 | 11/2011 | Klein et al. |
| 2011/0282663 A1 | 11/2011 | Talwar et al. |
| 2011/0282888 A1 | 11/2011 | Koperski et al. |
| 2011/0282906 A1 | 11/2011 | Wong |
| 2011/0283189 A1 | 11/2011 | McCarty |
| 2011/0288861 A1 | 11/2011 | Kurzweil et al. |
| 2011/0288863 A1 | 11/2011 | Rasmussen |
| 2011/0298585 A1 | 12/2011 | Barry |
| 2011/0301943 A1 | 12/2011 | Patch |
| 2011/0302162 A1 | 12/2011 | Xiao et al. |
| 2011/0306426 A1 | 12/2011 | Novak et al. |
| 2011/0307241 A1 | 12/2011 | Waibel et al. |
| 2011/0307491 A1 | 12/2011 | Fisk et al. |
| 2011/0307810 A1 | 12/2011 | Hilerio et al. |
| 2011/0313775 A1 | 12/2011 | Laligand et al. |
| 2011/0314032 A1 | 12/2011 | Bennett et al. |
| 2011/0314404 A1 | 12/2011 | Kotler et al. |
| 2011/0320187 A1 | 12/2011 | Motik et al. |
| 2012/0002820 A1 | 1/2012 | Leichter |
| 2012/0005602 A1 | 1/2012 | Anttila et al. |
| 2012/0008754 A1 | 1/2012 | Mukherjee et al. |
| 2012/0010886 A1 | 1/2012 | Razavilar |
| 2012/0011138 A1 | 1/2012 | Dunning et al. |
| 2012/0013609 A1 | 1/2012 | Reponen et al. |
| 2012/0015629 A1 | 1/2012 | Olsen et al. |
| 2012/0016658 A1 | 1/2012 | Wu et al. |
| 2012/0016678 A1 | 1/2012 | Gruber et al. |
| 2012/0019400 A1 | 1/2012 | Patel et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0022967 A1 | 1/2012 | Bachman et al. |
| 2012/0023088 A1 | 1/2012 | Cheng et al. |
| 2012/0023095 A1 | 1/2012 | Wadycki et al. |
| 2012/0023462 A1 | 1/2012 | Rosing et al. |
| 2012/0029661 A1 | 2/2012 | Jones et al. |
| 2012/0029910 A1 | 2/2012 | Medlock et al. |
| 2012/0034904 A1 | 2/2012 | LeBeau et al. |
| 2012/0035907 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035925 A1 | 2/2012 | Friend et al. |
| 2012/0035926 A1 | 2/2012 | Ambler |
| 2012/0035931 A1 | 2/2012 | LeBeau et al. |
| 2012/0035932 A1 | 2/2012 | Jitkoff et al. |
| 2012/0036556 A1 | 2/2012 | LeBeau et al. |
| 2012/0039539 A1 | 2/2012 | Boiman et al. |
| 2012/0041752 A1 | 2/2012 | Wang et al. |
| 2012/0042014 A1 | 2/2012 | Desai et al. |
| 2012/0042343 A1 | 2/2012 | Laligand et al. |
| 2012/0053815 A1 | 3/2012 | Montanari et al. |
| 2012/0053829 A1 | 3/2012 | Agarwal et al. |

(56) References Cited

U.S. PATENT DOCUMENTS

| | | |
|---|---|---|
| 2012/0053945 A1 | 3/2012 | Gupta et al. |
| 2012/0056815 A1 | 3/2012 | Mehra |
| 2012/0059655 A1 | 3/2012 | Cartales |
| 2012/0062473 A1 | 3/2012 | Xiao et al. |
| 2012/0066212 A1 | 3/2012 | Jennings |
| 2012/0066581 A1 | 3/2012 | Spalink |
| 2012/0075054 A1 | 3/2012 | Ge et al. |
| 2012/0078624 A1 | 3/2012 | Yook et al. |
| 2012/0078627 A1 | 3/2012 | Wagner |
| 2012/0082317 A1 | 4/2012 | Pance et al. |
| 2012/0083286 A1 | 4/2012 | Kim et al. |
| 2012/0084086 A1 | 4/2012 | Gilbert et al. |
| 2012/0084634 A1 | 4/2012 | Wong et al. |
| 2012/0088219 A1 | 4/2012 | Briscoe et al. |
| 2012/0089331 A1 | 4/2012 | Schmidt et al. |
| 2012/0108221 A1 | 5/2012 | Thomas et al. |
| 2012/0116770 A1 | 5/2012 | Chen et al. |
| 2012/0117499 A1 | 5/2012 | Mori et al. |
| 2012/0124126 A1 | 5/2012 | Alcazar et al. |
| 2012/0128322 A1 | 5/2012 | Shaffer et al. |
| 2012/0136572 A1 | 5/2012 | Norton |
| 2012/0136985 A1 | 5/2012 | Popescu et al. |
| 2012/0137367 A1 | 5/2012 | Dupont et al. |
| 2012/0149394 A1 | 6/2012 | Singh et al. |
| 2012/0150544 A1 | 6/2012 | McLoughlin et al. |
| 2012/0150580 A1 | 6/2012 | Norton |
| 2012/0158293 A1 | 6/2012 | Burnham |
| 2012/0158422 A1 | 6/2012 | Burnham et al. |
| 2012/0159380 A1 | 6/2012 | Kocienda et al. |
| 2012/0163710 A1 | 6/2012 | Skaff et al. |
| 2012/0166196 A1 | 6/2012 | Ju et al. |
| 2012/0173464 A1 | 7/2012 | Tur et al. |
| 2012/0174121 A1 | 7/2012 | Treat et al. |
| 2012/0179457 A1 | 7/2012 | Newman et al. |
| 2012/0185237 A1 | 7/2012 | Gajic et al. |
| 2012/0185480 A1 | 7/2012 | Ni et al. |
| 2012/0185781 A1 | 7/2012 | Guzman et al. |
| 2012/0191461 A1 | 7/2012 | Lin et al. |
| 2012/0192096 A1 | 7/2012 | Bowman et al. |
| 2012/0197743 A1 | 8/2012 | Grigg et al. |
| 2012/0197995 A1 | 8/2012 | Caruso |
| 2012/0197998 A1 | 8/2012 | Kessel et al. |
| 2012/0201362 A1 | 8/2012 | Crossan et al. |
| 2012/0209853 A1 | 8/2012 | Desai et al. |
| 2012/0209874 A1 | 8/2012 | Wong et al. |
| 2012/0214141 A1 | 8/2012 | Raya et al. |
| 2012/0214517 A1 | 8/2012 | Singh et al. |
| 2012/0215762 A1 | 8/2012 | Hall et al. |
| 2012/0221339 A1 | 8/2012 | Wang et al. |
| 2012/0221552 A1 | 8/2012 | Reponen et al. |
| 2012/0223889 A1 | 9/2012 | Medlock et al. |
| 2012/0223936 A1 | 9/2012 | Aughey et al. |
| 2012/0232885 A1 | 9/2012 | Barbosa et al. |
| 2012/0232886 A1 | 9/2012 | Capuozzo et al. |
| 2012/0232906 A1 | 9/2012 | Lindahl et al. |
| 2012/0239661 A1 | 9/2012 | Giblin |
| 2012/0239761 A1 | 9/2012 | Linner et al. |
| 2012/0242482 A1 | 9/2012 | Elumalai et al. |
| 2012/0245719 A1 | 9/2012 | Story, Jr. et al. |
| 2012/0245941 A1 | 9/2012 | Cheyer |
| 2012/0245944 A1 | 9/2012 | Gruber et al. |
| 2012/0246064 A1 | 9/2012 | Balkow |
| 2012/0250858 A1 | 10/2012 | Iqbal et al. |
| 2012/0252367 A1 | 10/2012 | Gaglio et al. |
| 2012/0252540 A1 | 10/2012 | Kirigaya |
| 2012/0253785 A1 | 10/2012 | Hamid et al. |
| 2012/0254143 A1 | 10/2012 | Varma et al. |
| 2012/0254152 A1 | 10/2012 | Park et al. |
| 2012/0254290 A1 | 10/2012 | Naaman |
| 2012/0265528 A1 | 10/2012 | Gruber et al. |
| 2012/0265535 A1 | 10/2012 | Bryant-Rich et al. |
| 2012/0265806 A1 | 10/2012 | Blanchflower et al. |
| 2012/0271625 A1 | 10/2012 | Bernard |
| 2012/0271634 A1 | 10/2012 | Lenke |
| 2012/0271635 A1 | 10/2012 | Ljolje |
| 2012/0271640 A1 | 10/2012 | Basir |
| 2012/0271676 A1 | 10/2012 | Aravamudan et al. |
| 2012/0275377 A1 | 11/2012 | Lehane et al. |
| 2012/0284027 A1 | 11/2012 | Mallett et al. |
| 2012/0290300 A1 | 11/2012 | Lee et al. |
| 2012/0295708 A1 | 11/2012 | Hernandez-Abrego et al. |
| 2012/0296649 A1 | 11/2012 | Bansal et al. |
| 2012/0296654 A1 | 11/2012 | Hendrickson et al. |
| 2012/0296891 A1 | 11/2012 | Rangan |
| 2012/0297348 A1 | 11/2012 | Santoro |
| 2012/0303369 A1 | 11/2012 | Brush et al. |
| 2012/0303371 A1 | 11/2012 | Labsky et al. |
| 2012/0304124 A1 | 11/2012 | Chen et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O'Sullivan |
| 2012/0310922 A1 | 12/2012 | Johnson et al. |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0316862 A1 | 12/2012 | Sultan et al. |
| 2012/0316878 A1 | 12/2012 | Singleton et al. |
| 2012/0317194 A1 | 12/2012 | Tian |
| 2012/0317498 A1 | 12/2012 | Logan et al. |
| 2012/0321112 A1 | 12/2012 | Schubert et al. |
| 2012/0324391 A1 | 12/2012 | Tocci et al. |
| 2012/0327009 A1 | 12/2012 | Fleizach |
| 2012/0329529 A1 | 12/2012 | van der Raadt |
| 2012/0330660 A1 | 12/2012 | Jaiswal |
| 2012/0330661 A1 | 12/2012 | Lindahl |
| 2012/0330990 A1 | 12/2012 | Chen et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0007648 A1 | 1/2013 | Gamon et al. |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0027875 A1 | 1/2013 | Zhu et al. |
| 2013/0030804 A1 | 1/2013 | Zavaliagkos et al. |
| 2013/0030815 A1 | 1/2013 | Madhvanath et al. |
| 2013/0030955 A1 | 1/2013 | David |
| 2013/0031476 A1 | 1/2013 | Coin et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041968 A1 | 2/2013 | Cohen et al. |
| 2013/0046544 A1 | 2/2013 | Kay et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054706 A1 | 2/2013 | Graham et al. |
| 2013/0055099 A1 | 2/2013 | Yao et al. |
| 2013/0055147 A1 | 2/2013 | Vasudev et al. |
| 2013/0063611 A1 | 3/2013 | Papakipos et al. |
| 2013/0066832 A1 | 3/2013 | Sheehan et al. |
| 2013/0067307 A1 | 3/2013 | Tian et al. |
| 2013/0073286 A1 | 3/2013 | Bastea-Forte et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0085755 A1 | 4/2013 | Bringert et al. |
| 2013/0085761 A1 | 4/2013 | Bringert et al. |
| 2013/0090921 A1 | 4/2013 | Liu et al. |
| 2013/0091090 A1 | 4/2013 | Spivack et al. |
| 2013/0095805 A1 | 4/2013 | Lebeau et al. |
| 2013/0096917 A1 | 4/2013 | Edgar et al. |
| 2013/0097566 A1 | 4/2013 | Berglund |
| 2013/0097682 A1 | 4/2013 | Zeljkovic et al. |
| 2013/0100268 A1 | 4/2013 | Mihailidis et al. |
| 2013/0103391 A1 | 4/2013 | Millmore et al. |

(56) References Cited

U.S. PATENT DOCUMENTS

| | | |
|---|---|---|
| 2013/0106742 A1 | 5/2013 | Lee et al. |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0111330 A1 | 5/2013 | Staikos et al. |
| 2013/0111348 A1 | 5/2013 | Gruber et al. |
| 2013/0111487 A1 | 5/2013 | Cheyer et al. |
| 2013/0115927 A1 | 5/2013 | Gruber et al. |
| 2013/0117022 A1 | 5/2013 | Chen et al. |
| 2013/0124189 A1 | 5/2013 | Baldwin et al. |
| 2013/0132089 A1 | 5/2013 | Fanty et al. |
| 2013/0132871 A1 | 5/2013 | Zeng et al. |
| 2013/0141551 A1 | 6/2013 | Kim |
| 2013/0142317 A1 | 6/2013 | Reynolds |
| 2013/0142345 A1 | 6/2013 | Waldmann |
| 2013/0144594 A1 | 6/2013 | Bangalore et al. |
| 2013/0144616 A1 | 6/2013 | Bangalore et al. |
| 2013/0151339 A1 | 6/2013 | Kim et al. |
| 2013/0152092 A1 | 6/2013 | Yadgar et al. |
| 2013/0154811 A1 | 6/2013 | Ferren et al. |
| 2013/0158977 A1 | 6/2013 | Senior |
| 2013/0165232 A1 | 6/2013 | Nelson et al. |
| 2013/0166303 A1 | 6/2013 | Chang et al. |
| 2013/0166442 A1 | 6/2013 | Nakajima et al. |
| 2013/0170738 A1 | 7/2013 | Capuozzo et al. |
| 2013/0172022 A1 | 7/2013 | Seymour et al. |
| 2013/0176244 A1 | 7/2013 | Yamamoto et al. |
| 2013/0176592 A1 | 7/2013 | Sasaki |
| 2013/0179440 A1 | 7/2013 | Gordon |
| 2013/0183944 A1 | 7/2013 | Mozer et al. |
| 2013/0185059 A1 | 7/2013 | Riccardi et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0191117 A1 | 7/2013 | Atti et al. |
| 2013/0197911 A1 | 8/2013 | Wei et al. |
| 2013/0204813 A1 | 8/2013 | Master et al. |
| 2013/0207898 A1 | 8/2013 | Sullivan et al. |
| 2013/0218553 A1 | 8/2013 | Fujii et al. |
| 2013/0218560 A1 | 8/2013 | Hsiao et al. |
| 2013/0222249 A1 | 8/2013 | Pasquero et al. |
| 2013/0225128 A1 | 8/2013 | Gomar |
| 2013/0231917 A1 | 9/2013 | Naik |
| 2013/0234947 A1 | 9/2013 | Kristensson et al. |
| 2013/0235987 A1 | 9/2013 | Arroniz-Escobar et al. |
| 2013/0238647 A1 | 9/2013 | Thompson |
| 2013/0244615 A1 | 9/2013 | Miller et al. |
| 2013/0246048 A1 | 9/2013 | Nagase et al. |
| 2013/0253911 A1 | 9/2013 | Petri et al. |
| 2013/0253912 A1 | 9/2013 | Medlock et al. |
| 2013/0275117 A1 | 10/2013 | Winer |
| 2013/0275138 A1 | 10/2013 | Gruber et al. |
| 2013/0275164 A1 | 10/2013 | Gruber et al. |
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0283168 A1 | 10/2013 | Brown et al. |
| 2013/0289991 A1 | 10/2013 | Eshwar et al. |
| 2013/0289993 A1 | 10/2013 | Rao et al. |
| 2013/0289994 A1 | 10/2013 | Newman et al. |
| 2013/0291015 A1 | 10/2013 | Pan |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311997 A1 | 11/2013 | Gruber et al. |
| 2013/0322634 A1 | 12/2013 | Bennett et al. |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325481 A1 | 12/2013 | Van Os et al. |
| 2013/0325484 A1 | 12/2013 | Chakladar et al. |
| 2013/0325979 A1 | 12/2013 | Mansfield et al. |
| 2013/0329023 A1 | 12/2013 | Suplee, III et al. |
| 2013/0332159 A1 | 12/2013 | Federighi et al. |
| 2013/0332162 A1 | 12/2013 | Keen |
| 2013/0332164 A1 | 12/2013 | Nalk |
| 2013/0332168 A1 | 12/2013 | Kim et al. |
| 2013/0332400 A1 | 12/2013 | González |
| 2013/0339256 A1 | 12/2013 | Shroff |
| 2013/0346068 A1 | 12/2013 | Solem et al. |
| 2013/0346347 A1 | 12/2013 | Patterson et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006153 A1 | 1/2014 | Thangam et al. |
| 2014/0012580 A1 | 1/2014 | Ganong et al. |
| 2014/0012586 A1 | 1/2014 | Rubin et al. |
| 2014/0019116 A1 | 1/2014 | Lundberg et al. |
| 2014/0019133 A1 | 1/2014 | Bao et al. |
| 2014/0028735 A1 | 1/2014 | Williams et al. |
| 2014/0033071 A1 | 1/2014 | Gruber et al. |
| 2014/0035823 A1 | 2/2014 | Khoe et al. |
| 2014/0039894 A1 | 2/2014 | Shostak |
| 2014/0040274 A1 | 2/2014 | Aravamudan et al. |
| 2014/0040748 A1 | 2/2014 | Lemay et al. |
| 2014/0040801 A1 | 2/2014 | Patel et al. |
| 2014/0040918 A1 | 2/2014 | Li et al. |
| 2014/0046934 A1 | 2/2014 | Zhou et al. |
| 2014/0047001 A1 | 2/2014 | Phillips et al. |
| 2014/0052791 A1 | 2/2014 | Chakra et al. |
| 2014/0053082 A1 | 2/2014 | Park et al. |
| 2014/0057610 A1 | 2/2014 | Olincy et al. |
| 2014/0059030 A1 | 2/2014 | Hakkani-Tur et al. |
| 2014/0067371 A1 | 3/2014 | Liensberger |
| 2014/0068751 A1 | 3/2014 | Last et al. |
| 2014/0074470 A1 | 3/2014 | Jansche et al. |
| 2014/0074472 A1 | 3/2014 | Lin et al. |
| 2014/0074815 A1 | 3/2014 | Plimton |
| 2014/0078065 A1 | 3/2014 | Akkok et al. |
| 2014/0080428 A1 | 3/2014 | Rhoads et al. |
| 2014/0081633 A1 | 3/2014 | Badaskar et al. |
| 2014/0082501 A1 | 3/2014 | Bae et al. |
| 2014/0086458 A1 | 3/2014 | Rogers et al. |
| 2014/0087711 A1 | 3/2014 | Geyer et al. |
| 2014/0088961 A1 | 3/2014 | Woodward et al. |
| 2014/0095171 A1 | 4/2014 | Lynch et al. |
| 2014/0096209 A1 | 4/2014 | Saraf et al. |
| 2014/0098247 A1 | 4/2014 | Rao et al. |
| 2014/0108017 A1 | 4/2014 | Mason et al. |
| 2014/0114554 A1 | 4/2014 | Lagassey |
| 2014/0118155 A1 | 5/2014 | Bowers et al. |
| 2014/0122059 A1 | 5/2014 | Patel et al. |
| 2014/0122086 A1 | 5/2014 | Kapur et al. |
| 2014/0122136 A1 | 5/2014 | Jayanthi |
| 2014/0122153 A1 | 5/2014 | Truitt |
| 2014/0135036 A1 | 5/2014 | Bonanni et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0142923 A1 | 5/2014 | Jones et al. |
| 2014/0142935 A1 | 5/2014 | Lindahl et al. |
| 2014/0143550 A1 | 5/2014 | Ganong, III et al. |
| 2014/0143721 A1 | 5/2014 | Suzuki et al. |
| 2014/0146200 A1 | 5/2014 | Scott et al. |
| 2014/0152577 A1 | 6/2014 | Yuen et al. |
| 2014/0155031 A1 | 6/2014 | Lee et al. |
| 2014/0157422 A1 | 6/2014 | Livshits et al. |
| 2014/0163951 A1 | 6/2014 | Nikoulina et al. |
| 2014/0163953 A1 | 6/2014 | Parikh |
| 2014/0164532 A1 | 6/2014 | Lynch et al. |
| 2014/0173460 A1 | 6/2014 | Kim |
| 2014/0180689 A1 | 6/2014 | Kim et al. |
| 2014/0188477 A1 | 7/2014 | Zhang |

(56) References Cited

U.S. PATENT DOCUMENTS

| | | |
|---|---|---|
| 2014/0195251 A1 | 7/2014 | Zeinstra et al. |
| 2014/0195252 A1 | 7/2014 | Gruber et al. |
| 2014/0203939 A1 | 7/2014 | Harrington et al. |
| 2014/0207582 A1 | 7/2014 | Flinn et al. |
| 2014/0214429 A1 | 7/2014 | Pantel |
| 2014/0214537 A1 | 7/2014 | Yoo et al. |
| 2014/0218372 A1 | 8/2014 | Missig et al. |
| 2014/0222436 A1 | 8/2014 | Binder et al. |
| 2014/0222678 A1 | 8/2014 | Sheets et al. |
| 2014/0223377 A1 | 8/2014 | Shaw et al. |
| 2014/0223481 A1 | 8/2014 | Fundament |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244271 A1 | 8/2014 | Lindahl |
| 2014/0247383 A1 | 9/2014 | Dave et al. |
| 2014/0247926 A1 | 9/2014 | Gainsboro et al. |
| 2014/0249817 A1 | 9/2014 | Hart et al. |
| 2014/0249821 A1 | 9/2014 | Kennewick et al. |
| 2014/0250046 A1 | 9/2014 | Winn et al. |
| 2014/0258857 A1 | 9/2014 | Dykstra-Erickson et al. |
| 2014/0267022 A1 | 9/2014 | Kim |
| 2014/0267599 A1 | 9/2014 | Drouin et al. |
| 2014/0274203 A1 | 9/2014 | Ganong et al. |
| 2014/0274211 A1 | 9/2014 | Sejnoha et al. |
| 2014/0278343 A1 | 9/2014 | Tran |
| 2014/0278349 A1 | 9/2014 | Grieves et al. |
| 2014/0278379 A1 | 9/2014 | Coccaro et al. |
| 2014/0278391 A1 | 9/2014 | Braho et al. |
| 2014/0278406 A1 | 9/2014 | Tsumura et al. |
| 2014/0278413 A1 | 9/2014 | Pitschel et al. |
| 2014/0278429 A1 | 9/2014 | Ganong, III |
| 2014/0278435 A1 | 9/2014 | Ganong et al. |
| 2014/0278443 A1 | 9/2014 | Gunn et al. |
| 2014/0278513 A1 | 9/2014 | Prakash et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0281983 A1 | 9/2014 | Xian et al. |
| 2014/0282003 A1 | 9/2014 | Gruber et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0297267 A1 | 10/2014 | Spencer et al. |
| 2014/0297281 A1 | 10/2014 | Togawa et al. |
| 2014/0297284 A1 | 10/2014 | Gruber et al. |
| 2014/0297288 A1 | 10/2014 | Yu et al. |
| 2014/0304605 A1 | 10/2014 | Ohmura et al. |
| 2014/0316585 A1 | 10/2014 | Boesveld et al. |
| 2014/0317502 A1 | 10/2014 | Brown et al. |
| 2014/0337048 A1 | 11/2014 | Brown et al. |
| 2014/0337266 A1 | 11/2014 | Kalns et al. |
| 2014/0337751 A1 | 11/2014 | Lim et al. |
| 2014/0337814 A1 | 11/2014 | Kalns et al. |
| 2014/0344627 A1 | 11/2014 | Schaub et al. |
| 2014/0344687 A1 | 11/2014 | Durham et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |
| 2014/0358523 A1 | 12/2014 | Sheth et al. |
| 2014/0365209 A1 | 12/2014 | Evermann |
| 2014/0365216 A1 | 12/2014 | Gruber et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365880 A1 | 12/2014 | Bellegarda |
| 2014/0365885 A1 | 12/2014 | Carson et al. |
| 2014/0365895 A1 | 12/2014 | Paulson et al. |
| 2015/0003797 A1 | 1/2015 | Schmidt |
| 2015/0006148 A1 | 1/2015 | Goldszmit et al. |
| 2015/0006178 A1 | 1/2015 | Peng et al. |
| 2015/0006199 A1 | 1/2015 | Snider et al. |
| 2015/0012271 A1 | 1/2015 | Peng et al. |
| 2015/0019219 A1 | 1/2015 | Tzirkel-hancock et al. |
| 2015/0019221 A1 | 1/2015 | Lee et al. |
| 2015/0033219 A1 | 1/2015 | Breiner et al. |
| 2015/0039292 A1 | 2/2015 | Suleman et al. |
| 2015/0039305 A1 | 2/2015 | Huang |
| 2015/0040012 A1 | 2/2015 | Faaborg et al. |
| 2015/0045003 A1 | 2/2015 | Vora et al. |
| 2015/0045068 A1 | 2/2015 | Soffer et al. |
| 2015/0046537 A1 | 2/2015 | Rakib |
| 2015/0050633 A1 | 2/2015 | Christmas et al. |
| 2015/0058013 A1 | 2/2015 | Pakhomov et al. |
| 2015/0065200 A1 | 3/2015 | Namgung et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0067485 A1 | 3/2015 | Kim et al. |
| 2015/0073804 A1 | 3/2015 | Senior et al. |
| 2015/0074524 A1 | 3/2015 | Nicholson et al. |
| 2015/0088511 A1 | 3/2015 | Bharadwaj et al. |
| 2015/0088514 A1 | 3/2015 | Typrin |
| 2015/0088523 A1 | 3/2015 | Schuster |
| 2015/0095031 A1 | 4/2015 | Conkie et al. |
| 2015/0095278 A1 | 4/2015 | Flinn et al. |
| 2015/0100316 A1 | 4/2015 | Williams et al. |
| 2015/0100983 A1 | 4/2015 | Pan |
| 2015/0106093 A1 | 4/2015 | Weeks et al. |
| 2015/0113407 A1 | 4/2015 | Hoffert et al. |
| 2015/0120723 A1 | 4/2015 | Deshmukh et al. |
| 2015/0127350 A1 | 5/2015 | Agiomyrgiannakis |
| 2015/0133109 A1 | 5/2015 | Freeman et al. |
| 2015/0135085 A1 | 5/2015 | Shoham et al. |
| 2015/0142420 A1 | 5/2015 | Sarikaya et al. |
| 2015/0142447 A1 | 5/2015 | Kennewick et al. |
| 2015/0148013 A1 | 5/2015 | Baldwin et al. |
| 2015/0149177 A1 | 5/2015 | Kalns et al. |
| 2015/0149354 A1 | 5/2015 | Mccoy |
| 2015/0149469 A1 | 5/2015 | Xu et al. |
| 2015/0154185 A1 | 6/2015 | Waibel |
| 2015/0161370 A1 | 6/2015 | North et al. |
| 2015/0170664 A1 | 6/2015 | Doherty et al. |
| 2015/0172463 A1 | 6/2015 | Quast et al. |
| 2015/0178388 A1 | 6/2015 | Winnemoeller et al. |
| 2015/0186012 A1 | 7/2015 | Coleman et al. |
| 2015/0186110 A1 | 7/2015 | Kannan |
| 2015/0186155 A1 | 7/2015 | Brown et al. |
| 2015/0186351 A1 | 7/2015 | Hicks et al. |
| 2015/0187355 A1 | 7/2015 | Parkinson et al. |
| 2015/0193379 A1 | 7/2015 | Mehta |
| 2015/0193391 A1 | 7/2015 | Khvostichenko et al. |
| 2015/0193392 A1 | 7/2015 | Greenblatt et al. |
| 2015/0194152 A1 | 7/2015 | Katuri et al. |
| 2015/0195379 A1 | 7/2015 | Zhang et al. |
| 2015/0195606 A1 | 7/2015 | McDevitt |
| 2015/0199077 A1 | 7/2015 | Zuger et al. |
| 2015/0199960 A1 | 7/2015 | Huo et al. |
| 2015/0201064 A1 | 7/2015 | Bells et al. |
| 2015/0205858 A1 | 7/2015 | Xie et al. |
| 2015/0212791 A1 | 7/2015 | Kumar et al. |
| 2015/0221304 A1 | 8/2015 | Stewart |
| 2015/0227633 A1 | 8/2015 | Shapira |
| 2015/0228281 A1 | 8/2015 | Raniere |
| 2015/0234636 A1 | 8/2015 | Barnes, Jr. |
| 2015/0234800 A1 | 8/2015 | Ehlen et al. |
| 2015/0243278 A1 | 8/2015 | Kibre et al. |
| 2015/0245154 A1 | 8/2015 | Dadu et al. |
| 2015/0248651 A1 | 9/2015 | Akutagawa et al. |
| 2015/0254057 A1 | 9/2015 | Klein et al. |
| 2015/0255071 A1 | 9/2015 | Chiba |
| 2015/0256873 A1 | 9/2015 | Klein et al. |
| 2015/0261496 A1 | 9/2015 | Faaborg et al. |
| 2015/0269139 A1 | 9/2015 | McAteer et al. |
| 2015/0278370 A1 | 10/2015 | Stratvert et al. |
| 2015/0279360 A1 | 10/2015 | Mengibar et al. |
| 2015/0281380 A1 | 10/2015 | Wang et al. |
| 2015/0286627 A1 | 10/2015 | Chang et al. |
| 2015/0287401 A1 | 10/2015 | Lee et al. |

(56) References Cited

U.S. PATENT DOCUMENTS

| | | |
|---|---|---|
| 2015/0287409 A1 | 10/2015 | Jang |
| 2015/0294516 A1 | 10/2015 | Chiang |
| 2015/0309997 A1 | 10/2015 | Lee et al. |
| 2015/0310879 A1 | 10/2015 | Buchanan et al. |
| 2015/0312182 A1 | 10/2015 | Langholz |
| 2015/0317069 A1 | 11/2015 | Clements et al. |
| 2015/0324041 A1 | 11/2015 | Varley et al. |
| 2015/0324334 A1 | 11/2015 | Lee et al. |
| 2015/0331711 A1 | 11/2015 | Huang et al. |
| 2015/0332667 A1 | 11/2015 | Mason |
| 2015/0339049 A1 | 11/2015 | Kasemset et al. |
| 2015/0339391 A1 | 11/2015 | Kang et al. |
| 2015/0340040 A1 | 11/2015 | Mun et al. |
| 2015/0340042 A1 | 11/2015 | Sejnoha et al. |
| 2015/0347086 A1 | 12/2015 | Liedholm et al. |
| 2015/0347382 A1 | 12/2015 | Dolfing et al. |
| 2015/0347385 A1 | 12/2015 | Flor et al. |
| 2015/0347393 A1 | 12/2015 | Futrell et al. |
| 2015/0347985 A1 | 12/2015 | Gross et al. |
| 2015/0348547 A1 | 12/2015 | Paulik et al. |
| 2015/0348548 A1 | 12/2015 | Piernot et al. |
| 2015/0348549 A1 | 12/2015 | Giuli et al. |
| 2015/0348551 A1 | 12/2015 | Gruber et al. |
| 2015/0348554 A1 | 12/2015 | Orr et al. |
| 2015/0350031 A1 | 12/2015 | Burks et al. |
| 2015/0370531 A1 | 12/2015 | Faaborg |
| 2015/0370780 A1 | 12/2015 | Wang et al. |
| 2015/0371665 A1 | 12/2015 | Naik et al. |
| 2015/0382079 A1 | 12/2015 | Lister et al. |
| 2016/0014476 A1 | 1/2016 | Caliendo, Jr. et al. |
| 2016/0019886 A1 | 1/2016 | Hong |
| 2016/0026258 A1 | 1/2016 | Ou et al. |
| 2016/0027431 A1 | 1/2016 | Kurzweil et al. |
| 2016/0028666 A1 | 1/2016 | Li |
| 2016/0034811 A1 | 2/2016 | Paulik et al. |
| 2016/0042735 A1 | 2/2016 | Vibbert et al. |
| 2016/0042748 A1 | 2/2016 | Jain et al. |
| 2016/0055422 A1 | 2/2016 | Li |
| 2016/0063998 A1 | 3/2016 | Krishnamoorthy et al. |
| 2016/0071521 A1 | 3/2016 | Haughay |
| 2016/0077794 A1 | 3/2016 | Kim et al. |
| 2016/0080165 A1 | 3/2016 | Ehsani et al. |
| 2016/0086116 A1 | 3/2016 | Rao et al. |
| 2016/0091967 A1 | 3/2016 | Prokofieva et al. |
| 2016/0092447 A1 | 3/2016 | Venkataraman et al. |
| 2016/0093291 A1 | 3/2016 | Kim |
| 2016/0093298 A1 | 3/2016 | Naik et al. |
| 2016/0093304 A1 | 3/2016 | Kim et al. |
| 2016/0094979 A1 | 3/2016 | Naik et al. |
| 2016/0117386 A1 | 4/2016 | Ajmera et al. |
| 2016/0119338 A1 | 4/2016 | Cheyer |
| 2016/0139662 A1 | 5/2016 | Dabhade |
| 2016/0147725 A1 | 5/2016 | Patten et al. |
| 2016/0155442 A1 | 6/2016 | Kannan et al. |
| 2016/0155443 A1 | 6/2016 | Khan et al. |
| 2016/0162456 A1 | 6/2016 | Munro et al. |
| 2016/0170966 A1 | 6/2016 | Kolo |
| 2016/0180844 A1 | 6/2016 | Vanblon et al. |
| 2016/0189717 A1 | 6/2016 | Kannan et al. |
| 2016/0212488 A1 | 7/2016 | Os et al. |
| 2016/0225372 A1 | 8/2016 | Cheung et al. |
| 2016/0240187 A1 | 8/2016 | Fleizach et al. |
| 2016/0260431 A1 | 9/2016 | Newendorp et al. |
| 2016/0260433 A1 | 9/2016 | Sumner et al. |
| 2016/0260436 A1 | 9/2016 | Lemay et al. |
| 2016/0267904 A1 | 9/2016 | Biadsy et al. |
| 2016/0275941 A1 | 9/2016 | Bellegarda et al. |
| 2016/0282956 A1 | 9/2016 | Ouyang et al. |
| 2016/0299882 A1 | 10/2016 | Hegerty et al. |
| 2016/0299883 A1 | 10/2016 | Zhu et al. |
| 2016/0321261 A1 | 11/2016 | Spasojevic et al. |
| 2016/0357728 A1 | 12/2016 | Bellegarda et al. |
| 2016/0357861 A1 | 12/2016 | Carlhian et al. |
| 2016/0358598 A1 | 12/2016 | Williams et al. |
| 2016/0358600 A1 | 12/2016 | Nallasamy et al. |
| 2016/0378747 A1 | 12/2016 | Orr et al. |
| 2017/0068423 A1 | 3/2017 | Napolitano et al. |
| 2017/0068513 A1 | 3/2017 | Stasior et al. |

FOREIGN PATENT DOCUMENTS

| | | |
|---|---|---|
| CA | 2792412 A1 | 7/2011 |
| CA | 2666438 C | 6/2013 |
| CH | 681573 A5 | 4/1993 |
| CN | 1263385 A | 8/2000 |
| CN | 1274440 A | 11/2000 |
| CN | 101008942 A | 8/2001 |
| CN | 1321295 A | 11/2001 |
| CN | 1369858 A | 9/2002 |
| CN | 1378156 A | 11/2002 |
| CN | 1383109 A | 12/2002 |
| CN | 1407795 A | 4/2003 |
| CN | 1125436 C | 10/2003 |
| CN | 1471098 A | 1/2004 |
| CN | 1494695 A | 5/2004 |
| CN | 1524218 A | 8/2004 |
| CN | 1535519 A | 10/2004 |
| CN | 1640191 A | 7/2005 |
| CN | 1673939 A | 9/2005 |
| CN | 1757027 A | 4/2006 |
| CN | 1864204 A | 11/2006 |
| CN | 1898721 A | 1/2007 |
| CN | 2865153 Y | 1/2007 |
| CN | 1959628 A | 5/2007 |
| CN | 1975715 A | 6/2007 |
| CN | 1995917 A | 7/2007 |
| CN | 101162153 A | 4/2008 |
| CN | 101179754 A | 5/2008 |
| CN | 101183525 A | 5/2008 |
| CN | 101188644 A | 5/2008 |
| CN | 101228503 A | 7/2008 |
| CN | 101233741 A | 7/2008 |
| CN | 101246020 A | 8/2008 |
| CN | 101271689 A | 9/2008 |
| CN | 101297541 A | 10/2008 |
| CN | 101427244 A | 5/2009 |
| CN | 101499156 A | 8/2009 |
| CN | 101535983 A | 9/2009 |
| CN | 101632316 A | 1/2010 |
| CN | 101636736 A | 1/2010 |
| CN | 101673544 A | 3/2010 |
| CN | 101847405 A | 9/2010 |
| CN | 101894547 A | 11/2010 |
| CN | 101939740 A | 1/2011 |
| CN | 101951553 A | 1/2011 |
| CN | 102160043 A | 8/2011 |
| CN | 102246136 A | 11/2011 |
| CN | 202035047 U | 11/2011 |
| CN | 202092650 U | 12/2011 |
| CN | 103035240 A | 4/2013 |
| DE | 3837590 A1 | 5/1990 |
| DE | 4126902 A1 | 2/1992 |
| DE | 4334773 A1 | 4/1994 |
| DE | 4445023 A1 | 6/1996 |
| DE | 102004029203 A1 | 12/2005 |
| DE | 19841541 B4 | 12/2007 |
| DE | 102008024258 A1 | 11/2009 |
| EP | 30390 A1 | 6/1981 |
| EP | 57514 A1 | 8/1982 |
| EP | 59880 A2 | 9/1982 |
| EP | 138061 A1 | 4/1985 |
| EP | 140777 A1 | 5/1985 |
| EP | 218859 A2 | 4/1987 |
| EP | 262938 A1 | 4/1988 |
| EP | 138061 B1 | 6/1988 |
| EP | 283995 A2 | 9/1988 |
| EP | 293259 A2 | 11/1988 |
| EP | 299572 A2 | 1/1989 |
| EP | 313975 A2 | 5/1989 |
| EP | 314908 A2 | 5/1989 |
| EP | 327408 A2 | 8/1989 |
| EP | 389271 A2 | 9/1990 |
| EP | 411675 A2 | 2/1991 |
| EP | 441089 A2 | 8/1991 |

(56) References Cited

FOREIGN PATENT DOCUMENTS

| | | |
|---|---|---|
| EP | 464712 A2 | 1/1992 |
| EP | 476972 A2 | 3/1992 |
| EP | 534410 A2 | 3/1993 |
| EP | 558312 A1 | 9/1993 |
| EP | 559349 A1 | 9/1993 |
| EP | 570660 A1 | 11/1993 |
| EP | 575146 A2 | 12/1993 |
| EP | 578604 A1 | 1/1994 |
| EP | 586996 A2 | 3/1994 |
| EP | 609030 A1 | 8/1994 |
| EP | 651543 A2 | 5/1995 |
| EP | 679005 A1 | 10/1995 |
| EP | 795811 A1 | 9/1997 |
| EP | 476972 B1 | 5/1998 |
| EP | 845894 A2 | 6/1998 |
| EP | 852052 A1 | 7/1998 |
| EP | 863453 A1 | 9/1998 |
| EP | 863469 A2 | 9/1998 |
| EP | 867860 A2 | 9/1998 |
| EP | 869697 A2 | 10/1998 |
| EP | 559349 B1 | 1/1999 |
| EP | 889626 A1 | 1/1999 |
| EP | 917077 A2 | 5/1999 |
| EP | 691023 B1 | 9/1999 |
| EP | 946032 A2 | 9/1999 |
| EP | 981236 A1 | 2/2000 |
| EP | 982732 A1 | 3/2000 |
| EP | 984430 A2 | 3/2000 |
| EP | 1001588 A2 | 5/2000 |
| EP | 1014277 A1 | 6/2000 |
| EP | 1028425 A2 | 8/2000 |
| EP | 1028426 A2 | 8/2000 |
| EP | 1047251 A2 | 10/2000 |
| EP | 1052566 A1 | 11/2000 |
| EP | 1076302 A1 | 2/2001 |
| EP | 1091615 A1 | 4/2001 |
| EP | 1094406 A2 | 4/2001 |
| EP | 1107229 A2 | 6/2001 |
| EP | 1229496 A2 | 8/2002 |
| EP | 1233600 A2 | 8/2002 |
| EP | 1245023 A1 | 10/2002 |
| EP | 1246075 A2 | 10/2002 |
| EP | 1280326 A1 | 1/2003 |
| EP | 1291848 A2 | 3/2003 |
| EP | 1311102 A1 | 5/2003 |
| EP | 1315084 A1 | 5/2003 |
| EP | 1315086 A1 | 5/2003 |
| EP | 1345360 A2 | 9/2003 |
| EP | 1347361 A1 | 9/2003 |
| EP | 1368961 A2 | 12/2003 |
| EP | 1379061 A2 | 1/2004 |
| EP | 1432219 A1 | 6/2004 |
| EP | 1435620 A1 | 7/2004 |
| EP | 1480421 A1 | 11/2004 |
| EP | 1517228 A2 | 3/2005 |
| EP | 1536612 A1 | 6/2005 |
| EP | 1566948 A1 | 8/2005 |
| EP | 1650938 A1 | 4/2006 |
| EP | 1675025 A2 | 6/2006 |
| EP | 1693829 A1 | 8/2006 |
| EP | 1699042 A1 | 9/2006 |
| EP | 1739546 A2 | 1/2007 |
| EP | 1181802 B1 | 2/2007 |
| EP | 1818786 A1 | 8/2007 |
| EP | 1892700 A1 | 2/2008 |
| EP | 1912205 A2 | 4/2008 |
| EP | 1939860 A1 | 7/2008 |
| EP | 1944997 A2 | 7/2008 |
| EP | 651543 B1 | 9/2008 |
| EP | 1909263 B1 | 1/2009 |
| EP | 1335620 B1 | 3/2009 |
| EP | 2069895 A1 | 6/2009 |
| EP | 2094032 A1 | 8/2009 |
| EP | 2096840 A1 | 9/2009 |
| EP | 2107553 A1 | 10/2009 |
| EP | 2109295 A1 | 10/2009 |
| EP | 1720375 B1 | 7/2010 |
| EP | 2205010 A1 | 7/2010 |
| EP | 2309491 A1 | 4/2011 |
| EP | 2400373 A1 | 12/2011 |
| EP | 2431842 A2 | 3/2012 |
| EP | 2551784 A1 | 1/2013 |
| EP | 2555536 A1 | 2/2013 |
| EP | 2575128 A2 | 4/2013 |
| EP | 2733598 A2 | 5/2014 |
| EP | 2801890 A1 | 11/2014 |
| EP | 2801972 A1 | 11/2014 |
| EP | 2930715 A1 | 10/2015 |
| EP | 2938022 A1 | 10/2015 |
| EP | 2940556 A1 | 11/2015 |
| FR | 2911201 A1 | 7/2008 |
| GB | 2293667 A | 4/1996 |
| GB | 2310559 A | 8/1997 |
| GB | 2323694 A | 9/1998 |
| GB | 2342802 A | 4/2000 |
| GB | 2343285 A | 5/2000 |
| GB | 2346500 A | 8/2000 |
| GB | 2352377 A | 1/2001 |
| GB | 2367399 A | 4/2002 |
| GB | 2384399 A | 7/2003 |
| GB | 2402855 A | 12/2004 |
| GB | 2445436 A | 7/2008 |
| GB | 2445667 A | 7/2008 |
| IT | FI20010199 A1 | 4/2003 |
| JP | 55-80084 A | 6/1980 |
| JP | 57-41731 A | 3/1982 |
| JP | 59-57336 A | 4/1984 |
| JP | 62-153326 A | 7/1987 |
| JP | 01-010317 A | 1/1989 |
| JP | 1-500631 A | 3/1989 |
| JP | 1-254742 A | 10/1989 |
| JP | 2-86397 A | 3/1990 |
| JP | 2-153415 A | 6/1990 |
| JP | 2-502149 A | 7/1990 |
| JP | 3-113578 A | 5/1991 |
| JP | 4-236624 A | 8/1992 |
| JP | 5-79951 A | 3/1993 |
| JP | 5-165459 A | 7/1993 |
| JP | 5-204859 A | 8/1993 |
| JP | 5-293126 A | 11/1993 |
| JP | 6-19965 A | 1/1994 |
| JP | 6-69954 A | 6/1994 |
| JP | 06-208389 A | 7/1994 |
| JP | 6-274586 A | 9/1994 |
| JP | 06-332493 A | 12/1994 |
| JP | 6-332617 A | 12/1994 |
| JP | 7-199379 A | 8/1995 |
| JP | 7-219961 A | 8/1995 |
| JP | 7-320051 A | 12/1995 |
| JP | 7-320079 A | 12/1995 |
| JP | 8-63330 A | 3/1996 |
| JP | 8-185265 A | 7/1996 |
| JP | 8-223281 A | 8/1996 |
| JP | 8-227341 A | 9/1996 |
| JP | 9-18585 A | 1/1997 |
| JP | 9-27000 A | 1/1997 |
| JP | 9-55792 A | 2/1997 |
| JP | 09-062293 A | 3/1997 |
| JP | 9-116616 A | 5/1997 |
| JP | 9-259063 A | 10/1997 |
| JP | 9-265457 A | 10/1997 |
| JP | 10-31497 A | 2/1998 |
| JP | 10-69578 A | 3/1998 |
| JP | 10-78952 A | 3/1998 |
| JP | 10-105324 A | 4/1998 |
| JP | 10-274997 A | 10/1998 |
| JP | 10-312194 A | 11/1998 |
| JP | 10-320169 A | 12/1998 |
| JP | 11-06743 A | 1/1999 |
| JP | 11-45241 A | 2/1999 |
| JP | 11-136278 A | 5/1999 |
| JP | 11-231886 A | 8/1999 |
| JP | 11-265400 A | 9/1999 |
| JP | 2000-32140 A | 1/2000 |

(56) References Cited

FOREIGN PATENT DOCUMENTS

| | | |
|---|---|---|
| JP | 2000-59497 A | 2/2000 |
| JP | 2000-90119 A | 3/2000 |
| JP | 2000-99225 A | 4/2000 |
| JP | 2000-134407 A | 5/2000 |
| JP | 2000-163031 A | 6/2000 |
| JP | 2000-207167 A | 7/2000 |
| JP | 2000-216910 A | 8/2000 |
| JP | 2000-224663 A | 8/2000 |
| JP | 2000-272349 A | 10/2000 |
| JP | 2000-276471 A | 10/2000 |
| JP | 2000-331004 A | 11/2000 |
| JP | 2000-339137 A | 12/2000 |
| JP | 2000-352988 A | 12/2000 |
| JP | 2000-352989 A | 12/2000 |
| JP | 2001-13978 A | 1/2001 |
| JP | 2001-14319 A | 1/2001 |
| JP | 2001-22498 A | 1/2001 |
| JP | 2001-34289 A | 2/2001 |
| JP | 2001-34290 A | 2/2001 |
| JP | 2001-045553 A | 2/2001 |
| JP | 2001-56233 A | 2/2001 |
| JP | 2001-109493 A | 4/2001 |
| JP | 2001-125896 A | 5/2001 |
| JP | 2001-148899 A | 5/2001 |
| JP | 2001-273283 A | 10/2001 |
| JP | 2001-282813 A | 10/2001 |
| JP | 2001-296880 A | 10/2001 |
| JP | 2002-14954 A | 1/2002 |
| JP | 2002-24212 A | 1/2002 |
| JP | 2002-30676 A | 1/2002 |
| JP | 2002-41276 A | 2/2002 |
| JP | 2002-41624 A | 2/2002 |
| JP | 2002-82748 A | 3/2002 |
| JP | 2002-82893 A | 3/2002 |
| JP | 2001-123295 A | 4/2002 |
| JP | 2002-132804 A | 5/2002 |
| JP | 2002-182679 A | 6/2002 |
| JP | 2002-182680 A | 6/2002 |
| JP | 2002-516549 A | 6/2002 |
| JP | 2002-230021 A | 8/2002 |
| JP | 2002-236029 A | 8/2002 |
| JP | 2002-524806 A | 8/2002 |
| JP | 2002-281562 A | 9/2002 |
| JP | 2002-534716 A | 10/2002 |
| JP | 2002-341892 A | 11/2002 |
| JP | 2002-342033 A | 11/2002 |
| JP | 2002-342212 A | 11/2002 |
| JP | 2002-344880 A | 11/2002 |
| JP | 2002-542501 A | 12/2002 |
| JP | 2003-15682 A | 1/2003 |
| JP | 2003-022087 A | 1/2003 |
| JP | 2003-44091 A | 2/2003 |
| JP | 2003-84877 A | 3/2003 |
| JP | 2003-517158 A | 5/2003 |
| JP | 2003-202897 A | 7/2003 |
| JP | 2003-233568 A | 8/2003 |
| JP | 2003-244317 A | 8/2003 |
| JP | 2003-255991 A | 9/2003 |
| JP | 2003-527656 A | 9/2003 |
| JP | 2003-288356 A | 10/2003 |
| JP | 2003-308079 A | 10/2003 |
| JP | 2003-533909 A | 11/2003 |
| JP | 2004-48804 A | 2/2004 |
| JP | 2004-54080 A | 2/2004 |
| JP | 2004-056226 A | 2/2004 |
| JP | 2004-505322 A | 2/2004 |
| JP | 2004-505525 A | 2/2004 |
| JP | 2004-86356 A | 3/2004 |
| JP | 2004-94936 A | 3/2004 |
| JP | 2004-117905 A | 4/2004 |
| JP | 2004-152063 A | 5/2004 |
| JP | 2004-153306 A | 5/2004 |
| JP | 2004-523004 A | 7/2004 |
| JP | 2004-295837 A | 10/2004 |
| JP | 2004-310034 A | 11/2004 |
| JP | 2004-333870 A | 11/2004 |
| JP | 2004-534268 A | 11/2004 |
| JP | 2004-347786 A | 12/2004 |
| JP | 2005-55782 A | 3/2005 |
| JP | 2005-63257 A | 3/2005 |
| JP | 2005-70645 A | 3/2005 |
| JP | 2005-80094 A | 3/2005 |
| JP | 2005-86624 A | 3/2005 |
| JP | 2005-506602 A | 3/2005 |
| JP | 2005-92441 A | 4/2005 |
| JP | 2005-149481 A | 6/2005 |
| JP | 2005-181386 A | 7/2005 |
| JP | 2005-189454 A | 7/2005 |
| JP | 2005-210362 A | 8/2005 |
| JP | 2005-221678 A | 8/2005 |
| JP | 2005-275925 A | 10/2005 |
| JP | 2005-283843 A | 10/2005 |
| JP | 2005-311864 A | 11/2005 |
| JP | 2005-332212 A | 12/2005 |
| JP | 2006-003142 A | 1/2006 |
| JP | 2006-4274 A | 1/2006 |
| JP | 2006-23860 A | 1/2006 |
| JP | 2006-30447 A | 2/2006 |
| JP | 2006-31092 A | 2/2006 |
| JP | 2006-59094 A | 3/2006 |
| JP | 2006-079427 A | 3/2006 |
| JP | 2006-80617 A | 3/2006 |
| JP | 2006-107438 A | 4/2006 |
| JP | 2002-169588 A | 6/2006 |
| JP | 2006-146008 A | 6/2006 |
| JP | 2006-146182 A | 6/2006 |
| JP | 2006-155368 A | 6/2006 |
| JP | 2006-175637 A | 7/2006 |
| JP | 2006-189394 A | 7/2006 |
| JP | 2006-201870 A | 8/2006 |
| JP | 2006-208696 A | 8/2006 |
| JP | 2006-237735 A | 9/2006 |
| JP | 2006-244296 A | 9/2006 |
| JP | 2006-522549 A | 9/2006 |
| JP | 2006-267328 A1 | 10/2006 |
| JP | 2006-302091 A | 11/2006 |
| JP | 2006-318373 A | 11/2006 |
| JP | 2006-526185 A | 11/2006 |
| JP | 2007-4633 A | 1/2007 |
| JP | 2007-17990 A | 1/2007 |
| JP | 2007-500903 A | 1/2007 |
| JP | 2007-53796 A | 3/2007 |
| JP | 2007-79690 A | 3/2007 |
| JP | 2007-171534 A | 7/2007 |
| JP | 2007-193794 A | 8/2007 |
| JP | 2007-206317 A | 8/2007 |
| JP | 2007-264471 A | 10/2007 |
| JP | 2007-264792 A | 10/2007 |
| JP | 2007-264892 A | 10/2007 |
| JP | 2007-299352 A | 11/2007 |
| JP | 2007-322647 A | 12/2007 |
| JP | 2007-325089 A | 12/2007 |
| JP | 2008-009120 A | 1/2008 |
| JP | 200821002 A | 1/2008 |
| JP | 2008-26381 A | 2/2008 |
| JP | 2008-39928 A | 2/2008 |
| JP | 2008-58813 A | 3/2008 |
| JP | 2008-064687 A | 3/2008 |
| JP | 2008-90545 A | 4/2008 |
| JP | 2008-97003 A | 4/2008 |
| JP | 2008-134949 A | 6/2008 |
| JP | 2008-526101 A | 7/2008 |
| JP | 2008-185693 A | 8/2008 |
| JP | 2008-198022 A | 8/2008 |
| JP | 2008-217468 A | 9/2008 |
| JP | 2008-228129 A | 9/2008 |
| JP | 2008-233678 A | 10/2008 |
| JP | 2008-236448 A | 10/2008 |
| JP | 2008-252161 A | 10/2008 |
| JP | 2008-268684 A | 11/2008 |
| JP | 2008-271481 A | 11/2008 |
| JP | 2008-299221 A | 12/2008 |
| JP | 2009-503623 A | 1/2009 |
| JP | 2009-36999 A | 2/2009 |

(56) References Cited

FOREIGN PATENT DOCUMENTS

| | | |
|---|---|---|
| JP | 2009-47920 A | 3/2009 |
| JP | 2009-069062 A | 4/2009 |
| JP | 2009-98490 A | 5/2009 |
| JP | 2009-140444 A | 6/2009 |
| JP | 2009-186989 A | 8/2009 |
| JP | 2009-193448 A | 8/2009 |
| JP | 2009-193457 A | 8/2009 |
| JP | 2009-193532 A | 8/2009 |
| JP | 2009-205367 A | 9/2009 |
| JP | 2009-294913 A | 12/2009 |
| JP | 2009-294946 A | 12/2009 |
| JP | 2010-66519 A | 3/2010 |
| JP | 2010-78979 A | 4/2010 |
| JP | 2010-108378 A | 5/2010 |
| JP | 2010-518526 A | 5/2010 |
| JP | 2010-157207 A | 7/2010 |
| JP | 2010-224236 A | 10/2010 |
| JP | 4563106 B2 | 10/2010 |
| JP | 2010-535377 A | 11/2010 |
| JP | 2010-287063 A | 12/2010 |
| JP | 2011-41026 A | 2/2011 |
| JP | 2011-45005 A | 3/2011 |
| JP | 2011-59659 A | 3/2011 |
| JP | 2011-81541 A | 4/2011 |
| JP | 2011-525045 A | 9/2011 |
| JP | 2011-238022 A | 11/2011 |
| JP | 2012-014394 A | 1/2012 |
| JP | 2012-116442 A | 6/2012 |
| JP | 2012-147063 A | 8/2012 |
| JP | 2012-518847 A | 8/2012 |
| JP | 2013-511214 A | 3/2013 |
| JP | 2013-73240 A | 4/2013 |
| JP | 2013-080476 A | 5/2013 |
| JP | 2013-517566 A | 5/2013 |
| JP | 2013-134430 A | 7/2013 |
| JP | 2013-527947 A | 7/2013 |
| JP | 2014-077969 A | 5/2014 |
| KR | 10-1999-0073234 A | 10/1999 |
| KR | 2001-0093654 A | 10/2001 |
| KR | 10-2001-0102132 A | 11/2001 |
| KR | 2002-0013984 A | 2/2002 |
| KR | 2002-0057262 A | 7/2002 |
| KR | 2002-0064149 A | 8/2002 |
| KR | 2002-0069952 A | 9/2002 |
| KR | 2003-0016993 A | 3/2003 |
| KR | 10-2004-0014835 A | 2/2004 |
| KR | 10-2004-0044632 A | 5/2004 |
| KR | 10-2005-0083561 A | 8/2005 |
| KR | 10-2005-0090568 A | 9/2005 |
| KR | 10-2006-0011603 A | 2/2006 |
| KR | 10-2006-0012730 A | 2/2006 |
| KR | 10-2006-0055313 A | 5/2006 |
| KR | 10-2006-0073574 A | 6/2006 |
| KR | 10-2006-0091469 A | 8/2006 |
| KR | 10-2007-0024262 A | 3/2007 |
| KR | 10-2007-0071675 A | 7/2007 |
| KR | 10-2007-0094767 A | 9/2007 |
| KR | 10-0757496 B1 | 9/2007 |
| KR | 10-2007-0100837 A | 10/2007 |
| KR | 10-0776800 B1 | 11/2007 |
| KR | 10-0801227 B1 | 2/2008 |
| KR | 10-0810500 B1 | 3/2008 |
| KR | 10-0819928 B1 | 4/2008 |
| KR | 10-2008-0033070 A | 6/2008 |
| KR | 10-2008-0049647 A | 6/2008 |
| KR | 10-2008-0059332 A | 12/2008 |
| KR | 10-2008-0109322 A | 12/2008 |
| KR | 10-2009-0001716 A | 1/2009 |
| KR | 10-2009-0028464 A | 3/2009 |
| KR | 10-2009-0030117 A | 3/2009 |
| KR | 10-2009-0086805 A | 8/2009 |
| KR | 10-0920267 B1 | 10/2009 |
| KR | 10-2009-0122944 A | 12/2009 |
| KR | 10-2009-0127961 A | 12/2009 |
| KR | 10-2009-0129192 A | 12/2009 |
| KR | 10-2010-0015958 A | 2/2010 |
| KR | 10-2010-0048571 A | 5/2010 |
| KR | 10-2010-0119519 A | 11/2010 |
| KR | 10-2011-0043644 A | 4/2011 |
| KR | 10-1032792 B1 | 5/2011 |
| KR | 10-2011-0068490 A | 6/2011 |
| KR | 10-2011-0072847 A | 6/2011 |
| KR | 10-2011-0086492 A | 7/2011 |
| KR | 10-2011-0100620 A | 9/2011 |
| KR | 10-2011-0113414 A | 10/2011 |
| KR | 10-2011-0115134 A | 10/2011 |
| KR | 10-2012-0020164 A | 3/2012 |
| KR | 10-2012-0031722 A | 4/2012 |
| KR | 10-2012-0120316 A | 11/2012 |
| KR | 10-2012-0137435 A | 12/2012 |
| KR | 10-2012-0137440 A | 12/2012 |
| KR | 10-2012-0138826 A | 12/2012 |
| KR | 10-2012-0139827 A | 12/2012 |
| KR | 10-1193668 B1 | 12/2012 |
| NL | 1014847 C | 10/2001 |
| RU | 2273106 C2 | 3/2006 |
| RU | 2349970 C2 | 3/2009 |
| RU | 2353068 C2 | 4/2009 |
| RU | 2364917 C2 | 8/2009 |
| TW | 468323 B | 12/2001 |
| TW | 200601264 A | 1/2006 |
| TW | 200638337 A | 11/2006 |
| TW | 200643744 A | 12/2006 |
| TW | 200801988 A | 1/2008 |
| TW | I301373 B | 9/2008 |
| TW | M348993 U | 1/2009 |
| TW | 200943903 A | 10/2009 |
| TW | 201018258 A | 5/2010 |
| TW | 201027515 A1 | 7/2010 |
| TW | 201028996 A1 | 8/2010 |
| TW | 201110108 A1 | 3/2011 |
| TW | 2011-42823 A1 | 12/2011 |
| TW | 201227715 A1 | 7/2012 |
| TW | 201245989 A1 | 11/2012 |
| TW | 201312548 A1 | 3/2013 |
| WO | 1989/003139 A1 | 4/1989 |
| WO | 1993/020640 A1 | 10/1993 |
| WO | 1994/016434 A1 | 7/1994 |
| WO | 1994/029788 A1 | 12/1994 |
| WO | 1995/002221 A1 | 1/1995 |
| WO | 1995/016950 A1 | 6/1995 |
| WO | 1995/017746 A1 | 6/1995 |
| WO | 1996/003741 A1 | 2/1996 |
| WO | 1997/010586 A1 | 3/1997 |
| WO | 1997/026612 A1 | 7/1997 |
| WO | 1997/029614 A1 | 8/1997 |
| WO | 1997/038488 A1 | 10/1997 |
| WO | 1997/049044 A1 | 12/1997 |
| WO | 1998/009270 A1 | 3/1998 |
| WO | 1998/033111 A1 | 7/1998 |
| WO | 1998/041956 A1 | 9/1998 |
| WO | 1999/001834 A1 | 1/1999 |
| WO | 1999/008238 A1 | 2/1999 |
| WO | 1999/016181 A1 | 4/1999 |
| WO | 1999/056227 A1 | 11/1999 |
| WO | 2000/014727 A1 | 3/2000 |
| WO | 2000/014728 A1 | 3/2000 |
| WO | 2000/019697 A1 | 4/2000 |
| WO | 2000/022820 A1 | 4/2000 |
| WO | 2000/029964 A1 | 5/2000 |
| WO | 2000/030070 A2 | 5/2000 |
| WO | 2000/038041 A1 | 6/2000 |
| WO | 2000/041065 A1 | 7/2000 |
| WO | 2000/044173 A1 | 7/2000 |
| WO | 2000/060435 A2 | 10/2000 |
| WO | 2000/060435 A3 | 10/2000 |
| WO | 2000/063766 A1 | 10/2000 |
| WO | 2000/068936 A1 | 11/2000 |
| WO | 2001/006489 A1 | 1/2001 |
| WO | 2001/030046 A2 | 4/2001 |
| WO | 2001/030047 A2 | 4/2001 |
| WO | 2001/033569 A1 | 5/2001 |
| WO | 2001/035391 A1 | 5/2001 |
| WO | 2001/44912 A2 | 6/2001 |

(56) References Cited

FOREIGN PATENT DOCUMENTS

| | | |
|---|---|---|
| WO | 2001/046946 A1 | 6/2001 |
| WO | 2001/065413 A1 | 9/2001 |
| WO | 2001/067753 A1 | 9/2001 |
| WO | 2001/071480 A2 | 9/2001 |
| WO | 2002/010900 A2 | 2/2002 |
| WO | 2002/025610 A1 | 3/2002 |
| WO | 2002/031814 A1 | 4/2002 |
| WO | 2002/037469 A2 | 5/2002 |
| WO | 2002/049253 A2 | 6/2002 |
| WO | 2002/071259 A1 | 9/2002 |
| WO | 2002/073603 A1 | 9/2002 |
| WO | 2003/003152 A2 | 1/2003 |
| WO | 2003/003765 A1 | 1/2003 |
| WO | 2003/023786 A2 | 3/2003 |
| WO | 2003/036457 A2 | 5/2003 |
| WO | 2003/041364 A2 | 5/2003 |
| WO | 2003/049494 A1 | 6/2003 |
| WO | 2003/056789 A1 | 7/2003 |
| WO | 2003/067202 A2 | 8/2003 |
| WO | 2003/084196 A1 | 10/2003 |
| WO | 2003/094489 A1 | 11/2003 |
| WO | 2003/105125 A1 | 12/2003 |
| WO | 2003/107179 A1 | 12/2003 |
| WO | 2004/008801 A1 | 1/2004 |
| WO | 2004/025938 A1 | 3/2004 |
| WO | 2004/047415 A1 | 6/2004 |
| WO | 2004/055637 A2 | 7/2004 |
| WO | 2004/057486 A1 | 7/2004 |
| WO | 2004/061850 A1 | 7/2004 |
| WO | 2004/072846 A2 | 8/2004 |
| WO | 2004/084413 A2 | 9/2004 |
| WO | 2005/003920 A2 | 1/2005 |
| WO | 2005/008505 A1 | 1/2005 |
| WO | 2005/008899 A1 | 1/2005 |
| WO | 2005/010725 A2 | 2/2005 |
| WO | 2005/027472 A2 | 3/2005 |
| WO | 2005/027485 A1 | 3/2005 |
| WO | 2005/031737 A1 | 4/2005 |
| WO | 2005/034082 A1 | 4/2005 |
| WO | 2005/034085 A1 | 4/2005 |
| WO | 2005/041455 A1 | 5/2005 |
| WO | 2005/089895 A1 | 6/2005 |
| WO | 2005/064592 A1 | 7/2005 |
| WO | 2005/069171 A1 | 7/2005 |
| WO | 2005/101176 A2 | 10/2005 |
| WO | 2006/020305 A2 | 2/2006 |
| WO | 2006/037545 A2 | 4/2006 |
| WO | 2006/054724 A1 | 5/2006 |
| WO | 2006/056822 A1 | 6/2006 |
| WO | 2006/078246 A1 | 7/2006 |
| WO | 2006/084144 A2 | 8/2006 |
| WO | 2006/101649 A2 | 9/2006 |
| WO | 2006/129967 A1 | 12/2006 |
| WO | 2006/133571 A1 | 12/2006 |
| WO | 2007/002753 A2 | 1/2007 |
| WO | 2007/036762 A1 | 4/2007 |
| WO | 2007/080559 A2 | 7/2007 |
| WO | 2007/083894 A1 | 7/2007 |
| WO | 2007/125151 A1 | 11/2007 |
| WO | 2008/030970 A2 | 3/2008 |
| WO | 2008/071231 A1 | 6/2008 |
| WO | 2008/085742 A2 | 7/2008 |
| WO | 2008/098900 A2 | 8/2008 |
| WO | 2008/109835 A2 | 8/2008 |
| WO | 2008/120036 A1 | 10/2008 |
| WO | 2008/130095 A1 | 10/2008 |
| WO | 2008/140236 A1 | 11/2008 |
| WO | 2008/142472 A1 | 11/2008 |
| WO | 2008/153639 A1 | 12/2008 |
| WO | 2009/009240 A2 | 1/2009 |
| WO | 2009/016631 A2 | 2/2009 |
| WO | 2009/017280 A1 | 2/2009 |
| WO | 2009/075912 A1 | 6/2009 |
| WO | 2009/104126 A1 | 8/2009 |
| WO | 2009/156438 A1 | 12/2009 |
| WO | 2009/156978 A1 | 12/2009 |
| WO | 2010/054373 A2 | 5/2010 |
| WO | 2010/075623 A1 | 7/2010 |
| WO | 2010/141802 A1 | 12/2010 |
| WO | 2011/057346 A1 | 5/2011 |
| WO | 2011/060106 A1 | 5/2011 |
| WO | 2011/088053 A2 | 7/2011 |
| WO | 2011/093025 A1 | 8/2011 |
| WO | 2011/116309 A1 | 9/2011 |
| WO | 2011/133543 A1 | 10/2011 |
| WO | 2011/150730 A1 | 12/2011 |
| WO | 2011/163350 A1 | 12/2011 |
| WO | 2012/129231 A1 | 9/2012 |
| WO | 2012/135157 A2 | 10/2012 |
| WO | 2012/154317 A1 | 11/2012 |
| WO | 2012/155079 A2 | 11/2012 |
| WO | 2012/167168 A2 | 12/2012 |
| WO | 2013/022135 A1 | 2/2013 |
| WO | 2013/048880 A1 | 4/2013 |
| WO | 2013/169842 A2 | 11/2013 |
| WO | 2013/173511 A2 | 11/2013 |
| WO | 2013/184953 A1 | 12/2013 |
| WO | 2014/022148 A1 | 2/2014 |
| WO | 2014/028797 A1 | 2/2014 |
| WO | 2014/031505 A1 | 2/2014 |
| WO | 2014/066352 A1 | 5/2014 |
| WO | 2014/078965 A1 | 5/2014 |
| WO | 2014/143959 A2 | 9/2014 |
| WO | 2014/144579 A1 | 9/2014 |
| WO | 2014/159581 A1 | 10/2014 |
| WO | 2014/197336 A1 | 12/2014 |
| WO | 2014/204659 A2 | 12/2014 |
| WO | 2015/030796 A1 | 3/2015 |
| WO | 2015/041892 A1 | 3/2015 |
| WO | 2015/084659 A1 | 6/2015 |
| WO | 2015/094369 A1 | 6/2015 |
| WO | 2015/183401 A1 | 12/2015 |
| WO | 2016/075081 A1 | 5/2016 |

OTHER PUBLICATIONS

"SmartThings +Amazon Echo", Smartthings Samsung [online], Available online at <https://web.archive.org/web/20160509231428/https://blog.smartthings.com/featuted/alexa-turn-on-my-smart-things/>, Aug. 21, 2015, 3 pages.
"The world of Virtual Assistants—more SemTech . . . ", End of Business as Usual—Glenn's External blog, Online Available at <https://web.archive.org/web/20091101840940/http://glennas.wordpress.com/2009/10/17/the-world-of-virtual-assistants-more-semtech/>, Oct. 17, 2009, 5 pages.
Anania, Peter, "Amazon Echo with Home Automation (Smart-things)", Available online at https://www.youtube.com/watch?v=LMW6aXmsWNE, Dec. 20, 2015, 1 page.
Castleos, "Whole House Voice Control Demonstration", available online at : https://www.youtube.com/watch?v=9SRCoxrZ_W4, Jun. 2, 2012, 26 pages.
Chelba et al., "Structured Language Modeling for Speech Recognition", Available online at : http://arxiv.org/pdf/cs/0001023.pdf, Jan. 25, 2000, 7 pages.
Deedeevuu, "Amazon Echo Alarm Feature", Available online at https://www.youtube.com/watch?v=fdjU8eRLk7c, Feb. 16, 2015, 1 page.
Eagle et al, "Social Serendipity: Proximity Sensing and Cueing", MIT Media Laboratory Technical Note 580, May 2004, 18 pages.
Extended European Search Report (includes Partial European Search Report and European Search Opinion) received for European Patent Application No. 16150079.8, dated Feb. 18, 2016, 7 pages.
Extended European Search Report received for European Patent Application No. 11707939.2, dated Nov. 18, 2016, 13 pages.
Extended European Search Report received for European Patent Application No. 13726938.7, dated Dec. 14, 2015, 8 pages.
Extended European Search Report received for European Patent Application No. 13770552.1, dated Jan. 7, 2016, 5 pages.

(56) References Cited

OTHER PUBLICATIONS

Extended European Search Report received for European Patent Application No. 14719914.5, dated Oct. 10, 2016, 7 pages.
Extended European Search Report received for European Patent Application No. 14737370.8, dated May 19, 2016, 12 pages.
Extended European Search Report received for European Patent Application No. 16186308.9, dated Jan. 16, 2017, 9 pages.
Extended European Search Report received for European Patent Application No. 16188272.5, dated Nov. 18, 2016, 12 pages.
Extended European Search Report received for European Patent Application No. 16198245.9, dated Feb. 22, 2017, 13 pages.
Extended Search Report received for European Patent Application No. 16188055.4, dated Dec. 22, 2016, 8 pages.
Gomez et al., "Mouth Gesture and Voice Command Based Robot Command Interface", IEEE International Conference on Robotics and Automation, May 12-17, 2009, pp. 333-338.
Gruber et al., "Siri, a Virtual Personal Assistant Bringing Intelligence to the Interface", Available at URL:https://web.archive.org/web/20090824055846/http://tomgruber.org/writing/Siri-SemTech09.pdf, Aug. 24, 2009, 21 pages.
Hashimoto, Yoshiyuki , "Simple Guide for iPhone Siri, Which Can Be Operated with Your Voice", Shuwa System Co., Ltd., vol. 1, Jul. 5, 2012, pp. 8, 130, 131.
Huang et al., "A Novel Approach to Robust Speech Endpoint Detection in Car Environments", Acoustics, Speech, and Signal Processing 2000, ICASSP '00, Proceeding S. 2000 IEEE International Conference on Jun. 5-9, 2000, vol. 3, Jun. 5, 2000, pp. 1751-1754.
International Preliminary Report on Patentability received for PCT Patent Application No. PCT/US2015/023089, dated Jan. 12, 2017, 12 pages.
International Preliminary Report on Patentability received for PCT Patent Application No. PCT/US2015/023097, dated Jan. 12, 2017, 11 pages.
International Preliminary Report on Patentability received for PCT Patent Application No. PCT/US2015/023593, dated Dec. 15, 2016, 12 pages.
International Preliminary Report on Patentability received for PCT Patent Application No. PCT/US2015/029554, dated Dec. 29, 2016, 8 pages.
International Preliminary Report on Patentability Received for PCT Patent Application No. PCT/US2015/032470, dated Dec. 15, 2016, 9 pages.
International Preliminary Report on Patentability received for PCT Patent Application No. PCT/US2015/032724, dated Dec. 15, 2016, 8 pages.
International Preliminary Report on Patentability received for PCT Patent Application No. PCT/US2015/033051, dated Dec. 15, 2016, 10 pages.
International Preliminary Report on Patentability received for PCT Patent Application No. PCT/US2015/047062, dated Mar. 9, 2017, 18 pages.
International Search Report & Written Opinion received for PCT Patent Application No. PCT/US2016/021410, dated Jul. 26, 2016, 19 pages.
International Search Report and Written Opinion received for PCT Patent Application No. PCT/US16/23312, dated Jun. 27, 2016, 7 pages.
International Search Report and Written Opinion received for PCT Patent Application No. PCT/US2015/029554, dated Jul. 16, 2015, 11 pages.
International Search Report and Written Opinion received for PCT Patent Application No. PCT/US2015/047584, dated Nov. 9, 2015, 10 pages.
International Search Report and Written Opinion received for PCT Patent Application No. PCT/US2015/053366, dated Apr. 26, 2016, 16 pages.
International Search Report and Written Opinion received for PCT Patent Application No. PCT/US2016/021103, dated Jun. 8, 2016, 15 pages.
International Search Report and Written Opinion received for PCT Patent Application No. PCT/US2016/021104, dated Jun. 8, 2016, 15 pages.
International Search Report and Written opinion received for PCT Patent Application No. PCT/US2016/021409, dated May 26, 2016, 22 pages.
International Search report and Written Opinion received for PCT Patent Application No. PCT/US2016/024666, dated Jun. 10, 2016, 13 pages.
International Search Report and Written Opinion received for PCT Patent Application No. PCT/US2016/025404, dated Jun. 24, 2016, 21 pages.
International Search Report and Written Opinion received for PCT Patent Application No. PCT/US2016/025407, dated Jun. 23, 2016, 18 pages.
International Search Report and Written Opinion received for PCT Patent Application No. PCT/US2016/025408, dated Aug. 11, 2016, 19 pages.
International Search Report and Written Opinion received for PCT Patent Application No. PCT/US2016/031550, dated Aug. 4, 2016, 13 pages.
International Search Report and Written Opinion received for PCT Patent Application No. PCT/US2016/035112, dated Aug. 22, 2016, 21 pages.
International Search Report and Written Opinion Received for PCT Patent Application No. PCT/US2016/047184, dated Jan. 17, 2017, 22 pages.
International Search Report and Written Opinion received for PCT Patent Application No. PCT/US2016/047215, dated Oct. 24, 2016, 18 pages.
Invitation to Pay Additional Fee Received for PCT Patent Application No. PCT/US2016/047184, dated Dec. 6, 2016, 9 pages.
Invitation to Pay Additional Fees received for PCT Application No. PCT/US2016/021410, dated Apr. 28, 2016, 2 pages.
Invitation to pay additional fees received for PCT Patent Application No. PCT/US2014/029562, dated Jul. 4, 2014, 7 pages.
Invitation to Pay Additional Fees received for PCT Patent Application No. PCT/US2014/040393, dated Sep. 17, 2014, 7 pages.
Invitation to Pay Additional Fees received for PCT Patent Application No. PCT/US2015/047281, dated Oct. 8, 2015, 6 pages.
Invitation to Pay Additional Fees received for PCT Patent Application No. PCT/US2015/053366, dated Feb. 19, 2016, 8 pages.
Invitation to Pay Additional Fees received for PCT Patent Application No. PCT/US2016/025408, dated May 13, 2016, 2 pages.
Invitation to Pay Additional Fees received for PCT Patent Application No. PCT/US2014/028785, dated Jul. 4, 2014, 7 pages.
Invitation to pay additional fees received for the PCT Patent Application No. PCT/US2014/015418, dated May 26, 2014, 5 pages.
James, Frankie, "Lessons from Developing Audio HTML Interfaces", The Third International ACM Conference on Assistive Technologies, 1998, 8 pages.
Jensvoll, Maja Henriette, "The Acquisition of Past Tense in English/Norwegian Bilingual Children Single versus Dual Mechanisms", Proceedings of the 19th Scandinavian Conference of Linguistics, vol. 31, No. 3, 2003, pp. 545-557.
Kanda et al., "Robust Domain Selection Using Dialogue History in Multi-domain Spoken Dialogue Systems", Journal of Information Processing Society, vol. 48, No. 5, May 15, 2007, pp. 1980-1989. (English Abstract Submitted).
Kanda et al., "Spoken Language Understanding Using Dialogue Context in Database Search Task", Journal of Information Processing Society of Japan, vol. 47, No. 6, Jun. 15. 2016, pp. 1802-1811. (English Abstract Submitted).
Katzenmaier et al., "Identifying the Addressee in Human-Human-Robot Interactions based on Head Pose and Speech", Proc. ICMI '04, ACM, 2004, pp. 144-151.
Komatani et al., "Multi-domain Spoken Dialogue System with Extensibility and Robustness Against Speech Recognition Errors", Proceedings of the 7th SIGdial Workshop on Discourse and Dialogue, Association for Computational Linguistics, Jul. 2006, pp. 9-17.

(56) References Cited

OTHER PUBLICATIONS

Külekci et al., "Turkish Word Segmentation Using Morphological Analyzer", 7th European Conference on Speech Communication and Technology, 2nd Interspeech Event, 2001, 4 pages.
Merlin et al., "Non Directly Acoustic Process for Costless Speaker Recognition and Indexation", International Workshop on Intelligent Communication Technologies and Applications, Jan. 1, 1999, 5 pages.
Morrison, Jonathan, "iPhone 5 Siri Demo", Online Available at <https://www.youtube.com/watch?v=_wHWwG5lhWc>, Sep. 21, 2012, 3 pages.
Pathak et al., "Privacy-preserving Speech Processing: Cryptographic and String-matching Frameworks Show Promise", In: IEEE signal processing magazine, retrieved from <http://www.merl.com/publications/docs/TR2013-063.pdf>, Feb. 13, 2013, 16 pages.
Pollock, Stephen, "A Rule-Based Message Filtering System", Published in: Journal, ACM Transactions on Information Systems (TOIS), vol. 6, Issue 3, Jul. 1988, pp. 232-254.
Powell, Josh, "Now You See Me . . . Show/Hide Performance", available at http://www.learningjquery.com/2010/05/now-you-see-me-showhide-performance, May 4, 2010, 3 pages.
Routines, "SmartThings Support", Available online at <https://web.archive.org/web/20151207165701/https://support.smartthings.com/hc/en-us/articles/205380034-Routines>, 2015, 2 pages.
Ruch et al., "Using Lexical Disambiguation and Named-Entity Recognition to Improve Spelling Correction in the Electronic Patient Record", Artificial Intelligence in Medicine, Sep. 2003, pp. 169-184.
Schultz, Tanja, "Speaker Characteristics", In: Speaker Classification I, retrieved from <http://ccc.inaoep.mx/~villasen/bib/Speaker%20Characteristics.pdf>, 2007, pp. 47-74.
Spivack, Nova, "Sneak Preview of Siri—Part Two—Technical Foundations—Interview with Tom Gruber, CTO of Siri", Online Available at <https://web.archive.org/web/20100114234454/http://www.twine.com/item/12vhy39k4-22m/interview-with-tom-gruber-of-siri>, Jan. 14, 2010, 5 pages.
Ushida et al., "Spoken Dialogue Engine based on Autonomous Behavior Decision Model", Omron Technics, vol. 40, No. 1, 2000, pp. 16-21. {See Communication under 37 CFR § 1.98(a) (3)}.
Ware et al., "The DragMag Image Magnifier", CHI '95 Mosaic of Creativity, May 7-11, 1995, pp. 407-408.
Zangerle et al., "Recommending #-Tag in Twitter", Proceedings of the Workshop on Semantic Adaptive Socail Web, 2011, pp. 1-12.
2004 Chrysler Pacifica: U-Connect Hands-Free Communication System, The Best and Brightest of 2004, Brief Article, Automotive Industries, Sep. 2003, 1 page.
2007 Lexus GS 450h 4dr Sedan (3.5L 6cyl Gas/Electric Hybrid CVT), available at <http://review.cnet.com/4505-10865_16-31833144.html>, retrieved on Aug. 3, 2006, 10 pages.
Abcom Pty. Ltd. "12.1" 925 Candela Mobile PC", LCDHardware.com, available at <http://www.lcdhardware.com/panel/12_1_panel/default.asp.>, retrieved on Dec. 19, 2002, 2 pages.
ABF Software, "Lens-Magnifying Glass 1.5", available at <http://download.com/3000-2437-10262078.html?tag=1st-0-1>, retrieved on Feb. 11, 2004, 1 page.
Abut et al., "Low-Rate Speech Encoding Using Vector Quantization and Subband Coding", (Proceedings of the IEEE international Acoustics, Speech and Signal Processing Conference, Apr. 1986), as reprinted in Vector Quantization IEEE Press, 1990, pp. 312-315.
Abut et al., "Vector Quantization of Speech and Speech-Like Waveforms", (IEEE Transactions on Acoustics, Speech, and Signal Processing, Jun. 1982), as reprinted in Vector Quantization (IEEE Press, 1990), 1990, pp. 258-270.
Acero et al., "Environmental Robustness in Automatic Speech Recognition", International Conference on Acoustics, Speech and Signal Processing (ICASSP'90), Apr. 1990, 4 pages.
Acero et al., "Robust Speech Recognition by Normalization of the Acoustic Space", International Conference on Acoustics, Speech and Signal Processing, 1991, 4 pages.

Adium, "AboutAdium—Adiurn X—Trac", available at <http://web.archive.org/web/20070819113247/http://trac.adiumx.com/wiki/AboutAdium>, retrieved on Nov. 25, 2011, 2 pages.
Adobe.com, "Reading PDF Documents with Adobe Reader 6.0—A Guide for People with Disabilities", Available online at "https://www.adobe.com/enterprise/accessibility/pdfs/acro6_cg_ue.pdf", Jan. 2004, 76 pages.
Agnas et al., "Spoken Language Translator: First-Year Report", SICS (ISSN 0283-3638), SRI and Telia Research AB, Jan. 1994, 161 pages.
Ahlberg et al., "The Alphaslider: A Compact and Rapid Selector", CHI '94 Proceedings of the SIGCHI Conference on Human Factors in Computing Systems, Apr. 1994, pp. 365-371.
Ahlberg et al., "Visual Information Seeking: Tight Coupling of Dynamic Query Filters with Starfield Displays", Proceedings of the SIGCHI Conference on Human Factors in Computing Systems, Apr. 24-28, 1994, pp. 313-317.
Ahlbom et al., Modeling Spectral Speech Transitions Using Temporal Decomposition Techniques, IEEE International Conference of Acoustics, Speech and Signal Processing (ICASSP'87), vol. 12, Apr. 1987, 4 page.
Ahlstrom et al., "Overcoming Touchscreen User Fatigue by Workplace Design", CHI '92 Posters and Short Talks of the 1992 SIGCHI Conference on Human Factors in Computing Systems, 1992, pp. 101-102.
Ahmed et al., "Intelligent Natural Language Query Processor", TENCON '89, Fourth IEEE Region 10 International Conference, Nov. 22-24, 1989, pp. 47-49.
Ahuja et al., "A Comparison of Application Sharing Mechanisms in Real-Time Desktop Conferencing Systems", At&T Bell Laboratories, 1990, pp. 238-248.
Aikawa et al., "Generation for Multilingual MT", available at <http://mtarchive.info/MTS-2001-Aikawa.pdf>, retrieved on Sep. 18, 2001, 6 pages.
Aikawa et al., "Speech Recognition Using Time-Warping Neural Networks", Proceedings of the 1991, IEEE Workshop on Neural Networks for Signal Processing, 1991, 10 pages.
Aikawa, K. "Time-Warping Neural Network for Phoneme Recognition", IEEE International Joint Conference on Neural Networks, vol. 3, Nov. 18-21, 1991, pp. 2122-2127.
Alfred App, "Alfred", available at <http://www.alfredapp.com/>, retrieved on Feb. 8, 2012, 5 pages.
All Music Website, available at <http://www.allmusic.com/>, retrieved on Mar. 19, 2007, 2 pages.
Allen et al., "Automated Natural Spoken Dialog", Computer, vol. 35, No. 4, Apr. 2002, pp. 51-56.
Allen, J., "Natural Language Understanding", 2nd Edition, The Benjamin/Cummings Publishing Company, Inc., 1995, 671 pages.
Alleva et al., "Applying SPHINX-II to DARPA Wall Street Journal CSR Task", Proceedings of Speech and Natural Language Workshop, Feb. 1992, pp. 393-398.
Alshawi et al., "CLARE: A Contextual Reasoning and Co-operative Response Framework for the Core Language Engine", SRI International, Cambridge Computer Science Research Centre, Cambridge, Dec. 1992, 273 pages.
Alshawi et al., "Declarative Derivation of Database Queries from Meaning Representations", Proceedings of the BANKAI Workshop on Intelligent Information Access, Oct. 1991, 12 pages.
Alshawi et al., "Logical Forms in the Core Language Engine", Proceedings of the 27th Annual Meeting of the Association for Computational Linguistics, 1989, pp. 25-32.
Alshawi et al., "Overview of the Core Language Engine", Proceedings of Future Generation Computing Systems, Tokyo, Sep. 1988, 13 pages.
Alshawi, H., "Translation and Monotonic Interpretation/Generation", SRI International, Cambridge Computer Science Research Centre, Cambridge, available at <http://www.cam.sri.com/tr/crc024/paper.ps.Z1992>, Jul. 1992, 18 pages.
Amano et al., "A User-friendly Multimedia Book Authoring System", The Institute of Electronics, Information and Communication Engineers Technical Report, vol. 103, No. 416, Nov. 2003, pp. 33-40.

(56) References Cited

OTHER PUBLICATIONS

Amano, Junko, "A User-Friendly Authoring System for Digital Talking Books", IEICE Technical Report, The Institute of Electronics, Information and Communication Engineers, vol. 103 No. 418, Nov. 6, 2003, pp. 33-40.
Ambite et al., "Design and Implementation of the CALO Query Manager", American Association for Artificial Intelligence, 2006, 8 pages.
Ambite et al., "Integration of Heterogeneous Knowledge Sources in the CALO Query Manager", The 4th International Conference on Ontologies, Databases and Applications of Semantics (ODBASE), 2005, 18 pages.
Amrel Corporation, "Rocky Matrix BackLit Keyboard", available at <http://www.amrel.com/asi_matrixkeyboard.html>, retrieved on Dec. 19, 2002, 1 page.
Anastasakos et al., "Duration Modeling in Large Vocabulary Speech Recognition", International Conference on Acoustics, Speech and Signal Processing (ICASSP'95), May 1995, pp. 628-631.
Anderson et al., "Syntax-Directed Recognition of Hand-Printed Two-Dimensional Mathematics", Proceedings of Symposium on Interactive Systems for Experimental Applied Mathematics: Proceedings of the Association for Computing Machinery Inc. Symposium, 1967, 12 pages.
Anhui USTC IFl Ytek Co. Ltd., "Flytek Research Center Information Datasheet", available at <http://www.iflttek.com/english/Research.htm>, retrieved on Oct. 15, 2004, 3 pages.
Ansari et al., "Pitch Modification of Speech using a Low-Sensitivity Inverse Filter Approach", IEEE Signal Processing Letters, vol. 5, No. 3, Mar. 1998, pp. 60-62.
Anthony et al., "Supervised Adaption for Signature Verification System", IBM Technical Disclosure, Jun. 1, 1978, 3 pages.
API.AI, "Android App Review—Speaktoit Assistant", Available at <https://www.youtube.com/watch?v=myE498nyfGw>, Mar. 30, 2011, 3 pages.
Appelt et al., "Fastus: A Finite-State Processor for Information Extraction from Real-world Text", Proceedings of IJCAI, 1993, 8 pages.
Appelt et al., "SRI International Fastus System MUC-6 Test Results and Analysis", SRI International, Menlo Park, California, 1995, 12 pages.
Appelt et al., "SRI: Description of the JV-FASTUS System used for MUC-5", SRI International, Artificial Intelligence Center, 1993, 19 pages.
Apple Computer, "Guide Maker User's Guide", Apple Computer, Inc., Apr. 27, 1994, 8 pages.
Apple Computer, "Introduction to Apple Guide", Apple Computer, Inc., Apr. 28, 1994, 20 pages.
Apple Computer, "Knowledge Navigator", published by Apple Computer no later than 2008, as depicted in Exemplary Screenshots from video entitled 'Knowledge Navigator', 2008, 7 pages.
Apple Computer, Inc., "Apple—iPod—Technical Specifications, iPod 20GB and 60GB Mac + PC", available at <http://www.apple.com/ipod/color/specs.html>, 2005, 3 pages.
Apple Computer, Inc., "Apple Announces iTunes 2", Press Release, Oct. 23, 2001, 2 pages.
Apple Computer, Inc., "Apple Introduces iTunes—World's Best and Easiest to Use Jukebox Software", Macworld Expo, Jan. 9, 2001, 2 pages.
Apple Computer, Inc., "Apple's iPod Available in Stores Tomorrow", Press Release, Nov. 9, 2001, 1 page.
Apple Computer, Inc., "Inside Macintosh", vol. VI, 1985.
Apple Computer, Inc., "iTunes 2, Playlist Related Help Screens", iTunes v2.0, 2000-2001, 8 pages.
Apple Computer, Inc., "iTunes 2: Specification Sheet", 2001, 2 pages.
Apple Computer, Inc., "iTunes, Playlist Related Help Screens", iTunes v1.0 2000-2001, 8 pages.
Apple Computer, Inc., "QuickTime Movie Playback Programming Guide", Aug. 11, 2005, pp. 1-58.
Apple Computer, Inc., "QuickTime Overview", Aug. 11 2005, pp. 1-34.
Apple Computer, Inc., "Welcome to Tiger", available at <http://www.maths.dundee.ac.uk/software/Welcome_to_Mac_OS_X_v10.4_Tiger.pdf>, 2005, pp. 1-32.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Apple, "VoiceOver", available at <http://www.apple.com/accessibility/voiceover/>, Feb. 2009, 5 pages.
Applebaum et al., "Enhancing the Discrimination of Speaker Independent Hidden Markov Models with Corrective Training", International Conference on Acoustics, Speech, and Signal Processing, May 23, 1989, pp. 302-305.
AppleEvent Manager, which is described in the publication Inside Macintosh vol. VI, available from Addison-Wesley Publishing Company, 1985.
Arango et al., "Touring Machine: A Software Platform for Distributed Multimedia Applications", 1992 IFIP International Conference on Upper Layer Protocols, Architectures, and Applications, May 1992, pp. 1-11.
Archbold et al., "A Team User's Guide", SRI International, Dec. 21, 1981, 70 pages.
Arons, Barry M., "The Audio-Graphical Interface to a Personal Integrated Telecommunications System", Thesis Submitted to the Department of Architecture at the Massachusetts Institute of Technology, Jun. 1984, 88 pages.
Asanovic et al., "Experimental Determination of Precision Requirements for Back-Propagation Training of Artificial Neural Networks", Proceedings of the 2nd International Conference of Microelectronics for Neural Networks, 1991, www.ICSI.Berkelev.EDU, 1991, 7 pages.
Atal et al., "Efficient Coding of LPC Parameters by Temporal Decomposition", IEEE International Conference on Acoustics, Speech and Signal Processing (ICASSP'83), Apr. 1983, 4 pages.
Badino et al., "Language Independent Phoneme Mapping for Foreign TTS", 5th ISCA Speech Synthesis Workshop, Pittsburgh, PA, Jun. 14-16, 2004, 2 pages.
Baechtle et al., "Adjustable Audio Indicator", IBM Technical Disclosure Bulletin, Jul. 1, 1984, 2 pages.
Baeza-Yates, Ricardo, "Visualization of Large Answers in Text Databases", AVI '96 Proceedings of the Workshop on Advanced Visual Interfaces, 1996, pp. 101-107.
Bahl et al., "A Maximum Likelihood Approach to Continuous Speech Recognition", IEEE Transaction on Pattern Analysis and Machine Intelligence, vol. PAMI-5, No. 2, Mar. 1983, 13 pages.
Bahl et al., "A Tree-Based Statistical Language Model for Natural Language Speech Recognition", IEEE Transactions on Acoustics, Speech and Signal Processing, vol. 37, No. 7, Jul. 1989, 8 pages.
Bahl et al., "Acoustic Markov Models Used in the Tangora Speech Recognition System", Proceeding of International Conference on Acoustics, Speech and Signal Processing (ICASSP'88), vol. 1, Apr. 1988, 4 pages.
Bahl et al., "Large Vocabulary Natural Language Continuous Speech Recognition", Proceedings of 1989 International Conference on Acoustics, Speech and Signal Processing, vol. 1, May 1989, 6 pages.
Bahl et al., "Multonic Markov Word Models for Large Vocabulary Continuous Speech Recognition", IEEE Transactions on Speech and Audio Processing, vol. 1, No. 3, Jul. 1993, 11 pages.
Bahl et al., "Recognition of a Continuously Read Natural Corpus", IEEE International Conference on Acoustics, Speech, and Signal Processing, vol. 3, Apr. 1978, pp. 422-424.
Bahl et al., "Speech Recognition with Continuous-Parameter Hidden Markov Models", Proceeding of International Conference on Acoustics, Speech and Signal Processing (ICASSP'88), vol. 1, Apr. 1988, 8 pages.
Bajarin, Tim, "With Low End Launched, Apple Turns to Portable Future", PC Week, vol. 7, Oct. 1990, p. 153(1).
Banbrook, M., "Nonlinear Analysis of Speech from a Synthesis Perspective", A Thesis Submitted for the Degree of Doctor of Philosophy, The University of Edinburgh, Oct. 15, 1996, 35 pages.

(56) References Cited

OTHER PUBLICATIONS

Barrett et al., "How to Personalize the Web", 1997 in proceddings of the ACM SIGCHI Conference on Human Factors in Computer Systems, Mar. 22-27, 1997, pp. 75-82.
Barthel, B., "Information Access for Visually Impaired Persons: Do We Still Keep a "Document" in "Documentation"?", Professional Communication Conference, Sep. 1995, pp. 62-66.
Baudel et al., "2 Techniques for Improved HC Interaction: Toolglass & Magic Lenses: The See-Through Interface", Apple Inc., Video Clip, CHI'94 Video Program on a CD, 1994.
Bear et al., "A System for Labeling Self-Repairs in Speech", SRI International, Feb. 22, 1993, 9 pages.
Bear et al., "Detection and Correction of Repairs in Human-Computer Dialog", SRI International, May 1992, 11 pages.
Bear et al., "Integrating Multiple Knowledge Sources for Detection and Correction of Repairs in Human-Computer Dialog", Proceedings of the 30th Annual Meeting on Association for Computational Linguistics (ACL), 1992, 8 pages.
Bear et al., "Using Information Extraction to Improve Document Retrieval", SRI International, Menlo Park, California, 1998, 11 pages.
Beck et al., "Integrating Natural Language, Query Processing, and Semantic Data Models", COMCON Spring '90. IEEE Computer Society International Conference, 1990, Feb. 26-Mar. 2, 1990, pp. 538-543.
Bederson et al., "Pad++: A Zooming Graphical Interface for Exploring Alternate Interface Physics", UIST' 94 Proceedings of the 7th Annual ACM symposium on User Interface Software and Technology, Nov. 1994, pp. 17-26.
Bederson et al., "The Craft of Information Visualization", Elsevier Science, Inc., 2003. 435 pages.
Belaid et al., "A Syntactic Approach for Handwritten Mathematical Formula Recognition", IEEE Transactions on Pattern Analysis and Machine Intelligence, vol. PAMI-6, No. 1, Jan. 1984, 7 pages.
Bellegarda et al., "A Latent Semantic Analysis Framework for Large-Span Language Modeling", 5th European Conference on Speech, Communication and Technology (EUROSPEECH'97), Sep. 1997, 4 pages.
Bellegarda et al., "A Muitispan Language Modeling Framework for Large Vocabulary Speech Recognition", IEEE Transactions on Speech and Audio Processing, vol. 6, No. 5, Sep. 1998, 12 pages.
Bellegarda et al., "A Novel Word Clustering Algorithm Based on Latent Semantic Analysis", Proceedings of the IEEE International Conference on Acoustics, Speech and Signal Processing (ICASSP'96), vol. 1, 1996, 4 pages.
Bellegarda et al., "Experiments Using Data Augmentation for Speaker Adaptation", International Conference on Acoustics, Speech and Signal Processing (ICASSP'95), May 1995, 4 pages.
Bellegarda et al., "On-Line Handwriting Recognition using Statistical Mixtures", Advances in Handwriting and Drawings: A Multidisciplinary Approach, Europia, 6th International IGS Conference on Handwriting and Drawing, Paris, France, Jul. 1993, 11 pages.
Bellegarda et al., "Performance of the IBM Large Vocabulary Continuous Speech Recognition System on the ARPA Wall Street Journal Task", Signal Processing VII: Theories and Applications, European Association for Signal Processing, 1994, 4 pages.
Bellegarda et al., "The Metamorphic Algorithm: A Speaker Mapping Approach to Data Augmentation", IEEE Transactions on Speech and Audio Processing, vol. 2, No. 3, Jul. 1994, 8 pages.
Bellegarda et al., "Tied Mixture Continuous Parameter Modeling for Speech Recognition", IEEE Transactions on Acoustics, Speech and Signal Processing, vol. 38, No. 12, Dec. 1990, pp. 2033-2045.
Bellegarda, Jerome R. "Latent Semantic Mapping", IEEE Signal Processing Magazine, vol. 22, No. 5, Sep. 2005, pp. 70-80.
Bellegarda, Jerome R., "Exploiting both Local and Global Constraints for Multi-Span Statistical Language Modeling", Proceeding of the 1998 IEEE International Conference on Acoustics, Speech and Signal Processing (1CASSP'98), vol. 2, May 1998, 5 pages.
Bellegarda, Jerome R., "Exploiting Latent Semantic Information in Statistical Language Modeling", Proceedings of the IEEE, vol. 88, No. 8, Aug. 2000, 18 pages.
Bellegarda, Jerome R., "Interaction-Driven Speech Input—A Data-Driven Approach to the Capture of both Local and Global Language Constraints", available at <http://old.sig.chi.ora/bulletin/1998.2/bellegarda.html>, 1992, 7 pages.
Bellegarda, Jerome R., "Large Vocabulary Speech Recognition with Multispan Statistical Language Models", IEEE Transactions on Speech and Audio Processing, vol. 8, No. 1, Jan. 2000, 9 pages.
Belvin et al., "Development of the HRL Route Navigation Dialogue System", Proceedings of the First International Conference on Human Language Technology Research, Paper, 2001, 5 pages.
Benel et al., "Optimal Size and Spacing of Touchscreen Input Areas", Human-Computer Interaction—Interact, 1987, pp. 581-585.
Bergmann et al., "An adaptable man-machine interface using connected-word recognition", 2nd European Conference on Speech Communication and Technology (Eurospeech 91), vol. 2, XP002176387, Sep. 24-26, 1991, pp. 467-470.
Beringer et al., "Operator Behavioral Biases Using High-Resolution Touch Input Devices", Proceedings of the Human Factors and Ergonomics Society 33rd Annual Meeting, 1989, 3 pages.
Beringer, Dennis B., "Target Size, Location, Sampling Point and Instruction Set: More Effects on Touch Panel Operation", Proceedings of the Human Factors and Ergonomics Society 34th Annual Meeting, 1990, 5 pages.
Bernabei et al., "Graphical I/O Devices for Medical Users", 14th Annual International Conference of the IEEE on Engineering in Medicine and Biology Society, vol. 3, 1992, pp. 834-836.
Bernstein, Macrophone, "Speech Corpus", IEEE/ICASSP, Apr. 22, 1994, pp. 1-81 to 1-84.
Berry et al., "PTIME: Personalized Assistance for Calendaring", ACM Transactions on Intelligent Systems and Technology, vol. 2, No. 4, Article 40, Jul. 2011, pp. 1-22.
Berry et al., "Symantec", New version of MORE.TM, Apr. 10, 1990, 1 page.
Berry et al., "Task Management under Change and Uncertainty Constraint Solving Experience with the CALO Project", Proceedings of CP'05 Workshop on Constraint Solving under Change, 2005, 5 pages.
Bertulucci, Jeff, "Google Adds Voice Search to Chrome Browser", PC World, Jun. 14, 2011, 5 pages.
Best Buy, "When it Comes to Selecting a Projection TV, Toshiba Makes Everything Perfectly Clear", Previews of New Releases, available at <http://www.bestbuy.com/HomeAudioVideo/Specials/ToshibaTVFeatures.asp>, retrieved on Jan. 23, 2003, 5 pages.
Betts et al., "Goals and Objectives for User Interface Software", Computer Graphics, vol. 21, No. 2, Apr. 1987, pp. 73-78.
Biemann et al., "Disentangling from Babylonian Confusion—Unsupervised Language Identification", CICLing'05 Proceedings of the 6th international conference on Computational Linguistics and Intelligent Text Processing, vol. 3406, Feb. 2005, pp. 773-784.
Biemann, Chris, "Unsupervised Part-of-Speech Tagging Employing Efficient Graph Clustering", Proceeding COLING ACL '06 Proceedings of the 21st International Conference on computational Linguistics and 44th Annual Meeting of the Association for Computational Linguistics: Student Research Workshop, 2006, pp. 7-12.
Bier et al., "Toolglass and Magic Lenses: The See-Through Interface", Computer Graphics (SIGGRAPH '93 Proceedings), vol. 27, 1993, pp. 73-80.
Birrell, Andrew, "Personal Jukebox (PJB)", available at <http://birrell.org/andrew/talks/pjb-overview.ppt>, Oct. 13, 2000, 6 pages.
Black et al., "Automatically Clustering Similar Units for Unit Selection in Speech Synthesis", Proceedings of Eurospeech, vol. 2, 1997, 4 pages.
Black et al., "Multilingual Text-to-Speech Synthesis", Acoustics, Speech and Signal Processing (ICASSP'04), Proceedings of the IEEE International Conference, vol. 3, May 17-21, 2004, pp. 761-764.
Blair et al., "An Evaluation of Retrieval Effectiveness for a Full-Text Document-Retrieval System", Communications of the AcCM, vol. 28, No. 3, Mar. 1985, 11 pages.

(56) References Cited

OTHER PUBLICATIONS

Bleher et al., "A Graphic Interactive Application Monitor", IBM Systems Journal, vol. 19, No. 3, Sep. 1980, pp. 382-402.
BluePhoneElite: About, available at <http://www.reelintelligence.com/BluePhoneElite>, retrieved on Sep. 25, 2006, 2 pages.
BluePhoneElite: Features, available at <http://www.reelintelligence.com/BluePhoneElite/features.shtml,>, retrieved on Sep. 25, 2006, 2 pages.
Bluetooth PC Headsets, "'Connecting' Your Bluetooth Headset with Your Computer", Enjoy Wireless VoIP Conversations, available at <http://www.bluetoothpcheadsets.com/connect.htm>, retrieved on Apr. 29, 2006, 4 pages.
Bobrow et al., "Knowledge Representation for Syntactic/Semantic Processing", From: AAA-80 Proceedings, Copyright 1980, AAAI, 1980, 8 pages.
Bocchieri et al., "Use of Geographical Meta-Data in ASR Language and Acoustic Models", IEEE International Conference on Acoustics Speech and Signal Processing, 2010, pp. 5118-5121.
Bociurkiw, Michael, "Product Guide: Vanessa Matz", available at <http://www.forbes.com/asap/2000/1127/vmartz_print.html>, retrieved on Jan. 23, 2003, 2 pages.
Borden IV, G.R., "An Aural User Interface for Ubiquitous Computing", Proceedings of the 6th International Symposium on Wearable Computers, IEEE, 2002, 2 pages.
Borenstein, Nathaniel S., "Cooperative Work in the Andrew Message System", Information Technology Center and Computer Science Department, Carnegie Mellon University: Thyberg, Chris A. Academic Computing, Carnegie Mellon University, 1988, pp. 306-323.
Bouchou et al., "Using Transducers in Natural Language Database Query", Proceedings of 4th International Conference on Applications of Natural Language to Information Systems, Austria, Jun. 1999, 17 pages.
Boy, Guy A., "Intelligent Assistant Systems", Harcourt Brace Jovanovicy, 1991, 1 page.
Boyer et al., "A Fast String Searching Algorithm", Communications of the ACM, vol. 20, 1977, pp. 762-772.
Brain, Marshall, "How MP3 Files Work", available at <http://www.howstuffworks.com>, retrieved on Mar. 19, 2007, 4 pages.
Bratt et al., "The SRI Telephone-Based ATIS System", Proceedings of ARPA Workshop on Spoken Language Technology, 1995, 3 pages.
Briner, L. L., "Identifying Keywords in Text Data Processing", In Zelkowitz, Marvin V., ED, Directions and Challenges, 15th Annual Technical Symposium, Gaithersbury, Maryland, Jun. 17, 1976, 7 pages.
Brown et al., "Browing Graphs Using a Fisheye View", Apple Inc., Video Clip, Systems Research Center, CHI '92 Continued Proceedings on a CD, 1992.
Brown et al., "Browsing Graphs Using a Fisheye View", CHI '93 Proceedings of the INTERACT '93 and CHI '93 Conference on Human Factors in Computing Systems, 1993, p. 516.
Bulyko et al., "Error-Correction Detection and Response Generation in a Spoken Dialogue System", Speech Communication, vol. 45, 2005, pp. 271-288.
Bulyko et al., "Joint Prosody Prediction and Unit Selection for Concatenative Speech Synthesis", Electrical Engineering Department, University of Washington, Seattle, 2001, 4 pages.
Burger, D., "Improved Access to Computers for the Visually Handicapped: New Prospects and Principles", IEEE Transactions on Rehabilitation Engineering, vol. 2, No. 3, Sep. 1994, pp. 111-118.
Burke et al., "Question Answering from Frequently Asked Question Files", AI Magazine, vol. 18, No. 2, 1997, 10 pages.
Burns et al., "Development of a Web-Based Intelligent Agent for the Fashion Selection and Purchasing Process via Electronic Commerce", Proceedings of the Americas Conference on Information System (AMCIS), Dec. 31, 1998, 4 pages.

Busemann et al., "Natural Language Diaglogue Service for Appointment Scheduling Agents", Technical Report RR-97-02, Deutsches Forschungszentrum fur Kunstliche Intelligenz GmbH, 1997, 8 pages.
Bussey, et al., "Service Architecture, Prototype Description and Network Implications of a Personalized Information Grazing Service", INFOCOM'90, Ninth Annual Joint Conference of the IEEE Computer and Communication Societies, Available at <http://slrohall.com/oublications/>, Jun. 1990, 8 pages.
Bussler et al., "Web Service Execution Environment (WSMX)", retrieved from Internet on Sep. 17, 2012, available at <http://www.w3.org/Submission/WSMX>, Jun. 3, 2005, 29 pages.
Butcher, Mike, "EVI Arrives in Town to go Toe-to-Toe with Siri", TechCrunch, Jan. 23, 2012, 2 pages.
Butler, Travis, "Arches Jukebox 6000 Challenges Nomad Jukebox", available at <http://tidbits.com/article/6521>, Aug. 13, 2001, 5 pages.
Butler, Travis, "Portable MP3: The Nomad Jukebox", available at <http://tidbits.com/article/6261>, Jan. 8, 2001, 4 pages.
Buxton et al., "EuroPARC's Integrated Interactive Intermedia Facility (IIIF): Early Experiences", Proceedings of the IFIP WG 8.4 Conference on Multi-User Interfaces and Applications, 1990, pp. 11-34.
Buzo et al., "Speech Coding Based Upon Vector Quantization", IEEE Transactions on Acoustics, Speech and Signal Processing, vol. Assp-28, No. 5, Oct. 1980, 13 pages.
Call Centre, "Word Prediction", The CALL Centre & Scottish Executive Education Dept., 1999, pp. 63-73.
Caminero-Gil et al., "Data-Driven Discourse Modeling for Semantic Interpretation", Proceedings of the IEEE International Conference on Acoustics, Speech and Signal Processing, May 1996, 6 pages.
Campbell et al., "An Expandable Error-Protected 4800 BPS CELP Coder (U.S. Federal Standard 4800 BPS Voice Coder)", (Proceedings of IEEE Int'l Acoustics, Speech, and Signal Processing Conference, May 1983), as reprinted in Vector Quantization (IEEE Press, 1990), 1990, pp. 328-330.
Cao et al., "Adapting Ranking SVM to Document Retrieval", SIGIR '06, Seattle, WA, Aug. 6-11, 2006, 8 pages.
Car Working Group, "Hands-Free Profile 1.5 HFP1.5_SPEC", Bluetooth Doc, available at <www.bluetooth.org>, Nov. 25, 2005, 93 pages.
Caraballo et al., "Language Identification Based on a Discriminative Text Categorization Technique", Iberspeech 2012—Vii Jornadas En Tecnologia Del Habla and Iii Iberiansl Tech Workshop, Nov. 21, 2012, pp. 1-10.
Card et al., "Readings in Information Visualization Using Vision to Think", Interactive Technologies, 1999, 712 pages.
Carpendale et al., "3-Dimensional Pliable Surfaces: For the Effective Presentation of Visual Information", UIST '95 Proceedings of the 8th Annual ACM Symposium on User Interface and Software Technology, Nov. 14-17, 1995, pp. 217-226.
Carpendale et al., "Extending Distortion Viewing from 2D to 3D", IEEE Computer Graphics and Applications, Jul./Aug. 1997, pp. 42-51.
Carpendale et al., "Making Distortions Comprehensible", IEEE Proceedings of Symposium on Visual Languages, 1997, 10 pages.
Carter et al., "The Speech-Language Interface in the Spoken Language Translator", SRI International, Nov. 23, 1994, 9 pages.
Carter, D., "Lexical Acquisition in the Core Language Engine", Proceedings of the Fourth Conference of the European Chapter of the Association for Computational Linguistics, 1989, 8 pages.
Casner et al., "N-Way Conferencing with Packet Video", The Third International Workshop on Packet Video, Mar. 22-23, 1990, pp. 1-6.
Cawley, Gavin C. "The Application of Neural Networks to Phonetic Modelling", PhD. Thesis, University of Essex, Mar. 1996, 13 pages.
Chai et al., "Comparative Evaluation of a Natural Language Dialog Based System and a Menu Driven System for Information Access: A Case Study", Proceedings of the International Conference on Multimedia Information Retrieval (RIAO), Paris, Apr. 2000, 11 pages.
Chakarova et al., "Digital Still Cameras—Downloading Images to a Computer", Multimedia Reporting and Convergence, available at

(56) References Cited

OTHER PUBLICATIONS

<http://journalism.berkeley.edu/multimedia/tutorials/stillcams/downloading.html>, retrieved on May 9, 2005, 2 pages.
Chamberlain, Kim, "Quick Start Guide Natural Reader", available online at <http://atrc.colostate.edu/files/quickstarts/Natural_Reader_Quick_Start_Guide.>, Apr. 2008, 5 pages.
Chang et al., "A Segment-Based Speech Recognition System for Isolated Mandarin Syllables", Proceedings TEN CON '93, IEEE Region 10 Conference on Computer, Communication, Control and Power Engineering, vol. 3, Oct. 1993, 6 pages.
Chang et al., "Discriminative Training of Dynamic Programming based Speech Recognizers", IEEE Transactions on Speech and Audio Processing, vol. 1, No. 2, Apr. 1993, pp. 135-143.
Chartier, David, "Using Multi-Network Meebo Chat Service on Your iPhone", available at <http://www.tuaw.com/2007/07/04/using-multi-network-meebo-chat-service-on-your-iphone/>, Jul. 4, 2007, 5 pages.
Chen et al., "An Improved Method for Image Retrieval Using Speech Annotation", The 9th International Conference on Multi-Media Modeling, Jan. 2003, pp. 1-17.
Chen, Yi, "Multimedia Siri Finds and Plays Whatever You Ask for", PSFK Report, Feb. 9, 2012, 9 pages.
Cheyer et al., "Demonstration Video of Multimodal Maps Using an Agent Architecture", published by SRI International no later than 1996, as depicted in Exemplary Screenshots from video entitled Demonstration Video of Multimodal Maps Using an Agent Architecture, 1996, 6 pages.
Cheyer et al., "Demonstration Video of Multimodal Maps Using an Open-Agent Architecture", published by SRI International no later than 1996, as depicted in Exemplary Screenshots from video entitled Demonstration Video of Multimodal Maps Using an Open-Agent Architecture, 6 pages.
Cheyer et al., "Multimodal Maps: An Agent-Based Approach", International Conference on Co-operative Multimodal Communication, 1995, 15 pages.
Cheyer et al., "Spoken Language and Multimodal Applications for Electronic Realties", Virtual Reality, vol. 3, 1999, pp. 1-15.
Cheyer et al., "The Open Agent Architecture", Autonomous Agents and Multi-Agent Systems, vol. 4, Mar. 1, 2001, 6 pages.
Cheyer et al., "The Open Agent Architecture: Building Communities of Distributed Software Agents", Artificial Intelligence Center, SRI International, Power Point Presentation, Available online at <http://www.ai.sri.com/-oaa/>, retrieved on Feb. 21, 1998, 25 pages.
Cheyer, A., "Demonstration Video of Vanguard Mobile Portal", published by SRI International no later than 2004, as depicted in 'Exemplary Screenshots from video entitled Demonstration Video of Vanguard Mobile Portal', 2004, 10 pages.
Cheyer, Adam, "A Perspective on AI & Agent Technologies for SCM", VerticalNet Presentation, 2001, 22 pages.
Cheyer, Adam, "About Adam Cheyer", available at <http://www.adam.cheyer.com/about.html>, retrieved on Sep. 17, 2012, 2 pages.
Choi et al., "Acoustic and Visual Signal based Context Awareness System for Mobile Application", IEEE Transactions on Consumer Electronics, vol. 57, No. 2, May 2011, pp. 738-746.
Chomsky et el., "The Sound Pattern of English", New York, Harper and Row, 1968, 242 pages.
Choularton et al., "User Responses to Speech Recognition Errors: Consistency of Behaviour Across Domains", Proceedings of the 10th Australian International Conference on Speech Science & Technology, Dec. 8-10, 2004, pp. 457-462.
Church, Kenneth W., "Phonological Parsing in Speech Recognition", Kluwer Academic Publishers, 1987.
Cisco Systems, Inc., "Cisco Unity Unified Messaging User Guide", Release 4.0(5), Apr. 14, 2005, 152 pages.
Cisco Systems, Inc., "Installation Guide for Cisco Unity Unified Messaging with Microsoft Exchange 2003/2000 (With Failover Configured)", Release 4.0(5), Apr. 14, 2005, 152 pages.
Cisco Systems, Inc., "Operations Manager Tutorial, Cisco's IPC Management Solution", 2006, 256 pages.

Codd, E. F., "Databases: Improving Usability and Responsiveness—How About Recently", Copyright 1978, Academic Press, Inc., 1978, 28 pages.
Cohen et al., "An Open Agent Architecture", available at <http://citeseerx.ist.psu.edu/viewdoc/summary?doi=1 0.1.1.30.480>, 1994, 8 pages.
Cohen et al., "Voice User Interface Design,", Excerpts from Chapter 1 and Chapter 10, 2004, 36 pages.
Coleman, David W., "Meridian Mail Voice Mail System Integrates Voice Processing and Personal Computing", Speech Technology, vol. 4, No. 2, Mar./Apr. 1988, pp. 84-87.
Coles et al., "Chemistry Question-Answering", SRI International, Jun. 1969, 15 pages.
Coles et al., "Techniques for Information Retrieval Using an Inferential Question-Answering System with Natural-Language Input", SRI International, Nov. 1972, 198 Pages.
Coles et al., "The Application of Theorem Proving to Information Retrieval", SRI International, Jan. 1971, 21 pages.
Colt, Sam, "Here's One Way Apple's Smartwatch Could Be Better Than Anything Else", Business Insider, Aug. 21, 2014, pp. 1-4.
Combined Search Report and Examination Report under Sections 17 and 18(3) received for GB Patent Application No. 1009318.5, dated Oct. 8, 2010, 5 pages.
Combined Search Report and Examination Report under Sections 17 and 18(3) received for GB Patent Application No. 1217449.6, dated Jan. 17, 2013, 6 pages.
Compaq Inspiration Technology, "Personal Jukebox (PJB)—Systems Research Center and PAAD", Oct. 13, 2000, 25 pages.
Compaq, "Personal Jukebox", available at <http://research.com/compaq.com/SRC/pjb/>, 2001, 3 pages.
Conkie et al., "Preselection of Candidate Units in a Unit Selection-Based Text-to-Speech Synthesis System", ISCA, 2000, 4 pages.
Conklin, Jeff, "Hypertext: An Introduction and Survey", Computer Magazine, Sep. 1987, 25 pages.
Conklin, Jeffrey, "A Survey of Hypertext", MCC Software Technology Program, Dec. 1987, 40 pages.
Connolly et al., "Fast Algorithms for Complex Matrix Multiplication Using Surrogates", IEEE Transactions on Acoustics, Speech and Signal Processing, vol. 37, No. 6, Jun. 1989, 13 pages.
Constantinides et al., "A Schema Based Approach to Dialog Control", Proceedings of the International Conference on Spoken Language Processing, 1998, 4 pages.
Copperi et al., "CELP Coding for High Quality Speech at 8 kbits/s", Proceedings of IEEE International Acoustics, Speech and Signal Processing Conference, Apr. 1986), as reprinted in Vector Quantization (IEEE Press), 1990, pp. 324-327.
Corporate Ladder, BLOC Publishing Corporation, 1991, 1 pages.
Corr, Paul, "Macintosh Utilities for Special Needs Users", available at <http://homepage.mac.com/corrp/macsupt/columns/specneeds.html>, Feb. 1994 (content updated Sep. 19, 1999), 4 pages.
Cox et al., "Speech and Language Processing for Next-Millennium Communications Services", Proceedings of the IEEE, vol. 88, No. 8, Aug. 2000, 24 pages.
Craig et al., "Deacon: Direct English Access and Control", AFIPS Conference Proceedings, vol. 19, San Francisco, Nov. 1966, 18 pages.
Creative Technology Ltd., "Creative NOMAD® II: Getting Started—User Guide (on Line Version)", available at <http://ec1.images-amazon.com/media/i3d/01/A/man-migrate/MANUAL000026434.pdf>, Apr. 2000, 46 pages.
Creative Technology Ltd., "Creative NOMAD®: Digital Audio Player: User Guide (On-Line Version)", available at <http://ec1.images-amazon.com/media/i3d/01/A/man-migrate/MANUAL000010757.pdf>, Jun. 1999, 40 pages.
Creative Technology Ltd., "Nomad Jukebox", User Guide, Version 1.0, Aug. 2000, 52 pages.
Creative, "Creative NOMAD MuVo TX", available at <http://web.archive.org/web/20041024175952/www.creative.com/products/pfriendly.asp?product=9672>, retrieved on Jun. 6, 2006, 1 page.
Creative, "Creative NOMAD MuVo", available at <http://web.archive.org/web/20041024075901/www.creative.com/products/product.asp?category=213&subcategory=216&product=4983>, retrieved on Jun. 7, 2006, 1 page.

(56) References Cited

OTHER PUBLICATIONS

Creative, "Digital MP3 Player", available at <http://web.archive.org/web/20041024074823/www.creative.com/products/product.asp?category=213&subcategory=216&product=4983, 2004, 1 page.
Croft et al., "Task Support in an Office System", Proceedings of the Second ACM-SIGOA Conference on Office Information Systems, 1984, pp. 22-24.
Crowley et al., "MMConf: An Infrastructure for Building Shared Multimedia Applications", CSCW 90 Proceedings, Oct. 1990, pp. 329-342.
Cucerzan et al., "Bootstrapping a Multilingual Part-of-Speech Tagger in One Person-Day", in Proceedings of the 6th Conference on Natural Language Learning, vol. 20, 2002, pp. 1-7.
Cuperman et al., "Vector Predictive Coding of Speech at 16 kbit s/s", (IEEE Transactions on Communications, Jul. 1985), as reprinted in Vector Quantization (IEEE Press, 1990), 1990, pp. 300-311.
Cutkosky et al., "PACT: An Experiment in Integrating Concurrent Engineering Systems", Journal & Magazines, Computer, vol. 26, No. 1, Jan. 1993, 14 pages.
Dar et al., "DTL's DataSpot: Database Exploration Using Plain Language", Proceedings of the 24th VLDB Conference, New York, 1998, 5 pages.
Database WPI Section Ch, Week 8733, Derwent Publications Ltd., London, GB; AN 87-230826 & JP, A, 62 153 326 (Sanwa Kako KK (Sans) Sanwa Kako Co), Jul. 8, 1987, 6 pages.
Database WPI Section Ch, Week 8947, Derwent Publications Ltd., London, GB; AN 89-343299 & JP, A, 1 254 742 (Sekisui Plastics KK), Oct. 11, 1989, 7 pages.
Davis et al., "A Personal Handheld Multi-Modal Shopping Assistant", International Conference on Networking and Services, IEEE, 2006, 9 pages.
Davis et al., "Stone Soup Translation", Department of Linguistics, Ohio State University, 2001, 11 pages.
De Herrera, Chris, "Microsoft ActiveSync 3.1", Version 1.02, available at <http://www.cewindows.net/wce/activesync3.1.htm>, Oct. 13, 2000, 8 pages.
Decker et al., "Designing Behaviors for Information Agents", The Robotics Institute, Carnegie-Mellon University, Paper, Jul. 1996, 15 pages.
Decker et al., "Matchmaking and Brokering", The Robotics Institute, Carnegie-Mellon University, Paper, May 1996, 19 pages.
Deerwester et al., "Indexing by Latent Semantic Analysis", Journal of the American Society for Information Science, vol. 41, No. 6, Sep. 1990, 19 pages.
Degani et al., "'Soft' Controls for Hard Displays: Still a Challenge", Proceedings of the 36th Annual Meeting of the Human Factors Society, 1992, pp. 52-56.
Del Strother, Jonathan, "Coverflow", available at <http://www.steelskies.com/coverflow>, retrieved on Jun. 15. 2006, 14 pages.
Dellen, Jr. et al., "Discrete-Time Processing of Speech Signals", Prentice Hall ISBN: 0-02-328301-7, 1987, 14 pages.
Diagrammaker, Action Software, 1989.
Diagram-Master, Ashton-Tate, 1989.
Diamond Multimedia Systems, Inc., "Rio PMP300: User's Guide", available at <http://ec1.images-amazon.com/media/i3d/01/A/man-migrate/MANUAL000022854.pdf>, 1998, 28 pages.
Dickinson et al., "Palmtips: Tiny Containers for All Your Data", PC Magazine, vol. 9, Mar. 1990, p. 218(3).
Digital Audio in the New Era, Electronic Design and Application, No. 6, Jun. 30, 2003, 3 pages.
Digital Equipment Corporation, "Open VMS Software Overview", Software Manual, Dec. 1995, 159 pages.
Digital Equipment Corporation, "OpenVMS RTL DECtalk (DTK$) Manual", May 1993, 56 pages.
Dittenbach et al., "A Natural Language Query Interface for Tourism Information", In: Information and Communication Technologies in Tourism 2003, XP055114393, Feb. 14, 2003, pp. 152-162.
Dobrisek et al., "Evolution of the Information-Retrieval System for Blind and Visually-Impaired People", International Journal of Speech Technology, Kluwer Academic Publishers, Bo, vol. 6, No. 3, pp. 301-309.
Domingue et al., "Web Service Modeling Ontology (WSMO)—An Ontology for Semantic Web Services", Position Paper at the W3C Workshop on Frameworks for Semantics in Web Services, Innsbruck, Austria, Jun. 2005, 6 pages.
Donahue et al., "Whiteboards: a Graphical Database Tool", ACM Transactions on Office Information Systems, vol. 4, No, 1, Jan. 1986, pp. 24-41.
Donovan, R. E., "A New Distance Measure for Costing Spectral Discontinuities in Concatenative Speech Synthesisers", available at <http://citeseerx.ist.osu.edu/viewdoc/summarv?doi=1 0.1.1.21.6398>, 2001, 4 pages.
Dourish et al., "Portholes: Supporting Awareness in a Distributed Work Group", CHI 1992;, May 1992, pp. 541-547.
Dowding et al., "Gemini: A Natural Language System for Spoken-Language Understanding", Proceedings of the Thirty-First Annual Meeting of the Association for Computational Linguistics, 1993, 8 pages.
Dowding et al., "Interleaving Syntax and Semantics in an Efficient Bottom-Up Parser", Proceedings of the 32nd Annual Meeting of the Association for Computational Linguistics, 1994, 7 pages.
Dragon Naturally Speaking Version 11 Users Guide, Nuance Communications, Inc., Copyright @2002-2010, 132 pages.
Dual Rate Speech Coder for Multimedia Communications Transmitting at 5.3 and 6.3 kbits, International Telecommunication Union Recommendation G.723, 7 pages.
Dusan et al., "Multimodal Interaction on PDA's Integrating Speech and Pen Inputs", Eurospeech Geneva, 2003, 4 pages.
dyslexic.com, "AlphaSmart 3000 with CoWriter SmartApplet: Don Johnston Special Needs", available at <http://www.dyslexic.com/procuts.php?catid-2&pid=465&PHPSESSID=2511b800000f7da>, retrieved on Dec. 6, 2005, 13 pages.
Edwards, John R., "Q&A: Integrated Software with Macros and an Intelligent Assistant", Byte Magazine, vol. 11, No. 1, Jan. 1986, pp. 120-122.
Egido, Carmen, "Video Conferencing as a Technology to Support Group Work: A Review of its Failures", Bell Communications Research, 1988, pp. 13-24.
Elio et al., "On Abstract Task Models and Conversation Policies", Proc. Workshop on Specifying and Implementing Conversation Policies, Autonomous Agents'99 Conference, 1999, pp. 1-10.
Elliot, Chip, "High-Quality Multimedia Conferencing Through a Long-Haul Packet Network", BBN Systems and Technologies, 1993, pp. 91-98.
Elliott et al., "Annotation Suggestion and Search for Personal Multimedia Objects on the Web", CIVR, Jul. 7-9, 2008, pp. 75-84.
Elofson et al., "Delegation Technologies: Environmental Scanning with Intelligent Agents", Jour. of Management Info. Systems, Summer 1991, vol. 8, No. 1, 1991, pp. 37-62.
Eluminx, "Illuminated Keyboard", available at <http://www.elumix.com/>, retrieved on Dec. 19, 2002, 1 page.
Engst, Adam C., "SoundJam Keeps on Jammin", available at <http://db.tidbits.com/getbits.acgi?tbart=05988>, Jun. 19, 2000, 3 pages.
Epstein et al., "Natural Language Access to a Melanoma Data Base", SRI International, Sep. 1978, 7 pages.
Ericsson et al., "Software Illustrating a Unified Approach to Multimodality and Multilinguality in the In-Home Domain", Talk and Look: Tools for Ambient Linguistic Knowledge, Dec. 2006, 127 pages.
Ericsson Inc., "Cellular Phone with Integrated MP3 Player", Research Disclosure Journal No. 41815, Feb. 1999, 2 pages.
Erol et al., "Multimedia Clip Generation From Documents for Browsing on Mobile Devices", IEEE Transactions on Multimedia, vol. 10, No. 5, Aug. 2008, 13 pages.
Eslambolchilar et al., "Making Sense of Fisheye Views", Second Dynamics and Interaction Workshop at University of Glasgow, Aug. 2005, 6 pages.

(56) References Cited

OTHER PUBLICATIONS

Eslambolchilar et al., "Multimodal Feedback for Tilt Controlled Speed Dependent Automatic Zooming", UIST'04, Oct. 24-27, 2004, 2 pages.
European Search Report received for European Patent Application No. 01201774.5, dated Sep. 14, 2001, 3 pages.
European Search Report received for European Patent Application No. 99107544.1, dated Jul. 8, 1999, 4 pages.
European Search Report received for European Patent Application No. 99107545.8, dated Jul. 1, 1999, 3 pages.
Evermann et al., "Posterior Probability Decoding, Confidence Estimation and System Combination", Proceedings Speech Transcription Workshop, 2000, 4 pages.
Evi, "Meet Evi: The One Mobile Application that Provides Solutions for your Everyday Problems", Feb. 2012, 3 pages.
Exhibit 1, "Natural Language Interface Using Constrained Intermediate Dictionary of Results", List of Publications Manually Reviewed for the Search of U.S. Pat. No. 7,177,798, Mar. 22, 2013, 1 page.
Extended European Search Report (includes European Search Report and European Search Opinion) received for European Patent Application No. 06256215.2, dated Feb. 20, 2007, 6 pages.
Extended European Search Report (includes European Search Report and European Search Opinion) received for European Patent Application No. 12186113.2, dated Apr. 28, 2014, 14 pages.
Extended European Search Report (includes Partial European Search Report and European Search Opinion) received for European Patent Application No. 13169672.6, dated Aug. 14, 2013, 11 pages.
Extended European Search Report (includes Partial European Search Report and European Search Opinion) received for European Patent Application No. 15169349.6, dated Jul. 28, 2015, 8 pages.
Extended European Search Report (includes Partial European Search Report and European Search Opinion) received for European Patent Application No. 15196748.6, dated Apr. 4, 2016.
Extended European Search Report (includes Supplementary European Search Report and Search Opinion) received for European Patent Application No. 07863218.9, dated Dec. 9, 2010, 7 pages.
Extended European Search Report (includes Supplementary European Search Report and Search Opinion) received for European Patent Application No. 12727027.0, dated Sep. 26, 2014, 7 pages.
Extended European Search Report (inclusive of the Partial European Search Report and European Search Opinion) received for European Patent Application No. 12729332.2, dated Oct. 31, 2014, 6 pages.
Extended European Search Report and Search Opinion received for European Patent Application No. 12185276.8, dated Dec. 18, 2012, 4 pages.
Extended European Search Report received for European Patent Application No. 11159884.3, dated May 20, 2011, 8 pages.
Extended European Search Report received for European Patent Application No. 12186663.6, dated Jul. 16, 2013, 6 pages.
Fanty et al., "A Comparison of DFT, PLP and Cochleagram for Alphabet Recognition", IEEE, Nov. 1991, pp. 326-329.
Feigenbaum et al., "Computer-Assisted Semantic Annotation of Scientific Life Works", Oct. 15, 2007, 22 pages.
Ferguson et al., "TRIPS: An Integrated Intelligent Problem-Solving Assistant", Proceedings of the Fifteenth National Conference on Artificial Intelligence (AAAI-98) and Tenth Conference on Innovative Applications of Artificial Intelligence (IAAI-98), 1998, 7 pages.
Fikes et al., "A Network-Based Knowledge Representation and its Natural Deduction System", SRI International, Jul. 1977, 43 pages.
Findlater et al., "Beyond QWERTY: Augmenting Touch-Screen Keyboards with Multi-Touch Gestures for Non-Alphanumeric Input", CHI '12, Austin, Texas, USA, May 5-10, 2012. 4 pages.
Fiscus, J. G., "A Post-Processing System to Yield Reduced Word Error Rates: Recognizer Output Voting Error Reduction (ROVER)", IEEE Proceedings, Automatic Speech Recognition and Understanding, Dec. 14-17, 1997, pp. 347-354.
Fisher et al., "Virtual Environment Display System", Interactive 3D Graphics, Oct. 23-24, 1986, pp. 77-87.
Forsdick, Harry, "Explorations into Real-Time Multimedia Conferencing", Proceedings of the Ifip Tc 6 International Symposium on Computer Message Systems, 1986, 331 pages.
Frisse, M. E., "Searching for Information in a Hypertext Medical Handbook", Communications of the ACM, vol. 31, No. 7, Jul. 1988, 8 pages.
Furnas et al., "Space-Scale Diagrams: Understanding Multiscale Interfaces", CHI '95 Proceedings of the SIGCHI Conference on Human Factors in Computing Systems, 1995, pp. 234-241.
Furnas, George W., "Effective View Navigation", Proceedings of the ACM SIGCHI Conference on Human Factors in Computing Systems, Mar. 1997, pp. 367-374.
Furnas, George W., "Generalized Fisheye Views", CHI '86 Proceedings of the SIGCHI Conference on Human Factors in Computing Systems, vol. 17. No. 4, Apr. 1986, pp. 16-23.
Furnas, George W., "The Fisheye Calendar System", Bellcore Technical Memorandum, Nov. 19, 1991, pp. 1-9.
Gamback et al., "The Swedish Core Language Engine", NOTEX Conference, 1992, 17 pages.
Gannes, Liz, "Alfred App Gives Personalized Restaurant Recommendations", AllThingsD, Jul. 18, 2011, pp. 1-3.
Gardner, Jr., P. C., "A System for the Automated Office Environment", IBM Systems Journal, vol. 20, No. 3, 1981, pp. 321-345.
Garretson, R., "IBM Adds 'Drawing Assistant' Design Tool to Graphic Series", PC Week, vol. 2, No. 32, Aug. 13, 1985, 1 page.
Gautier et al., "Generating Explanations of Device Behavior Using Compositional Modeling and Causal Ordering", CiteSeerx, 1993, pp. 89-97.
Gaver et al., "One is Not Enough: Multiple Views in a Media Space" INTERCHI, Apr. 24-29, 1993, pp. 335-341.
Gaver et al., "Realizing a Video Environment: EuroPARC's RAVE System", Rank Xerox Cambridge EuroPARC, 1992, pp. 27-35.
Gervasio et al., "Active Preference Learning for Personalized Calendar Scheduling Assistance", CiteSeerx, Proceedings of IUI'05, Jan. 2005, pp. 90-97.
Giachin et al., "Word Juncture Modeling Using Inter-Word Context-Dependent Phone-Like Units", Cselt Technical Reports, vol. 20, No. 1, Mar. 1992, pp. 43-47.
Gillespie, Kelly, "Adventures in Integration", Data Based Advisor, vol. 9, No. 9, Sep. 1991, pp. 90-92.
Gillespie, Kelly, "Internationalize Your Applications with Unicode", Data Based Advisor, vol. 10, No. 10, Oct. 1992, pp. 136-137.
Gilloire et al., "Innovative Speech Processing for Mobile Terminals: An Annotated Bibliography", Signal Processing, vol. 80, No. 7, Jul. 2000, pp. 1149-1166.
Glass et al., "Multilingual Language Generation Across Multiple Domains", International Conference on Spoken Language Processing, Japan, Sep. 1994, 5 pages.
Glass et al., "Multilingual Spoken-Language Understanding in the Mit Voyager System", Available online at <http://groups.csail.mit.edu/sls/publications/1995/speechcomm95-voyager.pdf>, Aug. 1995, 29 pages.
Glass, Alyssa, "Explaining Preference Learning", CiteSeerx, 2006, pp. 1-5.
Glinert-Stevens, Susan, "Microsoft Publisher: Desktop Wizardry", PC Sources, vol. 3, No. 2, Feb. 1992, 1 page.
Glossary of Adaptive Technologies: Word Prediction, available at <http://www.utoronto.ca/atrc/reference/techwordpred.html>, retrieved on Dec. 6, 2005, 5 pages.
Gmail, "About Group Chat", available at <http://mail.google.com/support/bin/answer.py?answer=81090>, Nov. 26, 2007, 2 pages.
Goddeau et al., "A Form-Based Dialogue Manager for Spoken Language Applications", Available online at <http://phasedance.com/pdf!icslp96.pdf>, Oct. 1996, 4 pages.
Goddeau et al., "Galaxy: A Human-Language Interface to On-Line Travel Information", International Conference on Spoken Language Processing, Yokohama, 1994, pp. 707-710.

(56) References Cited

OTHER PUBLICATIONS

Goldberg et al., "Using Collaborative Filtering to Weave an Information Tapestry", Communications of the ACM, vol. 35, No. 12, Dec. 1992, 10 pages.
Goldberg, Cheryl, "IBM Drawing Assistant: Graphics for the EGA", PC Magazine, vol. 4, No. 26, Dec. 24, 1985, 1 page.
Gong et al., "Guidelines for Handheld Mobile Device Interface Design", Proceedings of DSI 2004 Annual Meeting, 2004, pp. 3751-3756.
Gonnet et al., "Handbook of Algorithms and Data Structures: in Pascal and C. (2nd ed.)", Addison-Wesley Longman Publishing Co., 1991, 17 pages.
Good et al., "Building a User-Derived Interface", Communications of the ACM; (Oct. 1984) vol. 27, No. 10. Oct. 1984, pp. 1032-1043.
Gorin et al., "On Adaptive Acquisition of Language", International Conference on Acoustics, Speech and Signal Processing (ICASSP'90), vol. 1, Apr. 1990, 5 pages.
Gotoh et al., "Document Space Models Using Latent Semantic Analysis", In Proceedings of Eurospeech, 1997, 4 pages.
Gray et al., "Rate Distortion Speech Coding with a Minimum Discrimination Information Distortion Measure", (IEEE Transactions on Information Theory, Nov. 1981), as reprinted in Vector Quantization (IEEE Press), 1990, pp. 208-221.
Gray, R. M., "Vector Quantization", IEEE ASSP Magazine, Apr. 1984, 26 pages.
Green, C., "The Application of Theorem Proving to Question-Answering Systems", SRI Stanford Research Institute, Artificial Intelligence Group, Jun. 1969, 169 pages.
Greenberg, Saul, "A Fisheye Text Editor for Relaxed-WYSIWIS Groupware", CHI '96 Companion, Vancouver, Canada, Apr. 13-18, 1996, 2 pages.
Gregg et al., "DSS Access on the WWW: An Intelligent Agent Prototype", Proceedings of the Americas Conference on Information Systems, Association for Information Systems, 1998, 3 pages.
Griffin et al., "Signal Estimation From Modified Short-Time Fourier Transform", IEEE Transactions on Acoustics, Speech and Signal Processing, vol. ASSP-32, No. 2, Apr. 1984, pp. 236-243.
Grishman et al., "Computational Linguistics: An Introduction", Cambridge University Press, 1986, 172 pages.
Grosz et al., "Dialogic: A Core Natural-Language Processing System", SRI International, Nov. 1982, 17 pages.
Grosz et al., "Research on Natural-Language Processing at SRI", SRI International, Nov. 1981, 21 pages.
Grosz et al., "TEAM: An Experiment in the Design of Transportable Natural-Language Interfaces", Artificial Intelligence, vol. 32, 1987, 71 pages.
Grosz, B., "Team: A Transportable Natural-Language Interface System", Proceedings of the First Conference on Applied Natural Language Processing, 1983, 7 pages.
Gruber et al., "An Ontology for Engineering Mathematics", Fourth International Conference on Principles of Knowledge Representation and Reasoning, Available online at <http://www-ksl.stanford.edu/knowledge-sharing/papers/engmath.html>, 1994, pp. 1-22.
Gruber et al., "Generative Design Rationale: Beyond the Record and Replay Paradigm", Knowledge Systems Laboratory, Technical Report KSL 92-59, Dec. 1991, Updated Feb. 1993, 24 pages.
Gruber et al., "Machine-Generated Explanations of Engineering Models: A Compositional Modeling Approach", Proceedings of International Joint Conference on Artificial Intelligence, 1993, 7 pages.
Gruber et al., "NIKE: A National Infrastructure for Knowledge Exchange", A Whitepaper Advocating and ATP Initiative on Technologies for Lifelong Learning, Oct. 1994, pp. 1-10.
Gruber et al., "Toward a Knowledge Medium for Collaborative Product Development", Proceedings of the Second International Conference on Artificial Intelligence in Design, Jun. 1992, pp. 1-19.
Gruber, Thomas R., "A Translation Approach to Portable Ontology Specifications", Knowledge Acquisition, vol. 5, No. 2, Jun. 1993, pp. 199-220.
Gruber, Thomas R., "Automated Knowledge Acquisition for Strategic Knowledge", Machine Learning, vol. 4, 1989, pp. 293-336.
Gruber, Thomas R., "Interactive Acquisition of Justifications: Learning "Why" by Being Told "What"", Knowledge Systems Laboratory, Technical Report KSL 91-17, Original Oct. 1990, Revised Feb. 1991, 24 pages.
Gruber, Thomas R., "Toward Principles for the Design of Ontologies used for Knowledge Sharing", International Journal of Human-Computer Studies, vol. 43, No. 5-6, Nov. 1995, pp. 907-928.
Gruber, Thomas R., et al., U.S. Appl. No. 61/186,414, filed Jun. 12, 2009 titled "System and Method for Semantic Auto-Completion" 13 pages.
Gruber, Thomas R., et al., U.S. Appl. No. 61/493,201, filed Jun. 3, 2011 titled "Generating and Processing Data Items That Represent Tasks to Perform", 68 pages.
Gruber, Thomas R., et al., Unpublished U.S. Appl. No. 61/657,744, filed Jun. 9, 2012 titled "Automatically Adapting User Interfaces for Hands-Free Interaction", 40 pages.
Gruber, Thomas R., et al., U.S. Appl. No. 07/976,970, filed Nov. 16, 1992 titled "Status Bar for Application Windows".
Gruber, Tom, "(Avoiding) The Travesty of the Commons", Presentation at NPUC, New Paradigms for User Computing, IBM Almaden Research Center, Jul. 24, 2006, 52 pages.
Gruber, Tom, "2021: Mass Collaboration and the Really New Economy", TNTY Futures, vol. 1, No. 6, Available online at <http://tomgruber.org/writing/tnty2001.htm>, Aug. 2001, 5 pages.
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Collaborating Around Shared Content on the WWW, W3C Workshop on WWW and Collaboration", available at <http://www.w3.org/Collaboration/Workshop/Proceedings/P9.html>, Sep. 1995, 1 page.
Gruber, Tom, "Collective Knowledge Systems: Where the Social Web Meets Semantic Web", Web Semantics: Science, Services and Agents on the World Wide Web, 2007, pp. 1-19.
Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.
Gruber, Tom, "Enterprise Collaboration Management with Intraspect", Intraspect Technical White Paper, Jul. 2001, pp. 1-24.
Gruber, Tom, "Every Ontology is a Treaty—A Social Agreement—Among People with Some Common Motive in Sharing", Official Quarterly Bulletin of AIS Special Interest Group on Semantic Web and Information Systems, vol. 1, No. 3, 2004, pp. 1-5.
Gruber, Tom, "Helping Organizations Collaborate, Communicate, and Learn", Presentation to NASA Ames Research, Available online at <http://tomgruber.org/writing/organizational-intelligence-talk.htm>, Mar.-Oct. 2003, 30 pages.
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.
Gruber, Tom, "It is What It Does: The Pragmatics of Ontology for Knowledge Sharing", Proceedings of the International CIDOC CRM Symposium, Available online at <http://tomgruber.org/writing/cidoc-ontology.htm>, Mar. 26, 2003, 21 pages.
Gruber, Tom, "Ontologies, Web 2.0 and Beyond", Ontology Summit, Available online at <http://tomgruber.org/writing/ontolog-social-web-keynote.htm>, Apr. 2007, 17 pages.
Gruber, Tom, "Ontology of Folksonomy: A Mash-Up of Apples and Oranges", Int'l Journal on Semantic Web & Information Systems, vol. 3, No. 2, 2007, 7 pages.
Gruber, Tom, "Siri, A Virtual Personal Assistant—Bringing Intelligence to the Interface", Semantic Technologies Conference, Jun. 16, 2009, 21 pages.
Gruber, Tom, "TagOntology", Presentation to Tag Camp, Oct. 29, 2005, 20 pages.
Gruber, Tom, "Where the Social Web Meets the Semantic Web", Presentation at the 5th International Semantic Web Conference, Nov. 2006, 38 pages.

(56) References Cited

OTHER PUBLICATIONS

Gruhn et al., "A Research Perspective on Computer-Assisted Office Work", IBM Systems Journal, vol. 18, No. 3, 1979, pp. 432-456.
Guay, Matthew, "Location-Driven Productivity with Task Ave", available at <http://iphone.appstorm.net/reviews/productivity/location-driven-productivity-with-task-ave>, Feb. 19, 2011, 7 pages.
Guida et al., "NLI: A Robust Interface for Natural Language Person-Machine Communication", International Journal of Man-Machine Studies, vol. 17, 1982, 17 pages.
Guim, Mark, "How to Set a Person-Based Reminder with Cortana", available at <http://www.wpcentral.com/how-to-person-based-reminder-cortana>, Apr. 26, 2014, 15 pages.
Gurevych et al., "Semantic Coherence Scoring Using an Ontology", North American Chapter of the Association for Computational Linguistics Archive, Proceedings of the 2003 Conference of the North American Chapter of the Association for Computational Linguistics on Human Language Technology, May 27, 2003, 8 pages.
Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.
Guzzoni et al., "Active, A Platform for Building Intelligent Operating Rooms", Surgetica 2007 Computer-Aided Medical Interventions: Tools and Applications, 2007, pp. 191-198.
Guzzoni et al., "Active, A platform for Building Intelligent Software", Computational Intelligence, available at <http://www.informatik.uni-trier.del-ley/pers/hd/g/Guzzoni:Didier >, 2006, 5 pages.
Guzzoni et al., "Active, A Tool for Building Intelligent User Interfaces", ASC 2007, Palma de Mallorca, Aug. 2007, 6 pages.
Guzzoni et al., "Many Robots Make Short Work", AAAI Robot Contest, SRI International, 1996, 9 pages.
Guzzoni et al., "Modeling Human-Agent Interaction with Active Ontologies", AAAI Spring Symposium, Interaction Challenges for Intelligent Assistants, Stanford University, Palo Alto, California, 2007, 8 pages.
Guzzoni, D., "Active: A Unified Platform for Building Intelligent Assistant Applications", Oct. 25, 2007, 262 pages.
Haas et al., "An Approach to Acquiring and Applying Knowledge", SRI international, Nov. 1980, 22 pages.
Hadidi et al., "Student's Acceptance of Web-Based Course Offerings: An Empirical Assessment", Proceedings of the Americas Conference on Information Systerns(AMCIS), 1998, 4 pages.
Haga et al., "A Usability Survey of a Contents-Based Video Retrieval System by Combining Digital Video and an Electronic Bulletin Board", The Internet and Higher Education, vol. 8, No. 3, 2005, pp. 251-262.
Hain et al., "The Papageno TTS System", Siemens AG, Corporate Technology, Munich, Germany TC-STAR Workshop, 2006, 6 pages.
Haitsma et al., "A Highly Robust Audio Fingerprinting System", In Proceedings of the International Symposium on Music Information Retrieval (ISMIR), 2002, 9 pages.
Halbert, D. C., "Programming by Example", Dept. Electrical Engineering and Comp. Sciences, University of California, Berkley, Nov. 1984, pp. 1-76.
Hall, William S., "Adapt Your Program for Worldwide Use with Windows.TM. Internationalization Support", Microsoft Systems Journal, vol. 6, No. 6, Nov./Dec. 1991, pp. 29-58.
Haoui et al., "Embedded Coding of Speech: A Vector Quantization Approach", (Proceedings of the IEEE International Acoustics, Speech and Signal Processing Conference, Mar. 1985), as reprinted in Vector Quantization (IEEE Press, 1990), 1990, pp. 297-299.
Hardwar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved Feb. 9, 2012, 4 pages.
Harris, F. J., "On the Use of Windows for Harmonic Analysis with the Discrete Fourier Transform", In Proceedings of the IEEE, vol. 66, No. 1, Jan. 1978, 34 pages.
Hartson et al., "Advances in Human-Computer Interaction", Chapters 1, 5, and 6, vol. 3, 1992, 121 pages.
Hawkins et al., "Hierarchical Temporal Memory: Concepts, Theory and Terminology", Numenta, Inc., Mar. 27, 2007, 20 pages.
He et al., "Personal Security Agent: KQML-Based PKI", The Robotics Institute, Carnegie-Mellon University, Paper, 1997, 14 pages.
Headset Button Controller v7.3 APK Full App Download for Android, Blackberry, iPhone, 11 pages.
Hear voice from Google translate, Available on URL:https://www.youtube.com/watch?v=18AvMhFoD28, Jan. 28, 2011, 1 page.
Heger et al., "KNOWBOT: An Adaptive Data Base Interface", Nuclear Science and Engineering, V. 107, No. 2, Feb. 1991, pp. 142-157.
Helm et al., "Building Visual Language Parsers", Proceedings of CHI'91, Proceedings of the SIGCHI Conference on Human Factors in Computing Systems, 1991, 8 pages.
Hendrickson, Bruce, "Latent Semantic Analysis and Fiedler Retrieval", Linear Algebra and its Applications, vol. 421, 2007, pp. 345-355.
Hendrix et al., "Developing a Natural Language Interface to Complex Data", ACM Transactions on Database Systems, vol. 3, No. 2, Jun. 1978, pp. 105-147.
Hendrix et al., "The Intelligent Assistant: Technical Considerations Involved in Designing Q&A's Natural-Language Interface", Byte Magazine, Issue 14, Dec. 1987, 1 page.
Hendrix et al., "Transportable Natural-Language Interfaces to Databases", SRI International Technical Note 228, Apr. 30, 1981, 18 pages.
Hendrix, Gary G., "Human Engineering for Applied Natural Language Processing", SRI International, Technical Note 139, Feb. 1977, 27 pages.
Hendrix, Gary G., "Klaus: A System for Managing Information and Computational Resources", SRI International, Technical Note 230, Oct. 1980, 34 pages.
Hendrix, Gary G., "Lifer: A Natural Language Interface Facility", SRI Stanford Research Institute, Technical Note 135, Dec. 1976, 9 pages.
Hendrix, Gary G., "Natural-Language Interface", American Journal of Computational Linguistics, vol. 8, No. 2, Apr.-Jun. 1982, pp. 56-61.
Hendrix, Gary G., "The Lifer Manual: A Guide to Building Practical Natural Language Interfaces", SRI International, Technical Note 138, Feb. 1977, 76 pages.
Henrich et al., "Language Identification for the Automatic Grapheme-To-Phoneme Conversion of Foreign Words in a German Text-To-Speech System", Proceedings of the European Conference on Speech Communication and Technology, vol. 2, Sep. 1989, pp. 220-223.
Hermansky, H., "Perceptual Linear Predictive (PLP) Analysis of Speech", Journal of the Acoustical Society of America, vol. 87, No. 4, Apr. 1990. 15 pages.
Hermansky, H., "Recognition of Speech in Additive and Convolutional Noise Based on Rasta Spectral Processing", Proceedings of IEEE International Conference on Acoustics, Speech and Signal Processing (ICASSP'93), Apr. 1993, 4 pages.
Heyer et al., "Exploring Expression Data: Identification and Analysis of Coexpressed Genes", Genome Research, vol. 9, 1999, pp. 1106-1115.
Hill, R. D., "Some Important Features and Issues in User Interface Management System", Dynamic Graphics Project, University of Toronto, CSRI, vol. 21, No. 2, Apr. 1987, pp. 116-120.
Hinckley et al., "A Survey of Design Issues in Spatial Input", UIST '94 Proceedings of the 7th Annual ACM Symposium on User Interface Software and Technology, 1994, pp. 213-222.
Hiroshi, "TeamWork Station: Towards a Seamless Shared Workspace", NTT Human Interface Laboratories, CSCW 90 Proceedings, Oct. 1990, pp. 13-26.

(56) References Cited

OTHER PUBLICATIONS

Hirschman et al., "Multi-Site Data Collection and Evaluation in Spoken Language Understanding", Proceedings of the Workshop on Human Language Technology, 1993, pp. 19-24.
Hobbs et al., "Fastus: A System for Extracting Information from Natural-Language Text", SRI International, Technical Note 519, Nov. 19, 1992, 26 pages.
Hobbs et al., "Fastus: Extracting Information from Natural-Language Texts", SRI International, 1992, pp. 1-22.
Hobbs, Jerry R., "Sublanguage and Knowledge", SRI International, Technical Note 329, Jun. 1984, 30 pages.
Hodjat et al., "Iterative Statistical Language Model Generation for use with an Agent-Oriented Natural Language Interface", Proceedings of HCI International, vol. 4, 2003, pp. 1422-1426.
Hoehfeld et al., "Learning with Limited Numerical Precision Using the Cascade-Correlation Algorithm", IEEE Transactions on Neural Networks, vol. 3, No. 4, Jul. 1992, 18 pages.
Holmes, "Speech System and Research", 1955, pp. 129-135, 152-153.
Holmes, J, N., "Speech Synthesis and Recognition-Stochastic Models for Word Recognition", Published by Chapman & Hall, London, ISBN 0 412 534304, 1998, 7 pages.
Hon et al., "CMU Robust Vocabulary-Independent Speech Recognition System", IEEE International Conference on Acoustics, Speech and Signal Processing (ICASSP-91), Apr. 1991, 4 pages.
Hon et al., "Towards Large Vocabulary Mandarin Chinese Speech Recognition", Conference on Acoustics, Speech, and Signal Processing, ICASSP-94, IEEE International, vol. 1, Apr. 1994, pp. 545-548.
Hopper, Andy, "Pandora—An Experimental System for Multimedia Applications", Olivetti Research Laboratory, Apr. 1990, pp. 19-34.
Horvitz et al., "Handsfree Decision Support: Toward a Non-invasive Human-Computer Interface", Proceedings of the Symposium on Computer Applications in Medical Care, IEEE Computer Society Press, 1995, p. 955.
Horvitz et al., "In Pursuit of Effective Handsfree Decision Support: Coupling Bayesian Inference, Speech Understanding, and User Models", 1995, 8 pages.
Howard, John H., "(Abstract) An Overview of the Andrew File System", Information Technology Center, Carnegie Mellon University; (CMU-ITC-88-062) to Appear in a future issue of the ACM Transactions on Computer Systems, 1988, pp. 1-6.
Huang et al., "Real-Time Software-Based Video Coder for Multimedia Communication Systems", Department of Computer Science and Information Engineering, 1993, 10 pages.
Huang et al., "The SPHINX-II Speech Recognition System: An Overview", Computer, Speech and Language, vol. 7, No. 2, 1993, 14 pages.
Hukin, R. W., "Testing an Auditory Model by Resynthesis", European Conference on Speech Communication and Technology, Sep. 26-29, 1989, pp. 243-246.
Hunt, "Unit Selection in a Concatenative Speech Synthesis System Using a Large Speech Database", Copyright 1996 IEEE. "To appear in Proc. ICASSP-96, May 7-10, Atlanta, GA" ATR Interpreting Telecommunications Research Labs, Kyoto Japan, 1996, pp. 373-376.
iAP Sports Lingo 0x09 Protocol V1.00, May 1, 2006, 17 pages.
IBM Corporation, "Simon Says Here's How", Users Manual, 1994, 3 pages.
IBM, "Integrated Audio-Graphics User Interface", IBM Technical Disclosure Bulletin, vol. 33, No. 11, Apr. 1991, 4 pages.
IBM, "Speech Editor", IBM Technical Disclosure Bulletin, vol. 29, No. 10, Mar. 10, 1987, 3 pages.
IBM, "Speech Recognition with Hidden Markov Models of Speech Waveforms", IBM Technical Disclosure Bulletin, vol. 34, No. 1, Jun. 1991, 10 pages.
IBM, "Why Buy: ThinkPad", available at <http://www.pc.ibm.com/us/thinkpad/easeofuse.html>, retrieved on Dec. 19, 2002, 2 pages.
iChat AC, "Video Conferencing for the Rest of Us", Apple—Mac OS X'iChat AV, available at <http://www.apple.com/macosx/features/ichat/>, retrieved on Apr. 13, 2006, 3 pages.
id3.org, "id3v2.4.0-Frames", available at <http://id3.org/id3v2.4.0-frames?action=print>, retrieved on Jan. 22, 2015, 41 pages.
IEEE 1394 (Redirected from Firewire, Wikipedia, The Free Encyclopedia, available at <http://www.wikipedia.org/wiki/Firewire>, retrieved on Jun. 8, 2003, 2 pages.
Interactive Voice, available at <http://www.helloivee.com/company/>, retrieved on Feb. 10, 2014, 2 pages.
International Preliminary Report on Patentability received for PCT Patent Application No. PCT/GB2009/051684, dated Jun. 23, 2011, 10 pages.
International Preliminary Report on Patentability received for PCT Patent Application No. PCT/US1993/012637, dated Apr. 10, 1995, 7 pages.
International Preliminary Report on Patentability received for PCT Patent Application No. PCT/US1993/012666, dated Mar. 1, 1995, 5 pages.
International Preliminary Report on Patentability received for PCT Patent Application No. PCT/US1994/011011, dated Feb. 28, 1996, 4 pages.
International Preliminary Report on Patentability received for PCT Patent Application No. PCT/US1995/008369, dated Oct. 9, 1996, 4 pages.
International Preliminary Report on Patentability received for PCT Patent Application No. PCT/US2004/002873, dated Feb. 1, 2006, 5 pages.
International Preliminary report on Patentability received for PCT Patent Application No. PCT/US2004/016519, dated Jan. 23, 2006, 12 pages.
International Preliminary Report on Patentability received for PCT Patent Application No. PCT/US2005/030234, dated Mar. 20, 2007, 9 pages.
International Preliminary Report on Patentability received for PCT Patent Application No. PCT/US2008/000042, dated Jul. 7, 2009, 6 pages.
International Preliminary Report on Patentability received for PCT Patent Application No. PCT/US2008/000043, dated Jul. 7, 2009, 8 pages.
International Preliminary Report on Patentability received for PCT Patent Application No. PCT/US2008/000047, dated Jul. 7, 2009, 8 pages.
International Preliminary Report on Patentability received for PCT Patent Application No. PCT/US2009/051954, dated Mar. 24, 2011, 8 pages.
International Preliminary Report on Patentability received for PCT Patent Application No. PCT/US2009/055577, dated Aug. 6, 2010, 12 pages.
International Preliminary Report on Patentability received for PCT Patent Application No. PCT/US2010/037378, dated Dec. 6, 2011, 9 pages.
International Preliminary Report on Patentability received for PCT Patent Application No. PCT/US2011/020350, dated Jul. 17, 2012, 12 pages.
International Preliminary Report on Patentability received for PCT Patent Application No. PCT/US2011/020825, dated Jan. 13, 2012, 17 pages.
International Preliminary Report on Patentability received for PCT Patent Application No. PCT/US2011/020861, dated Aug. 2, 2012, 11 pages.
International Preliminary Report on Patentability received for PCT Patent Application No. PCT/US2011/037014, dated Dec. 13, 2012, 10 pages.
International Preliminary Report on Patentability received for PCT Patent Application No. PCT/US2012/029810, dated Oct. 3, 2013, 9 pages.
International Preliminary Report on Patentability received for PCT Patent Application No. PCT/US2012/034028, dated Oct. 31, 2013, 7 pages.
International Preliminary Report on Patentability received for PCT Patent Application No. PCT/US2012/040571, dated Dec. 19, 2013, 10 pages.

(56) References Cited

OTHER PUBLICATIONS

International Preliminary Report on Patentability received for PCT Patent Application No. PCT/US2012/040801, dated Dec. 19, 2013, 16 pages.
International Preliminary Report on Patentability received for PCT Patent Application No. PCT/US2012/040931, dated Dec. 18, 2014, 9 pages.
International Preliminary Report on Patentability received for PCT Patent Application No. PCT/US2012/043098, dated Jan. 9, 2014, 8 pages.
International Preliminary Report on Patentability received for PCT Patent Application No. PCT/US2012/043100, dated Jan. 9, 2014, 7 pages.
International Preliminary Report on Patentability received for PCT Patent Application No. PCT/US2012/056382, dated Apr. 10, 2014, 9 pages.
International Preliminary Report on Patentability received for PCT Patent Application No. PCT/US2013/028412, dated Sep. 12, 2014, 12 pages.
International Preliminary Report on Patentability received for PCT Patent Application No. PCT/US2013/028920, dated Sep. 18, 2014, 11 pages.
International Preliminary Report on Patentability received for PCT Patent Application No. PCT/US2013/029156, dated Sep. 9, 2014, 7 pages.
International Preliminary Report on Patentability received for PCT Patent Application No. PCT/US2013/041225, dated Nov. 27, 2014, 9 pages.
International Preliminary Report on Patentability received for PCT Patent Application No. PCT/US2013/041233, dated Nov. 18, 2014, 8 pages.
International Preliminary Report on Patentability received for PCT Patent Application No. PCT/US2013/044574, dated Dec. 9, 2014, 8 pages.
International Preliminary Report on Patentability received for PCT Patent Application No. PCT/US2013/044834, dated Dec. 9, 2014, 9 pages.
International Preliminary Report on Patentability received for PCT Patent Application No. PCT/US2013/047659, dated Dec. 31, 2014, 15 pages.
International Preliminary Report on Patentability received for PCT Patent Application No. PCT/US2013/047668, dated Jan. 8, 2015, 13 pages.
International Preliminary Report on Patentability received for PCT Patent Application No. PCT/US2013/052558, dated Feb. 12, 2015, 12 pages.
International Preliminary Report on Patentability received for PCT Patent Application No. PCT/US2013/058916, dated Mar. 19, 2015, 8 pages.
International Preliminary Report on Patentability received for PCT Patent Application No. PCT/US2013/060121, dated Apr. 2, 2015, 6 pages.
International Preliminary Report on Patentability received for PCT Patent Application No. PCT/US2014/015418, dated Aug. 20, 2015, 12 pages.
International Preliminary Report on Patentability received for PCT Patent Application No. PCT/US2014/016988, dated Sep. 3, 2015, 8 pages.
International Preliminary Report on Patentability received for PCT Patent Application No. PCT/US2014/023822, dated Sep. 24, 2015, 12 pages.
International Preliminary Report on Patentability received for PCT Patent Application No. PCT/US2014/023826, dated Sep. 24, 2015, 9 pages.
International Preliminary Report on Patentability received for PCT Patent Application No. PCT/US2014/026871, dated Sep. 24, 2015, 7 pages.
International Preliminary Report on Patentability received for PCT Patent Application No. PCT/US2014/026873, dated Sep. 24, 2015, 9 pages.
International Preliminary Report on Patentability received for PCT Patent Application No. PCT/US2014/028785, dated Sep. 24, 2015, 15 pages.
International Preliminary Report on Patentability received for PCT Patent Application No. PCT/US2014/028950, dated Sep. 24, 2015, 8 pages.
International Preliminary Report on Patentability received for PCT Patent Application No. PCT/US2014/029050, dated Sep. 24, 2015, 7 pages.
International Preliminary Report on Patentability received for PCT Patent Application No. PCT/US2014/029562, dated Sep. 24, 2015, 16 pages.
International Preliminary Report on Patentability received for PCT Patent Application No. PCT/US2014/040393, dated Dec. 8, 2015, 15 pages.
International Preliminary Report on Patentability received for PCT Patent Application No. PCT/US2014/040394, dated Dec. 23, 2015, 7 pages.
International Preliminary Report on Patentability received for PCT Patent Application No. PCT/US2014/040397, dated Dec. 17, 2015, 8 pages.
International Preliminary Report on Patentability received for PCT Patent Application No. PCT/US2014/040401, dated Dec. 8, 2015, 6 pages.
International Preliminary Report on Patentability received for PCT Patent Application No. PCT/US2014/040403 dated Dec. 23, 2015, 7 pages.
International Preliminary Report on Patentability received for PCT Patent Application No. PCT/US2014/040961, dated Dec. 17, 2015, 20 pages.
International Preliminary Report on Patentability received for PCT Patent Application No. PCT/US2014/041159, dated Dec. 17, 2015, 8 pages.
International Preliminary Report on Patentability received for PCT Patent Application No. PCT/US2014/041173, dated Dec. 17, 2015, 9 pages.
International Preliminary Report on Patentability received for PCT Patent Application No. PCT/US2014/049568, dated Feb. 18, 2016, 10 pages.
International Search Report and Written Opinion received for PCT Patent Application No. PCT/US1994/011011, dated Feb. 8, 1995, 3 pages (International Search Report only).
International Search Report and Written Opinion received for PCT Patent Application No. PCT/US2004/002873, dated Oct. 13, 2005, 7 pages.
International Search Report and Written Opinion received for PCT Patent Application No. PCT/US2004/016519, dated Nov. 3, 2005, 6 pages.
International Search Report and Written Opinion received for PCT Patent Application No. PCT/US2005/030234, dated Mar. 17, 2006, 11 pages.
International Search Report and Written Opinion received for PCT Patent Application No. PCT/US2005/038819, dated Apr. 5, 2006, 12 pages.
International Search Report and Written Opinion received for PCT Patent Application No. PCT/US2006/048669, dated Jul. 2, 2007, 12 pages.
International Search Report and Written Opinion received for PCT Patent Application No. PCT/US2006/048670, dated May 21, 2007, 11 pages.
International Search Report and Written Opinion received for PCT Patent Application No. PCT/US2006/048753, dated Jun. 19, 2007, 15 pages.
International Search Report and Written Opinion received for PCT Patent Application No. PCT/US2007/026243, dated Mar. 31, 2008, 10 pages.
International Search Report and Written Opinion received for PCT Patent Application No. PCT/US2007/088872, dated May 8, 2008, 8 pages.
International Search Report and Written Opinion received for PCT Patent Application No. PCT/US2007/088873, dated May 8, 2008, 7 pages.

(56) References Cited

OTHER PUBLICATIONS

International Search Report and Written Opinion received for PCT Patent Application No. PCT/US2008/000032, dated Jun. 12, 2008, 7 pages.
International Search Report and Written Opinion received for PCT Patent Application No. PCT/US2008/000042, dated May 21, 2008, 7 pages.
International Search Report and Written Opinion received for PCT Patent Application No. PCT/US2008/000043, dated Oct. 10, 2008, 12 pages.
International Search Report and Written Opinion received for PCT Patent Application No. PCT/US2008/000045, dated Jun. 12, 2008, 7 pages.
International Search Report and Written Opinion received for PCT Patent Application No. PCT/US2008/000047, dated Sep. 11, 2008, 12 pages.
International Search Report and Written Opinion received for PCT Patent Application No. PCT/US2008/000059, dated Sep. 19, 2008, 18 pages.
International Search Report and Written Opinion received for PCT Patent Application No. PCT/US2008/000061, dated Jul. 1, 2008, 13 pages.
International Search Report and Written Opinion received for PCT Patent Application No. PCT/US2009/051954, dated Oct. 30, 2009, 10 pages.
International Search Report and Written Opinion received for PCT Patent Application No. PCT/US2009/055577, dated Jan. 26, 2010, 9 pages.
International Search Report and Written Opinion received for PCT Patent Application No. PCT/US2010/037378, dated Aug. 25, 2010, 14 pages.
International Search Report and Written Opinion received for PCT Patent Application No. PCT/US2011/020350, dated Jun. 30, 2011, 17 pages.
International Search Report and Written Opinion received for PCT Patent Application No. PCT/US2011/020825, dated Mar. 18, 2011, 9 pages.
International Search Report and Written Opinion received for PCT Patent Application No. PCT/US2011/020861, dated Nov. 29, 2011, 12 pages.
International Search Report and Written Opinion received for PCT Patent Application No. PCT/US2012/029810, dated Aug. 17, 2012, 11 pages.
International Search Report and Written Opinion received for PCT Patent Application No. PCT/US2012/034028, dated Jun. 11, 2012, 9 pages.
International Search Report and Written Opinion received for PCT Patent Application No. PCT/US2012/040571, dated Nov. 16, 2012, 14 pages.
International Search Report and Written Opinion received for PCT Patent Application No. PCT/US2012/040801, dated Oct. 22, 2012, 20 pages.
International Search Report and Written Opinion received for PCT Patent Application No. PCT/US2012/040931, dated Feb. 1, 2013, 4 pages (International Search Report only).
International Search Report and Written Opinion received for PCT Patent Application No. PCT/US2012/043098, dated Nov. 14, 2012, 9 pages.
International Search Report and Written Opinion received for PCT Patent Application No. PCT/US2012/043100, dated Nov. 15, 2012, 8 pages.
International Search Report and Written Opinion received for PCT Patent Application No. PCT/US2012/056382, dated Dec. 20, 2012, 11 pages.
International Search Report and Written Opinion received for PCT Patent Application No. PCT/US2013/028412, dated Sep. 26, 2013, 17 pages.
International Search Report and Written Opinion received for PCT Patent Application No. PCT/US2013/028920, dated Jun. 27, 2013, 14 pages.
International Search Report and Written Opinion received for PCT Patent Application No. PCT/US2013/029156, dated Jul. 15, 2013, 9 pages.
International Search Report and Written Opinion received for PCT Patent Application No. PCT/US2013/040971, dated Nov. 12, 2013, 11 pages.
International Search Report and Written Opinion received for PCT Patent Application No. PCT/US2013/041225, dated Aug. 23, 2013, 3 pages (International Search Report only).
International Search Report and Written Opinion received for PCT Patent Application No. PCT/US2013/044574, dated Sep. 27, 2013, 12 pages.
International Search Report and Written Opinion received for PCT Patent Application No. PCT/US2013/044834, dated Dec. 20, 2013, 13 pages.
International Search Report and Written Opinion received for PCT Patent Application No. PCT/US2013/047659, dated Jul. 7, 2014, 25 pages.
International Search Report and Written Opinion received for PCT Patent Application No. PCT/US2013/047668, dated Feb. 13, 2014, 17 pages.
International Search Report and Written Opinion received for PCT Patent Application No. PCT/US2013/052558, dated Jan. 30, 2014, 15 pages.
International Search Report and Written Opinion received for PCT Patent Application No. PCT/US2013/058916, dated Sep. 8, 2014, 10 pages.
International Search Report and Written Opinion received for PCT Patent Application No. PCT/US2013/060121, dated Dec. 6, 2013, 8 pages.
International Search Report and Written Opinion received for PCT Patent Application No. PCT/US2014/015418, dated Aug. 26, 2014, 17 pages.
International Search Report and Written Opinion received for PCT Patent Application No. PCT/US2014/016988, dated Apr. 29, 2014, 10 pages.
International Search Report and Written Opinion received for PCT Patent Application No. PCT/US2014/023822, dated Sep. 25, 2014, 14 pages.
International Search Report and Written Opinion received for PCT Patent Application No. PCT/US2014/023826, dated Oct. 9, 2014, 13 pages.
International Search Report and Written Opinion received for PCT Patent Application No. PCT/US2014/026871, dated Jul. 23, 2014, 9 pages.
International Search Report and Written Opinion received for PCT Patent Application No. PCT/US2014/026873, dated Jan. 5, 2015, 11 pages.
International Search Report and Written Opinion received for PCT Patent Application No. PCT/US2014/028785, dated Oct. 17, 2014, 23 pages.
International Search Report and Written Opinion received for PCT Patent Application No. PCT/US2014/028950, dated Nov. 25, 2014, 10 pages.
International Search Report and Written Opinion received for PCT Patent Application No. PCT/US2014/029050, dated Jul. 31, 2014, 9 pages.
International Search Report and Written Opinion received for PCT Patent Application No. PCT/US2014/029562, dated Sep. 18, 2014, 21 pages.
International Search Report and Written Opinion received for PCT Patent Application No. PCT/US2014/040393, dated Dec. 8, 2014, 23 pages.
International Search Report and Written Opinion received for PCT Patent Application No. PCT/US2014/040394, dated Aug. 8, 2014, 11 pages.
International Search Report and Written Opinion received for PCT Patent Application No. PCT/US2014/040397, dated Aug. 27, 2014, 12 pages.
International Search Report and Written Opinion received for PCT Patent Application No. PCT/US2014/040401, dated Sep. 4, 2014, 10 pages.

(56) References Cited

OTHER PUBLICATIONS

International Search Report and Written Opinion received for PCT Patent Application No. PCT/US2014/040403, dated Sep. 23, 2014, 9 pages.
International Search Report and Written Opinion received for PCT Patent Application No. PCT/US2014/040961, dated Mar. 10, 2015, 5 pages.
International Search Report and Written Opinion received for PCT Patent Application No. PCT/US2014/041159, dated Sep. 26, 2014, 10 pages.
International Search Report and Written Opinion received for PCT Patent Application No. PCT/US2014/041173, dated Sep. 10, 2014, 11 pages.
International Search Report and Written Opinion received for PCT Patent Application No. PCT/US2014/049568, dated Nov. 14, 2014, 12 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2014/053958, dated Feb. 19, 2015, 10 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/019321, dated Jun. 3, 2015, 11 pages.
International Search Report and Written Opinion received for PCT Patent Application No. PCT/US2015/019322, dated Jun. 18, 2015, 16 pages.
International Search Report and Written Opinion received for PCT Patent Application No. PCT/US2015/023089, dated Aug. 20, 2015, 16 pages.
International Search Report and Written Opinion received for PCT Patent Application No. PCT/US2015/023097, dated Jul. 7, 2015, 15 pages.
International Search Report and Written Opinion received for PCT Patent Application No. PCT/US2015/023593, dated Aug. 14, 2015, 16 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/032470, dated Oct. 1, 2015, 13 pages.
International Search Report and Written Opinion received for PCT Patent Application No. PCT/US2015/032724, dated Jul. 27, 2015, 11 pages.
International Search Report and Written Opinion received for PCT Patent Application No. PCT/US2015/033051, dated Aug. 5, 2015, 14 pages.
International Search Report and Written Opinion received for PCT Patent Application No. PCT/US2015/047062, dated Jan. 13, 2016, 25 pages.
International Search Report and Written Opinion received for PCT Patent Application No. PCT/US2015/047064, dated Nov. 13, 2015, 13 pages.
International Search Report and Written Opinion received for PCT Patent Application No. PCT/US2015/047281, dated Dec. 17, 2015, 19 pages.
International Search Report and Written Opinion received for PCT Patent Application No. PCT/US2015/047553, dated Jan. 5, 2016, 10 pages.
International Search Report and Written opinion received for PCT Patent Application No. PCT/US2015/047583, dated Feb. 3, 2016, 11 pages.
International Search Report and Written Opinion received for PCT Patent Application No. PCT/US2015/053365, dated Mar. 10, 2016, 20 pages.
International Search Report received for PCT Patent Application No. PCT/GB2009/051684, dated Mar. 12, 2010, 4 pages.
International Search Report received for PCT Patent Application No. PCT/US1993/012666, dated Nov. 9, 1994, 8 pages.
International Search Report received for PCT Patent Application No. PCT/US1994/000687, dated Jun. 3, 1994, 1 page.
International Search Report received for PCT Patent Application No. PCT/US1994/00077, dated May 25, 1994, 2 pages.
International Search Report received for PCT Patent Application No. PCT/US1995/008369, dated Nov. 8, 1995, 6 pages.
International Search Report received for PCT Patent Application No. PCT/US1995/013076, dated Feb. 2, 1996, 1 page.
International Search Report received for PCT Patent Application No. PCT/US1996/01002, dated Oct. 30, 1996, 4 pages.
International Search Report received for PCT Patent Application No. PCT/US2002/024669, dated Nov. 5, 2002, 3 pages.
International Search Report received for PCT Patent Application No. PCT/US2002/024670, dated Sep. 26, 2002, 3 pages.
International Search Report received for PCT Patent Application No. PCT/US2002/033330, dated Feb. 4, 2003, 6 pages.
International Search Report received for PCT Patent Application No. PCT/US2005/040797, dated Nov. 24, 2006, 6 pages.
International Search Report received for PCT Patent Application No. PCT/US2011/037014, dated Oct. 4, 2011, 6 pages.
International Search Report received for PCT Patent Application No. PCT/US2013/041233, dated Nov. 22, 2013, 3 pages.
Intraspect Software, "The Intraspect Knowledge Management Solution: Technical Overview", available at <http://tomgruber.org/writing/intraspect-whitepaper-1998.pdf>, 1998, 18 pages.
Invitation to Pay Additional Fees and Partial International Search Report received for PCT Patent Application No. PCT/US2004/016519, dated Aug. 4, 2005, 6 pages.
Invitation to Pay Additional Fees and Partial International Search Report received for PCT Patent Application No. PCT/US2005/046797, dated Jul. 3, 2006, 6 pages.
Invitation to Pay Additional Fees and Partial International Search Report received for PCT Patent Application No. PCT/US2006/048738, dated Jul. 10, 2007, 4 pages.
Invitation to Pay Additional Fees and Partial International Search Report received for PCT Patent Application No. PCT/US2011/020350, dated Apr. 14, 2011, 5 pages.
Invitation to Pay Additional Fees and Partial International Search Report received for PCT Patent Application No. PCT/US2015/023089, dated Jun. 17, 2015, 7 pages.
Invitation to Pay Additional Fees received for PCT Patent Application No. PCT/US2008/000043, dated Jun. 27, 2008, 4 pages.
Invitation to Pay Additional Fees received for PCT Patent Application No. PCT/US2008/000047, dated Jul. 4, 2008, 4 pages.
Invitation to Pay Additional Fees received for PCT Patent Application No. PCT/US2011/037014, dated Aug. 2, 2011, 6 pages.
Invitation to Pay Additional Fees received for PCT Patent Application No. PCT/US2012/040801, dated Aug. 8, 2012, 2 pages.
Invitation to Pay Additional Fees received for PCT Patent Application No. PCT/US2013/047659, dated Feb. 27, 2014, 7 pages.
Invitation to Pay Additional Fees received for PCT Patent Application No. PCT/US2013/052558, dated Nov. 7, 2013, 6 pages.
Invitation to Pay Additional Fees received for PCT Patent Application No. PCT/US2014/040961, dated Jan. 14, 2015, 3 pages.
Iowegian International, "FIR Filter Properties, DSPGuru, Digital Signal Processing Central", available at <http://www.dspguru.com/dsp/faq/fir/properties> retrieved on Jul. 28, 2010, 6 pages.
iPhone Hacks, "Native iPhone MMS Application Released", available at <http://www.iphonehacks.com/2007/12/iphone-mms-app.html>, retrieved on Dec. 25, 2007, 5 pages.
iPhoneChat, "iChat for iPhone in JavaScript", available at <http://www.publictivity.com/iPhoneChat/>, retrieved on Dec. 25, 2007, 2 pages.

(56) References Cited

OTHER PUBLICATIONS

Iso-Sipila et al., "Multi-Lingual Speaker-Independent Voice User Interface for Mobile Devices", ICASSP 2006 Proceedings, IEEE International Conference on Acoustics, Speech and Signal Processing May 14, 2006, pp. 1-1081.
Issar et al., "CMU's Robust Spoken Language Understanding System", Proceedings of Eurospeech, 1993, 4 pages.
Issar, Sunil, "Estimation of Language Models for New Spoken Language Applications", Proceedings of 4th International Conference on Spoken language Processing, Oct. 1996, 4 pages.
Jabra Corporation, "FreeSpeak: BT200 User Manual", 2002, 42 pages.
Jabra, "Bluetooth Headset: User Manual", 2005, 17 pages.
Jabra, "Bluetooth Introduction", 2004, 15 pages.
Jacobs et al., "Scisor: Extracting Information from On-Line News", Communications of the ACM, vol. 33, No. 11, Nov. 1990, 10 pages.
Janas, Jurgen M., "The Semantics-Based Natural Language Interface to Relational Databases", Chapter 6, Cooperative Interfaces to Information Systems, 1986, pp. 143-188.
Jawaid et al., "Machine Translation with Significant Word Reordering and Rich Target-Side Morphology", WDS'11 Proceedings of Contributed Papers, Part I, 2011, pp. 161-166.
Jaybird, "Everything Wrong with AIM: Because We've All Thought About It", available at <http://www.psychonoble.com/archives/articles/82.html>, May 24, 2006, 3 pages.
Jeffay et al., "Kernel Support for Live Digital Audio and Video", in Proc. of the Second Intl. Workshop on Network and Operating System Support for Digital Audio and Video, vol. 614, Nov. 1991, pp. 10-21.
Jelinek et al., "Interpolated Estimation of Markov Source Parameters from Sparse Data", In Proceedings of the Workshop on Pattern Recognition in Practice,, May 1980, pp. 381-397.
Jelinek, F., "Self-Organized Language Modeling for Speech Recognition", Readings in Speech Recognition, Edited by Alex Waibel and Kai-Fu Lee, Morgan Kaufmann Publishers, Inc., ISBN: 1-55860-124-4, 1990, 63 pages.
Jennings et al., "A Personal News Service Based on a User Model Neural Network", IEICE Transactions on Information and Systems, vol. E75-D, No. 2, Mar. 1992, 12 pages.
Ji et al., "A Method for Chinese Syllables Recognition Based upon Sub-syllable Hidden Markov Model", 1994 International Symposium on Speech, Image Processing and Neural Networks, Hong Kong, Apr. 1994, 4 pages.
Jiang et al., "A Syllable-based Name Transliteration System", Proc. of the 2009 Named Entities Workshop, Aug. 7, 2009, pp. 96-99.
Johnson, Jeff A., "A Comparison of User Interfaces for Panning on a Touch-Controlled Display", CHI '95 Proceedings, 1995, 8 pages.
Johnson, Julia Ann., "A Data Management Strategy for Transportable Natural Language Interfaces", Doctoral Thesis Submitted to the Department of Computer Science, University of British Columbia, Canada, Jun. 1989, 285 pages.
Jones, J., "Speech Recognition for Cyclone", Apple Computer, Inc., E.R.S. Revision 2.9, Sep. 10, 1992, 93 pages.
Jouvet et al., "Evaluating Grapheme-to-phoneme Converters in Automatic Speech Recognition Context", IEEE,, 2012,, pp. 4821-4824.
Julia et al., "http://www.speech.sri.com/demos/atis.html", Proceedings of AAAI, Spring Symposium, 1997, 5 pages.
Julia et al., "Un Editeur Interactif De Tableaux Dessines a Main Levee (An Interactive Editor for Hand-Sketched Tables)", Traitement du Signal, vol. 12, No. 6, 1995, pp. 619-626.
Kaeppner et al., "Architecture of HeiPhone: A Testbed for Audio/Video Teleconferencing", IBM European Networking Center, 1993.
Kahn et al., "CoABS Grid Scalability Experiments", Autonomous Agents and Multi-Agent Systems, vol. 7, 2003, pp. 171-178.
Kamba et al., "Using Small Screen Space More Efficiently", CHI '96 Proceedings of the SIGCHI Conference on Human Factors in Computing Systems, Apr. 13-18, 1996, pp. 383-390.
Kamel et al., "A Graph Based Knowledge Retrieval System", IEEE International Conference on Systems, Man and Cybernetics, 1990, pp. 269-275.
Kane et al., "Slide Rule: Making Mobile Touch Screens Accessible to Blind People Using Multi-Touch Interaction Techniques", ASSETS, Oct. 13-15, 2008, pp. 73-80.
Kang et al., "Quality Improvement of LPC-Processed Noisy Speech by Using Spectral Subtraction", IEEE Transactions on Acoustics, Speech and Signal Processing, vol. 37, No. 6, Jun. 1989, pp. 939-942.
Karp, P. D., "A Generic Knowledge-Base Access Protocol", Available online at <http://lecture.cs.buu.ac.th/f50353/Document/gfp.pdf>, May 12, 1994, 66 pages.
Katz et al., "Exploiting Lexical Regularities in Designing Natural Language Systems", Proceedings of the 12th International Conference on Computational Linguistics, 1988, pp. 1-22.
Katz et al., "REXTOR: A System for Generating Relations from Natural Language", Proceedings of the ACL Workshop on Natural Language Processing and Information Retrieval (NLP&IR), Oct. 2000, 11 pages.
Katz, Boris, "A Three-Step Procedure for Language Generation", Massachusetts Institute of Technology, A.I. Memo No. 599, Dec. 1980, pp. 1-40.
Katz, Boris, "Annotating the World Wide Web Using Natural Language", Proceedings of the 5th RIAO Conference on Computer Assisted Information Searching on the Internet, 1997, 7 pages.
Katz, Boris, "Using English for Indexing and Retrieving", Proceedings of the 1st RIAO Conference on User-Oriented Content-Based Text and Image Handling, 1988, pp. 314-332.
Katz, S. M., "Estimation of Probabilities from Sparse Data for the Language Model Component of a Speech Recognizer", IEEE Transactions on Acoustics, Speech and Signal Processing, vol. ASSP-35, No. 3, Mar. 1987, 3 pages.
Kazemzadeh et al., "Acoustic Correlates of User Response to Error in Human-Computer Dialogues", Automatic Speech Recognition and Understanding, 2003, pp. 215-220.
Kazmucha, Allyson, "How to Send Map Locations Using iMessage", iMore.com, Available at <http://www.imore.com/how-use-imessage-share-your-location-your-iphone>, Aug. 2, 2012, 6 pages.
Keahey et al., "Non-Linear Image Magnification", Apr. 24, 1996, 11 pages.
Keahey et al., "Nonlinear Magnification Fields", Proceedings of the 1997 IEEE Symposium on Information Visualization, 1997, 12 pages.
Keahey et al., "Techniques for Non-Linear Magnification Transformations", IEEE Proceedings of Symposium on Information Visualization, Oct. 1996, pp. 38-45.
Keahey et al., "Viewing Text With Non-Linear Magnification: An Experimental Study", Department of Computer Science, Indiana University, Apr. 24, 1996, pp. 1-9.
Kennedy, P J., "Digital Data Storage Using Video Disc", IBM Technical Disclosure Bulletin, vol. 24, No. 2, Jul. 1981, p. 1171.
Kerr, "An Incremental String Search in C: This Data Matching Algorithm Narrows the Search Space with each Keystroke", Computer Language, vol. 6, No. 12, Dec. 1989, pp. 35-39.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
Kikui, Gen-Itiro, "Identifying the Coding System and Language of On-Line Documents on the Internet", International Conference on Computational, Aug. 1996, pp. 652-657.
Kim, E.A. S., "The Structure and Processing of Fundamental Frequency Contours", University of Cambridge, Doctoral Thesis, Apr. 1987, 378 pages.
Kirstein et al., "Piloting of Multimedia Integrated Communications for European Researchers", Proc. INET '93, 1993, pp. 1-12.
Kitano, H., "PhiDM-Dialog, An Experimental Speech-to-Speech Dialog Translation System", Computer, vol. 24, No. 6, Jun. 1991. 13 pages.
Kitaoka et al., "Detection and Recognition of Correction Utterances on Misrecognition of Spoken Dialog System", Systems and Computers in Japan, vol. 36, No. 11 Oct. 2005, pp. 24-33.

(56) References Cited

OTHER PUBLICATIONS

Kjelldahl et al., "Multimedia—Principles, Systems, and Applications", Proceedings of the 1991 Eurographics Workshop on Multimedia Systems, Applications, and Interaction, Apr. 1991.
Klabbers et al., "Reducing Audible Spectral Discontinuities", IEEE Transactions on Speech and Audio Processing, vol. 9, No. 1, Jan. 2001, 13 pages.
Klatt et al., "Linguistic Uses of Segmental Duration in English: Acoustic and Perpetual Evidence", Journal of the Acoustical Society of America, vol. 59, No. 5, May 1976, 16 pages.
Kline et al., "Improving GUI Accessibility for People with Low Vision", CHI '95 Proceedings of the SIGCHI Conference on Human Factors in Computing Systems, May 7-11, 1995, pp. 114-121.
Kline et al., "UnWindows 1.0: X Windows Tools for Low Vision Users", ACM SIGCAPH Computers and the Physically Handicapped, No. 49, Mar. 1994, pp. 1-5.
Knight et al., "Heuristic Search", Production Systems, Artificial Intelligence, 2nd ed., McGraw-Hill, Inc., 1983-1991.
Knownav, "Knowledge Navigator", YouTube Video available at <http://www.youtube.com/watch?v=QRH8eimU_20>, Apr. 29, 2008, 1 page.
Kohler, Joachim, "Multilingual Phone Models for Vocabulary-Independent Speech Recognition Tasks", Speech Communication, vol. 35, No. 1-2, Aug. 2001, pp. 21-30.
Kominek et al., "Impact of Durational Outlier Removal from Unit Selection Catalogs", 5th ISCA Speech Synthesis Workshop, Jun. 14-16, 2004, 6 pages.
Konolige, Kurt, "A Framework for a Portable Natural-Language Interface to Large Data Bases", SRI International, Technical Note 197, Oct. 12, 1979, 54 pages.
Kroon et al., "Pitch Predictors with High Temporal Resolution", IEEE, vol. 2, 1990, pp. 661-664.
Kroon et al., "Quantization Procedures for the Excitation in CELP Coders", (Proceedings of IEEE International Acoustics, Speech, and Signal Processing Conference, Apr. 1987), as reprinted in Vector Quantization (IEEE Press, 1990), 1990, pp. 320-323.
Kubala et al., "Speaker Adaptation from a Speaker-Independent Training Corpus", International Conference on Acoustics, Speech and Signal Processing (ICASSP'90), Apr. 1990, 4 pages.
Kubala et al., "The Hub and Spoke Paradigm for CSR Evaluation", Proceedings of the Spoken Language Technology Workshop, Mar. 1994, 9 pages.
Kuo et al., "A Radical-Partitioned coded Block Adaptive Neural Network Structure for Large-Volume Chinese Characters Recognition", International Joint Conference on Neural Networks, vol. 3, Jun. 1992, pp. 597-601.
Kuo et al., "A Radical-Partitioned Neural Network System Using a Modified Sigmoid Function and a Weight-Dotted Radical Selector for Large-Volume Chinese Character Recognition VLSI", IEEE Int. Symp. Circuits and Systems, Jun. 1994, pp. 3862-3865.
Kurlander et al., "Comic Chat", [Online], 1996 [Retrieved on: Feb 4, 2013], SIGGRAPH '96 Proceedings of the 23rd annual conference on Computer graphics and interactive techniques, [Retrieved from: http://delivery.acm.org/10.1145/240000/237260/p225-kurlander.pdf], 1996, pp. 225-236.
Ladefoged, Peter, "A Course in Phonetics", New York, Harcourt, Brace, Jovanovich, Second Edition, 1982.
Laface et al., "A Fast Segmental Viterbi Algorithm for Large Vocabulary Recognition", International Conference on Acoustics, Speech, and Signal Processing, vol. 1, May 1995, pp. 560-563.
Lafferty et al., "Conditional Random Fields: Probabilistic Models for Segmenting and Labeling Sequence Data", Proceedings of the 18th International Conference on Machine Learning, 2001, 9 pages.
Laird et al., "SOAR: An Architecture for General Intelligence", Artificial Intelligence, vol. 33, 1987, pp. 1-64.
Lamel et al., "Generation and synthesis of Broadcast Messages", Proceedings of ESCA-NATO Workshop: Applications of Speech Technology, Sep. 1, 1993, 4 pages.
Lamping et al., "Laying Out and Visualizing Large Trees Using a Hyperbolic Space", Proceedings of the ACM Symposium on User Interface Software and Technology, Nov. 1994, pp. 13-14.
Lamping et al., "Visualizing Large Trees Using the Hyperbolic Browser", Apple Inc., Video Clip, MIT Media Library, on a CD, 1995.
Langley et al., "A Design for the ICARUS Architechture", SIGART Bulletin, vol. 2, No. 4, 1991, pp. 104-109.
Lantz et al., "Towards a Universal Directory Service", Departments of Computer Science and Electrical Engineering, Stanford University, 1985, pp. 250-260.
Lantz, Keith, "An Experiment in Integrated Multimedia Conferencing", 1986, pp. 267-275.
Larks, "Intelligent Software Agents", available at <http://www.cs.cmu.edu/~softagents/larks.html> retrieved on Mar. 15, 2013, 2 pages.
Lau et al., "Trigger-Based Language Models: A Maximum Entropy Approach", ICASSP'93 Proceedings of the 1993 IEEE international conference on Acoustics, speech, and signal processing: speech processing—vol. II, 1993, pp. 45-48.
Lauwers et al., "Collaboration Awareness in Support of Collaboration Transparency: Requirements for the Next Generation of Shared Window Systems", CHI'90 Proceedings, 1990, pp. 303-311.
Lauwers et al., "Replicated Architectures for Shared Window Systems: A Critique", COCS '90 Proceedings of the ACM SIGOIS and IEEE CS TC-OA conference on Office information systems, ACM SIGOIG Bulletin, 1990, pp. 249-260.
Lazzaro, Joseph J., "Adapting Desktop Computers to Meet the Needs of Disabled Workers is Easier Than You Might Think", Computers for the Disabled, BYTE Magazine, Jun. 1993, 4 pages.
Leahy et al., "Effect of Touch Screen Target Location on User Accuracy", Proceedings of the Human Factors Society 34th Annual Meeting, 1990, 5 pages.
Lee et al., "A Multi-Touch Three Dimensional Touch-Sensitive Tablet", CHI '85 Proceedings of the SIGCHI Conference on Human Factors in Computing Systems, Apr. 1985, pp. 21-25.
Lee et al., "A Real-Time Mandarin Dictation Machine for Chinese Language with Unlimited Texts and Very Large Vocabulary", International Conference on Acoustics, Speech and Signal Processing, vol. 1, Apr. 1990, 5 pages.
Lee et al., "Golden Mandarin (II)—An improved Single-Chip Real-Time Mandarin Dictation Machine for Chinese Language with Very Large Vocabulary", IEEE International Conference of Acoustics, Speech and Signal Processing, vol. 2, 1993, 4 pages.
Lee et al., "Golden Mandarin (II)—An Intelligent Mandarin Dictation Machine for Chinese Character Input with Adaptation/Learning Functions", International Symposium on Speech, Image Processing and Neural Networks, Hong Kong, Apr. 1994, 5 pages.
Lee et al., "On URL Normalization", Proceedings of the International Conference on Computational Science and its Applications, ICCSA 2005, pp. 1076-1085.
Lee et al., "System Description of Golden Mandarin (I) Voice Input for Unlimited Chinese Characters", International Conference on Computer Processing of Chinese & Oriental Languages, vol. 5, No. 3 & 4, Nov. 1991, 16 pages.
Lee, K. F., "Large-Vocabulary Speaker-Independent Continuous Speech Recognition: The SPHINX System", Partial Fulfillment of the Requirements for the Degree of Doctorof Philosophy, Computer Science Department, Carnegie Mellon University, Apr. 1988, 195 pages.
Lee, Kai-Fu, "Automatic Speech Recognition", 1989, 14 pages (Table of Contents).
Lemon et al., "Multithreaded Context for Robust Conversational Interfaces: Context—Sensitive Speech Recognition and Interpretation of Corrective Fragments", ACM Transactions on Computer-Human Interaction, vol. 11, No. 3, Sep. 2004, pp. 241-267.
Leong et al., "CASIS: A Context-Aware Speech Interface System", Proceedings of the 10th International Conference on Intelligent User Interfaces, Jan. 2005, pp. 231-238.
Leung et al., "A Review and Taxonomy of Distortion-Oriented Presentation Techniques", ACM Transactions on Computer-Human Interaction (TOCHI), vol. 1, No. 2, Jun. 1994, pp. 126-160.

(56) References Cited

OTHER PUBLICATIONS

Leveseque et al., "A Fundamental Tradeoff in Knowledge Representation and Reasoning", Readings in Knowledge Representation, 1985, 30 pages.
Levinson et al., "Speech synthesis in telecommunications", IEEE Communications Magazine, vol. 31, No. 11, Nov. 1993, pp. 46-53.
Lewis, "Speech synthesis in a computer aided learning environment", UK IT, Mar. 19-22, 1990, pp. 294-298.
Lewis, Cameron, "Task Ave for iPhone Review", Mac Life, Available at <http://www.maclife.com/article/reviews/task_ave_iphone_review>, Mar. 3, 2011, 5 pages.
Lewis, Peter, "Two New Ways to Buy Your Bits", CNN Money, available at <http://money.cnn.com/2003/12/30/commentary/ontechnology/download/>,, Dec. 31, 2003, 4 pages.
Li et al., "A Phonotactic Language model for Spoken Language Identification", Proceedings of the 43rd Annual Meeting of the ACL, Jun. 25, 2005, pp. 515-522.
Lieberman et al., "Out of Context: Computer Systems that Adapt to, and Learn from, Context", IBM Systems Journal, vol. 39, No. 3 & 4, 2000, pp. 617-632.
Lieberman, Henry, "A Multi-Scale, Multi-Layer, Translucent Virtual Space", Proceedings of IEEE Conference on Information Visualization, Aug. 1997, pp. 124-131.
Lieberman, Henry, "Powers of Ten Thousand: Navigating in Large Information Spaces", Proceedings of the ACM Symposium on User Interface Software and Technology, Nov. 1994, pp. 1-2.
Lin et al., "A Distributed Architecture for Cooperative Spoken Dialogue Agents with Coherent Dialogue State and History", Available on line at <http://citeseerx.ist.psu.edu/viewdoc/summary?doi=10.1.1.42.272>, 1999, 4 pages.
Lin et al., "A New Framework for Recognition of Mandarin Syllables with Tones Using Sub-syllabic Unites", IEEE International Conference on Acoustics, Speech and Signal Processing (ICASSP-93), Apr. 1993, 4 pages.
Linde et al., "An Algorithm for Vector Quantizer Design", IEEE Transactions on Communications, vol. 28, No. 1, Jan. 1980, 12 pages.
Liu et al., "Efficient Joint Compensation of Speech for the Effects of Additive Noise and Linear Filtering", IEEE International Conference of Acoustics, Speech and Signal Processing, ICASSP-92, Mar. 1992, 4 pages.
Logan et al., "Mel Frequency Cepstral Co-efficients for Music Modeling", International Symposium on Music Information Retrieval, 2000, 2 pages.
Lowerre, B. T., "The-Harpy Speech Recognition System", Doctoral Dissertation, Department of Computer Science, Carnegie Mellon University, Apr. 1976, 20 pages.
Lyon, R., "A Computational Model of Binaural Localization and Separation", Proceedings of IEEE International Conference on Acoustics, Speech and Signal Processing, Apr. 1983, pp. 1148-1151.
Lyons et al., "Augmenting Conversations Using Dual-Purpose Speech", Proceedings of the 17th Annual ACM Symposium on User interface Software and Technology, 2004, 10 pages.
Lyons, Richard F., "CCD Correlators for Auditory Models", Proceedings of the Twenty-Fifth Asilomar Conference on Signals, Systems and Computers, Nov. 4-6, 1991, pp. 785-789.
Macchi, Marian, "Issues in Text-to-Speech Synthesis" Proceedings of IEEE International Joint Symposia on Intelligence and Systems, May 21, 1998, pp. 318-325.
Mackenzie et al., "Alphanumeric Entry on Pen-Based Computers", International Journal of Human-Computer Studies, vol. 41, 1994, pp. 775-792.
Mackinlay et al., "The Perspective Wall: Detail and Context Smoothly Integrated", ACM, 1991, pp. 173-179.
Macsimum News, "Apple Files Patent for an Audio Interface for the iPod", available at <http://www.macsimumnews.com/index.php/archive/apple_files_patent_for_an_audio_interface_for_the_ipod>, retrieved on Jul. 13, 2006, 8 pages.
Mactech, "KeyStrokes 3.5 for Mac OS X Boosts Word Prediction", available at <http://www.mactech.com/news/?p=1007129>, retrieved on Jan. 7, 2008, 3 pages.
Maghbouleh, Arman, "An Empirical Comparison of Automatic Decision Tree and Linear Regression Models for Vowel Durations", Revised Version of a Paper Presented at the Computational Phonology in Speech Technology Workshop, 1996 Annual Meeting of the Association for Computational Linguistics in Santa Cruz, California, 7 pages.
Mahedero et al., "Natural Language Processing of Lyrics", In Proceedings of the 13th Annual ACM International Conference on Multimedia, ACM, Nov. 6-11, 2005, 4 pages.
Mangu et al., "Finding Consensus in Speech Recognition: Word Error Minimization and Other Applications of Confusion Networks", Computer Speech and Language, vol. 14, No. 4, 2000, pp. 291-294.
Manning etal, "Foundations of Statistical Natural Language Processing" The MIT Press, Cambridge Massachusetts, 1999, pp. 10-11.
Marcus et al., "Building a Large Annotated Corpus of English: The Penn Treebank", Computational Linguistics, vol. 19, No. 2, 1993, pp. 313-330.
Markel et al., "Linear Prediction of Speech", Springer-Verlag, Berlin, Heidelberg, New York, 1976, 12 pages.
Markel et al., "Linear Production of Speech", Reviews, 1976, pp. xii, 288.
Martin et al., "Building and Using Practical Agent Applications", SRI International, PAAM Tutorial, 1998, 78 pages.
Martin et al., "Building Distributed Software Systems with the Open Agent Architecture", Proceedings of the Third International Conference on the Practical Application of Intelligent Agents and Multi-Agent Technology, Mar. 1998, pp. 355-376.
Martin et al., "Development Tools for the Open Agent Architecture", Proceedings of the International Conference on the Practical Application of Intelligent Agents and Multi-Agent Technology, Apr. 1996, pp. 1-17.
Martin et al., "Information Brokering in an Agent Architecture", Proceedings of the Second International Conference on the Practical Application of Intelligent Agents and Multi-Agent Technology, Apr. 1997, pp. 1-20.
Martin et al., "The Open Agent Architecture: A Framework for Building Distributed Software Systems", Applied Artificial Intelligence: An International Journal, vol. 13, No. 1-2, available at <http://adam.cheyer.com/papers/oaa.pdf>>, retrieved from internet on Jan.-Mar. 1999.
Martin et al., "Transportability and Generality in a Natural-Language Interface System", Proceedings of the Eighth International Joint Conference on Artificial Intelligence, Technical Note 293, Aug. 1983, 21 pages.
Martins et al., "Extracting and Exploring the Geo-Temporal Semantics of Textual Resources", Semantic Computing, IEEE International Conference, 2008, pp. 1-9.
Masui, Toshiyuki, "POBox: An Efficient Text Input Method for Handheld and Ubiquitous Computers", Proceedings of the 1st International Symposium on Handheld and Ubiquitous Computing, 1999, 12 pages.
Matiasek et al., "Tamic-P: A System for NL Access to Social Insurance Database", 4th International Conference on Applications of Natural Language to Information Systems, Jun. 1999, 7 pages.
Matsui et al., "Speaker Adaptation of Tied-Mixture-Based Phoneme Models for Text-Prompted Speaker Recognition", 1994 IEEE International Conference on Acoustics, Speech and Signal Processing, Apr. 19-22, 1994, pp. 1-125-1-128.
Matsuzawa, A, "Low-Voltage and Low-Power Circuit Design for Mixed Analog/Digital Systems in Portable Equipment", IEEE Journal of Solid-State Circuits, vol. 29, No. 4, 1994, pp. 470-480.
McGuire et al., "SHADE: Technology for Knowledge-Based Collaborative Engineering", Journal of Concurrent Engineering Applications and Research (CERA), 1993, 18 pages.
Meet Ivee, Your Wi-Fi Voice Activated Assistant, available at <http://www.helloivee.com/>, retrieved on Feb. 10, 2014, 8 pages.

(56) References Cited

OTHER PUBLICATIONS

Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.
Mellinger, David K., "Feature-Map Methods for Extracting Sound Frequency Modulation", IEEE Computer Society Press, 1991, pp. 795-799.
Meng et al., "Generating Phonetic Cognates to Handle Named Entities in English-Chinese Cross-Language Spoken Document Retrieval", Automatic Speech Recognition and Understanding, Dec. 2001, pp. 311-314.
Meng et al., "Wheels: A Conversational System in the Automobile Classified Domain", Proceedings of Fourth International Conference on Spoken Language, ICSLP 96, vol. 1, Oct. 1996, 4 pages.
Menico, Costas, "Faster String Searches", Dr. Dobb's Journal, vol. 14, No. 7, Jul. 1989, pp. 74-77.
Menta, Richard, "1200 Song MP3 Portable is a Milestone Player", available at <http://www.mp3newswire.net/stories/personaljuke.html>, Jan. 11, 2000, 4 pages.
Meyer, Mike, "A Shell for Modern Personal Computers", University of California, Aug. 1987, pp. 13-19.
Meyrowitz et al., "Bruwin: An Adaptable Design Strategy for Window Manager/Virtual Terminal Systems", Department of Computer Science, Brown University, 1981, pp. 180-189.
Miastkowski, Stan, "paperWorks Makes Paper Intelligent", Byte Magazine, Jun. 1992.
Michos et al., "Towards an Adaptive Natural Language Interface to Command Languages", Natural Language Engineering, vol. 2, No. 3, 1996, pp. 191-209.
Microsoft Corporation, "Microsoft MS-DOS Operating System User's Guide", Microsoft Corporation, 1982, pp. 4-1 to 4-16, 5-1 to 5-19.
Microsoft Corporation, Microsoft Office Word 2003 (SP2), Microsoft Corporation, SP3 as of 2005, pages MSWord 2003 Figures 1-5, 1983-2003.
Microsoft Press, "Microsoft Windows User's Guide for the Windows Graphical Environment", version 3.0, 1985-1990, pp. 33-41 & 70-74.
Microsoft Windows XP, "Magnifier Utility", Oct. 25, 2001, 2 pages.
Microsoft Word 2000 Microsoft Corporation, pages MSWord Figures 1-5, 1999.
Microsoft, "Turn On and Use Magnifier", available at <http://www.microsoft.com/windowsxp/using/accessibility/magnifierturnon.mspx>, retrieved on Jun. 6, 2009.
Microsoft/Ford, "Basic Sync Commands", www.SyncMyRide.com, Sep. 14, 2007, 1 page.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Milner, N. P., "A Review of Human Performance and Preferences with Different Input Devices to Computer Systems", Proceedings of the Fourth Conference of the British Computer Society on People and Computers, Sep. 5-9, 1988, pp. 341-352.
Milstead et al., "Metadata: Cataloging by Any Other Name", available at <http://www.iicm.tugraz.at/thesis/cguetl_diss/literatur/Kapitel06/References/Milstead_et_al._1999/metadata.html>, Jan. 1999, 18 pages.
Milward et al., "D2.2: Dynamic Multimodal Interface Reconfiguration, Talk and Look: Tools for Ambient Linguistic Knowledge", available at <http://www.ihmc.us/users/nblaylock!Pubs/Files/talk d2.2.pdf>, Aug. 8, 2006, 69 pages.
Miniman, Jared, "Applian Software's Replay Radio and Player v1.02", pocketnow.com—Review, available at <http://www.pocketnow.com/reviews/replay/replay.htm>, Jul. 31, 2001, 16 pages.
Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.
Minker et al., "Hidden Understanding Models for Machine Translation", Proceedings of ETRW on Interactive Dialogue in Multi-Modal Systems, Jun. 1999, pp. 1-4.
Mitra et al., "A Graph-Oriented Model for Articulation of Ontology Interdependencies", Advances in Database Technology, Lecture Notes in Computer Science, vol. 1777, 2000, pp. 1-15.
Moberg et al., "Cross-Lingual Phoneme Mapping for Multilingual Synthesis Systems", Proceedings of the 8th International Conference on Spoken Language Processing; Jeju Island, Korea, Interspeech 2004, Oct. 4-8, 2004, 4 pages.
Moberg, M., "Contributions to Multilingual Low-Footprint TTS System for Hand-Held Devices", Doctoral Thesis, Tampere University of Technology, Aug. 17, 2007, 82 pages.
Mobile Speech Solutions, Mobile Accessibility, SVOX AG Product Information Sheet, available at <http://www.svox.com/site/bra840604/con782768/mob965831936.aSQ?osLang=1>, Sep. 27, 2012, 1 page.
Mobile Tech News, "T9 Text Input Software Updated", available at <http://www.mobiletechnews.com/info/2004/11/23/122155.html>, Nov. 23, 2004, 4 pages.
Modi et al., "CMRadar: A Personal Assistant Agent for Calendar Management", AAAI, Intelligent Systems Demonstrations, 2004, pp. 1020-1021.
Mok et al., "Media Searching on Mobile Devices", IEEE EIT 2007 Proceedings, 2007, pp. 126-129.
Moore et al., "Combining Linguistic and Statistical Knowledge Sources in Natural-Language Processing for ATIS", SRI International, Artificial Intelligence Center, 1995, 4 pages.
Moore et al., "SRI's Experience with the ATIS Evaluation", Proceedings the Workshop on Speech and Natural Language, Jun. 1990, pp. 147-148.
Moore et al., "The Information Warfare Advisor: An Architecture for Interacting with Intelligent Agents Across the Web", Proceedings of Americas Conference on Information Systems (AMCIS), Dec. 31, 1998, pp. 186-188.
Moore, Robert C., "Handling Complex Queries in a Distributed Data Base", SRI International, Technical Note 170, Oct. 8, 1979, 38 pages.
Moore, Robert C., "Practical Natural-Language Processing by Computer", SRI International, Technical Note 251, Oct. 1981, 34 pages.
Moore, Robert C., "The Role of Logic in Knowledge Representation and Commonsense Reasoning", SRI International, Technical Note 264, Jun. 1982, 19 pages.
Moore, Robert C., "Using Natural-Language Knowledge Sources in Speech Recognition", SRI International, Artificial Intelligence Center, Jan. 1999, pp. 1-24.
Moran et al., "Intelligent Agent-Based User Interfaces", Proceedings of International Workshop on Human Interface Technology, Oct. 1995, pp. 1-4.
Moran et al., "Multimodal User Interfaces in the Open Agent Architecture", International Conference on Intelligent User Interfaces (IUI97), 1997, 8 pages.
Moran, Douglas B., "Quantifier Scoping in the SRI Core Language Engine", Proceedings of the 26th Annual Meeting on Association for Computational Linguistics, 1988, pp. 33-40.
Morgan, B., "Business Objects (Business Objects for Windows) Business Objects Inc.", DBMS, vol. 5, No. 10, Sep. 1992, 3 pages.
Morland, D. V., "Human Factors Guidelines for Terminal Interface Design", Communications ofthe ACM vol. 26, No. 7, Jul. 1983, pp. 484-494.
Morris et al., "Andrew: A Distributed Personal Computing Environment", Communications of the ACM, (Mar. 1986); vol. 29 No. 3,, Mar. 1986, pp. 184-201.
Morton, Philip, "Checking if an Element is Hidden", StackOverflow, Available at <http://stackoverflow.com/questions/178325/checking-if-an-element-is-hidden>, Oct. 7, 2008, 12 pages.
Motro, Amihai, "Flex: A Tolerant and Cooperative User Interface to Databases", IEEE Transactions on Knowledge and Data Engineering, vol. 2, No. 2, Jun. 1990, pp. 231-246.
Mountford et al., "Talking and Listening to Computers", The Art of Human-Computer Interface Design, Apple Computer, Inc., Addison-Wesley Publishing Company, Inc., 1990, 17 pages.

(56) References Cited

OTHER PUBLICATIONS

Mozer, Michael C., "An Intelligent Environment must be Adaptive", IEEE Intelligent Systems, 1999, pp. 11-13.
Muller et al., "CSCW'92 Demonstrations", 1992, pp. 11-14.
Murty et al., "Combining Evidence from Residual Phase and MFCC Features for Speaker Recognition", IEEE Signal Processing Letters, vol. 13, No. 1, Jan. 2006, 4 pages.
Murveit et al., "Integrating Natural Language Constraints into HMM-Based Speech Recognition", International Conference on Acoustics, Speech and Signal Processing, Apr. 1990, 5 pages.
Murveit et al., "Speech Recognition in SRI's Resource Management and ATIS Systems", Proceedings of the Workshop on Speech and Natural Language, 1991, pp. 94-100.
Musicmatch, "Musicmatch and Xing Technology Introduce Musicmatch Jukebox", Press Releases, available at <http://www.musicmatch.com/info/company/press/releases/?year=1998&release=2>, May 18, 1998, 2 pages.
Muthusamy et al., "Speaker-Independent Vowel Recognition: Spectograms versus Cochleagrams", IEEE, Apr. 1990, pp. 533-536.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
N200 Hands-Free Bluetooth Car Kit, available at <www.wirelessground.com>, retrieved on Mar. 19, 2007, 3 pages.
Nadoli et al., "Intelligent Agents in the Simulation of Manufacturing Systems", Proceedings of the SCS Multiconference on AI and Simulation, 1989, 1 page.
Nakagawa et al., "Speaker Recognition by Combining MFCC and Phase Information", IEEE International Conference on Acoustics, Speech and Signal Processing (ICASSP), Mar. 2010, 4 pages.
Nakagawa et al., "Unknown Word Guessing and Part-of-Speech Tagging Using Support Vector Machines", Proceedings of the 6th NLPRS, 2001, pp. 325-331.
Naone, Erica, "TR10: Intelligent Software Assistant", Technology Review, Mar.-Apr. 2009, 2 pages.
Navigli, Roberto, "Word Sense Disambiguation: A Survey", ACM Computing Surveys, vol. 41, No. 2, Feb. 2009, 70 pages.
NCIP Staff, "Magnification Technology", available at <http://www2.edc.org/ncip/library/vi/magnifi.htm>, 1994, 6 pages.
NCIP, "NCIP Library: Word Prediction Collection", available at <http://www2.edc.org/ncip/library/wp/toc.htm>, 1998, 4 pages.
NCIP, "What is Word Prediction?", available at <http://www2.edc.org/NCIP/library/wp/what_is.htm>, 1998, 2 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Neches et al., "Enabling Technology for Knowledge Sharing", Fall, 1991, pp. 37-56.
Newton, Harry, "Newton's Telecom Dictionary", Mar. 1998, pp. 62, 155, 610-611, 771.
Ng, Simon, "Google's Task List Now Comes to Iphone", SimonBlog, Available at <http://www.simonblog.com/2009/02/04/googles-task-list-now-comes-to-iphone/>, Feb. 4, 2009, 33 pages.
Nguyen et al., "Generic Manager for Spoken Dialogue Systems", In DiaBruck: 7th Workshop on the Semantics and Pragmatics of Dialogue, Proceedings, 2003, 2 pages.
Niesler et al., "A Variable-Length Category-Based N-Gram Language Model", IEEE International Conference on Acoustics, Speech and Signal Processing (ICASSP'96), vol. 1, May 1996, 6 pages.
Nilsson, B. A., "Microsoft Publisher is an Honorable Start for DTP Beginners", Computer Shopper, Feb. 1, 1992, 2 pages.
Noik, Emanuel G., "Layout-Independent Fisheye Views of Nested Graphs", IEEE Proceedings of Symposium on Visual Languages, 1993, 6 pages.
Nonhoff-Arps et al., "StraBenmusik: Portable MP3-Spieler mit USB Anschluss", CT Magazin Fuer Computer Technik, Verlag Heinz Heise GMBH, Hannover DE, No. 25, 2000, pp. 166-175.
Northern Telecom, "Meridian Mail PC User Guide", 1988, 17 Pages.
Notenboom, Leo A., "Can I Retrieve Old MSN Messenger Conversations?", available at <http://ask-leo.com/can_I_retrieve_old_msn_messenger_conversations.html>, Mar. 11, 2004, 23 pages.
Noth et al., "Verbmobil: The Use of Prosody in the Linguistic Components of a Speech Understanding System", IEEE Transactions on Speech and Audio Processing, vol. 8, No. 5, Sep. 2000, pp. 519-532.
O'Connor, Rory J., "Apple Banking on Newton's Brain", San Jose Mercury News, Apr. 22, 1991.
Odubiyi et al., "SAIRE—A Scalable Agent-Based Information Retrieval Engine", Proceedings of the First International Conference on Autonomous Agents, 1997, 12 pages.
Ohsawa et al., "A computational Model of an Intelligent Agent Who Talks with a Person", Research Reports on Information Sciences, Series C, No. 92, Apr. 1989, pp. 1-18.
Ohtomo et al., "Two-Stage Recognition Method of Hand-Written Chinese Characters Using an Integrated Neural Network Model", Denshi Joohoo Tsuushin Gakkai Ronhunshi, D-II, vol. J74, Feb. 1991, pp. 158-165.
Okazaki et al., "Multi-Fisheye Transformation Method for Large-Scale Network Maps", IEEE Japan, vol. 44, No. 6, 1995, pp. 495-500.
Omologo et al., "Microphone Array Based Speech Recognition with Different Talker-Array Positions", IEEE International Conference on Acoustics, Speech, and Signal Processing, vol. 1, Apr. 21-24, 1997, pp. 227-230.
Oregon Scientific, "512MB Waterproof MP3 Player with FM Radio & Built-in Pedometer", available at <http://www2.oregonscientific.com/shop/product.asp?cid=4&scid=11&pid=581>, retrieved on Jul. 31, 2006, 2 pages.
Oregon Scientific, "Waterproof Music Player with FM Radio and Pedometer (MP121)—User Manual", 2005, 24 pages.
OSXDaily, "Get a List of Siri Commands Directly from Sid", Available at <http://osxdaily.com/2013/02/05/list-siri-commands/>, Feb. 5, 2013, 15 pages.
Owei et al., "Natural Language Query Filtration in the Conceptual Query Language", IEEE, 1997, pp. 539-549.
Padilla, Alfredo, "Palm Treo 750 Cell Phone Review—Messaging", available at <http://www.wirelessinfo.com/content/palm-Treo-750-Cell-Phone-Review/Messaging.htm>, Mar. 17, 2007, 6 pages.
Palay et al., "The Andrew Toolkit: An Overview", Information Technology Center, Carnegie-Mellon University, 1988, pp. 1-15.
Palm, Inc., "User Guide: Your Palm® Treo.TM. 755p Smartphone", 2005-2007, 304 pages.
Pan et al., "Natural Language Aided Visual Query Budding for Complex Data Access", In proceeding of: Proceedings of the Twenty-Second Conference on Innovative Applications of Artificial Intelligence, XP055114607, Jul. 11, 2010.
Panasonic, "Toughbook 28: Powerful, Rugged and Wireless", Panasonic: Toughbook Models, available at <http://www.panasonic.com/computer/notebook/html/01a_s8.htm>, retrieved on Dec. 19, 2002, 3 pages.
Pannu et al., "A Learning Personal Agent for Text Filtering and Notification", Proceedings of the International Conference of Knowledge Based Systems, 1996, pp. 1-11.
Papadimitriou et al., "Latent Semantic Indexing: A Probabilistic Analysis", Available online at <http://citeseerx.ist.psu.edu/messages/downloadsexceeded.html>, Nov. 14, 1997, 21 pages.
Parks et al., "Classification of Whale and Ice Sounds with a cochlear Model", IEEE, Mar. 1992.
Parson, T. W., "Voice and Speech Processing", Pitch and Formant Estimation, McGraw-Hill, Inc., ISBN: 0-07-0485541-0, 1987, 15 pages.
Parsons, T. W., "Voice and Speech Processing", Linguistics and Technical Fundamentals, Articulatory Phonetics and Phonemics, McGraw-Hill, Inc., ISBN: 0-07-0485541-0, 1987, 5 pages.
Patent Abstracts of Japan, vol. 014, No. 273 (E-0940)Jun. 13, 1990 (Jun. 13, 1990)—& JP 02 086057 A (Japan Storage Battery Co Ltd), Mar. 27, 1990 (Mar. 27, 1990), 3 pages.

(56) References Cited

OTHER PUBLICATIONS

Patterson et al., "Rendezvous: An Architecture for Synchronous Multi-User Applications", CSCW '90 Proceedings, 1990, Pp. 317-328.
Pearl, Amy, "System Support for Integrated Desktop Video Conferencing", Sunmicrosystems Laboratories, Dec. 1992, pp. 1-15.
Penn et al., "Ale for Speech: A Translation Prototype", Bell Laboratories, 1999, 4 pages.
Pereira, Fernando, "Logic for Natural Language Analysis", SRI International, Technical Note 275, Jan. 1983, 194 pages.
Perrault et al., "Natural-Language Interfaces", SRI International Technical Note 393, Aug. 22, 1986. 48 pages.
PhatNoise, Voice Index on Tap, Kenwood Music Keg, available at <http://www.phatnoise.com/kenwood/kenwoodssamail.html>, retrieved on Jul. 13, 2006, 1 page.
Phillipps, Ben, "Touchscreens are Changing the Face of Computers—Today's Users Have Five Types of Touchscreens to Choose from, Each with its Own Unique Characteristics", Electronic Products, Nov. 1994, pp. 63-70.
Phillips, Dick, "The Multi-Media Workstation", SIGGRAPH '89 Panel Proceedings, 1989, pp. 93-109.
Phoenix Solutions, Inc., "Declaration of Christopher Schmandt Regarding the MIT Galaxy System", West Interactive Corp., A Delaware Corporation, Document 40, Jul. 2, 2010, 162 pages.
Pickering, J. A., "Touch-Sensitive Screens: The Technologies and Their Application", International Journal of Man-Machine Studies, vol. 25, No. 3, Sep. 1986, pp. 249-269.
Picone, J., "Continuous Speech Recognition using Hidden Markov Models", IEEE ASSP Magazine, vol. 7, No. 3, Jul. 1990, 16 pages.
Pingali et al., "Audio-Visual Tracking for Natural Interactivity", ACM Multimedia, Oct. 1999, pp. 373-382.
Plaisant et al., "Touchscreen Interfaces for Alphanumeric Data Entry", Proceedings of the Human Factors and Ergonomics Society 36th Annual Meeting, 1992, pp. 293-297.
Plaisant et al., "Touchscreen Toggle Design", CHI'92, May 3-7, 1992, pp. 667-668.
Poly-Optical Products, Inc., "Poly-Optical Fiber Optic Membrane Switch Backlighting", available at <http://www.poly-optical.com/membrane_switches.html>, retrieved on Dec. 19, 2002; 3 pages.
Poor, Alfred, "Microsoft Publisher", PC Magazine, vol. 10, No. 20, Nov. 26, 1991, 1 page.
Potter et al., "An Experimental Evaluation of Three Touch Screen Strategies within a Hypertext Database", International Journal of Human-Computer Interaction, vol. 1, No. 1, 1989, pp. 41-52.
Potter et al., "Improving the Accuracy of Touch Screens: An Experimental Evaluation of Three Strategies", CHI '88 ACM, 1988, pp. 27-32.
Public Safety Technologies, "Tracer 2000 Computer", available at <http://www.pst911.com/tracer.html>, retrieved on Dec. 19, 2002, 3 pages.
Pulman et al., "Care: A Combined Language and Reasoning Engine", Proceedings of JFIT Conference, available at <http://www.cam.sri.com/tr/crc042/paper.ps.Z>, 1993, 8 pages.
Quazza et al., "Actor: A Multilingual Unit-Selection Speech Synthesis System", Proceedings of 4th ISCA Tutorial and Research Workshop on Speech Synthesis, Jan. 1, 2001, 6 pages.
Quick Search Algorithm Communications of the ACM, 33(8), 1990, pp. 132-142.
Rabiner et al., "Digital Processingof Speech Signals", Prentice Hall, 1978, pp. 274-277.
Rabiner et al., "Fundamental of Speech Recognition", AT&T, Published by Prentice-Hall, Inc., ISBN: 0-13-285826-6, 1993, 17 pages.
Rabiner et al., "Note on the Properties of a Vector Quantizer for LPC Coefficients", Bell System Technical Journal, vol. 62 No. 8, Oct. 1983, 9 pages.
Rampe et al., "SmartForm Designer and SmartForm Assistant", News release, Claris Corp., Jan. 9, 1989, 1 page.
Rao et al., "Exploring Large Tables with the Table Lens", Apple Inc., Video Clip, Xerox Corp., on a CD, 1994.
Rao et al., "Exploring Large Tables with the Table Lens", CHI'95 Mosaic of Creativity, ACM, May 7-11, 1995, pp. 403-404.
Rao et al., "The Table Lens: Merging Graphical and Symbolic Representations in an Interactive Focus+Context Visualization for Tabular Information", Proceedings of the ACM SIGCHI Conference on Human Factors in Computing Systems, Apr. 1994, pp. 1-7.
Raper, Larry K.,"The C-MU PC Server Project", (CMU-ITC-86-051), Dec. 1986, pp. 1-30.
Ratcliffe et al., "Intelligent Agents Take U.S. Bows", MacWeek, vol. 6, No. 9, Mar. 2, 1992, 1 page.
Ratcliffe, M., "ClearAccess 2.0 Allows SQL Searches Off-Line (Structured Query Language) (ClearAccess Corp. Preparing New Version of Data-Access Application with Simplified User Interface, New Features) (Product Announcement)", MacWeek, vol. 6, No. 41, Nov. 16, 1992, 2 pages.
Ravishankar, Mosur K., "Efficient Algorithms for Speech Recognition", Doctoral Thesis Submitted to School of Computer Science, Computer Science Division, Carnegie Mellon University, Pittsburgh, May 15, 1996, 146 pages.
Rayner et al., "Adapting the Core Language Engine to French and Spanish", Cornell University Library, available at <http:l/arxiv.org/abs/cmp-lg/9605015>, May 10, 1996, 9 pages.
Rayner et al., "Deriving Database Queries from Logical Forms by Abductive Definition Expansion", Proceedings of the Third Conference on Applied Natural Language Processing, ANLC, 1992, 8 pages.
Rayner et al., "Spoken Language Translation with Mid-90's Technology: A Case Study", Eurospeech, ISCA, Available online at <http://citeseerx.ist.psu.edu/viewdoc/summary?doi=10.1.1.54.8608>, 1993, 4 pages.
Rayner, M., "Abductive Equivalential Translation and its Application to Natural Language Database Interfacing", Dissertation Paper, SRI International, Sep. 1993, 162 pages.
Rayner, Manny, "Linguistic Domain Theories: Natural-Language Database Interfacing from First Principles", SRI International, Cambridge, 1993, 11 pages.
Reddi, "The Parser".
Reddy, D. R., "Speech Recognition by Machine: A Review", Proceedings of the IEEE, Apr. 1976, pp. 501-531.
Reininger et al., "Speech and Speaker Independent Codebook Design in VQ Coding Schemes", (Proceedings of the IEEE International Acoustics, Speech and Signal Processing Conference, Mar. 1985), as reprinted in Vector Quantization (IEEE Press, 1990), 1990, pp. 271-273.
Remde et al., "SuperBook: An Automatic Tool for Information Exploration—Hypertext?", in Proceedings of Hypertext, 87 Papers, Nov. 1987, 14 pages.
Ren et al., "Efficient Strategies for Selecting Small Targets on Pen-Based Systems: An Evaluation Experiment for Selection Strategies and Strategy Classifications", Proceedings of the IFIP TC2/TC13 WG2.7/WG13.4 Seventh Working Conference on Engineering for Human-Computer Interaction, vol. 150, 1998, pp. 19-37.
Ren et al., "Improving Selection Performance on Pen-Based Systems: A Study of Pen-Based Interaction for Selection Tasks", ACM Transactions on Computer-Human Interaction, vol. 7, No. 3, Sep. 2000, pp. 384-416.
Ren et al., "The Best among Six Strategies for Selecting a Minute Target and the Determination of the Minute Maximum Size of the Targets on a Pen-Based Computer", Human-Computer Interaction INTERACT, 1997, pp. 85-92.
Reynolds, C. F., "On-Line Reviews: A New Application of the HICOM Conferencing System", IEEE Colloquium on Human Factors in Electronic Mail and Conferencing Systems, Feb. 3, 1989, 4 pages.
Rice et al., "Monthly Program: Nov. 14, 1995", The San Francisco Bay Area Chapter of ACM SIGCHI, available at <http://www.baychi.org/calendar/19951114>, Nov. 14, 1995, 2 pages.
Rice et al., "Using the Web Instead of a Window System", Proceedings of the SIGCHI Conference on Human Factors in Computing Systems, CHI'96, 1996, pp. 1-14.

(56) References Cited

OTHER PUBLICATIONS

Ricker, Thomas, "Apple Patents Audio User Interface", Engadget, available at <http://www.engadget.com/2006/05/04/apple-patents-audio-user-interface/>, May 4, 2006, 6 pages.
Riecken, R D., "Adaptive Direct Manipulation", IEEE Xplore, 1991, pp. 1115-1120.
Rigoll, G., "Speaker Adaptation for Large Vocabulary Speech Recognition Systems Using Speaker Markov Models", International Conference on Acoustics, Speech and Signal Processing (ICASSP'89), May 1989, 4 pages.
Riley, M D., "Tree-Based Modelling of Segmental Durations", Talking Machines Theories, Models and Designs, Elsevier Science Publishers B.V., North-Holland, ISBN: 08-444-89115.3, 1992, 15 pages.
Rioport, "Rio 500: Getting Started Guide", available at <http://ec1.images-amazon.com/media/i3d/01/A/man-migrate/MANUAL000023453.pdf>, 1999, 2 pages.
Rivlin et al., "Maestro: Conductor of Multimedia Analysis Technologies", SRI International, 1999, 7 pages.
Rivoira et al., "Syntax and Semantics in a Word-Sequence Recognition System", IEEE International Conference on Acoustics, Speech and Signal Processing (ICASSP'79), Apr. 1979, 5 pages.
Robbin et al., "MP3 Player and Encoder for Macintosh!", SoundJam MP Plus, Version 2.0, 2000, 76 pages.
Robertson et al., "Information Visualization Using 3D Interactive Animation", Communications of the ACM, vol. 36, No. 4, Apr. 1993, pp. 57-71.
Robertson et al., "The Document Lens", UIST '93, Nov. 3-5, 1993, pp. 101-108.
Roddy et al., "Communication and Collaboration in a Landscape of B2B eMarketplaces", VerticalNet Solutions, White Paper, Jun. 15, 2000, 23 pages.
Roddy et al., "Interface Issues in Text Based Chat Rooms", SIGCHI Bulletin, vol. 30, No. 2, Apr. 1998, pp. 119-123.
Root, Robert, "Design of a Multi-Media Vehicle for Social Browsing", Bell Communications Research, 1988, pp. 25-38.
Rose et al., "Inside Macintosh", vols. I, II, and III, Addison-Wesley Publishing Company, Inc., Jul. 1988, 1284 pages.
Roseberry, Catherine, "How to Pair a Bluetooth Headset & Cell Phone", available at <http://mobileoffice.about.com/od/usingyourphone/ht/blueheadset_p.htm>, retrieved on Apr. 29, 2006, 2 pages.
Rosenberg et al., "An Overview of the Andrew Message System", Information Technology Center Carnegie-Mellon University, Jul. 1987, pp. 99-108.
Rosenfeld, R., "A Maximum Entropy Approach to Adaptive Statistical Language Modelling", Computer Speech and Language, vol. 10, No. 3, Jul. 1996, 25 pages.
Rosner et al., "In Touch: A Graphical User Interface Development Tool", IEEE Colloquium on Software Tools for Interface Design, Nov. 8, 1990, pp. 12/1-12/7.
Rossfrank, "Konstenlose Sprachmitteilungins Festnetz", XP002234425, Dec. 10, 2000, pp. 1-4.
Roszkiewicz, A., "Extending your Apple", Back Talk-Lip Service, A+ Magazine, The Independent Guide for Apple Computing, vol. 2, No. 2, Feb. 1984, 5 pages.
Roucos et al., "A Segment Vocoder at 150 B/S", (Proceedings of the IEEE International Acoustics, Speech and Signal Processing Conference, Apr. 1983), as reprinted in Vector Quantization (IEEE Press, 1990), 1990, pp. 246-249.
Roucos et al., "High Quality Time-Scale Modification for Speech", Proceedings of the 1985 IEEE Conference on Acoustics, Speech and Signal Processing, 1985, pp. 493-496.
Rubine, Dean Harris, "Combining Gestures and Direct Manipulation", CHI '92, May 3-7, 1992, pp. 659-660.
Rubine, Dean Harris, "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Rudnicky et al., "Creating Natural Dialogs in the Carnegie Mellon Communicator System", Proceedings of Eurospeech, vol. 4, 1999, pp. 1531-1534.
Russell et al., "Artificial Intelligence, A Modern Approach", Prentice Hall, Inc., 1995, 121 pages.
Russo et al., "Urgency is a Non-Monotonic Function of Pulse Rate", Journal of the Acoustical Society of America, vol. 122, No. 5, 2007, 6 pages.
Sabin et al., "Product Code Vector Quantizers for Waveform and Voice Coding", (IEEE Transactions on Acoustics, Speech and Signal Processing, Jun. 1984), as reprinted in Vector Quantization (IEEE Press, 1990), 1990, pp. 274-288.
Sacerdoti et al., "A Ladder User's Guide (Revised)", SRI International Artificial Intelligence Center, Mar. 1980, 39 pages.
Sagalowicz, D., "AD-Ladder User's Guide", SRI International, Sep. 1980, 42 pages.
Sakoe et al., "Dynamic Programming Algorithm Optimization for Spoken Word Recognition", IEEE Transactions on Acoustics, Speech and Signal Processing, vol. ASSP-26, No. 1, Feb. 1978, 8 pages.
Salton et al., "On the Application of Syntactic Methodologies in Automatic Text Analysis", Information Processing and Management, vol. 26, No. 1, Great Britain, 1990, 22 pages.
Sameshima et al., "Authorization with Security Attributes and Privilege Delegation Access control beyond the ACL", Computer Communications, vol. 20, 1997, 9 pages.
Sankar, Ananth, "Bayesian Model Combination (BAYCOM) for Improved Recognition", IEEE International Conference on Acoustics, Speech, and Signal Processing (ICASSP), Mar. 18-23, 2005, pp. 845-848.
San-Segundo et al., "Confidence Measures for Dialogue Management in the CU Communicator System", Proceedings of Acoustics, Speech and Signal Processing (ICASSP'00), Jun. 2000, 4 pages.
Santaholma, Marianne E., "Grammar Sharing Techniques for Rule-based Multilingual NLP Systems", Proceedings of the 16th Nordic Conference of Computational Linguistics, NODALIDA 2007, May 25, 2007, 8 pages.
Santen, Jan P., "Assignment of Segmental Duration in Text-to-Speech Synthesis", Computer Speech and Language, vol. 8, No. 2, Apr. 1994, pp. 95-128.
Sarawagi, Sunita, "CRF Package Page", available at <http://crf.sourceforge.net/>, retrieved on Apr. 6, 2011, 2 pages.
Sarkar et al., "Graphical Fisheye Views of Graphs", CHI '92 Proceedings of the SIGCHI Conference on Human Factors in Computing Systems, May 3-7, 1992, pp. 83-91.
Sarkar et al., "Graphical Fisheye Views of Graphs", Systems Research Center, Digital Equipment Corporation,, Mar. 17, 1992, 31 pages.
Sarkar et al., "Graphical Fisheye Views", Communications of the ACM, vol. 37, No. 12, Dec. 1994, pp. 73-83.
Sarkar et al., "Stretching the Rubber Sheet: A Metaphor for Viewing Large Layouts on Small Screens", UIST'93, ACM, Nov. 3-5, 1993, pp. 81-91.
Sarvas et al., "Metadata Creation System for Mobile Images", Conference Proceedings, The Second International Conference on Mobile Systems, Applications and Services, Jun. 6, 2004, pp. 36-48.
Sastry, Ravindra W., "A Need for Speed: A New Speedometer for Runners", submitted to the Department of Electrical Engineering and Computer Science at the Massachusetts Institute of Technology, 1999, pp. 1-42.
Sato, H., "A Data Model, Knowledge Base and Natural Language Processing for Sharing a Large Statistical Database", Statistical and Scientific Database Management, Lecture Notes in Computer Science, vol. 339, 1989, 20 pages.
Savoy, J., "Searching Information in Hypertext Systems Using Multiple Sources of Evidence", International Journal of Man-Machine Studies, vol. 38, No. 6, Jun. 1996, 15 pages.
Scagliola, C., "Language Models and Search Algorithms for Real-Time Speech Recognition", International Journal of Man-Machine Studies, vol. 22, No. 5, 1985, 25 pages.
Schafer et al., "Digital Representations of Speech Signals", Proceedings of the IEEE, vol. 63, No. 4, Apr. 1975, pp. 662-677.

(56) References Cited

OTHER PUBLICATIONS

Schaffer et al., "Navigating Hierarchically Clustered Networks through Fisheye and Full-Zoom Methods", ACM Transactions on Computer-Human Interaction, vol. 3, No. 2, Jun. 1996, pp. 162-188.
Scheifler, R. W., "The X Window System", MIT Laboratory for Computer Science and Gettys, Jim Digital Equipment Corporation and MIT Project Athena; ACM Transactions on Graphics, vol. 5, No. 2, Apr. 1986, pp. 79-109.
Schluter et al., "Using Phase Spectrum Information for Improved Speech Recognition Performance", IEEE International Conference on Acoustics, Speech, and Signal Processing, 2001, pp. 133-136.
Schmandt et al., "A Conversational Telephone Messaging System", IEEE Transactions on Consumer Electronics, vol. CE-30, Aug. 1984, pp. xxi-xxiv.
Schmandt et al., "Augmenting a Window System with Speech Input", IEEE Computer Society, Computer, vol. 23, No. 8, Aug. 1990, 8 pages.
Schmandt et al., "Phone Slave: A Graphical Telecommunications Interface", Proceedings of the SID, vol. 26, No. 1, 1985, pp. 79-82.
Schmandt et al., "Phone Slave: A Graphical Telecommunications Interface", Society for Information Display, International Symposium Digest of Technical Papers, Jun. 1984, 4 pages.
Schmid, H., "Part-of-speech tagging with neural networks", COLING '94 Proceedings of the 15th conference on Computational linguistics—vol. 1, 1994, pp. 172-176.
Schnelle, Dirk, "Context Aware Voice User Interfaces for Workflow Support", Dissertation paper, Aug. 27, 2007, 254 pages.
Schone et al., "Knowledge-Free Induction of Morphology Using Latent Semantic Analysis", Proceedings of the 2nd Workshop on Learning Language in Logic and the 4th Conference on Computational Natural Language Learning, vol. 7, 2000, pp. 67-72.
Schooler et al., "A Packet-switched Multimedia Conferencing System", By Eve Schooler, et al; ACM SIGOIS Bulletin, vol. I, No. 1, Jan. 1989, pp. 12-22.
Schooler et al., "An Architecture for Multimedia Connection Management", Proceedings IEEE 4th Comsoc International Workshop on Multimedia Communications, Apr. 1992, pp. 271-274.
Schooler et al., "Multimedia Conferencing: Has it Come of Age?", Proceedings 24th Hawaii International Conference on System Sciences, vol. 3, Jan. 1991, pp. 707-716.
Schooler et al., "The Connection Control Protocol: Architecture Overview", USC/Information Sciences Institute, Jan. 28, 1992, pp. 1-6.
Schooler, Eve M., "Case Study: Multimedia Conference Control in a Packet-Switched Teleconferencing System", Journal of Internetworking: Research and Experience, vol. 4, No. 2, Jun. 1993, pp. 99-120.
Schooler, Eve M., "The Impact of Scaling on a Multimedia Connection Architecture", Multimedia Systems, vol. 1, No. 1, 1993, pp. 2-9.
Schooler, Eve, "A Distributed Architecture for Multimedia Conference Control", ISI Research Report, Nov. 1991, pp. 1-18.
Schütze, H., "Dimensions of Meaning", Proceedings of Supercomputing'92 Conference, Nov. 1992, 10 pages.
Schütze, H., "Distributional part-of-speech tagging", EACL '95 Proceedings of the seventh conference on European chapter of the Association for Computational Linguistics, 1995, pp. 141-148.
Schütze, Hinrich, "Part-of-speech induction from scratch", ACL '93 Proceedings of the 31st annual meeting on Association for Computational Linguistics, 1993, pp. 251-258.
Schwartz et al., "Context-Dependent Modeling for Acoustic-Phonetic Recognition of Continuous Speech", IEEE International Conference on Acoustics, Speech, and Signal Processing, vol. 10, Apr. 1985, pp. 1205-1208.
Schwartz et al., "Improved Hidden Markov Modeling of Phonemes for Continuous Speech Recognition", IEEE International Conference on Acoustics, Speech, and Signal Processing, vol. 9, 1984, pp. 21-24.
Schwartz et al., "The N-Best Algorithm: An Efficient and Exact Procedure for Finding the N Most Likely Sentence Hypotheses", IEEE, 1990, pp. 81-84.
Scott et al., "Designing Touch Screen Numeric Keypads: Effects of Finger Size, Key Size, and Key Spacing", Proceedings of the Human Factors and Ergonomics Society 41st Annual Meeting, Oct. 1997, pp. 360-364.
Seagrave, Jim, "A Faster Way to Search Text", EXE, vol. 5, No. 3, Aug. 1990, pp. 50-52.
Sears et al., "High Precision Touchscreens: Design Strategies and Comparisons with a Mouse", International Journal of Man-Machine Studies, vol. 34, No. 4, Apr. 1991, pp. 593-613.
Sears et al., "Investigating Touchscreen Typing: The Effect of Keyboard Size on Typing Speed", Behavior & Information Technology, vol. 12, No. 1, 1993, pp. 17-22.
Sears et al., "Touchscreen Keyboards", Apple Inc., Video Clip, Human-Computer Interaction Laboratory, on a CD, Apr. 1991.
Seide et al., "Improving Speech Understanding by Incorporating Database Constraints and Dialogue History", Proceedings of Fourth International Conference on Philadelphia,, 1996, pp. 1017-1020.
Sen et al., "Indian Accent Text-to-Speech System for Web Browsing", Sadhana, vol. 27, No. 1, Feb. 2002, pp. 113-126.
Seneff et al., "A New Restaurant Guide Conversational System: Issues in Rapid Prototyping for Specialized Domains", Proceedings of Fourth International Conference on Spoken Language, vol. 2, 1996, 4 pages.
Sethy et al., "A Syllable Based Approach for Improved Recognition of Spoken Names", ITRW on Pronunciation Modeling and Lexicon Adaptation for Spoken language Technology (PMLA2002), Sep. 14-15, 2002, pp. 30-35.
Sharoff et al., "Register-Domain Separation as a Methodology for Development of Natural Language Interfaces to Databases", Proceedings of Human-Computer Interaction (INTERACT'99), 1999, 7 pages.
Sheth et al., "Evolving Agents for Personalized Information Filtering", Proceedings of the Ninth Conference on Artificial Intelligence for Applications, Mar. 1993, 9 pages.
Sheth et al., "Relationships at the Heart of Semantic Web: Modeling, Discovering, and Exploiting Complex Semantic Relationships", Enhancing the Power of the Internet: Studies in Fuzziness and Soft Computing, Oct. 13, 2002, pp. 1-38.
Shikano et al., "Speaker Adaptation through Vector Quantization", IEEE International Conference on Acoustics, Speech and Signal Processing (ICASSP'86), vol. 11, Apr. 1986, 4 pages.
Shimazu et al., "CAPIT: Natural Language Interface Design Tool with Keyword Analyzer and Case-Based Parser", NEG Research & Development, vol. 33, No. 4, Oct. 1992, 11 pages.
Shinkle, L., "Team User's Guide", SRI International, Artificial Intelligence Center, Nov. 1984, 78 pages.
Shiraki et al., "LPC Speech Coding Based on Variable-Length Segment Quantization", (IEEE Transactions on Acoustics, Speech and Signal Processing, Sep. 1988), as reprinted in Vector Quantization (IEEE Press, 1990), 1990, pp. 250-257.
Shklar et al., "InfoHarness: Use of Automatically Generated Metadata for Search and Retrieval of Heterogeneous Information", Proceedings of CAiSE'95, Finland, 1995, 14 pages.
Shneiderman, Ben, "Designing the User interface: Strategies for Effective Human-Computer Interaction", Second Edition, 1992, 599 pages.
Shneiderman, Ben, "Designing the User interface: Strategies for Effective Human-Computer Interaction", Third Edition, 1998, 669 pages.
Shneiderman, Ben, "Direct Manipulation for Comprehensible, Predictable and Controllable User Interfaces", Proceedings of the 2nd International Conference on Intelligent User Interfaces, 1997, pp. 33-39.
Shneiderman, Ben, "Sparks of Innovation in Human-Computer Interaction", 1993, (Table of Contents, Title Page, Ch. 4, Ch. 6 and List of References).
Shneiderman, Ben, "The Eyes Have It: A Task by Data Type Taxonomy for Information Visualizations", IEEE Proceedings of Symposium on Visual Languages, 1996, pp. 336-343.

(56) References Cited

OTHER PUBLICATIONS

Shneiderman, Ben, "Touch Screens Now Offer Compelling Uses", IEEE Software, Mar. 1991, pp. 93-94.
Shoham et al., "Efficient Bit and Allocation for an Arbitrary Set of Quantizers", (IEEE Transactions on Acoustics, Speech, and Signal Processing, Sep. 1988) as reprinted in Vector Quantization (IEEE Press, 1990), 1990, pp. 289-296.
Sgurdsson et al. "Mel Frequency Cepstral Co-efficients: An Evaluation of Robustness of MP3 Encoded Music", Proceedings of the 7th International Conference on Music Information Retrieval, 2006, 4 pages.
Silverman et al., "Using a Sigmoid Transformation for Improved Modeling of Phoneme Duration", Proceedings of the IEEE International Conference on Acoustics, Speech and Signal Processing, Mar. 1999, 5 pages.
Simkovitz, Daniel. "LP-DOS Magnifies the PC Screen", IEEE, 1992, pp. 203-204.
Simonite, Tom, "One Easy Way to Make Siri Smarter", Technology Review, Oct. 18, 2011 2 pages.
Singh et al., "Automatic Generation of Phone Sets and Lexical Transcriptions", Acoustics, Speech and Signal Processing (ICASSP'00) 2000, 1 page.
Singh, N., "Unifying Heterogeneous Information Models", Communications of the ACM, 1998, 13 pages.
Sinitsyn, Alexander, "A Synchronization Framework for Personal Mobile Servers", Proceedings of the Second IEEE Annual Conference on Pervasive Computing and Communications Workshops, Piscataway, 2004, pp. 1, 3 and 5.
Slaney et al., "On the Importance of Time—A Temporal Representation of Sound", Visual Representation of Speech Signals, 1993, pp. 95-116.
Smeaton, Alan F., "Natural Language Processing and Information Retrieval", Information Processing and Management, vol. 26, No. 1, 1990, pp. 19-20.
Smith et al., "Guidelines for Designing User Interface Software", User Lab, Inc., Aug. 1986, pp. 1-384.
Smith et al., "Relating Distortion to Performance in Distortion Oriented Displays", Proceedings of Sixth Australian Conference on Computer-Human Interaction, Nov. 1996, pp. 6-11.
Sony Eiicsson Corporate, "Sony Ericsson to introduce Auto pairing. TM. to Improve Bluetooth.TM. Connectivity Between Headsets and Phones", Press Release, available at <http://www.sonyericsson.com/spg.jsp?cc=global&lc=en&ver=4001&template=pc3_1_1&tz . . . >, Sep. 28, 2005, 2 pages.
Soong et al., "A High Quality Subband Speech Coder with Backward Adaptive Predictor and Optimal Time-Frequency Bit Assignment", (Proceedings of the IEEE International Acoustics, Speech, and Signal Processing Conference, Apr. 1986), as reprinted in Vector Quantization (IEEE Press, 1990), 1990, pp. 316-319.
Speaker Recognition, Wikipedia, The Free Enclyclopedia, Nov. 2, 2010, 4 pages.
Spiller, Karen, "Low-Decibel Earbuds Keep Noise at a Reasonable Level", available at <http://www.nashuatelegraph.com/apps/pbcs.dll/article?Date=20060813&Cate . . . >, Aug. 13, 2006, 3 pages.
SRI International, "The Open Agent Architecture TM 1.0 Distribution", Open Agent Architecture (OAA), 1999, 2 pages.
SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, 2 pages.
Srihari, R. K.., "Use of Multimedia Input in Automated Image Annotation and Content-based Retrieval", Proceedings of Spie, International Society for Optical Engineering, vol. 2420, Feb. 9, 1995., pp. 249-260.
Srinivas et al., "Monet: A Multi-Media System for Conferencing and Application Sharing in Distributed Systems", CERC Technical Report Series Research Note, Feb. 1992.
Starr et al., "Knowledge-Intensive Query Processing", Proceedings of the 5th KRDB Workshop, Seattle, May 31, 1998, 6 pages.
Stealth Computer Corporation, "Peripherals for Industrial Keyboards & Pointing Devices", available at <http://www.stealthcomputer.com/peripherals_oem.htm>, retrieved on Dec. 19, 2002, 6 pages.
Steinberg, Gene, "Sonicbiue Rio Car (10 GB, Reviewed: 6 GB)", available at <http://electronics.cnet.com/electronics/0-6342420-1304-4098389.html>, Dec. 12, 2000, 2 pages.
Stent et al., "Geo-Centric Language Models for Local Business Voice Search", AT&T Labs—Research, 2009, pp. 389-396.
Stent et al., "The CommandTalk Spoken Dialogue System", SRI International, 1999, pp. 183-190.
Stern et al., "Multiple Approaches to Robust Speech Recognition", Proceedings of Speech and Natural Language Workshop, 1992, 6 pages.
Stickel, Mark E., "A Nonclausal Connection-Graph Resolution Theorem-Proving Program", Proceedings of AAAI'82, 1982, 5 pages.
Stifleman, L., "Not Just Another Voice Mail System", Proceedings of 1991 Conference, American Voice, Atlanta GA, Sep. 24-26, 1991, pp. 21-26.
Stone et al., "The Movable Filter as a User Interface Tool", CHI '94 Human Factors in Computing Systems, 1994, pp. 306-312.
Strom et al., "Intelligent Barge-In in Conversational Systems", MIT laboratory for Computer Science, 2000, 4 pages.
Stuker et al., "Cross-System Adaptation and Combination for Continuous Speech Recognition: The Influence of Phoneme Set and Acoustic Front-End", Influence of Phoneme Set and Acoustic Front-End, Interspeech, Sep. 17-21, 2006, pp. 521-524.
Su et al., "A Review of ZoomText Xtra Screen Magnification Program for Windows 95", Journal of Visual Impairment & Blindness, Feb. 1998, pp. 116-119.
Su, Joseph C., "A Review of Telesensory's Vista PCI Screen Magnification System", Journal of Visual Impairment & Blindness, Oct. 1998, pp. 705, 707-710.
Sugumaran, V., "A Distributed Intelligent Agent-Based Spatial Decision Support System", Proceedings of the Americas Conference on Information systems (AMCIS), Dec. 31, 1998, 4 pages.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Summerfield et al., "ASIC Implementation of the Lyon Cochlea Model", Proceedings of the 1992 International Conference on Acoustics, Speech and Signal Processing, IEEE, vol. V, 1992, pp. 673-676.
Sundaram et al., "Latent Perceptual Mapping with Data-Driven Variable-Length Acoustic Units for Template-Based Speech Recognition", ICASSP 2012, Mar. 2012, pp. 4125-4128.
Sycara et al., "Coordination of Multiple Intelligent Software Agents", International Journal of Cooperative Information Systems (IJCIS), vol. 5, No. 2 & 3, 1996, 31 pages.
Sycara et al., "Distributed Intelligent Agents", IEEE Expert, vol. 11, No. 6, Dec. 1996, 32 pages.
Sycara et al., "Dynamic Service Matchmaking among Agents in Open Information Environments", SIGMOD Record, 1999, 7 pages.
Sycara et al., "The RETSINA MAS Infrastructure", Autonomous Agents and Multi-Agent Systems, vol. 7, 2003, 20 pages.
T3 Magazine, "Creative MuVo TX 256MB", available at <http://www.t3.co.uk/reviews/entertainment/mp3_player/creative_muvo_tx_256mb>, Aug. 17, 2004, 1 page.
TAOS, "TAOS, Inc. Announces Industry's First Ambient Light Sensor to Convert Light Intensity to Digital Signals", News Release, available at <http://www.taosinc.com/presssrelease_090902.htm>, Sep. 16, 2002, 3 pages.
Taylor et al., "Speech Synthesis by Phonological Structure Matching", International Speech Communication Association, vol. 2, Section 3, 1999, 4 pages.
Tello, Ernest R., "Natural-Language Systems", Mastering AI Tools and Techniques, Howard W. Sams & Company, 1988, pp. 25-64.
Tenenbaum et al., "Data Structure Using Pascal", Prentice-Hall, Inc., 1981, 34 pages.

(56) References Cited

OTHER PUBLICATIONS

TextnDrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.

TG3 Electronics, Inc., "BL82 Series Backlit Keyboards", available at <http://www.tg3electronics.com/products/backlit/backlit.htm>, retrieved on Dec. 19, 2002, 2 pages.

The HP 150, "Hardware: Compact, Powerful, and Innovative", vol. 8, No. 10, Oct. 1983, pp. 36-50.

Tidwell, Jenifer, "Animated Transition", Designing Interfaces, Patterns for effective Interaction Design, Nov. 2005, First Edition, 4 pages.

Timothy et al., "Speech-Based Annotation and Retrieval of Digital Photographs", Interspeech. 8th Annual Conference of the International Speech Communication Association, Aug. 27, 2007, pp. 2165-2168.

Tofel, Kevin C., "SpeakToIt: A Personal Assistant for Older iPhones, iPads", Apple News, Tips and Reviews, Feb. 9, 2012, 7 pages.

Tombros et al., "Users' Perception of Relevance of Spoken Documents", Journal of the American Society for Information Science, New York, Aug. 2000, pp. 929-939.

Top 10 Best Practices for Voice User Interface Design available at <http://www.developer.com/voice/article.php/1567051/Top-10-Best-Practices-for-Voice-UserInterface-Design.htm>, Nov. 1, 2002, 4 pages.

Touch, Joseph, "Zoned Analog Personal Teleconferencing", USC / Information Sciences Institute, 1993, pp. 1-19.

Toutanova et al., "Feature-Rich Part-of-Speech Tagging with a Cyclic Dependency Network", Computer Science Dept., Stanford University, Stanford CA 94305-9040, 2003, 8 pages.

Trigg et al., "Hypertext Habitats: Experiences of Writers in NoteCards", Hypertext '87 Papers; Intelligent Systems Laboratory, Xerox Palo Alto Research Center, 1987, pp. 89-108.

Trowbridge, David, "Using Andrew for Development of Educational Applications", Center for Design of Educational Computing, Carnegie-Mellon University (CMU-ITC-85-065), Jun. 2, 1985, pp. 1-6.

Tsai et al., "Attributed Grammar—A Tool for Combining Syntactic and Statistical Approaches to Pattern Recognition", IEEE Transactions on Systems, Man and Cybernetics, vol. SMC-10, No. 12, Dec. 1980, 13 pages.

Tsao et al., "Matrix Quantizer Design for LPC Speech Using the Generalized Lloyd Algorithm", (IEEE Transactions on Acoustics, Speech and Signal Processing, Jun. 1985), as reprinted in Vector Quantization (IEEE Press, 1990), 1990, pp. 237-245.

Tucker, Joshua, "Too Lazy to Grab Your TV Remote? Use Siri Instead", Engadget, Nov. 30, 2011, 8 pages.

Tur et al., "The CALO Meeting Assistant System", IEEE Transactions on Audio, Speech and Language Processing, vol. 18, No. 6, Aug. 2010, pp. 1601-1611.

Tur et al., "The CALO Meeting Speech Recognition and Understanding System", Proc. IEEE Spoken Language Technology Workshop, 2008, 4 pages.

Turletti, Thierry, "The INRIA Videoconferencing System (IVS)", Oct. 1994, pp. 1-7.

Tyson et al., "Domain-Independent Task Specification in the TACITUS Natural Language System", SRI International, Artificial intelligence Center, May 1990, 16 pages.

Udell, J., "Computer Telephony", BYTE, vol. 19, No. 7, Jul. 1994, 9 pages.

Uslan et al., "A Review of Henter-Joyce's MAGic for Windows NT", Journal of Visual Impairment and Blindness, Dec. 1999, pp. 666-668.

Uslan et al., "A Review of Supernova Screen Magnification Program for Windows", Journal of Visual Impairment & Blindness, Feb. 1999, pp. 108-110.

Uslan et al., "A Review of Two Screen Magnification Programs for Windows 95: Magnum 95 and LP-Windows", Journal of Visual Impairment & Blindness, Sep.-Oct. 1997, pp. 9-13.

Van Santen, J. P.H., "Contextual Effects on Vowel Duration", Journal Speech Communication, vol. 11, No. 6, Dec. 1992, pp. 513-546.

Veiga, Alex, "AT&T Wireless Launching Music Service", available at <http://bizyahoo.com/ap/041005/at_t_mobile_music_5.html?printer=1>, Oct. 5, 2004, 2 pages.

Vepa et al., "New Objective Distance Measures for Spectral Discontinuities in Concatenative Speech Synthesis", Proceedings of the IEEE 2002 Workshop on Speech Synthesis, 2002, 4 pages.

Verschelde, Jan, "MATLAB Lecture 8. Special Matrices in MATLAB", UIC, Dept. of Math, Stat. & CS, MCS 320, Introduction to Symbolic Computation, 2007, 4 pages.

Vegas et al., "Chat Circles", SIGCHI Conference on Human Factors in Computing Systems, May 15-20, 1999, pp. 9-16.

Viikki et al., "Speaker- and Language-Independent Speech Recognition in Mobile Communication Systems", IEEE, vol. 1, 2001, pp. 5-8.

Vingron, Martin, "Near-Optimal Sequence Alignment", Current Opinion in Structural Biology, vol. 6, No. 3, 1996, pp. 346-352.

Vungo Incar, "Distracted Driving Solution with Vlingo InCar", YouTube Video, Available online at <http://www.youtube.com/watch?v=Vqs8XfXxgz4>, Oct. 2010, 2 pages.

Vlingo, "Vlingo Launches Voice Enablement Application on Apple App Store", Press Release, Dec. 3, 2008, 2 pages.

Vogel et al., "Shift: A Technique for Operating Pen-Based Interfaces Using Touch", CHI '07 Proceedings, Mobile Interaction Techniques I, Apr. 28-May 3, 2007, pp. 657-666.

VoiceAssist, "Send Text, Listen to and Send E-Mail by Voice", YouTube Video, Available online at <http://www.youtube.com/watch?v=0tEU61nHHA4>, Jul. 30, 2009, 1 page.

VoiceontheGo, "Voice on the Go (BlackBerry)", YouTube Video, available online at <http://www.youtube.com/watch?v=pJqpWgQS98w>, Jul. 27, 2009, 1 page.

W3C Working Draft, "Speech Synthesis Markup Language Specification for the Speech Interface Framework", available at <http://www.w3org./TR/speech-synthesis>, retrieved on Dec. 14, 2000, 42 pages.

Wadlow, M. G., "The Role of Human Interface Guidelines in the Design of Multimedia Applications", Carnegie Mellon University (To be Published in Current Psychology: Research and Reviews, Summer 1990 (CMU-ITC-91-101), 1990, pp. 1-22.

Wahlster et al., "Smartkom: Multimodal Communication with a Life-Like Character", Eurospeech—Scandinavia, 7th European Conference on Speech Communication and Technology, 2001, 5 pages.

Waibel, Alex, "Interactive Translation of Conversational Speech", Computer, vol. 29, No. 7, Jul. 1996, pp. 41-48.

Waldinger et al., "Deductive Question Answering from Multiple Resources", New Directions in Question Answering, Published by AAAI, Menlo Park, 2003, 22 pages.

Walker et al., "Natural Language Access to Medical Text", SRI International, Artificial Intelligence Center, Mar. 1981, 23 pages.

Walker et al., "The LOCUS Distributed Operating System 1", University of California Los Angeles, 1983, pp. 49-70.

Waltz, D., "An English Language Question Answering System for a Large Relational Database", ACM, vol. 21, No. 7, 1978, 14 pages.

Wang et al., "An Industrial-Strength Audio Search Algorithm", In Proceedings of the International Conference on Music Information Retrieval (ISMIR), 2003, 7 pages.

Wang et al., "An Initial Study on Large Vocabulary Continuous Mandarin Speech Recognition with Limited Training Data Based on Sub-Syllabic Models", International Computer Symposium, vol. 2, 1994, pp. 1140-1145.

Wang et al., "Tone Recognition of Continuous Mandarin Speech Based on Hidden Markov Model", International Journal of Pattern Recognition and Artificial Intelligence, vol. 8, 1994, pp. 233-245.

Ward et al., "A Class Based Language Model for Speech Recognition", IEEE, 1996, 3 pages.

(56) References Cited

OTHER PUBLICATIONS

Ward et al., "Recent improvements in the CMU Spoken Language Understanding System", ARPA Human Language Technology Workshop, 1994, 4 pages.
Ward, Wayne, "The CMU Air Travel Information Service: Understanding Spontaneous Speech", Proceedings of the Workshop on Speech and Natural Language, HLT '90 1990, pp. 127-129.
Ware et al., "The DragMag Image Magnifier Prototype I", Apple Inc., Video Clip, Marlon, on a CD, Applicant is not Certain about the Date for the Video Clip., 1995.
Warren et al., "An Efficient Easily Adaptable System for Interpreting Natural Language Queries", American Journal of Computational Linguistics, vol. 8, No. 3-4, 1982, 11 pages.
Watabe et al., "Distributed Multiparty Desktop Conferencing System: MERMAID", CSCW 90 Proceedings, Oct. 1990. pp. 27-38.
Weizenbaum, J., "ELIZA—A Computer Program for the Study of Natural Language Communication Between Man and Machine", Communications of the ACM, vol. 9, No. 1, Jan. 1966, 10 pages.
Werner et al., "Prosodic Aspects of Speech, Universite de Lausanne", Fundamentals of Speech Synthesis and Speech Recognition: Basic Concepts, State of the Art and Future Challenges, 1994, 18 pages.
Westerman, Wayne, "Hand Tracking, Finger Identification and Chordic Manipulation on a Multi-Touch Surface", Doctoral Dissertation, 1999, 363 Pages.
What is Fuzzy Logic?, available at <http://www.cs.cmu.edu>, retrieved on Apr. 15, 1993, 5 pages.
White, George M., "Speech Recognition, Neural Nets, and Brains", Jan. 1992, pp. 1-48.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 3 pages.
Wikipedia, "Speech Recognition", available at <http://en.wikipedia.org/wiki/Speech_recognition>, retrieved on Sep. 14, 2011, 10 pages.
Wilensky et al., "Talking to UNIX in English: An Overview of UC", Communications of the ACM, vol. 27, No. 6, Jun. 1984, pp. 574-593.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 13 pages.
Windows XP: A Big Surprise!—Experiencing Amazement from Windows XP, New Computer, No. 2, Feb. 28, 2002, 8 pages.
Winiwarter et al., "Adaptive Natural Language Interfaces to FAQ Knowledge Bases", Proceedings of 4th International Conference on Applications of Natural Language to Information Systems, Austria, Jun. 1999, 22 pages.
WirelessInfo, "SMS/MMS Ease of Use (8.0)", available at <http://www.wirelessinfo.com/content/palm-Treo-750-Cell-Phone-Review/Messaging.htm>, Mar. 2007, 3 pages.
Wolff, M., "Post Structuralism and the ARTFUL Database: Some Theoretical Considerations", Information Technology and Libraries, vol. 13, No. 1, Mar. 1994, 10 pages.
Wong et al., "An 800 Bit/s Vector Quantization LPC Vocoder", (IEEE Transactions on Acoustics, Speech and Signal Processing, Oct. 1982), as reprinted in Vector Quantization (IEEE Press, 1990), 1990, pp. 222-232.
Wong et al., "Very Low Data Rate Speech Compression with LPC Vector and Matrix Quantization", (Proceedings of the IEEE Int'l Acoustics, Speech and Signal Processing Conference, Apr. 1983), as reprinted in Vector Quantization (IEEE Press, 1990), 1990, pp. 233-236.
Worldwide Character Encoding, Version 2.0, vols. 1,2 by Unicode, Inc., 12 pages.
Written Opinion received for PCT Patent Application No. PCT/US2005/046797, dated Nov. 24, 2006, 9 pages.

Wu et al., "Automatic Generation of Synthesis Units and Prosodic Information for Chinese Concatenative Synthesis", Speech Communication, vol. 35, No. 3-4, Oct. 2001, pp. 219-237.
Wu et al., "KDA: A Knowledge-Based Database Assistant", Proceeding of the Fifth International Conference on Engineering (IEEE Cat.No. 89CH2695-5), 1989, 8 pages.
Wu, M., "Digital Speech Processing and Coding", Multimedia Signal Processing, Lecture-2 Course Presentation, University of Maryland, College Park, 2003, 8 pages.
Wu, M., "Speech Recognition, Synthesis, and H.C.I.", Multimedia Signal Processing, Lecture—3 Course Presentation, University of Maryland, College Park, 2003, 11 pages.
Wyle, M. F., "A Wide Area Network Information Filter", Proceedings of First International Conference on Artificial Intelligence on Wall Street, Oct. 1991, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
Yang et al., "Auditory Representations of Acoustic Signals", IEEE Transactions of Information Theory, vol. 38, No. 2, Mar. 1992, pp. 824-839.
Yang et al., "Hidden Markov Model for Mandarin Lexical Tone Recognition", IEEE Transactions on Acoustics, Speech and Signal Processing, vol. 36, No. 7, Jul. 1988, pp. 988-992.
Yang et al., "Smart Sight: A Tourist Assistant System", Proceedings of Third International Symposium on Wearable Computers, 1999, 6 pages.
Yankelovich et al., "Intermedia: The Concept and the Construction of a Seamless Information Environment", Computer Magazine, IEEE, Jan. 1988, 16 pages.
Yarowsky, David, "Homograph Disambiguation in Text-to-Speech Synthesis", Chapter 12, Progress in Speech Synthesis, 1997, pp. 157-172.
Yiourgalis et al., "Text-to-Speech system for Greek", ICASSP 91, vol. 1, May 14-17, 1991, pp. 525-528.
Yoon et al., "Letter-to-Sound Rules for Korean", Department of Linguistics, The Ohio State University, 2002, 4 pages.
Young et al, "The HTK Book", Version 3.4, Dec. 2006, 368 pages.
Youtube, "New bar search for Facebook", Available at "https://www.youtube.com/watch?v=vwgN1WbvCas", 1 page.
Yunker, John, "Beyond Borders: Web Globalization Strategies" New Riders, Aug. 22, 2002, 11 pages.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zelig, "A Review of the Palm Treo 750v", available at <http://www.mtekk.com.au/Articles/tabid/54/articleType/ArticleView/articleId/769/A-Review-of-the-Palm-Treo-750v.aspx>, Feb. 5, 2007, 3 pages.
Zeng et al., "Cooperative Intelligent Software Agents", The Robotics Institute, Carnegie-Mellon University, Mar. 1995, 13 pages.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Zhao et al., "Intelligent Agents for Flexible Workflow Systems", Proceedings of the Americas Conference on Information Systems (AMCIS), Oct. 1998, 4 pages.
Zhao, Y., "An Acoustic-Phonetic-Based Speaker Adaptation Technique for Improving Speaker-Independent Continuous Speech Recognition", IEEE Transactions on Speech and Audio Processing, vol. 2, No. 3, Jul. 1994, pp. 380-394.
Zhong et al., "JustSpeak: Enabling Universal Voice Control on Android", W4A'14, Proceedings of the 11th Web for All Conference, No. 36, Apr. 7-9, 2014, 8 pages.
Ziegler, K, "A Distributed Information System Study", IBM Systems Journal, vol. 18, No. 3, 1979, pp. 374-401.
Zipnick et al., "U.S. Appl. No. 10/859,661, filed Jun. 2, 2004".

(56) References Cited

OTHER PUBLICATIONS

Zovato et al., "Towards Emotional Speech Synthesis: A Rule based Approach", Proceedings of 5th ISCA Speech Synthesis Workshop—Pittsburgh, 2004, pp. 219-220.
Zue et al., "From Interface to Content: Translingual Access and Delivery of On-Line Information", Eurospeech, 1997, 4 pages.
Zue et al., "Jupiter: A Telephone-Based Conversational Interface for Weather Information", IEEE Transactions on Speech and Audio Processing, Jan. 2000, 13 pages.
Zue et al., "Pegasus: A Spoken Dialogue Interface for On-Line Air Travel Planning", Speech Communication, vol. 15, 1994, 10 pages.
Zue et al., "The Voyager Speech Understanding System: Preliminary Development and Evaluation", Proceedings of IEEE, International Conference on Acoustics, Speech and Signal Processing, 1990, 4 pages.
Zue, Victor W., "Toward Systems that Understand Spoken Language", ARPA Strategic Computing Institute, Feb. 1994, 9 pages.
Zue, Victor, "Conversational Interfaces: Advances and Challenges", Spoken Language System Group, Sep. 1997, 10 pages.

\* cited by examiner

Apple Sells Two Million Copies of Mac OS X Leopard in First Weekend

{long pause}{two_new_lines}CUPERTINO, California {short pause} {punctuations}—October 30, 2007{short pause {punctuation}}—Apple® today announced that it sold {rate increase} {parenthesis} {for delivered in the case of maintenance agreements} over two million copies of Mac OS® X Leopard since its release on Friday, far outpacing the first-weekend sales of Mac OS X Tiger{short pause, speak text for footnote in faster rate}.

{switch to male voice (speaker name is Steve)} "Early indications are that Leopard will be a huge hit with customers," {switch to narrator voice} said Steve Jobs, Apple's CEO. {switch to male voice (speaker name is Steve)} "Leopard's innovative features are getting great reviews and making more people than ever think about switching to the Mac."

{switch to narrator voice} {Pricing & Availability {short pause}{font style change}} Mac OS X version 10.5 Leopard is available through the Apple Store {slow speech rate, play sound {link} (www.apple.com), at Apple's retail stores and through Apple Authorized Resellers for a suggested retail price of $129 (US) for a single user license.

{long pause {extended punctuation}}*************************************************

{play sound {image}}

{long pause {extended punctuation}}

{not spoken {already spoken {ellno}}}* Tiger sold one million copies in its initial weekend.

NOTE TO EDITORS: For additional information visit Apple...

FIG. 9(b)

INTELLIGENT TEXT-TO-SPEECH CONVERSION

CROSS REFERENCE TO RELATED APPLICATIONS

This application is a continuation of U.S. patent application Ser. No. 15/090,544, filed on Apr. 4, 2016, entitled INTELLIGENT TEXT-TO-SPEECH CONVERSION, which is a continuation of U.S. patent application Ser. No. 14/631,526, filed on Feb. 25, 2015, now U.S. Pat. No. 9,305,543, issued Apr. 5, 2016, entitled INTELLIGENT TEXT-TO-SPEECH CONVERSION, which is a continuation of U.S. patent application Ser. No. 12/098,417, filed Apr. 5, 2008, now U.S. Pat. No. 8,996,376, issued Mar. 31, 2015, entitled INTELLIGENT TEXT-TO-SPEECH CONVERSION, all of which are hereby incorporated by reference in their entirety for all purposes.

BACKGROUND OF THE INVENTION

Field of the Invention

The invention pertains to text-to-speech processing and, more particularly, to enhanced text-to-speech processing for improved document review.

Description of the Related Art

For various reasons, documents have been converted to speech (spoken text) using conventional text-to-speech processing. A user desiring to review a document can then listen to the resulting speech instead of having to read through the document. For users with impaired vision, listening to the resulting speech for a document is particularly important. Regardless of the reasons for listening to speech associated with a document, conventional text-to-speech processing is often not able to impart to the user (listener) contextual information about the text that is being spoken. Further, in recent years, documents have become more complex and more diversified. As a result, today's documents can have many different formats and contain various different document elements, including links, images, headings, tables, captions, footnotes, etc., which makes text-to-speech processing more challenging. Thus, there is a need to provide improved text-to-speech processing that can present contextual information to listeners.

For users desiring to listen to documents while on-the-go, text-to-speech processing can generate audio output that can be listened to while on-the-go. However, text-to-speech processing is processor-intensive, making it impractical for many portable devices that have limited processing power. Hence, there is also a need to manage creation, delivery and consumption of audio outputs that provide speech associated with documents.

SUMMARY OF THE INVENTION

The invention pertains for techniques for improved text-to-speech processing. The improved text-to-speech processing can convert text from an electronic document into an audio output that includes speech associated with the text as well as audio contextual cues.

The invention can be implemented in numerous ways, including as a method, system, device, or apparatus (including a computer readable medium or a graphical user interface). Several embodiments of the invention are discussed below.

As a computer-implemented method for converting text to speech, one embodiment of the invention can, for example, include at least: selecting a document to be converted to speech; parsing the selected document; converting text in the selected document to speech; and creating an audio file based on the converted text.

As a computer-implemented method for converting text to speech, another embodiment of the invention can, for example, include at least: identifying text elements in a document; determining which of the identified text elements will be spoken; determining an order in which the identified text elements will be spoken; determining at least one audio cue that will accompany the at least one of the spoken text elements; and associating the at least one determined audio cue with the at least one of the spoken text elements corresponding thereto.

As a computer implemented method for generating an audio summary for a document, one embodiment of the invention can, for example, include at least: parsing a document; generating an audio summary for the parsed document; and associating the audio summary to the parsed document.

As a method for presenting a text-based document in an audio fashion, one embodiment of the invention can, for example, include at least: providing a text document having at plurality of embedded text-to-speech markup tags; and converting the text document to an audio file using text-to-speech conversion and using the embedded text-to-speech tags.

As a text-to-speech conversion system, one embodiment of the invention can, for example, include at least: a text document having at plurality of embedded text-to-speech markup tags; and a text-to-speech converter configured to convert the text document to an audio file in accordance with the embedded text-to-speech tags.

As a computer readable storage medium including at least computer program code for converting text to speech tangibly embodied therein, one embodiment can, for example, include at least: computer program code for selecting a document to be converted to speech; computer program code for parsing the selected document; computer program code for converting text in the selected document to speech; and computer program code for creating an audio file based on the converted text, where the audio file includes at least one audio cue.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 9(b) is a screenshot of an exemplary marked up text document that has been prepared for conversion to speech.

DETAILED DESCRIPTION OF THE INVENTION

Figure 1A:
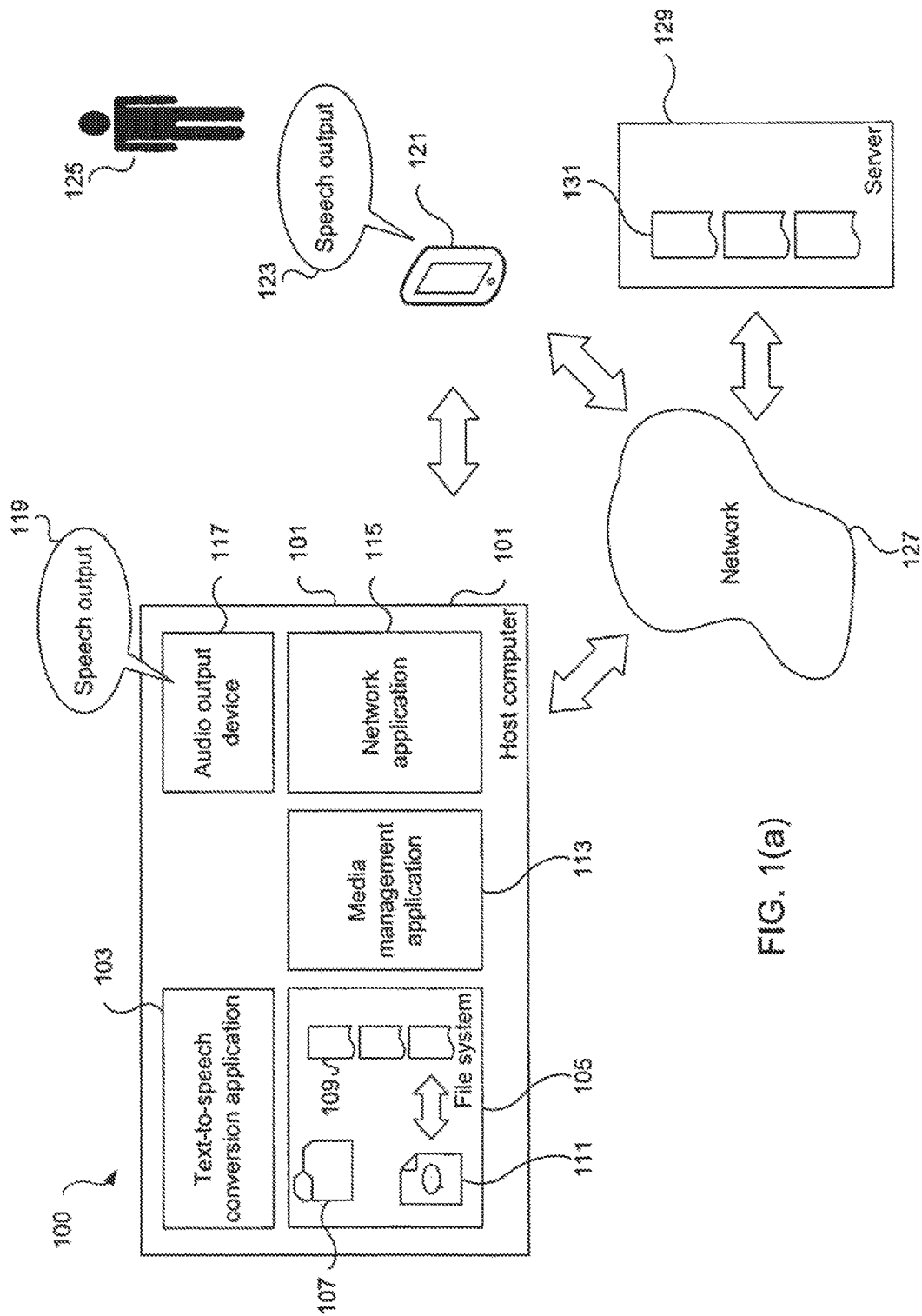
FIG. 1(a) is a block diagram of a text-to-speech processing system according to one embodiment of the invention.

The invention pertains for techniques for improved text-to-speech processing. The improved text-to-speech processing can convert text from an electronic document into an audio output that includes speech associated with the text as well as audio contextual cues.

One aspect of the invention provides audio contextual cues to the listener when outputting speech (spoken text) pertaining to a document. The audio contextual cues can be based on an analysis of a document prior to a text-to-speech conversion. In one embodiment, audio contextual cues can announce the context of a particular block of text, for example by saying "this is a title", "this is a footnote", etc. In other embodiment, audio contextual cues for the content of a document can also be imparted, for example, by any of: altering speed of the text as it is read, changing a voice used by the text-to-speech processor, playing a sound to announce a contextual change, speaking text while a background noise is played, changing the pitch of the voice speaking the text, playing a sound to indicate italicized or balded text, playing a sound to indicate a misspelling or grammatical mistake, or altering volume of the voice speaking the text.

In one embodiment, the invention can process hyperlinks in a document in an intelligent manner. In one implementation, when a block of text includes a hyperlink, a text-to-speech processor can indicate (e.g., by auditory cue) to the user that a string of text (possibly a word or phrase) is a hyperlink. As one example, a low tone in the background can be played while a text-to-speech processor speaks the hyperlink. As another example, a tone or click can be played before and/or after the hyperlink. As still another example, a text-to-speech processor can use a distinct voice to let the user know that text being read is a hyperlink.

In one embodiment, audio contextual clues can be influenced by user preferences. Audio contextual cues can be, for example, set as user preferences in a software control panel associated with a text-to-speech processor.

According to another aspect of the invention, an audio summary can be generated for a file. The audio summary for a document can thereafter be presented to a user so that the user can hear a summary of the document without having to process the document to produce its spoken text via text-to-speech conversion.

Documents as used herein pertain to electronic documents. The electronic documents are electrically stored in an electronic file on a computer readable medium. For example, a document used herein can be of various different types and formats, including documents concerning text, word processing, presentation, webpage, electronic mail (e-mail), markup language, syndication, page description language, portable document format, etc.

Embodiments of the invention are discussed below with reference to FIGS. 1-9(b). However, those skilled in the art will readily appreciate that the detailed description given herein with respect to these figures is for explanatory purposes as the invention extends beyond these limited embodiments.

FIG. 1(a) is a block diagram of a text-to-speech processing system 100 according to one embodiment of the invention. The text-to-speech processing system 100 includes a host computer 101, a portable media player 121, and a server computer 129. The host computer 101 can be connected to the portable media player 121, for example, by using a USB cable or other cable, or by using a wireless network connection such as WiFi or Bluetooth. The host computer 101 can connect to the server computer 129 over a network 127, for example the Internet. The host computer 101 can be connected to the network either by a cable, for example an Ethernet cable, or by using a wireless network connection. The host computer 101 can include a file system 105, which is used to access files 109 and directories 107 on the host computer 101.

The host computer 101 can also include one or more software applications, for example a media management application 113, a network application 115, and a text-to-speech conversion application 103 (or text-to-speech converter). The media management application 113 can be, for example iTunes™ software program, produced by Apple Inc. of Cupertino, Calif. The media management application 113 can be used to organize and present (e.g., play) media files 111. Media files 111 can include audio files such as MP3s, AACs or RSS feeds, video files, and any other media content file. The media management application 113 can also be used to manage the transfer of audio files 111 between the host computer 101 and the portable media player 121, for example by performing a synching operation between the host computer 101 and the portable media player 121. For ease of use on the portable media player 121, the audio files 111 can be stored in a predetermined organization. The predetermined organization can facilitate searching, navigation and/or playback of the audio files 111 on the portable media player 121. For example, like types of documents (e.g., emails, webpages, etc.) can be separately grouped. The network application 115 can include any of a wide variety of network capable applications including, but not limited to, Web browsers, e-mail applications, and terminal applications. Also, the network application 115 can be implemented as a module or part of the media management application 113.

The text-to-speech conversion application 103 can be used to convert electronic documents (e.g., text files) into audio files 111. Alternately, the text-to-speech conversion application 103 can be used generate speech output 119 (e.g., by using a speech synthesizer). The generated speech output 119 can be presented to a user 125 using an audio output device 117. The audio output device 117 can be a sound card, for example, or other built-in sound hardware such as an audio output device built into a motherboard. Speech output 119 can be presented to the user 125 by way of a speaker or headphones, for example. The text-to-speech conversion application 103 can interact with a network application to present a webpage or the contents of an e-mail mailbox to the user 125. In one embodiment, the text-to-speech conversion application 103 can be used to convert documents, including webpages, RSS feeds, e-mails, text files, PDFs, or other documents having text into audio files 111 at the host computer 101. The text-to-speech conversion application 103 can also be used to produce files 131 that reside on the server computer 129. The files 131 that reside on the server computer can include audio files as well as any of the documents mentioned above. The audio files 111 can, in one embodiment, be copied from the host computer 101 to the portable media player 121. Further, the portable media player 121 can be capable of presenting speech output 123 to the user 125.

Figure 1B:
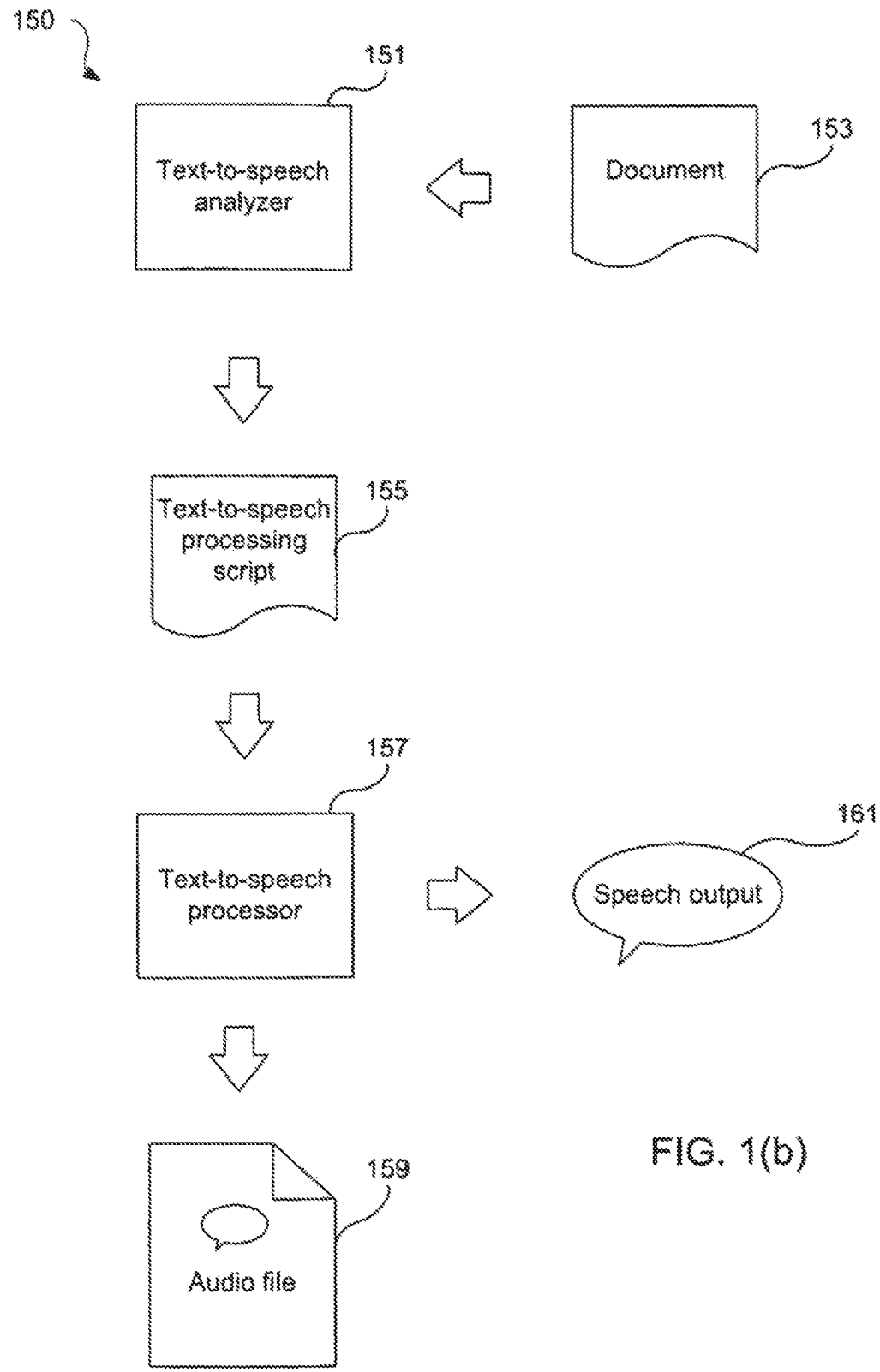
FIG. 1(b) is a block diagram of a text-to-speech processing system according to another embodiment of the invention.
Figure 1C:
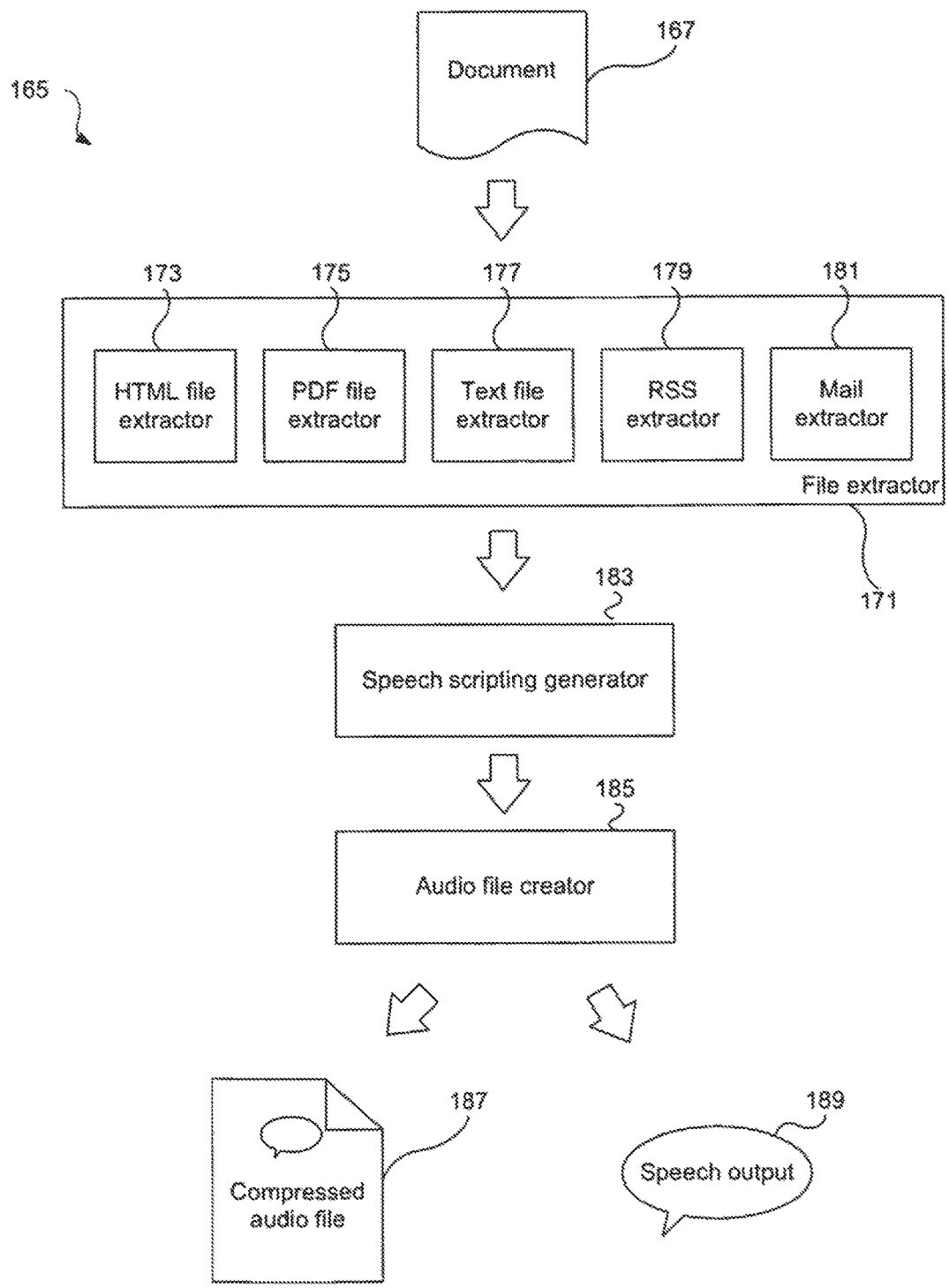
FIG. 1(c) is a block diagram of a text-to-speech processing system according to another embodiment of the invention.

FIG. 1(*b*) is a block diagram of a text-to-speech processing system 150 according to one embodiment of the invention. The text-to-speech processing system 150 can be, for example, implemented by the text-to-speech conversion application 103 of FIG. 1(*a*).

The text-to-speech processing system 150 can include a text-to-speech analyzer 151. The text-to-speech analyzer 151 can analyze a document 153 and output a text-to-speech processing script 155. The document text-to-speech analyzer 151 can, for example, identify different elements of the document 153, such as the table of contents, publishing information, footnotes, endnotes, tables, figures, embedded video or audio, document abstract, hyperlinks, proprietary elements (e.g., such as Adobe Flash content or Apple QuickTime™ content), and document meta-information. The text-to-speech processing script 155 can then be created by the text-to-speech analyzer 151 with embedded audio context cues to be interpreted by a text-to-speech processor 157.

In one embodiment, the content of a document 153 to be converted to speech can be rearranged in the text-to-speech processing script 155 according to user preferences. For example, footnotes in the document 153 can be marked to be read in-line rather than at the bottom of the page, page numbers can be announced at the start of the page rather than at the end, a table of contents can be moved or omitted entirely, etc. The text-to-speech processor 157 can output an audio file 159 or can output speech 161 directly.

In one embodiment, in the case where the text-to-speech processor 157 output is converted into an audio file 159, audio chapter information can be inserted into the text-to-speech processing script 155 for conversion into chapter or track markers within the audio file (e.g., so a user can navigate within the audio file by skipping forward or backward by chapter).

The document text-to-speech processing script 155 can be stored for later use. For example, the document text-to-speech script 155 can be stored in a header of a file, in the directory that contains the file, or in some other linked file. In one embodiment, the document text-to-speech analyzer 151 can resolve hyperlinks, either for immediate processing or for later use. In this case, a user can set a preference instructing the document text-to-speech analyzer 151 how to resolve hyperlinks (e.g., how many levels of hyperlinks to resolve). Thus, references cited to within a document, for example in footnotes or endnotes, can be processed as well and inserted into the audio file 159 by the text-to-speech processor 157.

In one embodiment, a text-to-speech processing script 155 can be embedded in a document upon creation of the document, with the assumption that some users will want to have the document read to them rather than reading it themselves. Alternatively, a standardized markup language (e.g., a "text-to-speech markup language") can be used during creation of a document, in order to allow the creator of the document to exercise creative control over future text-to-speech conversions. For example, a creator (author) of a document can, in advance, pick the voice that a text-to-speech processor will use to read a document. In another example, a creator can pre-select voices for the dialogue of characters in a document, such as a book. In a third example, a webmaster seeking to design a webpage accessible to the visually impaired can incorporate commands to be processed by a text-to-speech processor, rather than relying on a document text-to-speech analyzer to correctly interpret his webpage design.

In the above description, such as illustrated in FIG. 1(*b*), the document text-to-speech analyzer 151 and the text-to-speech processor 157 are shown as separate from each other. However, the text-to-speech analyzer 151 and text-to-speech processor 157 need not be separate. Further, the text-to-speech processing script 153 is also not required in other embodiments. Thus, in one embodiment, a single software application combining the functions of the text-to-speech analyzer 151 and the text-to-speech processor 157 can process a document 153 and output audio, either as speech output 161 (e.g., reading the document to the user on demand) or as an audio file 159 for later playback.

FIG. 1(*c*) is a block diagram of a text-to-speech processing system 165 according to one embodiment of the invention. The text-to-speech processing system 165 can receive a document 167 at a file extractor 171 that can be used to retrieve and/or examine (i.e., open) the document 167. The file extractor 171 can include a variety of modules capable of processing different types of documents 167. For example, a file extractor 171 can include an HTML file extractor 173, a PDF file extractor 175, a text file extractor 177, and RSS extractor 179, and an e-mail extractor 181, as well as other modules for extracting other types of documents (Microsoft Word files, RTF files, etc.) The file extractor 171 can output the contents (including at least text) of an extracted file to a speech scripting generator 183. The speech scripting generator 183 can take text that has been extracted by a file extractor 171 and apply heuristics (e.g., rules) to markup the text with speech markup tags. The speech markup tags can indicate when different speech attributes (e.g., the speed to read text, the voice used, or the pitch of the voice used) are to be applied.

The speech scripting generator 183 can output instructions (i.e., a script) to an audio file creator 185 which can be used to create an audio file based on the script supplied by the speech scripting generator 183 as well as the speech of the extracted text. For example, the audio file creator 185 can incorporate a text-to-speech processor and a sound recording application, where the output of the text-to-speech processor is recorded and stored as an audio file. The audio file creator 185 can output a compressed audio file 187, for example an MP3 or AAC file. Alternately, the audio file creator 185 can output an uncompressed audio file, for example an AIFF or WAV file. In an alternate embodiment, the audio file creator 185 can output speech to present to a listener, for example by using an audio output device 117 as described above in reference to FIG. 1(*a*), instead of generating a compressed audio file 187.

Figure 2:
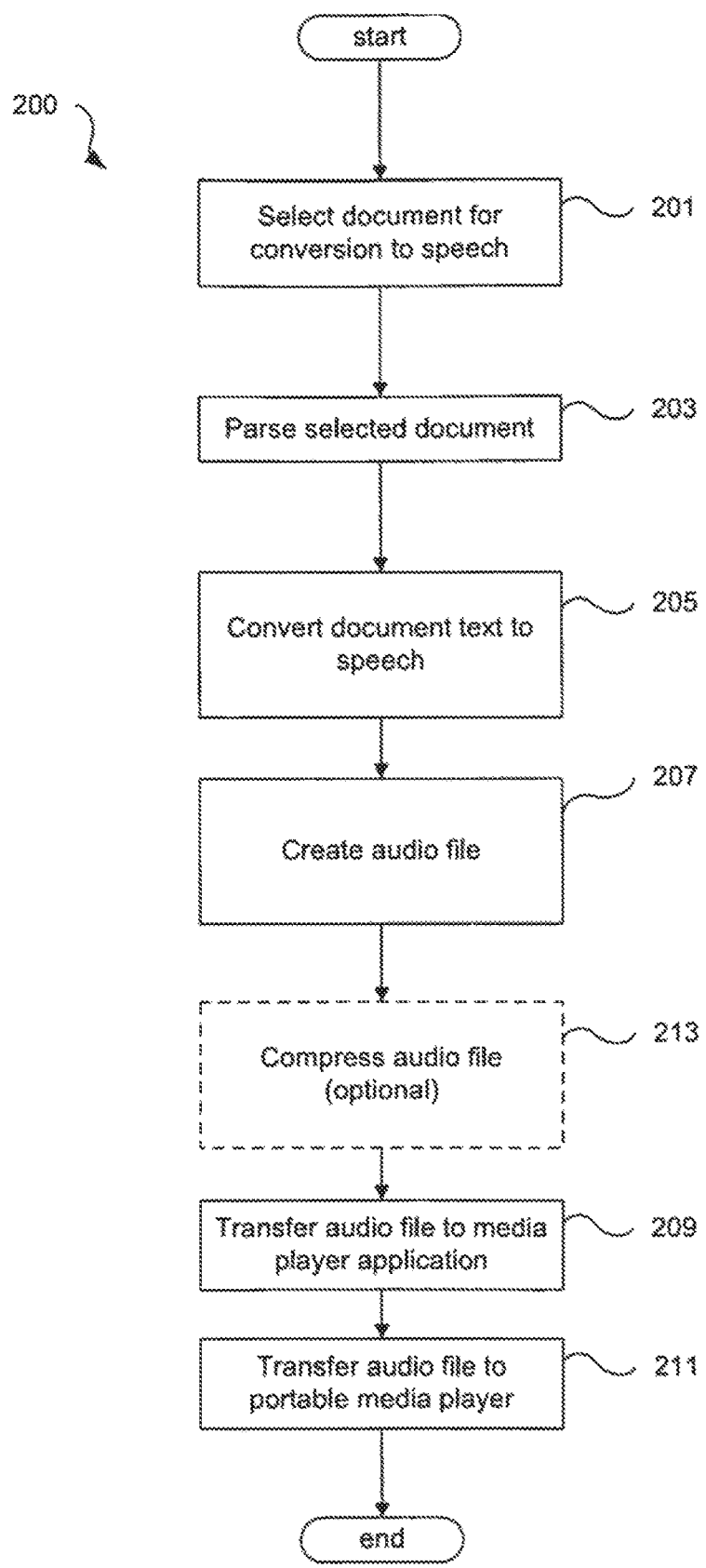
FIG. 2 is a flow diagram of a document to audio file conversion process according to one embodiment of the invention.

FIG. 2 is a flow diagram of an audio file creation process 200 according to one embodiment of the invention. The audio file creation process 200 can be implemented using, for example, the text-to-speech processing system 100 of FIG. 1(*a*), the text-to-speech processing system 150 of FIG. 1(*b*), or the text-to-speech processing system 165 of FIG. 1(*c*).

The audio file creation process 200 begins by selecting 201 a document for conversion into an audio file. A document can be any electronic file or link that contains text. For example, the document can be a text file, a PDF file, a webpage, a hyperlink, an RSS feed, or an e-mail. Text files can be of any format, for example: plain text, RTF or other proprietary file formats generated by common word processing software; files formatted using a page description language such as a Postscript or PDF; files formatted using a markup language such as HTML or XML; or files formatted using a typesetting program such as TeX. The audio file creation process 200 continues by parsing 203 the selected document. Parsing 203 can involve examining, interpreting and/or identifying all the various elements of the selected document. For example, parsing 203 can be used to identify the various text elements in the selected document, including, but not limited to, author information, document title, header text, footer text, body text, table captions, picture captions, abstract text, footnotes, endnotes, table of contents, hyperlinks, and copyright information. In addition, parsing 203 can involve identifying supplemental elements that may be present in the selected document. Examples of supplemental elements are markup tags, typesetting information, binary code, embedded video, pictures, proprietary content such as Flash or QuickTime, and metadata. In one embodiment, when hyperlinks are present, one or more hyperlinks can be opened and resolved during the parsing 203 of the selected document. For example, if the selected document is an RSS feed, the parsing 203 can resolve a RSS URL for the RSS feed, and examine the text or webpage associated with the RSS URL. As another example, if the selected document pertains to e-mail, parsing 203 can include retrieving e-mails from a server.

Once the document has been parsed 203, the document text is converted 205 to speech consistent with the document parsing 203 using a text-to-speech processor, for example the text-to-speech processor 107 of FIG. 1(b). Different types of text elements can be converted to speech differently, using different speech cadence, inflection, or tone, or by indicating different types of text using auditory cues. The audio file creation process 200 continues by creating 207 an audio file using the speech created by the text-to-speech conversion of step 205, for example, by recording (i.e., storing) the output of the text-to-speech processor. Alternately, a text-to-speech processor can create 207 an audio file directly.

Next, the audio file can be transferred 209 to a media player application. In the case where the audio file is transferred to a media player application, the media player application can be a media management application for example iTunes™ software program, produced by Apple Inc. of Cupertino, Calif. Finally, the audio file can be transferred 211 to a portable media player, for example by performing a synching operation between the portable media player, (e.g., an iPod™ or other portable media player), and a personal computer. The transfer 211 of the audio file to the portable media player can be managed using the media management application. Alternately, the audio file can be transferred 211 to a media player application directly, without first performing step 209.

In one embodiment, the audio file can be compressed 213 before being transferred 209 to the media player application. Compression may be necessary because many standard audio files are created using "lossless" recording algorithms, which typically produce files that require a large amount of memory storage space. For example, in the audio interchange file format (.aiff), one minute of audio can require 10 MB or more of storage space. Thus, it is common to compress audio, for example, into a "lossy" file format, such as MP3 or AAC, which take up much less memory storage space. Alternately, in one embodiment, a compressed audio file can be created in step 207, thus eliminating the need for compression step 213.

Figure 3:
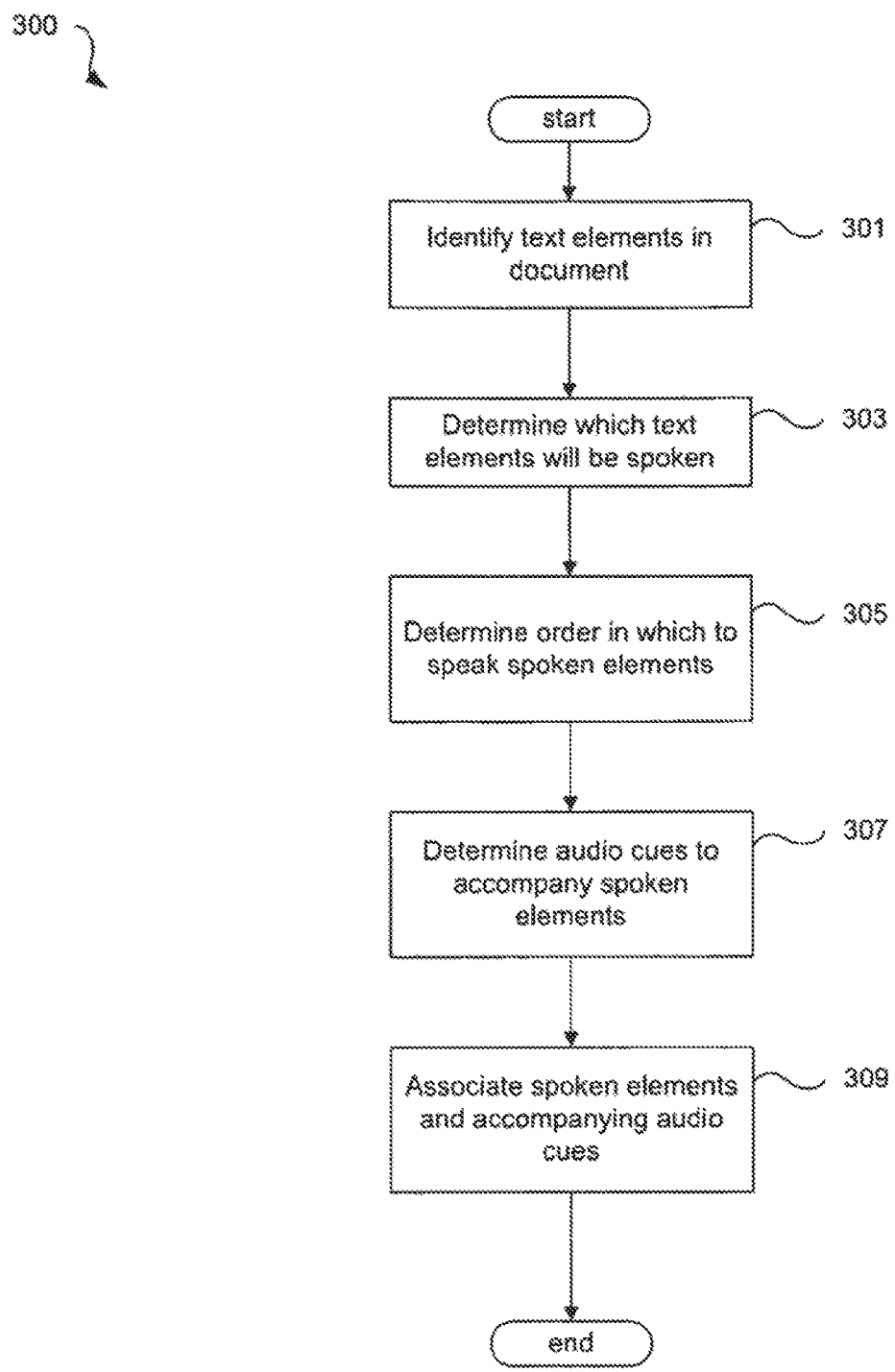
FIG. 3 is a flow diagram of a text-to-speech processing process according to one embodiment of the invention.

FIG. 3 is a flow diagram of a text-to-speech processing process 300 according to one embodiment of the invention. The text-to-speech processing process 300 can replace and/or supplement the parsing step 203 and the text-to-speech conversion step 205 of FIG. 2.

The text to speech processing process 300 begins by identifying 301 text elements in a given document. The identifying 301 of text elements in a document can include, for example, parsing the document as described in block 203 of FIG. 2. Other elements in the document, such as supplemental elements, including pictures, embedded video, markup language tags, and metadata, can also be identified 301. The supplemental elements may also include text that is not normally presented to a reader when the document is displayed, such as copyright information or document revision information.

Figure 4:
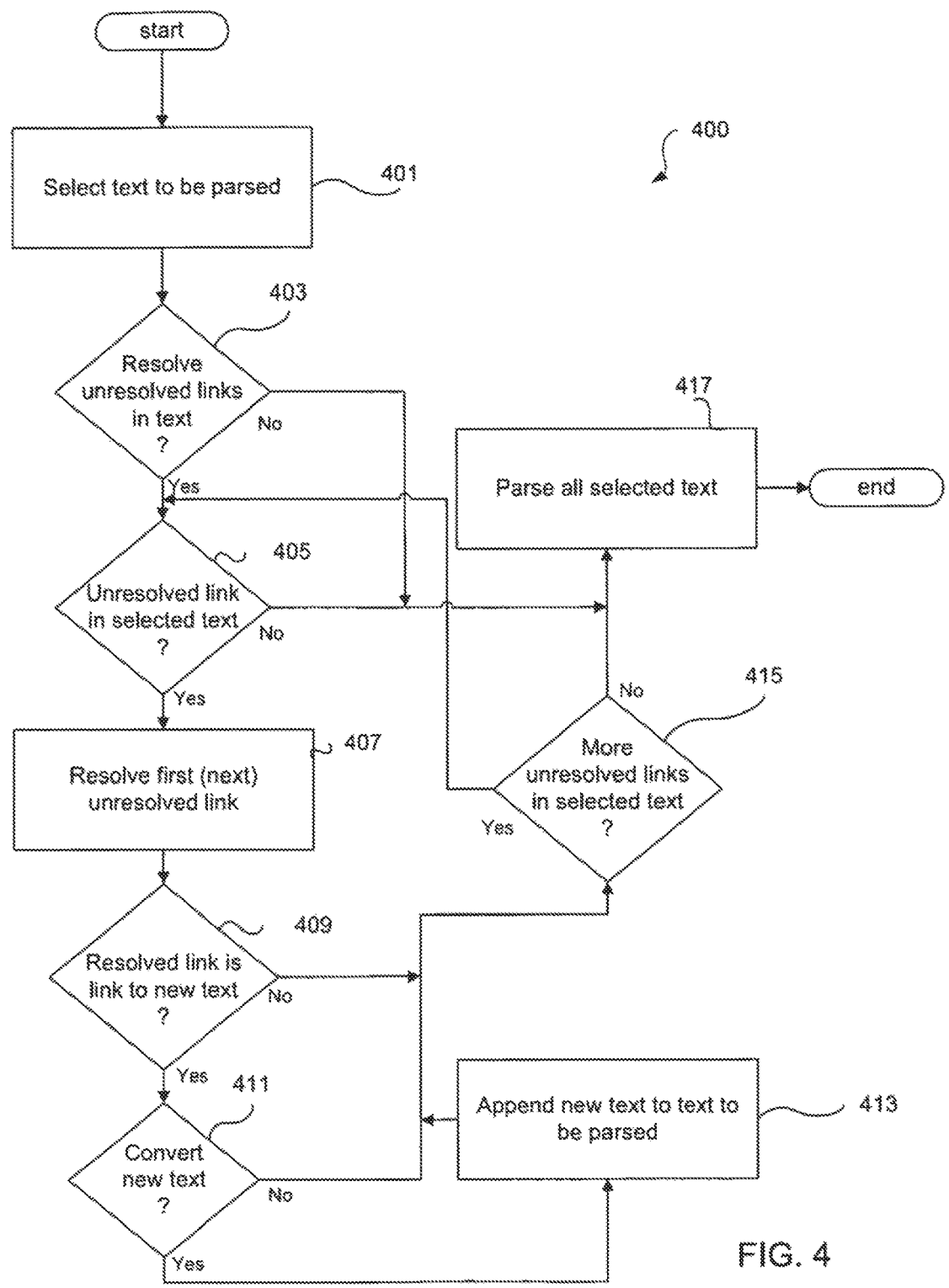
FIG. 4 is a flow diagram of a text-parsing process according to one embodiment of the invention.

Next, the text-to-speech processing process 300 determines 303 which text elements will be spoken. Examples of text elements that can be spoken include, but are not limited to, titles, body text, footnotes, picture captions. table captions. and page numbers. Examples of text elements that might not be spoken include markup tags, tables of contents, and other text elements that may be difficult to convert to speech. Those particular text elements that are not to be spoken can be designated as non-spoken text elements during the determination 303. FIG. 4, as discussed below, is a flow diagram of a text-parsing process 400 according to one embodiment of the invention.

The text to speech processing process 300 continues by determining 305 the order in which to speak spoken elements. For example, the text-to-speech processing process 300 can determine 305 that footnotes contained in a document are to be spoken in line (i.e., spoken as they occur in the document). Other examples of text elements that may be spoken in a different order than they occur in the text document include page numbers, which can be spoken at the beginning of the page rather than at the end, author information, and endnotes. Next, audio cues that will accompany spoken elements can be determined 307. Audio cues include audio contextual cues that are presented to the listener in order to better convey the content of a particular document. As noted above, audio contextual cues can be as simple as announcing the context of a particular block of text, for example by saying "this is a title", "this is a footnote", etc. Audio contextual cues for the content of a document can also be imparted, for example, by altering the speed of the text as it is read, changing the voice used by the text-to-speech processor, playing a sound to announce a contextual change, speaking the text while a background noise is played, or altering the volume of the voice speaking the text.

Next, the spoken elements as determined in step 303 are associated 309 with the audio cues that were determined in step 307. The association 309 of the spoken elements and the audio clues can produce a tagged document or a speech script for use with a document.

In one embodiment, the invention can process hyperlinks in a document in an intelligent manner. In one implementation, when a block of text includes a hyperlink, a text-to-speech processor can indicate (e.g., by auditory cue) to the user that a string of text (possibly a word or phrase) is a hyperlink. As one example, a low tone in the background can be played while a text-to-speech processor speaks the hyperlink. As another example, a tone or click can be played before and/or after the hyperlink. As still another example, a text-to-speech processor can use a distinct voice to let the user know that text being read is a hyperlink. Besides auditory cues for denoting hyperlinks, hyperlinks can point to other documents and such other documents can be processed for text-to-speech and/or audio cues.

FIG. 4 is a flow diagram of a text-parsing process 400 according to one embodiment of the invention. The text-parsing process 490 can be used to resolve links (e.g., hyperlinks) in a document. For example, the text-parsing process 400 can be performed by the text-to-speech analyzer 151 of FIG. 1(b).

The text-parsing process 400 begins by selecting 401 text within an electronic document to be parsed. Next, a determination 403 determines if links (e.g., hyperlinks) in the selected text are to be resolved. For example, if a user can indicate (e.g., with a preference setting) whether links are to be resolved. Resolving a link can involve following the link to another document, following the link to another place on the same document, or simply determining where the link leads. In some cases, such as when the document being processed is a webpage, it may be undesirable to follow all links, since webpages sometimes contain numerous links. In other cases, it may be desirable to resolve one or more links in-line, such as when the webpage contains footnotes. Alternatively, the text-parsing process 400 may simply determine that a document contains one or more links without resolving any of the links. Thus the determination 403 can be used to determine which, if any, links are to be resolved in a particular document or block of text.

If the decision 403 determines that unresolved links are not to be resolved, the selected text is parsed 417 and the parsing process 400 ends. Parsing 417 can be, for example, the parsing 203 as described in reference to FIG. 2. On the other hand, if determination 403 determines that one or more unresolved links are to be resolved, then the text-parsing process 400 continues to decision 405 which determines if there are unresolved links in the selected text. If decision 405 determines that there are no unresolved links in the selected block of text, then the selected text is parsed 417 and the text-parsing process 400 ends. Alternatively, if decision 405 determines that there are unresolved links in the selected text, then the first unresolved link is resolved 407. Next, a decision 409 determines if the link that has been resolved 407 is a link to new text. such as a link to a footnote or a new document. If decision 409 determines that the resolved link is not a link to new text, for example if the link is a link (e.g., a bookmark) to a different section of the same document, then the text-parsing process 400 proceeds to decision 415. On the other hand, if decision 409 determines that the resolved link is a link to new text, a decision 411 determines if the new text is to be converted. In the case wherein the new link is a link to a new document, for example a different webpage, decision 411 can determine that the new text is not to be converted. Alternatively, in the case where the new link is a link to a footnote. decision 411 can determine that the text is to be converted. The decision of whether to convert a particular block of text can be, for example, predetermined by a user (i.e., by setting a preference setting) or predetermined by the designer of the program used to parse the document (i.e., set by default in a program). If decision 411 determines that the new text is to be converted, the new text is appended 413 to the text that was previously selected 401 to be parsed. At this point in the text-parsing process 400, the text that will eventually be parsed in step 417 includes the original text selected 401 and the new text appended 413.

Following block 413, following the decision 409 if the resolved link is not a link to new test, or following the decision 411 if the new text is not to be converted, a decision 415 determines if there are more unresolved links in the selected text. If decision 415 determines that there are more unresolved links, the text-parsing process 400 continues to decision 405 and subsequent blocks. If decision 415 determines that there are no more unresolved links, the text-parsing process 400 continues to block 417 where the selected text together with any appended new test can be parsed. Following block 417, the text-parsing process 400 can end.

In one embodiment of the invention, in the case where the new link is a link to a new document, the new document can be converted and stored as a separate audio file. Furthermore, links between one or more audio files created by, for example, the text-to-speech processing system of FIG. 1(b) can be inserted as chapter or section markers in the audio files. Later, when a user listening to an audio file created by a text-to-speech processor is notified (e.g., by an audio cue) that a hyperlink or link to another document has been reached, that user could, if desired, skip forward to that document.

Figure 5:
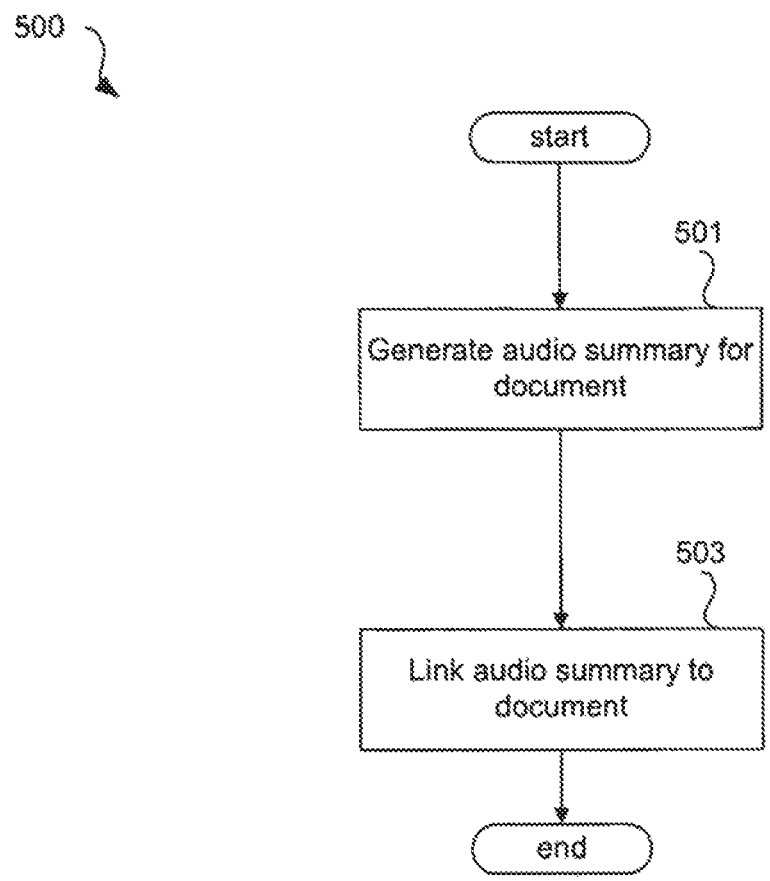
FIG. 5 is a flow diagram of an audio summary generating process according to one embodiment of the invention.

FIG. 5 is a flow diagram of an audio summary generating process 500 according to one embodiment of the invention. The audio summary generating process 500 can be used to create an audio summary for a file. The resulting audio summary can be accessed without opening the file. In one embodiment, the audio summary is implemented as "audio metadata", whereby metadata that is incorporated into a file is converted into speech. For example, many audio files, such as MP3 files or AAC files, contain metadata (i.e., data and that describes the data contained in the file). The audio summary generating process 500 can be used to convert the metadata contained in the MP3 or AAC file into an audio format (i.e., audio metadata) using a text-to-speech processor. One advantage of converting metadata into audio metadata is that a user can determine the contents of a file without having to look at or open that file.

The audio summary generating process 500 can begin by generating 501 an audio summary for a document. As examples, the document can be a music file, a text document, or a webpage. In the case of a music file, the generating of an audio summary can involve examining the metadata of the music file (typically contained in the file headers) and converting some or all of the metadata to audio. In the case of a text file, the generating 501 of the audio summary can include parsing the document to determine the author and title of the document. Further, in the case of the text file, the generating 501 of the audio summary can include identifying abstract or summary text and including audio for such text in the audio summary. In the case of a webpage, a generating 501 of the audio summary can include parsing the webpage for metadata, identifying title, author and/or abstract information for the webpage.

E-mail and RSS feeds typically include text and thus can also be considered documents. In the case of e-mail, the generating of the audio summary can include summarizing the contents of an e-mail inbox. For example, if an e-mail inbox contains five messages, the audio summary generating process can parse the headers of the five e-mails and compose a summary of the authors and subjects of the e-mails. Similarly, in the case of an RSS feed, the audio summary generating process can generate 501 a summary of the sources and subjects of new or updated RSS feeds.

In any event, after the audio summary is generated 501, the audio summary generating process 500 can link 503 the audio summary to the document. The linking 503 of the audio summary to the document can include, for example, embedding the audio summary into a header of a file containing the document. Alternately, the linking 503 of the audio summary to the document can store the audio summary in a directory associated with the document and provide a pointer (i.e., a software pointer) to the document.

Figure 6:
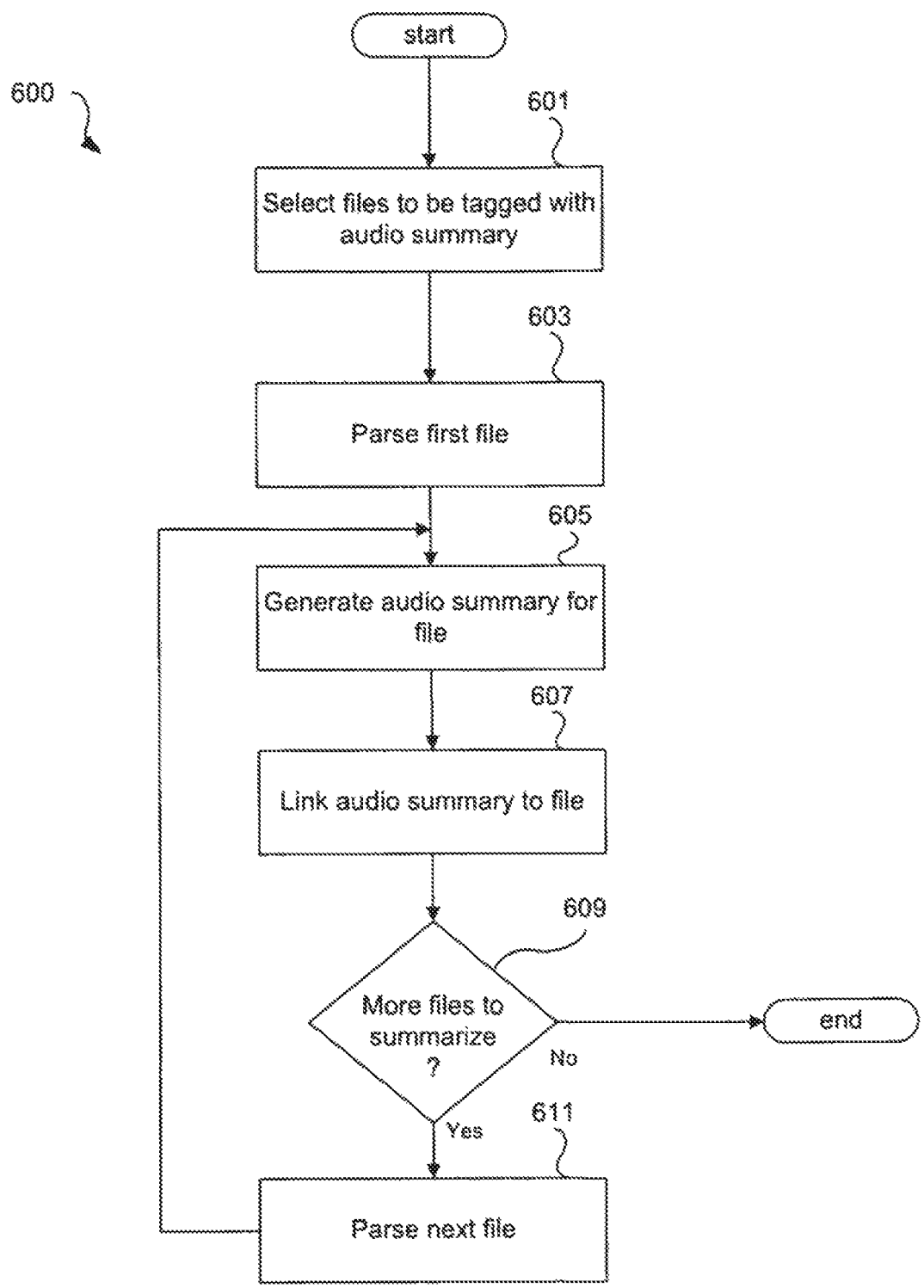
FIG. 6 is a flow diagram of an audio summary file-tagging process according to one embodiment of the invention.

FIG. 6 is a flow diagram of an audio summary file tagging process 600 according to one embodiment of the invention. The audio summary file tagging process 600 can be used to tag or more files with audio summary data. The audio summary file tagging process 600 can be performed as a batch operation, for example, on a folder of files, an e-mail inbox, a collection of RSS feeds, or on an entire directory tree. In one implementation, the audio summary file tagging process 600 can occur during, for example, the generation 501 of an audio summary for a document as described above in reference to FIG. 5.

The audio summary file tagging process 600 begins by selecting 601 one or more files to be tagged with an audio summary. As mentioned above, the selection 601 of one or more files can include files within a folder or directory. Next, a first file is parsed 603. The file can be parsed 603, for example, using a text-to-speech analyzer 151 as described in FIG. 1(*b*). After the file is parsed 603, an audio summary for the file is generated 605. The audio summary can be generated 605, for example, as described above with reference to FIG. 5. After generating 605 the audio summary for the file, the audio summary file tagging process 600 continues by linking 607 the audio summary to the file. The linking 607 can be accomplished, for example as described above in reference to FIG. 5. Next, a decision 609 that determines if more files have been selected to summarize, such as in the case where multiple files have been selected to be tagged with audio summaries. If decision 609 determines that there are more files to summarize, then the audio summary file tagging process 600 continues to parse 611 a next selected file. After the next selected file is parsed 611, the audio summary file tagging process returns to repeat block 605 and subsequent blocks to produce the audio summary for the selected file. On the other hand, if decision 609 determines that there are no more files to summarize, then the audio summary file tagging process 600 ends.

In one embodiment, when a user selects a file (i.e., clicks on the file using a mouse) that contains an audio summary, a text-to-speech processor, for example the text-to-speech conversion application 103 of FIG. 1(*a*), presents an audio summary of the selected file. In another embodiment, when a user mouses over (i.e., manipulates a mouse to place a cursor over) a file, a text-to-speech processor presents the audio summary of the file that has been moused over. In a third embodiment, selecting or mousing over a file or document causes a media player application to play an audio summary associated with the selected document or file. In still another embodiment, a portable media player incorporates the capability to present an audio summary of a file when a user selects the file, for example, by using the user interface of the portable media player. In one embodiment, the audio summary can be generated on a personal computer and transferred to a portable media player for later presentation by the portable media player. In another embodiment, the audio summary can be presented using a text-to-speech processor operating on the portable media player.

Figure 7:
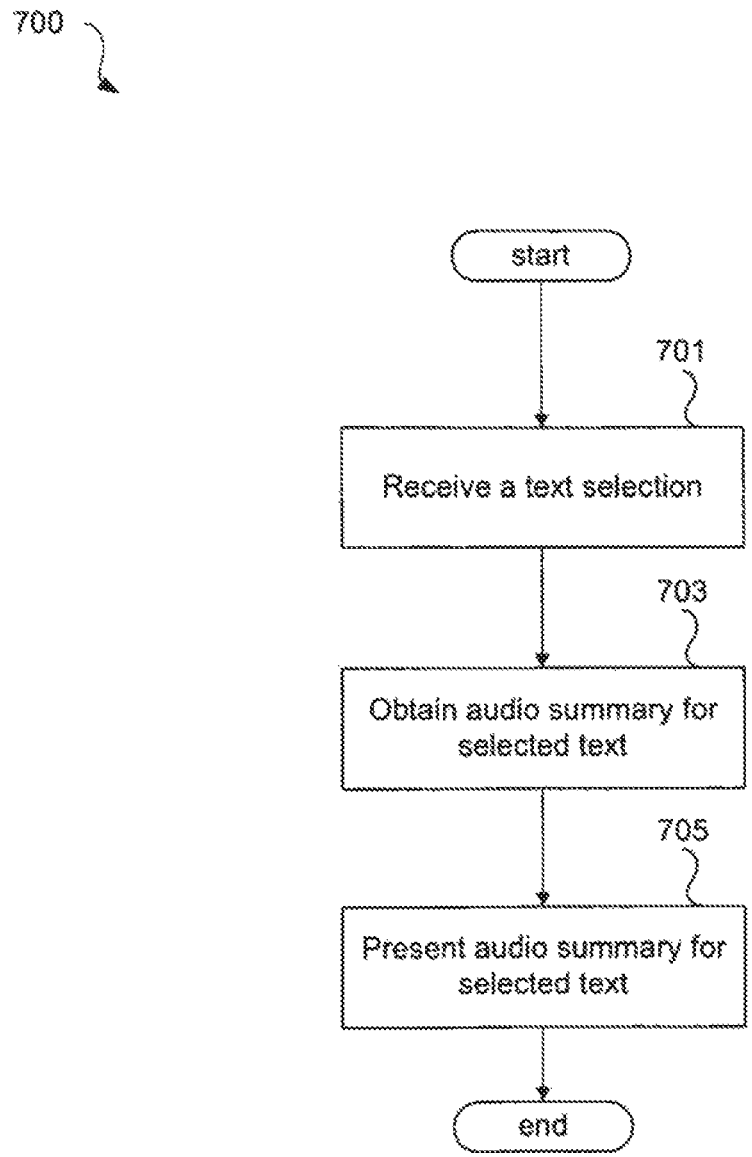
FIG. 7 is a flow diagram of an audio summary presentation process according to one embodiment of the invention.

FIG. 7 is a flow diagram of an audio summary presentation process 700 according to one embodiment of the invention. The audio summary presentation process 700 can be implemented by, for example, the host computer 101 of FIG. 1(*a*). Alternately, or in addition, the audio summary presentation process 700 can be implemented by the portable media player 121 of FIG. 1(*a*).

The audio summary presentation process 700 begins by receiving 701 a selection of text (e.g., document) to be summarized. In the case of a webpage, entering the webpage URL into a network browser can operate to select text to be summarized. In the case of a document or file, clicking or mousing over a file can operate to select text from an associated document. In the case of an e-mail application, opening an e-mail inbox can operate to select text of e-mails in the e-mail inbox. Similarly, in the case of an RSS reader, navigating to or opening a RSS reader application can operate to select text from one or more of the RSS feeds available to the RSS reader. Next, the audio summary presentation process obtains 703 an audio summary for the selected text. The audio summary can be created or, if already created and stored, the audio summary can be retrieved. Finally, the audio summary for the selected text is presented 705 to the user. For example, the host computer 101 or the portable media player 121 can play the audio summary for a user.

Figure 8:
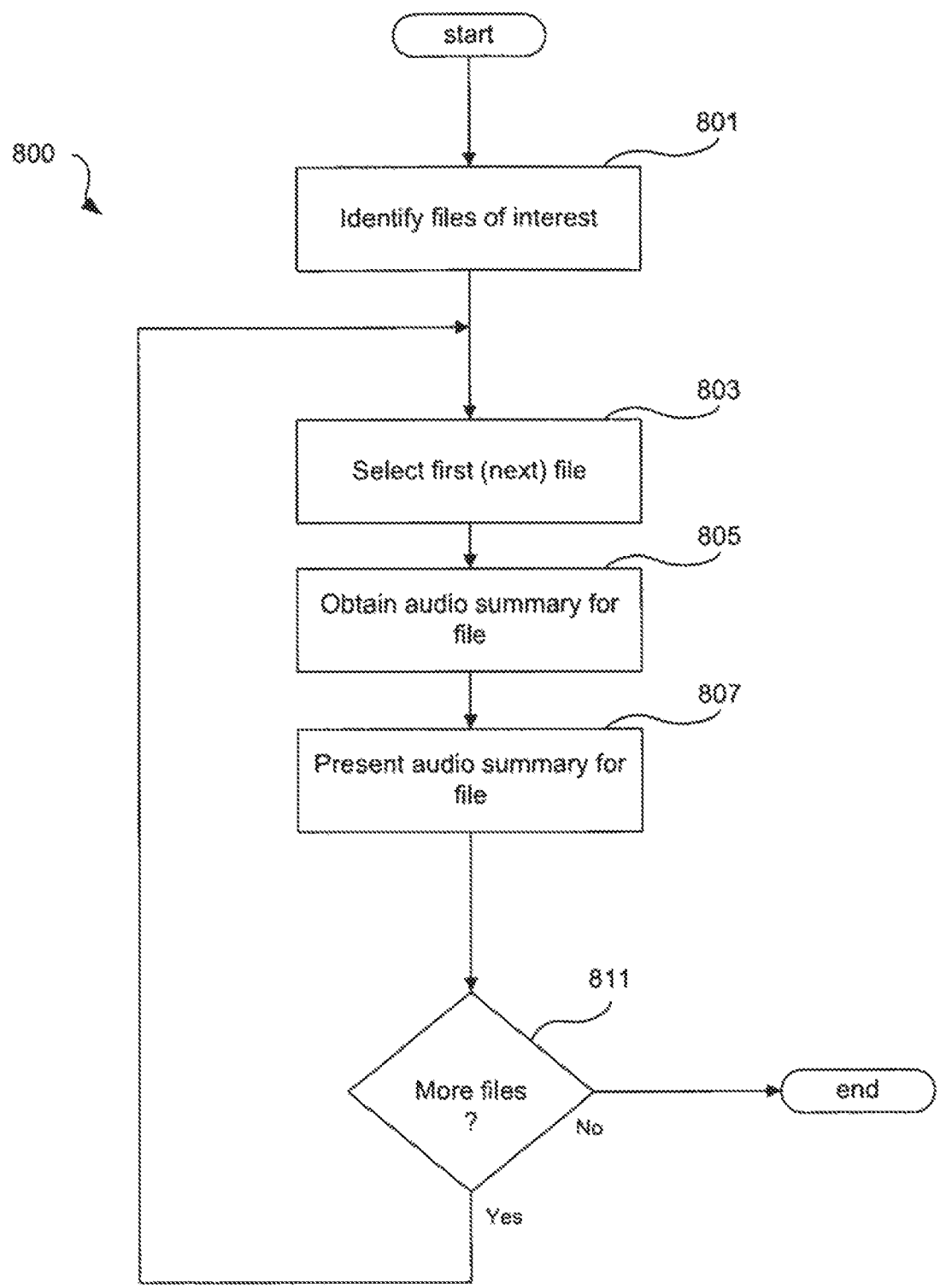
FIG. 8 is a flow diagram of an audio summary presentation process according to one embodiment of the invention.

FIG. 8 is a flow diagram of an audio summary presentation process 800 according to one embodiment of the invention. The audio summary presentation process 800 can be used to apply the audio summary presentation process 700 of FIG. 7 to a group of files or documents. The audio summary presentation process 800 can be implemented by, for example, the host computer 101 of FIG. 1(*a*). Alternatively, or in addition, the audio summary presentation process 800 can be implemented by the portable media player 121 of FIG. 1(*a*).

The audio summary presentation process 800 begins by identifying 801 files of interest. The files of interest can pertain to text or documents of interest. For example, the identifying 801 can be initiated by selecting a folder or directory of files or navigating to a website. Next, a first file of interest is selected 803. After selecting 803 the file, an audio summary is obtained 805 for the selected file. The audio summary can be obtained 805 from memory or can be generated. Next, the audio summary is presented 807 for the selected file.

After presenting 807 the audio summary for the selected file, a decision 811 determines if more files to be processed to provide audio summaries are. Here, the decision 811 can be based on the files of interest identified in step 801. If there are more files to be processed, the audio summary presentation process 800 returns to block 803 where a next file can be selected and then similarly processed. On the other hand, if there are no more files to be processed, then the audio summary presentation process 800 ends.

In one embodiment, when a user selects a file (i.e., clicks on a file using a mouse) a directory that contains one or more audio summaries, a text-to-speech processor, for example the text-to-speech conversion application 103 of FIG. 1(*a*), presents an audio summary of the selected file. In another embodiment, the audio summary presentation process 800 can be used to create an audio summary of one or more files, e-mails, RSS feeds, etc., create an audio file of the audio summary, and later transfer the audio file of the audio summary to a portable media player for playback at the user's convenience. In this embodiment, the audio summary of the one or more files can be a separate audio file from the audio files that it summarizes. For example, in the case of an e-mail inbox, an audio summary can be made describing the contents of the user's inbox. In addition, each individual e-mail can be converted to audio and stored in one or more separate files. Alternatively, a single audio file can be created containing chapters, wherein one chapter contains an audio summary of the contents of the user's e-mail inbox and subsequent chapters contain text-to-speech conversions of the individual e-mails in the user's e-mail inbox.

It is noted that audio summaries can be embedded or linked to documents by any of the above processes at any stage of file creation or after files have been created. For example, an audio summary can be embedded into a webpage by the creator of the webpage. In another example, an audio summary can be embedded in a document (e.g., as metadata) upon creation of the document by the author of the document. Thus, in the case where a user purchases a media file on an online store, the producer of the media file may have already embedded an audio summary and/or audio metadata into the file.

Figure 9A:
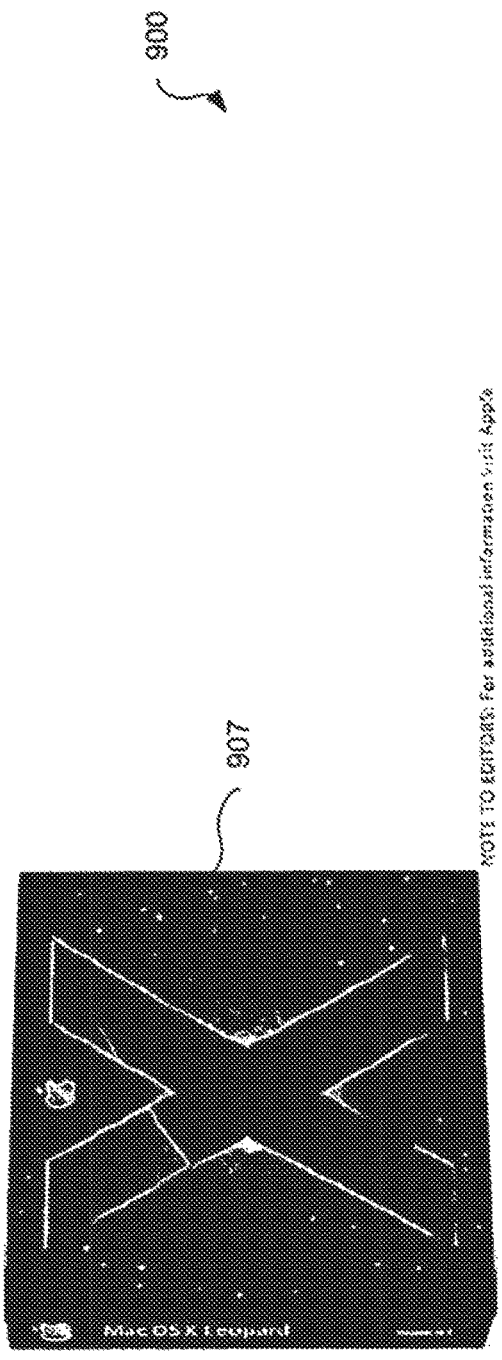
FIG. 9(a) is a screenshot of an exemplary text document.

FIG. 9(a) is a screenshot of an exemplary document 900. The exemplary document 900 is a document that contains not only text but also a footnote 901, a quote 903, a hyperlink 905 and an image 907. The document also varies text sizes and has punctuation and formatting. The document 900 can be a webpage, a PDF document, or any other document type that can contain not only text but also specific components such as footnotes, quotes, hyperlinks and images.

FIG. 9(b) is a screenshot of an exemplary marked up document 950 that has been prepared for conversion to speech. The exemplary marked up text document 950 can represent the exemplary document 900 of FIG. 9(a) after it has been marked up with instructions for subsequent spoken presentation by a voice synthesizer (e.g., a computerized voice used by a text-to-speech program to speak text.) The instructions embedded in the exemplary marked up text document 950 can be regarded as instructions corresponding to one implementation of a text-to-speech markup language described above in reference to FIG. 1(b) above. Further, exemplary text marked up document 950 can be regarded as an example of a text-to-speech processing script created by the text-to-speech analyzer 151 of FIG. 1(b). In the exemplary marked up text document 950, pauses can indicate punctuation, for example a voice synthesizer can insert long pause 951 to indicate two new lines, a short pause 953 to indicate a dash, a short pause 963 to indicate a font style change, and a long pause 967 to indicate extended punctuation, in this case a long string of asterisks. Long and short pauses can have different durations as set, for example, by a user preference. The exemplary marked up text document 950 also includes markup indicating changes in the speed at which the text-to-voice synthesizer will speak text. Rate increase 955 indicates parenthetical text. Rate increase 957 indicates a footnote. Rate decrease 965 indicates a link (e.g., hyperlink). The rate at which text is spoken can be set by the user as a user preference. The exemplary marked up text document 950 also includes voice synthesizer voice selections. Voice selection 959 indicates a male voice, designated Steve, will be used to speak the text contained in quotes. Voice selection 961 indicates that a voice, designated narrator, will be used to speak the text. Any number of different voices may be available, depending on the speech synthesizer. Alternatively, the parameters covering the voice produced by the text-to-speech synthesizer (e.g., pitch, speed, tone, accent, inflection, etc.) can be designated in the document, allowing for the creation of custom voices for a particular document. The exemplary marked up text document 950 also includes markup that directs text-to-speech processor to play sounds at particular times during the speaking of a document. In the exemplary marked up document 950, a command to play a sound 973 is used to indicate a link in the document, while a command to play a sound 969 is used to indicate an image in the document. The exemplary marked up text document 950 also depicts that the footnote text 971 is spoken inline where it is first referenced in the document and is not re-spoken at the end of the page.

The advantages of the invention are numerous. Different aspects, embodiments or implementations may, but need not, yield one or more of the following advantages. One advantage of certain embodiments of the invention is that improved quality of text-to-speech processing and improved identification of documents can be provided through the use of audio metadata. Another advantage of certain embodiments of the invention is that pauses, voice changes, and other audio cues can be presented to a user, thus improving the user experience when listening to text-to-speech output. This improved user experience when listening to text-to-speech output can be especially beneficial to a visually impaired listener, who can gain a fuller and more comprehensive understanding of a document's structure, format and content. Another advantage of certain embodiments of the invention is that audio summaries can for documents can be produced and presented. Another advantage of certain embodiments of the invention is that use of text-to-speech processing scripts allows separation of text-to-speech presentation software from text-to-speech processing software, which can reduce the need for complex text-to-speech processing applications on device providing speech presentation. For example, a device with minimal processing power can run a simple text-to-speech engine that follows a text-to-speech script that has been prepared on a more powerful device rather than having to perform the text-to-speech processing itself.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for converting text to speech, the method comprising:
   at an electronic device with a processor and memory storing one or more programs for execution by the processor:
      parsing a document to identify a plurality of elements in the document;

associating a first element of the plurality of elements with a first markup tag and a second element of the plurality of elements with a second markup tag;

creating an announcement comprising a spoken description of context for the first element; and based on the first markup tag and the second markup tag, generating audio that includes the announcement and a spoken form of text of the second element, wherein the announcement is spoken prior to the spoken form of the text of the second element.

2. The method of claim 1, wherein the context is a footnote.

3. The method of claim 1, wherein the context is a title.

4. The method of claim 1, wherein the document does not include text corresponding to the announcement.

5. The method of claim 1, further comprising:
identifying a non-text element of the plurality of elements in the document while parsing the document; and
creating an audio cue that represents the non-text element in the document, wherein the generated audio includes the audio cue.

6. The method of claim 5, wherein the non-text element is an image.

7. The method of claim 5, wherein the non-text element is a hyperlink.

8. The method of claim 1, further comprising:
generating a text-to-speech processing script that includes the text of the second element and the announcement, wherein the text-to-speech processing script is processed to generate the audio.

9. The method of claim 1, wherein parsing the document includes determining that the first element is a non-spoken element and the second element is a spoken element.

10. The method of claim 1, wherein in the document, the first element is positioned after the second element.

11. A non-transitory computer-readable storage medium comprising instructions, which when executed by an electronic device, causes the electronic device to:

parse a document to identify a plurality of elements in the document;

associate a first element of the plurality of elements with a first markup tag and a second element of the plurality of elements with a second markup tag;

create an announcement comprising a spoken description of context for the first element; and based on the first markup tag and the second markup tag, generate audio that includes the announcement and a spoken form of text of the second element, wherein the announcement is spoken prior to the spoken form of the text of the second element.

12. The computer-readable storage medium of claim 11, wherein the document does not include text corresponding to the announcement.

13. The computer-readable storage medium of claim 11, wherein the first element is a non-text element.

14. The computer-readable storage medium of claim 11, wherein parsing the document includes determining that the first element is a non-spoken element and the second element is a spoken element.

15. The computer-readable storage medium of claim 11, wherein in the document, the first element is positioned after the second element.

16. An electronic device, comprising:
one or more processors; and
memory storing one or more programs, the one or more programs including instructions, which when executed by the one or more processors, causes the one or more processors to:

parse a document to identify a plurality of elements in the document;

associate a first element of the plurality of elements with a first markup tag and a second element of the plurality of elements with a second markup tag;

create an announcement comprising a spoken description of context for the first element; and based on the first markup tag and the second markup tag, generate audio that includes the announcement and a spoken form of text of the second element, wherein the announcement is spoken prior to the spoken form of the text of the second element.

17. The device of claim 16, wherein the document does not include text corresponding to the announcement.

18. The device of claim 16, wherein the first element is a non-text element.

19. The device of claim 16, wherein parsing the document includes determining that the first element is a non-spoken element and the second element is a spoken element.

20. The device of claim 16, wherein in the document, the first element is positioned after the second element.

* * * * *